(12) United States Patent
von Flotow et al.

(10) Patent No.: US 11,608,191 B2
(45) Date of Patent: Mar. 21, 2023

(54) ROTORCRAFT-ASSISTED SYSTEM AND METHOD FOR LAUNCHING AND RETRIEVING A FIXED-WING AIRCRAFT INTO AND FROM FREE FLIGHT

(71) Applicant: Hood Technology Corporation, Hood River, OR (US)

(72) Inventors: Andreas H. von Flotow, Hood River, OR (US); Corydon C. Roeseler, Hood River, OR (US); Daniel Pepin Reiss, Hood River, OR (US); Jessie Massong, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 312 days.

(21) Appl. No.: 16/902,637

(22) Filed: Jun. 16, 2020

(65) Prior Publication Data

US 2020/0331633 A1     Oct. 22, 2020

Related U.S. Application Data

(62) Division of application No. 15/679,801, filed on Aug. 17, 2017, now Pat. No. 10,696,420.

(Continued)

(51) Int. Cl.
*B64F 1/02*     (2006.01)
*B65H 54/28*    (2006.01)
(Continued)

(52) U.S. Cl.
CPC .......... *B64F 1/0295* (2020.01); *B64C 39/024* (2013.01); *B64F 1/029* (2020.01);
(Continued)

(58) Field of Classification Search
CPC ... B64D 5/00; B64D 3/00; B64D 3/02; B64D 1/12; B64D 1/22; B64C 39/022; B64C 2201/182; B64C 2201/082
See application file for complete search history.

(56) References Cited

U.S. PATENT DOCUMENTS

| 968,339 A | 8/1910 | Geraldson |
| 1,144,505 A | 6/1915 | Steffan |

(Continued)

FOREIGN PATENT DOCUMENTS

| CA | 781808 A | 4/1968 |
| CA | 839101 A | 4/1970 |

(Continued)

OTHER PUBLICATIONS

"Bell QTR Quad Tiltrotor", Aviastar (3 pages), Jul. 27, 2015.
(Continued)

*Primary Examiner* — Brian M O'Hara
(74) *Attorney, Agent, or Firm* — Neal, Gerber & Eisenberg LLP

(57) ABSTRACT

Various embodiments of the present disclosure provide a rotorcraft-assisted system and method for launching and retrieving a fixed-wing aircraft into and from free flight. The launch and retrieval system includes a modular multicopter, a storage and launch system, an anchor system, a flexible capture member, and an aircraft-landing structure. The multicopter is attachable to the fixed-wing aircraft to facilitate launching the fixed-wing aircraft into free, wing-borne flight. The storage and launch system is usable to store the multicopter (when disassembled) and to act as a launch mount for the fixed-wing aircraft by retaining the fixed-wing aircraft in a desired launch orientation. The anchor system is usable with the multicopter, the flexible capture member, (Continued)

and the aircraft-landing structure to retrieve the fixed-wing aircraft from free, wing-borne flight.

17 Claims, 84 Drawing Sheets

Related U.S. Application Data

(60) Provisional application No. 62/376,359, filed on Aug. 17, 2016.

(51) Int. Cl.
| | |
|---|---|
| F15B 9/14 | (2006.01) |
| F15B 13/02 | (2006.01) |
| F15B 1/02 | (2006.01) |
| F15B 13/04 | (2006.01) |
| F15B 1/26 | (2006.01) |
| B64C 39/02 | (2023.01) |

(52) U.S. Cl.
CPC ............ *B65H 54/28* (2013.01); *F15B 1/021* (2013.01); *F15B 1/26* (2013.01); *F15B 9/14* (2013.01); *F15B 13/024* (2013.01); *F15B 13/0417* (2013.01); *B64C 2201/027* (2013.01); *B64C 2201/084* (2013.01); *B64C 2201/104* (2013.01); *B64C 2201/108* (2013.01); *B64C 2201/148* (2013.01); *B64C 2201/182* (2013.01); *B65H 2403/93* (2013.01); *B65H 2404/40* (2013.01); *B65H 2404/742* (2013.01); *B65H 2701/30* (2013.01); *F15B 2201/51* (2013.01)

(56) References Cited

U.S. PATENT DOCUMENTS

| | | | |
|---|---|---|---|
| 1,306,860 A | 6/1919 | Smith | |
| 1,383,595 A | 7/1921 | Black | |
| 1,499,472 A | 7/1924 | Pratt | |
| 1,582,188 A | 4/1926 | Mummert | |
| 1,625,020 A | 4/1927 | Guillermo | |
| 1,686,298 A | 10/1928 | Uhl | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A | 3/1932 | Griffin | |
| 1,912,723 A | 6/1933 | Perkins | |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,488,050 A | 11/1949 | Brodie | |
| 2,488,051 A | 11/1949 | Brodie | |
| 2,552,115 A | 5/1951 | Replogle | |
| 2,807,429 A | 9/1957 | Hawkins et al. | |
| 2,843,337 A | 7/1958 | Bennett | |
| 2,944,815 A | 7/1960 | Moyer | |
| 3,017,138 A | 1/1962 | Flint | |
| 3,029,049 A | 4/1962 | Melville | |
| 3,146,974 A | 9/1964 | Petoia | |
| 3,351,325 A | 11/1967 | Cotton | |
| 3,389,880 A | 6/1968 | Ferguson | |
| 3,785,316 A | 1/1974 | Leming et al. | |
| 3,804,371 A * | 4/1974 | Mills | B64D 1/22 254/336 |
| 3,809,334 A * | 5/1974 | Beurer | B64D 1/22 242/390.8 |
| 3,980,259 A | 9/1976 | Greenhalgh et al. | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,267,987 A | 5/1981 | McDonnell | |
| 4,311,290 A | 1/1982 | Koper | |
| 4,523,729 A | 6/1985 | Frick | |
| 4,575,026 A | 3/1986 | Brittain et al. | |
| 4,680,962 A | 7/1987 | Durbin | |
| 4,753,400 A | 6/1988 | Reuter et al. | |
| 4,757,959 A | 7/1988 | Schroeder et al. | |
| 4,790,497 A | 12/1988 | Yoffe | |
| 4,842,222 A | 6/1989 | Baird | |
| 5,000,398 A | 3/1991 | Rashev | |
| 5,039,034 A | 8/1991 | Burgess et al. | |
| 5,042,750 A * | 8/1991 | Winter | B64F 1/027 244/110 H |
| 5,054,717 A | 10/1991 | Taylor | |
| 5,092,540 A | 3/1992 | Burgess et al. | |
| 5,190,250 A * | 3/1993 | DeLong | B64D 1/22 244/17.11 |
| 5,687,930 A | 11/1997 | Wagner et al. | |
| 5,799,900 A | 9/1998 | McDonnell | |
| 5,806,795 A | 9/1998 | Ortelli | |
| 6,264,140 B1 | 7/2001 | McGeer et al. | |
| 6,708,926 B2 * | 3/2004 | Bonisch | B64D 7/00 244/137.1 |
| 6,824,102 B2 | 11/2004 | Haggard | |
| 6,874,729 B1 | 4/2005 | McDonnell | |
| 6,961,018 B2 | 11/2005 | Heppe et al. | |
| 7,000,883 B2 | 2/2006 | Mercadal et al. | |
| 7,028,947 B2 | 4/2006 | Burns | |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,097,137 B2 | 8/2006 | McDonnell | |
| 7,104,495 B2 | 9/2006 | McGeer | |
| 7,114,680 B2 | 10/2006 | Dennis | |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,530,527 B2 | 5/2009 | Kelleher | |
| 7,543,780 B1 | 6/2009 | Marshall et al. | |
| 7,562,843 B2 | 7/2009 | Lipponen | |
| 7,578,467 B2 | 8/2009 | Goodrich | |
| 7,581,702 B2 | 9/2009 | Olson et al. | |
| 7,602,415 B2 | 10/2009 | Von et al. | |
| 7,665,691 B2 | 2/2010 | Hanzlick et al. | |
| 7,712,702 B2 | 5/2010 | McGeer et al. | |
| 7,798,445 B2 | 9/2010 | Heppe et al. | |
| 7,806,366 B2 | 10/2010 | Jackson | |
| 7,876,359 B2 | 1/2011 | Von et al. | |
| 7,883,059 B2 | 2/2011 | Kunz | |
| 7,954,758 B2 | 6/2011 | McGeer et al. | |
| 8,091,833 B2 | 1/2012 | Von et al. | |
| 8,140,200 B2 | 3/2012 | Heppe et al. | |
| 8,162,256 B2 | 4/2012 | Goossen et al. | |
| 8,172,177 B2 | 5/2012 | Lovell et al. | |
| 8,226,039 B2 | 7/2012 | Von et al. | |
| 8,231,083 B2 | 7/2012 | Kutzmann et al. | |
| 8,245,968 B2 | 8/2012 | McGeer et al. | |
| 8,276,844 B2 | 10/2012 | Kariv | |
| 8,292,215 B2 | 10/2012 | Olm et al. | |
| 8,313,057 B2 | 11/2012 | Rednikov | |
| 8,348,193 B2 | 1/2013 | McGeer et al. | |
| 8,405,723 B2 | 3/2013 | Von et al. | |
| 8,453,966 B2 | 6/2013 | McGeer et al. | |
| 8,464,981 B2 | 6/2013 | Goldie et al. | |
| 8,573,536 B2 | 11/2013 | McGeer et al. | |
| 8,596,576 B1 | 12/2013 | McGeer et al. | |
| 8,672,264 B1 | 3/2014 | McGeer et al. | |

(56) References Cited

U.S. PATENT DOCUMENTS

| | | |
|---|---|---|
| 8,708,277 B1 | 4/2014 | McGeer et al. |
| 8,708,278 B2 | 4/2014 | McGeer et al. |
| 8,714,482 B2 | 5/2014 | McGeer et al. |
| 8,740,134 B2 | 6/2014 | Suzuki |
| 8,740,142 B2 | 6/2014 | McGeer et al. |
| 8,944,373 B2 | 2/2015 | Dickson et al. |
| 8,950,698 B1 | 2/2015 | Rossi |
| 8,955,801 B2 | 2/2015 | McGeer et al. |
| 8,991,793 B1 | 3/2015 | Bernhardt |
| 9,004,402 B2 | 4/2015 | McGeer et al. |
| 9,010,683 B2 | 4/2015 | Gundlach et al. |
| 9,132,916 B2 | 9/2015 | Hanna et al. |
| 9,193,481 B2 | 11/2015 | McGeer et al. |
| 9,266,609 B1 | 2/2016 | Kunz |
| 9,340,301 B2 | 5/2016 | Dickson et al. |
| 9,359,075 B1 | 6/2016 | Von Flotow et al. |
| 9,434,481 B2 | 9/2016 | McGeer |
| 9,456,185 B2 | 9/2016 | Oakley et al. |
| 9,637,245 B2 | 5/2017 | Yoffe |
| 9,685,091 B2 | 6/2017 | Hayes |
| 9,816,816 B2 | 11/2017 | Hayes |
| 9,856,036 B2 | 1/2018 | Dickson et al. |
| 9,896,222 B2 | 2/2018 | Kunz et al. |
| 10,293,929 B2 * | 5/2019 | von Flotow ............ B64D 5/00 |
| 10,518,902 B2 | 12/2019 | Briggs et al. |
| 10,519,013 B2 | 12/2019 | Curran et al. |
| 11,008,101 B2 | 5/2021 | Miller et al. |
| 11,230,389 B2 | 1/2022 | Gamble et al. |
| 11,518,511 B2 * | 12/2022 | Shaw .................... B64C 39/024 |
| 2002/0100838 A1 | 8/2002 | McGeer et al. |
| 2003/0222173 A1 | 12/2003 | McGeer et al. |
| 2004/0256519 A1 | 12/2004 | Ellis et al. |
| 2005/0017129 A1 | 1/2005 | McDonnell |
| 2005/0178894 A1 | 8/2005 | McGeer et al. |
| 2009/0224097 A1 | 9/2009 | Kariv |
| 2010/0025528 A1 | 2/2010 | Jackson |
| 2010/0295321 A1 | 11/2010 | Bevirt |
| 2012/0223182 A1 | 9/2012 | Gilchrist et al. |
| 2013/0161447 A1 | 6/2013 | McGeer et al. |
| 2014/0263852 A1 * | 9/2014 | Walker ................... H02G 11/02 244/53 R |
| 2015/0129716 A1 | 5/2015 | Yoffe |
| 2015/0314871 A1 | 11/2015 | Von Flotow |
| 2016/0023760 A1 | 1/2016 | Goodrich |
| 2016/0221683 A1 | 8/2016 | Roberts et al. |
| 2016/0327945 A1 | 11/2016 | Davidson |
| 2016/0375981 A1 | 12/2016 | McDonnell |
| 2017/0036762 A1 | 2/2017 | Gamble et al. |
| 2017/0072812 A1 | 3/2017 | Von Novak et al. |
| 2017/0225784 A1 | 8/2017 | Hayes et al. |
| 2017/0240277 A1 | 8/2017 | Molnar et al. |
| 2017/0369185 A1 | 12/2017 | Grubb |
| 2018/0050823 A1 | 2/2018 | McGeer |
| 2022/0380186 A1 * | 12/2022 | Chao .................. B65H 75/4486 |

FOREIGN PATENT DOCUMENTS

| | | |
|---|---|---|
| CN | 204822072 U | 12/2015 |
| EP | 0472613 A1 | 3/1992 |
| EP | 2186728 A1 | 5/2010 |
| GB | 2071031 A | 9/1981 |
| WO | 0107318 A1 | 2/2001 |
| WO | 2008015663 A1 | 2/2008 |
| WO | 2013171735 A1 | 11/2013 |
| WO | 2014204550 A2 | 12/2014 |

OTHER PUBLICATIONS

"Flexrotor Long-Endurance VTOL Aircraft Transitions to Wing-Borne Flight", Aerovel, http://www.aerovelco.com/papers/FlexrotorTransitionsAnnouncement.pdf (2 pages), Aug. 4, 2011.

"International Search Report and Written Opinion", PCT/US14/32518 (9 pages), dated Dec. 8, 2014.

"International Search Report and Written Opinion", PCT/US16/12213, dated Sep. 19, 2016.

"Rotary Action", Pigasus Press, Description of Scene of License to Kill, http://www.rotaryaction.com/pages/licetkil.html, 2014 (2 pages).

"Skyhook (Harrier Handling System)", www.harpoondatabases.com/encyclopedia/Entry2979.aspx (3 pages), Jun. 21, 2013.

"The Beartrap—A Canadian Invention", Originally published in Crowsnest Magazine—vol. 17, Nos. 3 and 4 (Mar.-Apr. 1965); retrieved at http://www.readyayeready.com/timeline/1960s/beartrap/index.htm>, retrieved on Sep. 14, 2007 (4 pages).

Dickard, H. E., "Mini-RPV Recovery System Conceptual Study", Teledyne Ryan Aeronautical, Prepared for Eustis Directorate, U.S. Army Air Mobility Research and Development Laboratory, Aug. 1977 (322 pages).

Durbin, Enoch, et al., "An Airspeed Vector Sensor for V/STOL Aircraft", Journal of Aircraft, vol. 19, No. 6, Jun. 1982 (7 pages), 449-455.

Hendrickson, Stephen P., et al., "A Miniature Powerplant for Very Small, Very Long Range Autonomous Aircraft", Final Report to the United States Department of Energy under contract No. DE-FG03-96ER82187 (Phase II SBIR) (23 pages), Sep. 29, 1999.

Holland, Greg J., et al., "Autonomous Aerosondes for Economical Atmospheric Soundings Anywhere on the Globe", Bulletin of the American Meteorological Society, vol. 73, No. 12, Dec. 1992 (12 pages).

McGeer, Tad, "Aerosonde Hazard Estimation", The Insitu Group, 1994 (7 pages).

McGeer, Tad, "Aerosonde Pacific Reconnaissance: Ready When You Are!", The Insitu Group, Pacific Northwest Weather Workshop, Mar. 2005 (15 pages).

McGeer, Tad, "Laima: The First Atlantic Crossing by Unmanned Aircraft", The Insitu Group (25 pages).

McGeer, Tad, et al., "Quantitative Risk Management as a Regulatory Approach to Civil UAVs", International Workshop on UAV Certification, Jun. 1999 (11 pages).

McGeer, Tad, "Regulatory Issues Involving Long-Range Weather Observation by Aerosonde Autonomous Aircraft", The Insitu Group (8 pages).

McGeer, Tad, "Safety, Economy, Reliability, and Regulatory Policy for Unmanned Aircraft", www.aerovelco.com, Mar. 2007 (9 pages).

McGeer, Tad, et al., "Wide-Scale Use of Long-Range Miniature Aerosondes Over the World's Oceans", available at www.aerovelco.com/papers/McGeerVagners99.mht, 1999 (25 pages).

Mullens, Katherine, et al., "Automated Launch, Recovery, and Refueling for Small Unmanned Aerial Vehicles", 2004 (11 pages).

* cited by examiner

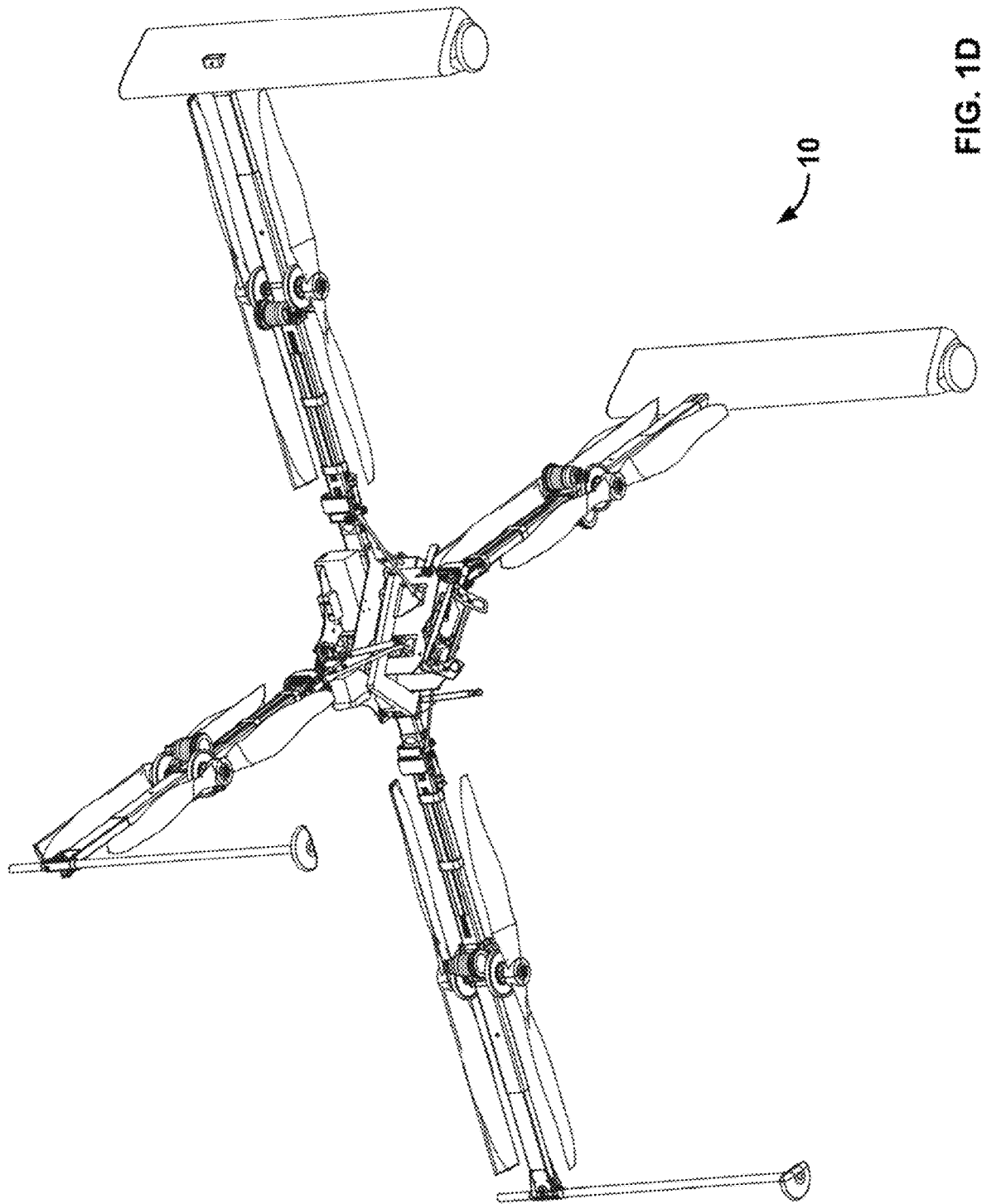

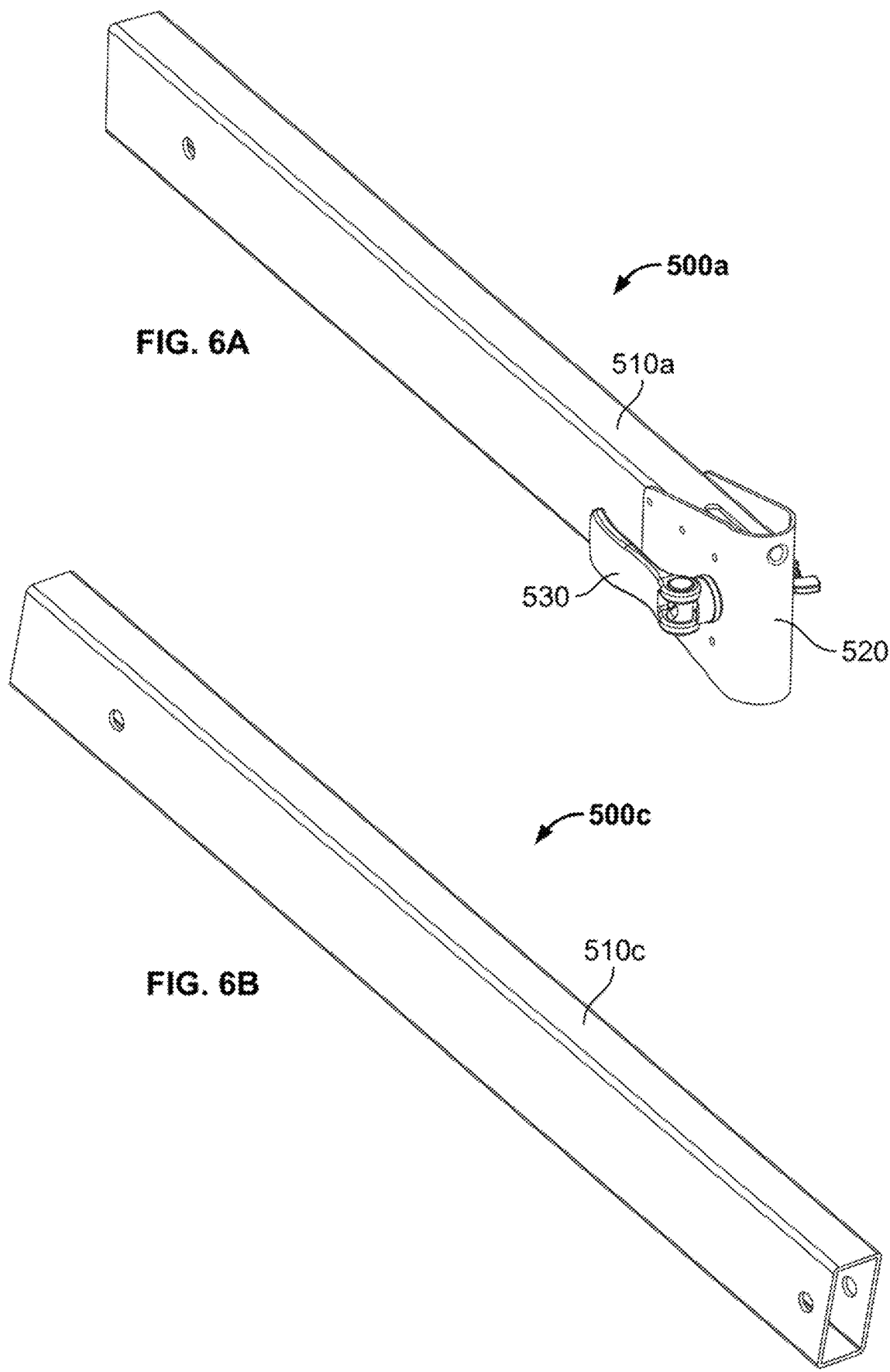

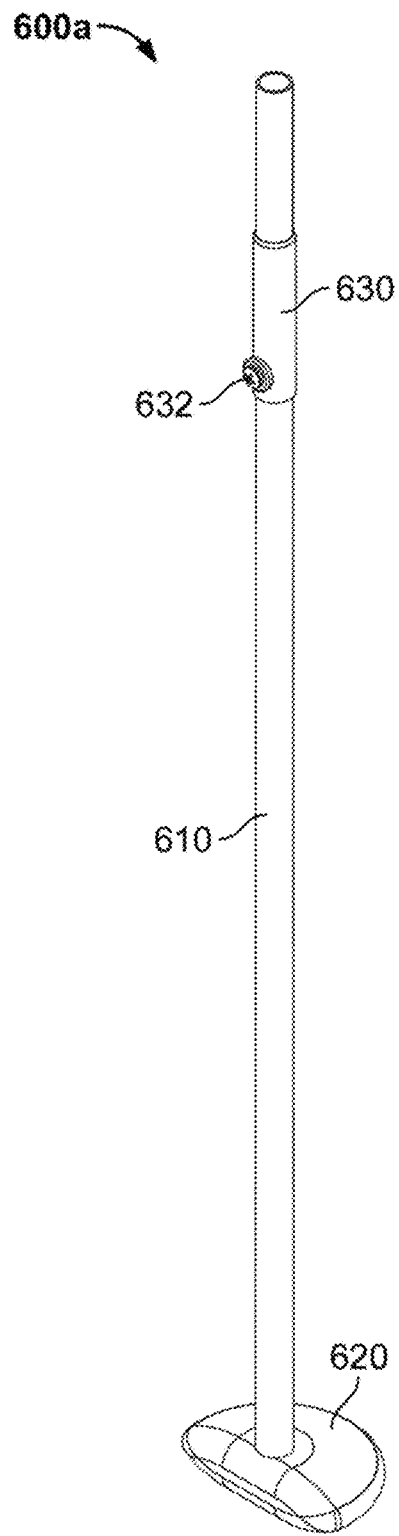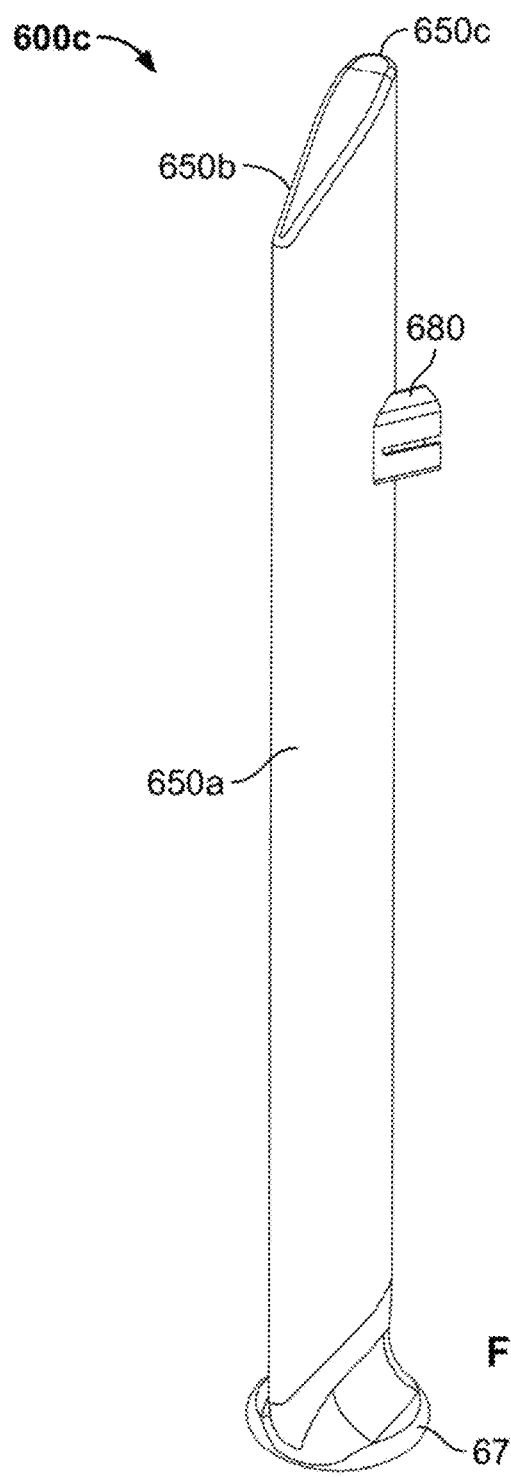
FIG. 7A
FIG. 7B

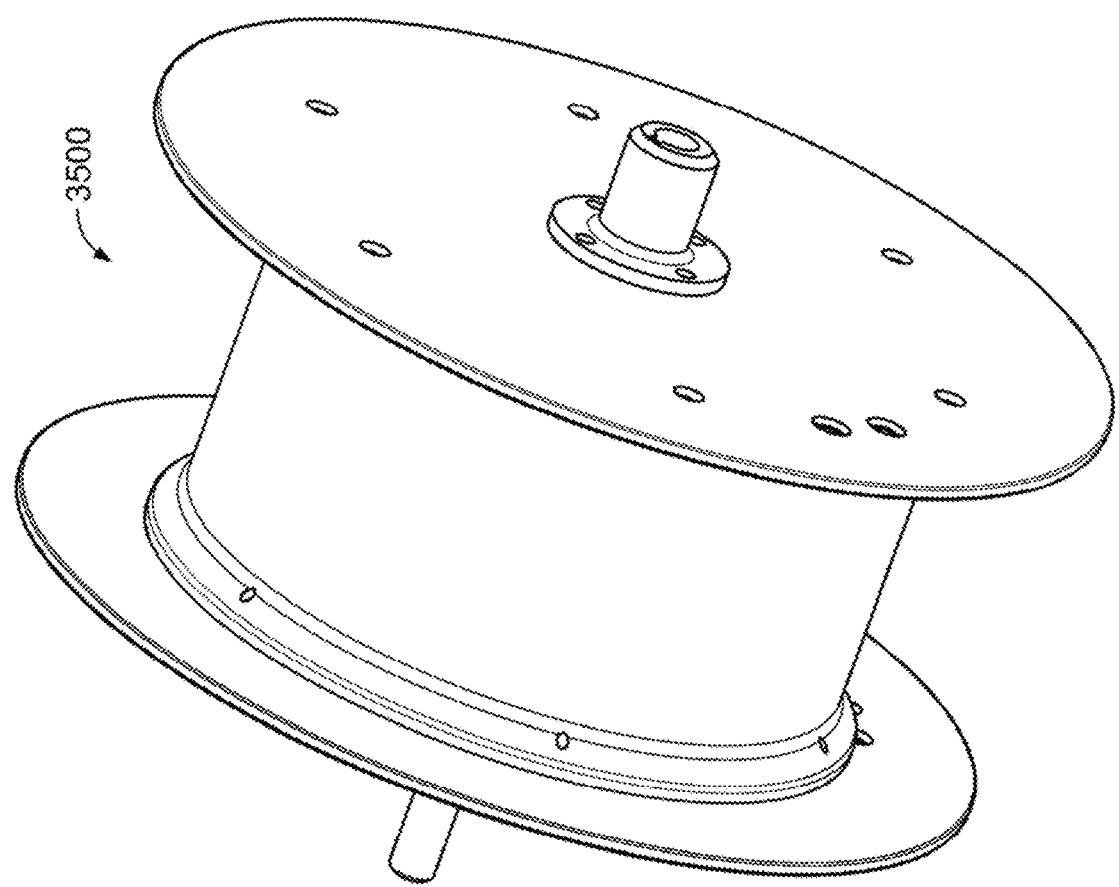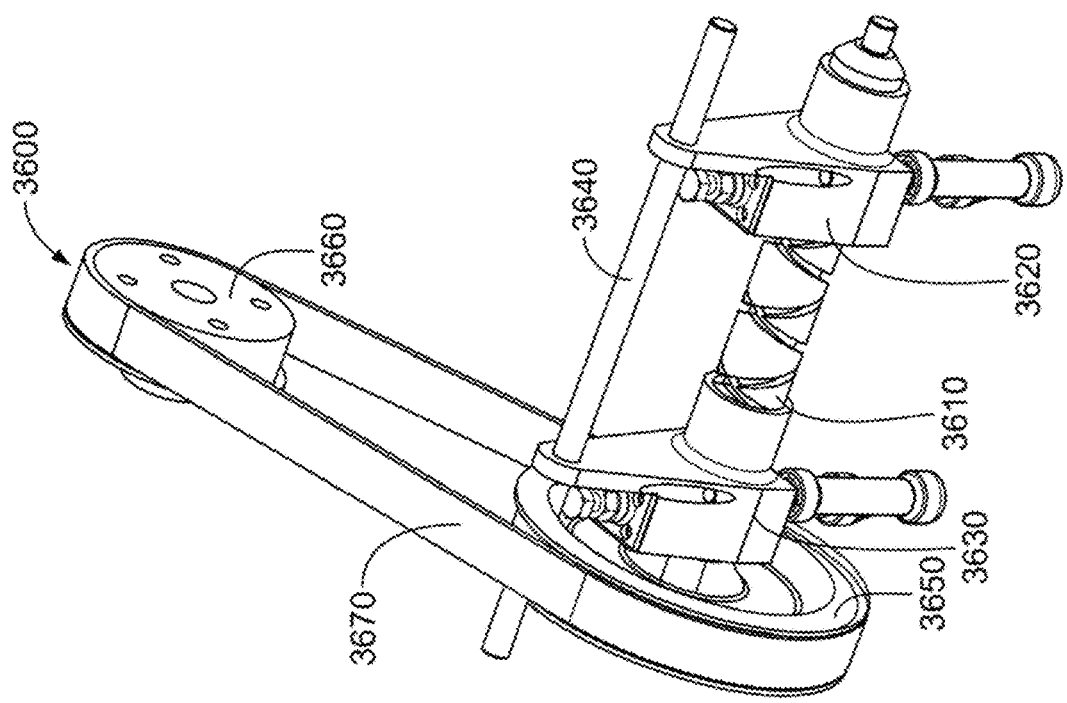
FIG. 9F

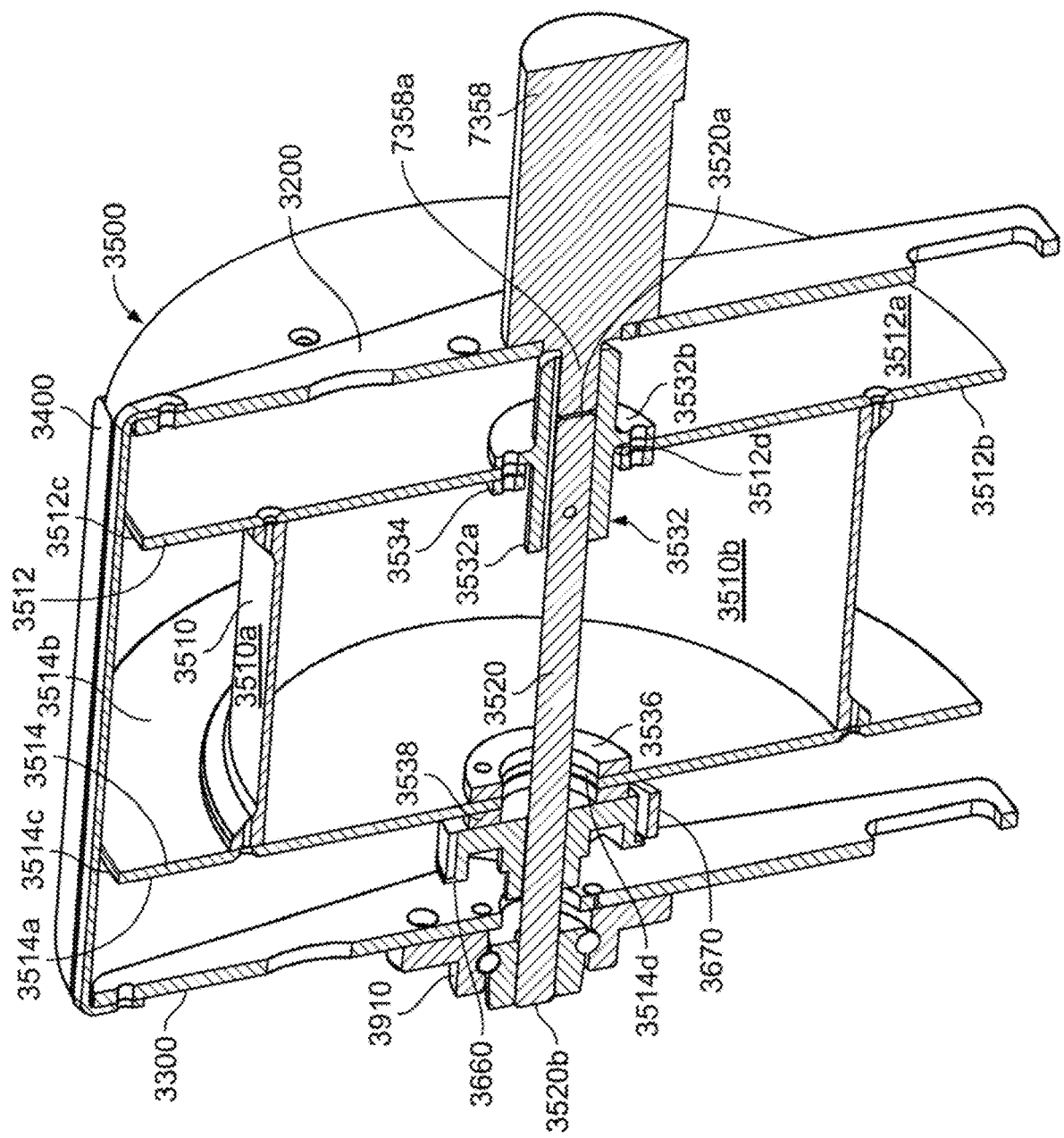

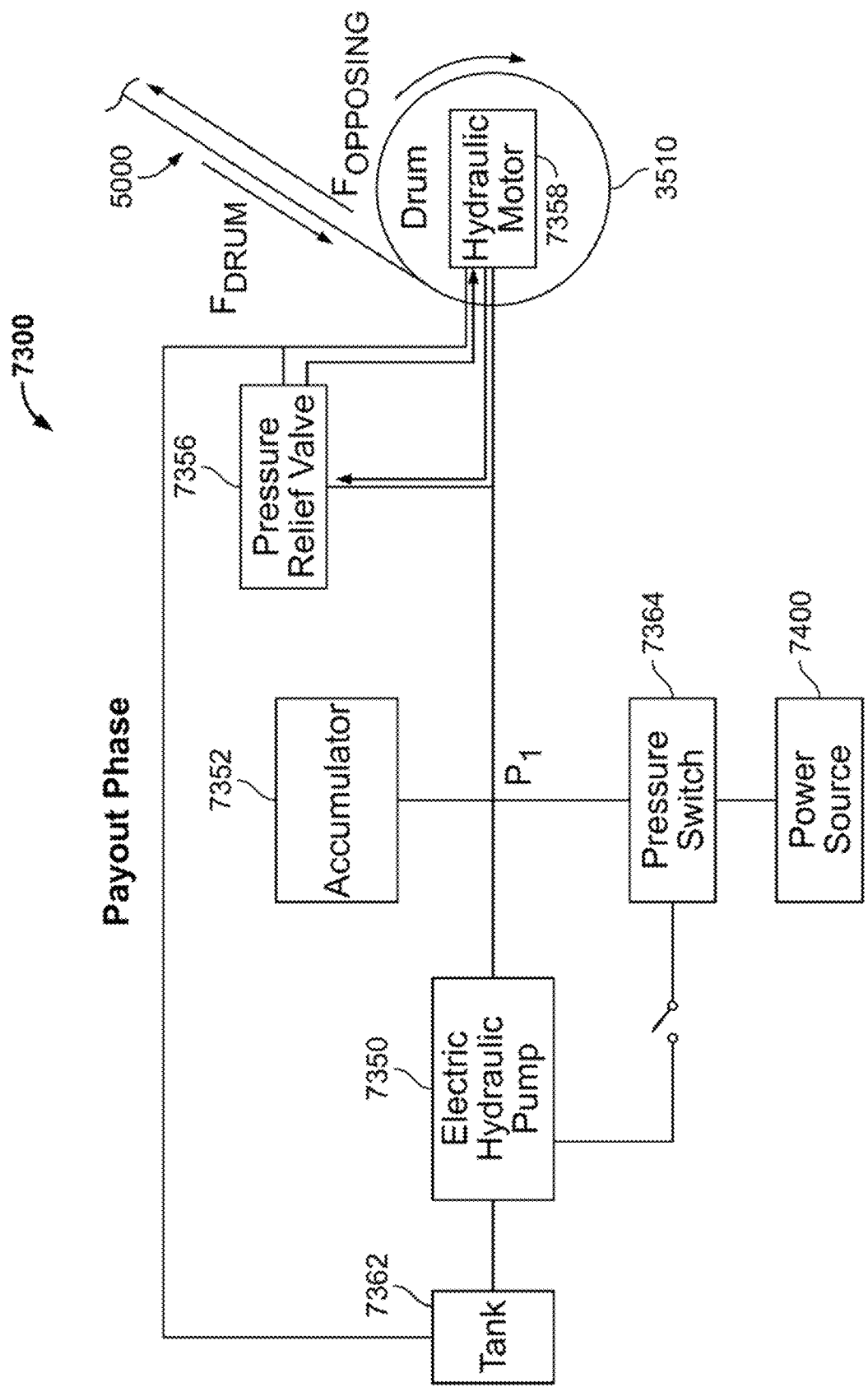

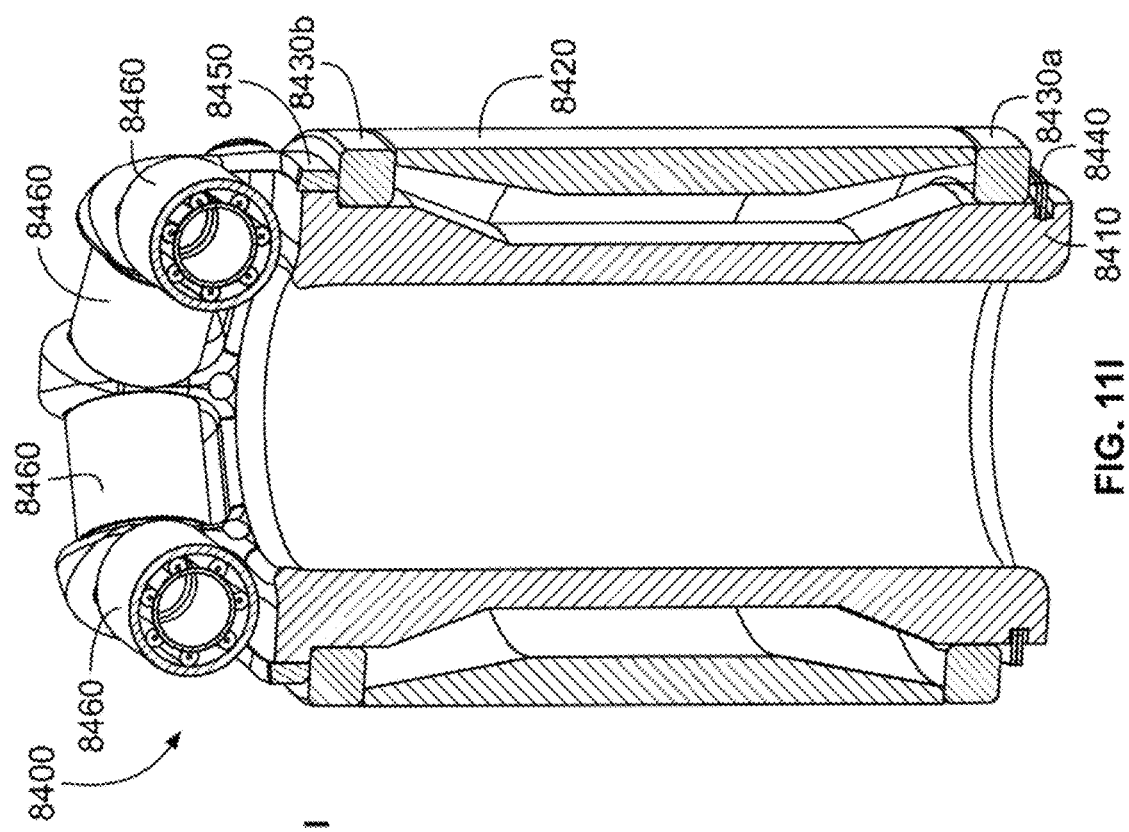
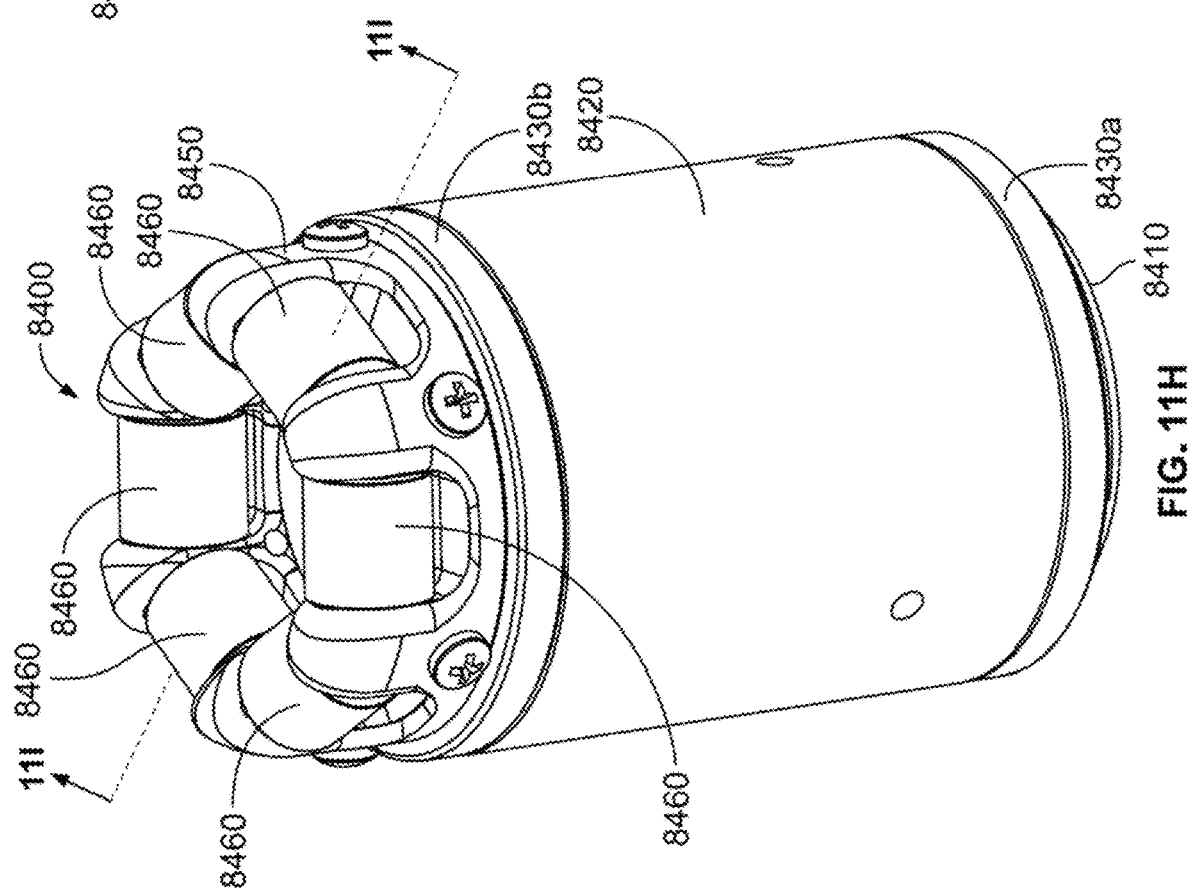
FIG. 11I
FIG. 11H

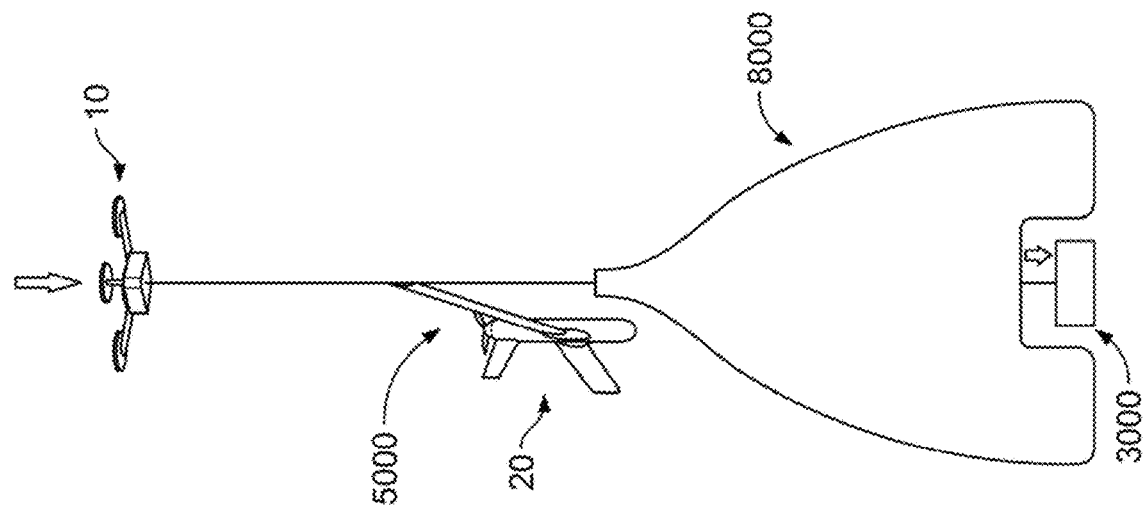
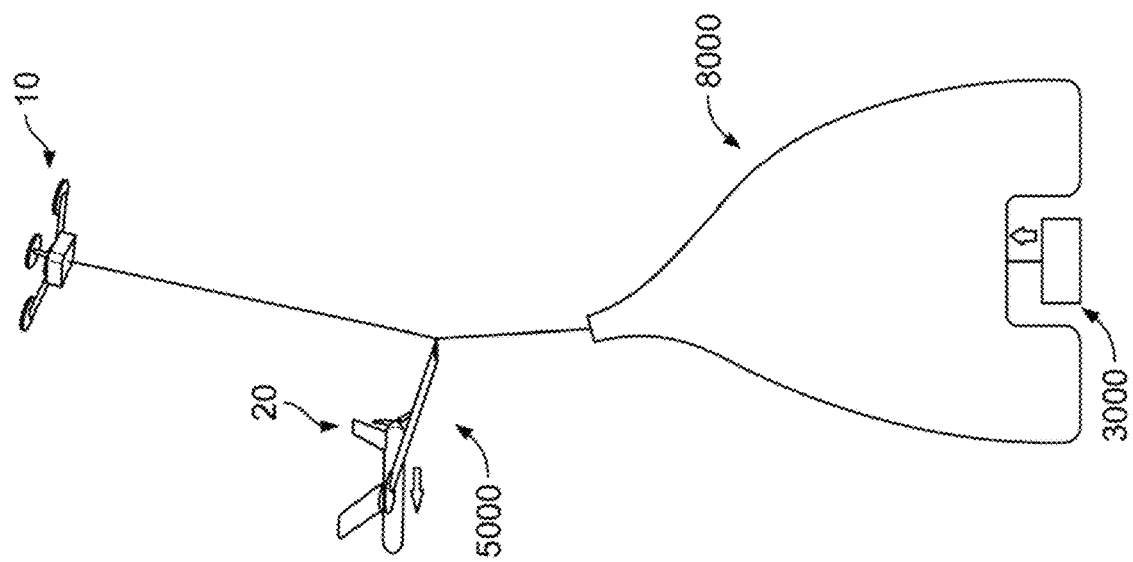

ROTORCRAFT-ASSISTED SYSTEM AND METHOD FOR LAUNCHING AND RETRIEVING A FIXED-WING AIRCRAFT INTO AND FROM FREE FLIGHT

PRIORITY CLAIM

This patent application is a divisional of, claims priority to and the benefit of U.S. patent application Ser. No. 15/679,801, filed on Aug. 17, 2017, which claims priority to and the benefit of U.S. Provisional Patent Application No. 62/376,359, filed on Aug. 17, 2016, the entire contents of both of which are incorporated herein by reference.

BACKGROUND

Aircraft capable of long-distance, efficient cruising flight typically require long runways for take-off and landing. This limits the locations from which the aircraft can take-off and at which the aircraft can land, since many locations don't have sufficient space for a runway. There is a need for new systems and methods that eliminate the need for these aircraft to use long runways to take-off and land.

SUMMARY

Various embodiments of the present disclosure provide a rotorcraft-assisted system and method for launching and retrieving a fixed-wing aircraft into and from free flight (sometimes called the "launch and retrieval system" for brevity).

The launch and retrieval system includes a modular multicopter, a storage and launch system, an anchor system, a flexible capture member, and an aircraft-landing structure. The multicopter is attachable to the fixed-wing aircraft to facilitate launching the fixed-wing aircraft into free, wing-borne flight. The storage and launch system is usable to store the multicopter (when disassembled) and to act as a launch mount for the fixed-wing aircraft by retaining the fixed-wing aircraft in a desired launch orientation. The anchor system is usable with the multicopter, the flexible capture member, and the aircraft-landing structure to retrieve the fixed-wing aircraft from free, wing-borne flight.

Generally, to launch the fixed-wing aircraft into free, wing-borne flight, an operator (or operators): (1) removes the disassembled multicopter from a container of the storage and launch system; (2) assembles the multicopter; (3) mounts the fixed-wing aircraft to a launch-assist assembly of the storage and launch system, which retains the fixed-wing aircraft in a desired launch orientation; (4) attaches the multicopter to the fixed-wing aircraft; (5) controls the multicopter to lift the fixed-wing aircraft to a desired altitude and to accelerate to a desired speed; (6) controls the multicopter to release the fixed-wing aircraft into free, wing-borne flight; and (7) controls the multicopter to land.

Generally, to retrieve the fixed-wing aircraft from free, wing-borne flight, an operator (or operators): (1) attaches a free end of the flexible capture member to the multicopter such that the flexible capture member extends from a drum of the anchor system through the aircraft-landing structure to the multicopter; (2) inflates the aircraft-landing structure such that it is positioned above the anchor system; (3) controls the multicopter to fly to a designated altitude above the anchor system and to station-keep relative to the anchor system such that the flexible capture member extends therebetween and the anchor system regulates the tension in the flexible capture member; (4) controls the fixed-wing aircraft to contact and capture the flexible capture member; (5) controls the multicopter to descend such that the fixed-wing aircraft contacts the aircraft-landing structure and a ground crew can secure the fixed-wing aircraft; and (6) controls the multicopter to land.

Additional features and advantages of the present disclosure are described in, and will be apparent from, the following Detailed Description and the Figures.

BRIEF DESCRIPTION OF THE FIGURES

FIG. 1D is a bottom perspective view of the multicopter of FIG. 1A.

FIG. 6A is a top perspective view of one of the front landing gear extension modules of the multicopter of FIG. 1A.

FIG. 6B is a top perspective view of one of the rear landing gear extension modules of the multicopter of FIG. 1A.

FIG. 7A is a top perspective view of one of the front landing gear modules of the multicopter of FIG. 1A.

FIG. 7B is a top perspective view of one of the rear landing gear modules of the multicopter of FIG. 1A.

FIG. 9F is a partially exploded top perspective view of the drum assembly and the level wind system of the anchor system of FIGS. 9A and 9B.

FIG. 9G is a cross-sectional top perspective view of the anchor system of FIGS. 9A and 9B taken substantially along line 9G-9G of FIG. 9A.

FIG. 10D is a schematic block diagram of the hydraulic system of FIG. 10A during a flexible capture member payout phase of the fixed-wing aircraft retrieval process.

FIG. 11H is a top perspective view of an upper guiding sealing component of the aircraft-landing structure of FIG. 11A.

FIG. 11I is a cross-sectional side elevational view of the upper guiding component of FIG. 11H taken substantially along line 11I-11I of FIG. 11H.

FIG. 12E is a diagrammatic view of the multicopter, the fixed-wing aircraft, the flexible capture member, the aircraft-landing structure, and the anchor system just after the fixed-wing aircraft captures the flexible capture member and as the anchor system is paying out flexible capture member.

FIG. 12F is a diagrammatic view of the multicopter, the fixed-wing aircraft, the flexible capture member, the aircraft-landing structure, and the anchor system after the fixed-wing aircraft has stopped moving and the anchor system has retracted the paid-out portion of the flexible capture member.

DETAILED DESCRIPTION

Figure 1A:
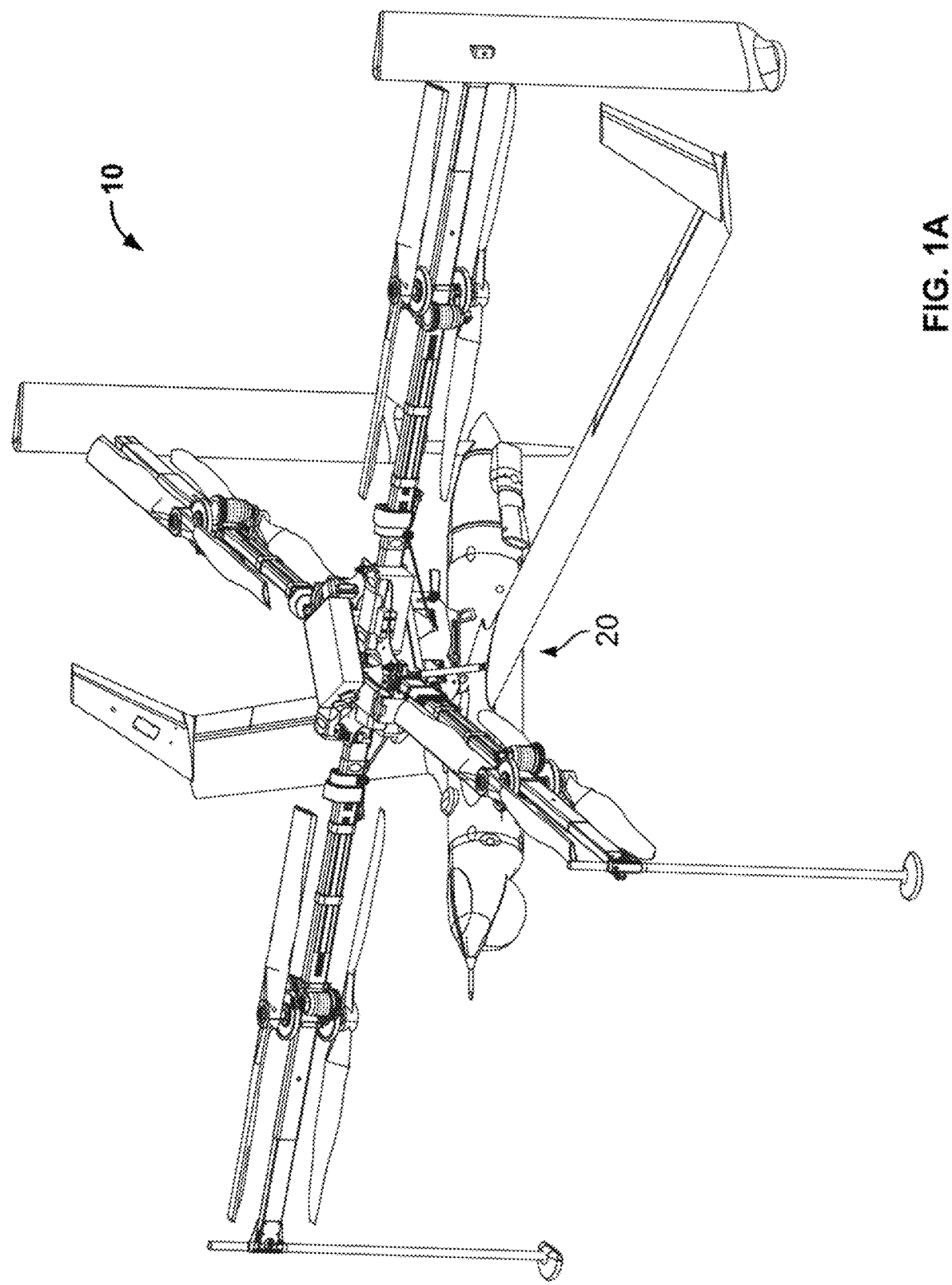
FIG. 1A is a top perspective view of one example embodiment of the multicopter of the present disclosure attached to a fixed-wing aircraft.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

The rotorcraft-assisted fixed-wing aircraft launch and retrieval system (sometimes called the "launch and retrieval system" for brevity) of various embodiments of the present disclosure is usable to launch a fixed-wing aircraft 20a into free, wing-borne flight and to retrieve the fixed-wing aircraft 20a from free, wing-borne flight. While the fixed-wing aircraft 20a may be any suitable fixed-wing aircraft, the fixed-wing aircraft of the example embodiments described below include: (1) the SCANEAGLE unmanned aerial vehicle 20a (SCANEAGLE is a registered trademark of the Boeing Company); and (2) the INTEGRATOR unmanned aerial vehicle 20b (INTEGRATOR is a registered trademark of Insitu, Inc.).

The launch and retrieval system includes a modular multicopter 10, a storage and launch system 2000, an anchor system 3000, a flexible capture member 5000, and an aircraft-landing structure 8000. The multicopter 10 is attachable to the fixed-wing aircraft 20a to facilitate launching the fixed-wing aircraft 20a into free, wing-borne flight. The storage and launch system 2000 is usable to store the multicopter 10 (when disassembled) and to act as a launch mount for the fixed-wing aircraft 20a by retaining the fixed-wing aircraft 20a in a desired launch orientation. The anchor system 3000 is usable with the multicopter 10, the flexible capture member 5000, and the aircraft-landing structure 8000 to retrieve the fixed-wing aircraft 20a from free, wing-borne flight.

Generally, to launch the fixed-wing aircraft 20a into free, wing-borne flight, an operator (or operators): (1) removes the disassembled multicopter 10 from a container of the storage and launch system 2000; (2) assembles the multicopter 10; (3) mounts the fixed-wing aircraft 20a to a launch-assist assembly of the storage and launch system 2000, which retains the fixed-wing aircraft 20a in a desired launch orientation; (4) attaches the multicopter 10 to the fixed-wing aircraft 20a; (5) controls the multicopter 10 to lift the fixed-wing aircraft 20a to a desired altitude and to accelerate to a desired speed; (6) controls the multicopter 10 to release the fixed-wing aircraft 20a into free, wing-borne flight; and (7) controls the multicopter 10 to land.

Generally, to retrieve the fixed-wing aircraft 20a from free, wing-borne flight, an operator (or operators): (1) attaches a free end of the flexible capture member 5000 to the multicopter 10 such that the flexible capture member 5000 extends from a drum of the anchor system 3000 through the aircraft-landing structure 8000 to the multicopter 10; (2) inflates the aircraft-landing structure 8000 such that it is positioned above the anchor system 3000; (3) controls the multicopter 10 to fly to a designated altitude above the anchor system 3000 and to station-keep relative to the anchor system 3000 such that the flexible capture member 5000 extends therebetween and the anchor system 3000 regulates the tension in the flexible capture member 5000; (4) controls the fixed-wing aircraft 20*a* to contact and capture the flexible capture member 5000; (5) controls the multicopter 10 to descend such that the fixed-wing aircraft 20*a* contacts the aircraft-landing structure 8000 and a ground crew can secure the fixed-wing aircraft 20*a*; and (6) controls the multicopter 10 to land.

While the multicopter 10 includes eight rotors in the example embodiments described below, the launch and retrieval system may include any suitable rotorcraft including any suitable quantity of rotors, such as one rotor, two rotors, or four rotors.

1. Multicopter

FIGS. 1A, 1B, 1C, 1D, 1E, 1F, and 1G show the multicopter 10. The multicopter 10 is modular in that it is assembled from (and can be disassembled into) a plurality of different modules or subassemblies. The multicopter is removably attachable to: (1) the fixed-wing aircraft 20*a* to facilitate launch of the fixed-wing aircraft 20*a* into free, wing-borne flight, and (2) to the flexible capture member 5000 to facilitate retrieval of the fixed-wing aircraft 20*a* from free, wing-borne flight.

Figure 1B:
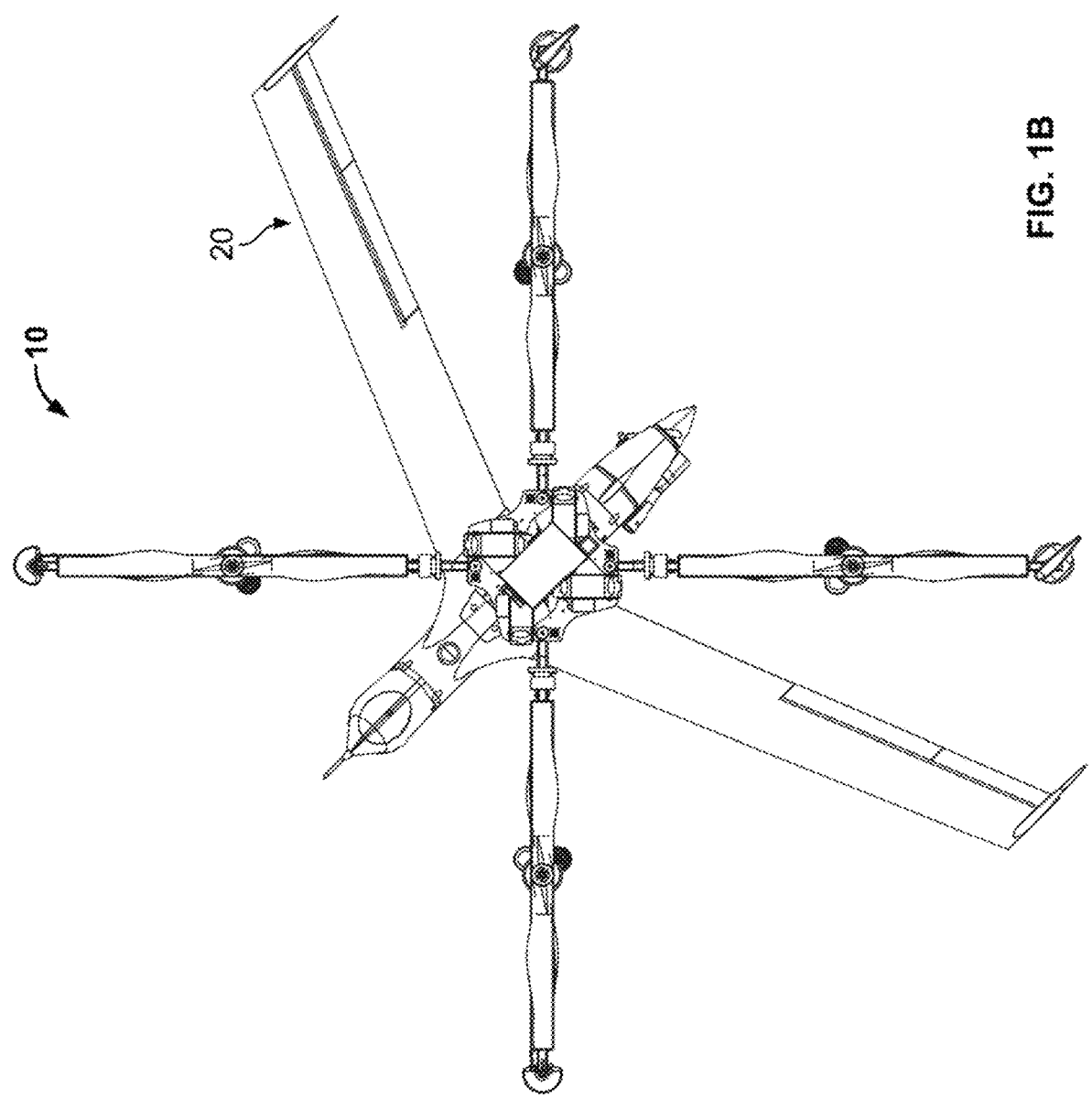
FIG. 1B is a top plan view of the multicopter and the fixed-wing aircraft of FIG. 1A.
Figure 1C:
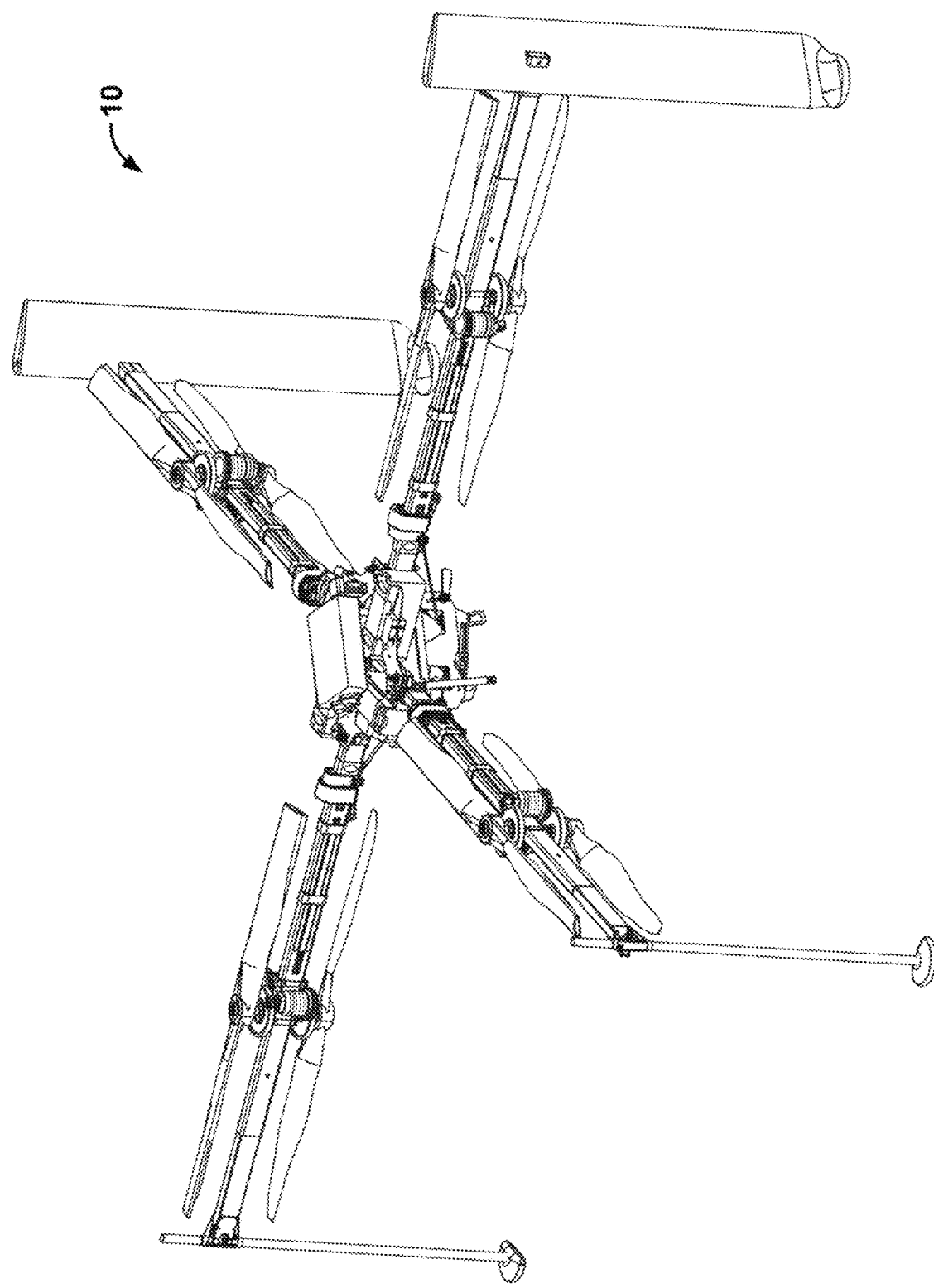
FIG. 1C is a top perspective view of the multicopter of FIG. 1A.
Figure 1E:
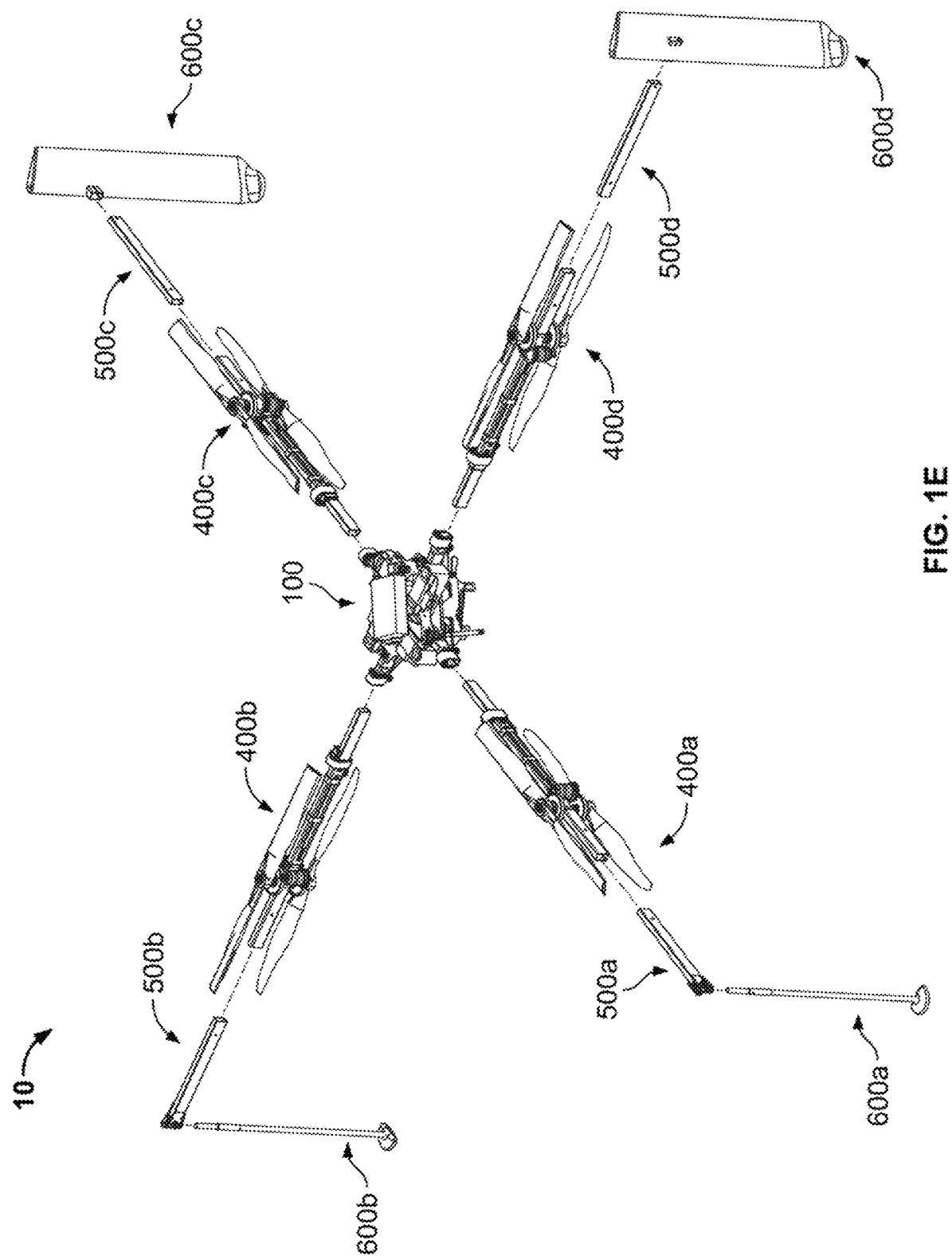
FIG. 1E is a partially exploded top perspective view of the multicopter of FIG. 1A.
Figure 1F:
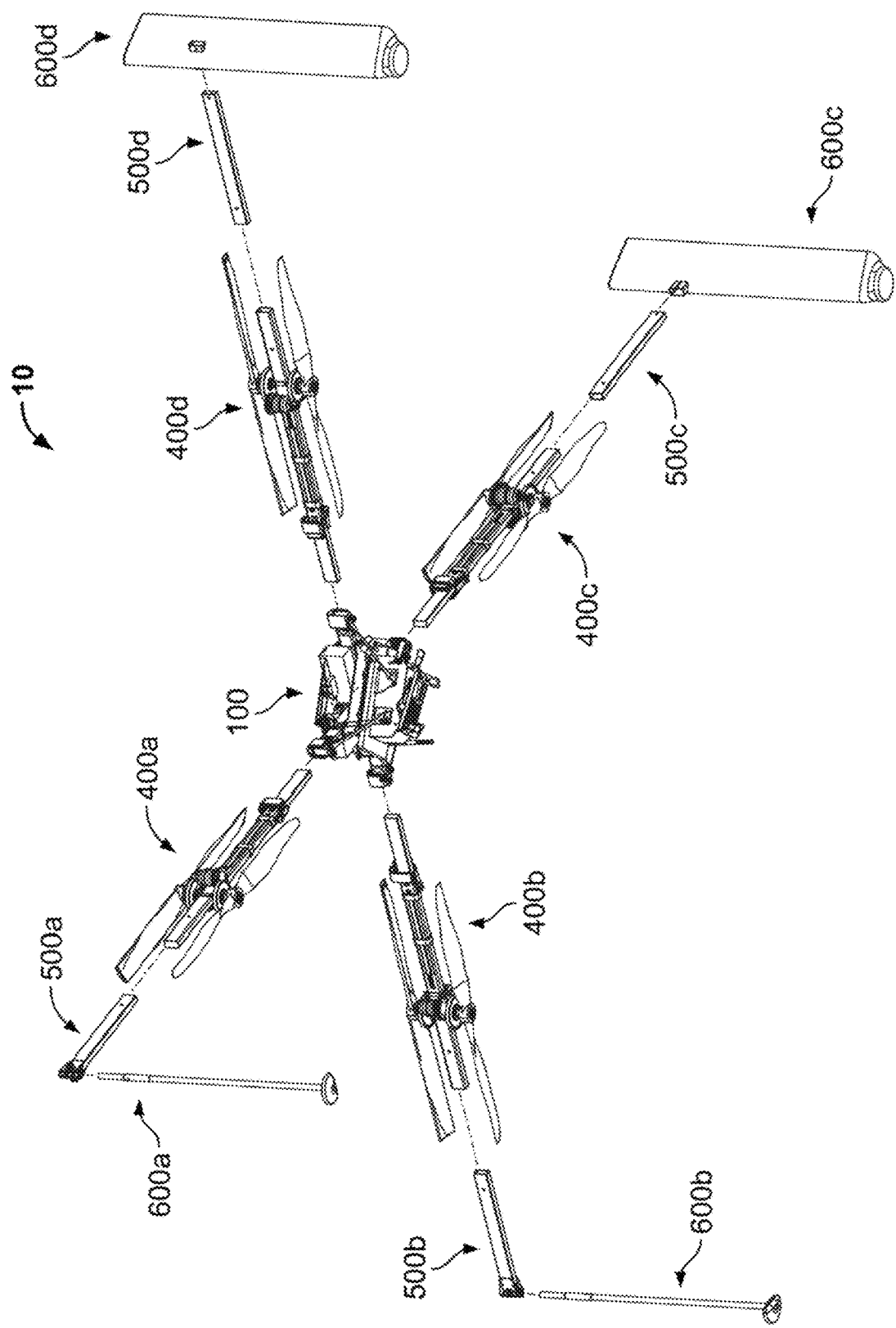
FIG. 1F is a partially exploded bottom perspective view of the multicopter of FIG. 1A.

As best shown in FIGS. 1E and 1F, the multicopter 10 includes the following 13 modules or subassemblies: a hub module 100; first, second, third, and fourth rotor arm modules 400*a*, 400*b*, 400*c*, and 400*d*; first and second front landing gear extension modules 500*a* and 500*b*; first and second rear landing gear extension modules 500*c* and 500*d*; first and second front landing gear modules 600*a* and 600*b*; and first and second rear landing gear modules 600*c* and 600*d*.

As described in detail below, to assemble the multicopter 10 from these 13 modules or subassemblies, after removing the 13 modules from the container of the storage and launch system 2000, an operator: (1) attaches the first, second, third, and fourth rotor arm modules 400*a*, 400*b*, 400*c*, and 400*d* to the hub module 100; (2) attaches the first and second front landing gear extension modules 500*a* and 500*b* to the first and second rotor arm modules 400*a* and 400*b*, respectively; (3) attaches the first and second rear landing gear extension modules 500*c* and 500*d* to the third and fourth rotor arm modules 400*c* and 400*d*, respectively; (4) attaches the first and second front landing gear module 600*a* and 600*b* to the first and second front landing gear extension modules 500*a* and 500*b*, respectively; and (5) attaches the first and second rear landing gear module 600*c* and 600*d* to the first and second rear landing gear extension modules 500*c* and 500*d*, respectively.

The modularity of this multicopter is beneficial compared to non-modular or unitary multicopter construction. First, the modularity of this multicopter enables an operator to quickly and easily disassemble this relatively large multicopter into 13 smaller modules or subassemblies. The operator can compactly store these modules or subassemblies into a single container, which makes the disassembled multicopter easy to store and transport compared to the assembled multicopter. Second, if a part of this multicopter breaks, its modularity enables the operator to quickly and easily replace the module(s) or subassembly(ies) including the broken part with a properly functioning replacement module(s) or subassembly(ies) rather than waste time repairing the broken component(s).

Figure 1G:
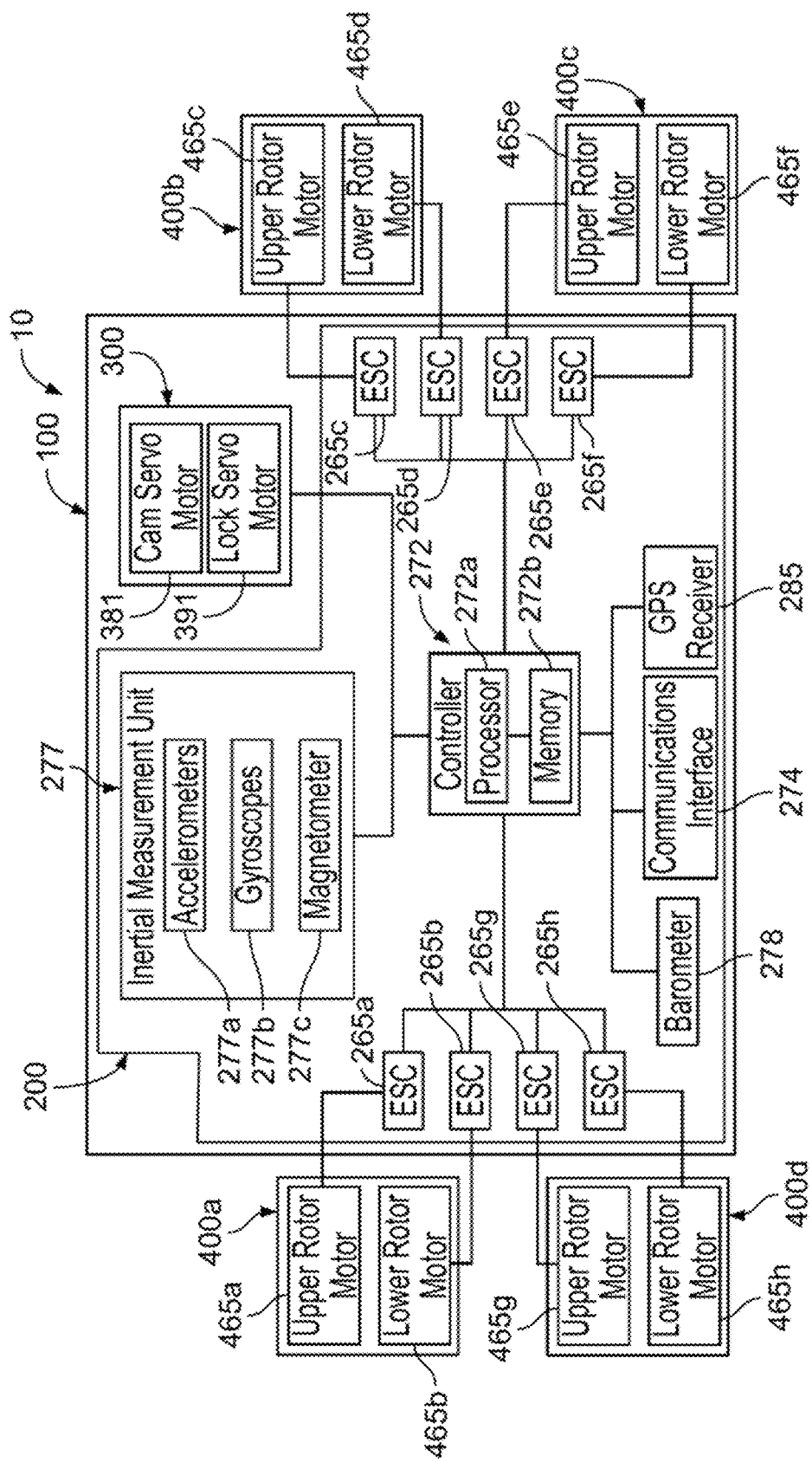
FIG. 1G is a block diagram showing certain electrically controlled components of the multicopter of FIG. 1A.

FIG. 1G is a block diagram of certain electrically controlled components of the multicopter 10. In this embodiment, although not shown in FIG. 1G, four (or any suitable quantity of) lithium-ion batteries (or any other suitable power source(s)) power these components (as described below). For a given component, the power source may be directly electrically connected to that component to power that component or indirectly electrically connected to that component (e.g., via another component) to power that component.

The hub module 100 includes a hub base 200 and a saddle 300. The hub base 200 includes: (1) a controller 272; (2) a communications interface 274; (3) an inertial measurement unit (IMU) 277; (4) a barometer 278 (or other suitable pressure sensor); (5) a GPS receiver 285; and (6) eight electronic speed controllers (ESCs) 265*a*, 265*b*, 265*c*, 265*d*, 265*e*, 265*f*, 265*g*, and 265*h*. The saddle 300 includes: (1) a cam servo motor 381; and (2) a lock servo motor 391. This is merely one example configuration, and these components may be located on any suitable part of the multicopter in other embodiments. The first rotor arm module 400*a* includes an upper rotor motor 465*a* and a lower rotor motor 465*b*. The second rotor arm module 400*b* includes an upper rotor motor 465*c* and a lower rotor motor 465*d*. The third rotor arm module 400*c* includes an upper rotor motor 465*e* and a lower rotor motor 465*f*. The fourth rotor arm module 400*d* includes an upper rotor motor 465*g* and a lower rotor motor 465*h*.

The controller 272 is electrically and communicatively connected to the communications interface 274, the IMU 277, the barometer 278, the GPS receiver 285, the ESCs 265*a* to 265*h*, the cam servo motor 381, and the lock servo motor 391.

The controller 272 includes a processor 272*a* and a memory 272*b*. The processor 272*a* is configured to execute program code or instructions stored in the memory 272*b* to control operation of the multicopter 10, as described herein. The processor 272*a* may be one or more of: (1) a general-purpose processor; (2) a content-addressable memory; (3) a digital-signal processor; (4) an application-specific integrated circuit; (5) a field-programmable gate array; (6) any suitable programmable logic device, discrete gate, or transistor logic; (7) discrete hardware components; and (8) any other suitable processing device.

The memory 272*b* is configured to store, maintain, and provide data as needed to support the functionality of the multicopter 10. For instance, in various embodiments, the memory 272*b* stores program code or instructions executable by the processor 272*a* to control the multicopter 10. The memory 272*b* may be any suitable data storage device, such as one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); and (4) read-only memory.

The communications interface 274 is a suitable wireless communication interface, such as a transceiver like an MM2 900 MHz Embedded Radio by Freewave Technologies, configured to establish and facilitate communication between the controller 272 and: (1) a computing device (such as a laptop computer, a tablet computer, or a mobile phone, not shown); and (2) an R/C controller (not shown)

that the operator of the multicopter 10 controls. In operation, once the communications interface 274 establishes communication with the computing device, the controller 272 can send data (via the communications interface 274) associated with the operation of the multicopter 10 (such as the operational status of the multicopter 10, GPS coordinates of the multicopter 10, rotor motor status, IMU or other sensor measurements, altitude, GPS reception health, magnetometer health, attitude, and the like) to the computing device. Once the communications interface 274 establishes communication with the R/C controller, the controller 272 can receive signals (via the communications interface 274) from the R/C controller. More specifically, upon receipt of these signals from the R/C controller, the communications interface 274 converts these signals into a format readable by the controller 272 and sends the converted signals to the controller 272 for processing.

The above-described communication may be bidirectional or unidirectional. In some embodiments, the communications interface 274 enables the controller 272 to send data to the computing device but not receive data from the computing device. In other embodiments, the communications interface 274 enables the controller 272 to send data to the computing device and to receive data from the computing device. In some embodiments, the communications interface 274 enables the controller 272 to receive signals from the R/C controller but not send signals to the R/C controller. In other embodiments, the communications interface 274 enables the controller 272 to receive signals from the R/C controller and send signals to the R/C controller.

In certain embodiments, the communications interface 274 includes separate components for communicating with the computing device (such as a telemetry link) and the R/C controller (such as an R/C receiver).

The IMU 277 includes: (1) multiple accelerometers 277a configured to sense the linear acceleration of the multicopter 10 with respect to three orthogonal reference axes (e.g., standard orthogonal x-, y-, and z-axes); (2) multiple gyroscopes 277b configured to sense the angular rotation of the multicopter 10 with respect to the pitch, yaw, and roll axes of the multicopter 10; and (3) a magnetometer 277c configured to enable the controller 272 to determine the heading of the multicopter 10 (i.e., the direction in which the multicopter 10 is pointed relative to Earth). More specifically, the magnetometer 277c is configured to sense the Earth's magnetic field and transmit a signal representing the direction of the Earth's magnetic North to the controller 272. The controller 272 is configured to use the GPS coordinates of the multicopter 10 and a global map of declination angle (the angle between the Earth's true North and the Earth's magnetic North) to determine a required correction angle. The controller 272 is configured to apply the required correction angle to the direction of the Earth's magnetic North to obtain the direction of the Earth's true North. The controller 272 is configured to use this information to determine the heading of the multicopter 10. In other embodiments, a pair of GPS receivers are used instead of the magnetometer to maintain more accurate heading. This practice is especially useful when the multicopter is operating in close proximity to large iron objects—such as ship hulls—or when the difference between the Earth's magnetic North and true North is large, such as near the Earth's poles.

The accelerometers 277a, the gyroscopes 277b, and the magnetometer 277c continuously or periodically obtain these sensor readings and continuously or periodically transmit corresponding signals to the controller 272, which uses these sensor readings in a variety of different ways described herein. This is merely one example IMU, and the IMU may include any suitable sensors.

The barometer 278 is configured to sense the atmospheric pressure and to transmit a signal representing the sensed atmospheric pressure to the controller 272. The controller 272 is configured to use the sensed atmospheric pressure to determine: (1) the height of the multicopter 10 above sea level; and (2) the height of the multicopter 10 above the ground or any other suitable reference location. For instance, to determine the height of the multicopter 10 above the ground, the controller 272 uses a reference atmospheric pressure sensed by the barometer 278 while the multicopter 10 is on the ground just before takeoff to determine the height of the ground above sea level. Once the multicopter 10 is airborne, at any given point in time the controller 272 is configured to determine the height of the multicopter 10 above the ground by: (1) using the atmospheric pressure sensed by the barometer 278 to determine the height of the multicopter 10 above sea level; and (2) determining the difference between the height of the multicopter 10 above sea level and the height of the ground above sea level. This is merely one example way of determining the height of the multicopter above a reference point. Any other suitable method may be employed.

The GPS receiver 285 is communicatively connectable with (such as via a suitable wireless protocol) GPS satellites (not shown), as is known in the art. The GPS receiver 285 is configured to receive signals from one or more of the GPS satellites, to determine the multicopter's location using those signals, and to transmit signals representing the multicopter's location to the controller 272.

The ESC 265a is electrically connected to and, along with the controller 272, controls the operation of the upper rotor motor 465a of the first rotor arm module 400a. The ESC 265b is electrically connected to and, along with the controller 272, controls the operation of the lower rotor motor 465b of the first rotor arm module 400a. The ESC 265c is electrically connected to and, along with the controller 272, controls the operation of the upper rotor motor 465c of the second rotor arm module 400b. The ESC 265d is electrically connected to and, along with the controller 272, controls the operation of the lower rotor motor 465d of the second rotor arm module 400b. The ESC 265e is electrically connected to and, along with the controller 272, controls the operation of the upper rotor motor 465e of the third rotor arm module 400c. The ESC 265f is electrically connected to and, along with the controller 272, controls the operation of the lower rotor motor 465f of the third rotor arm module 400c. The ESC 265g is electrically connected to and, along with the controller 272, controls the operation of the upper rotor motor 465g of the fourth rotor arm module 400d. The ESC 265h is electrically connected to and, along with the controller 272, controls the operation of the lower rotor motor 465h of the fourth rotor arm module 400d.

The controller 272 is configured to send rotor motor control signals to the ESCs 265a to 265h to control operation of the rotor motors 465a to 465h in accordance with received control signals and/or control signals the controller 272 generates via any of the software subroutines disclosed herein.

1.1 Hub Module

Figure 2A:
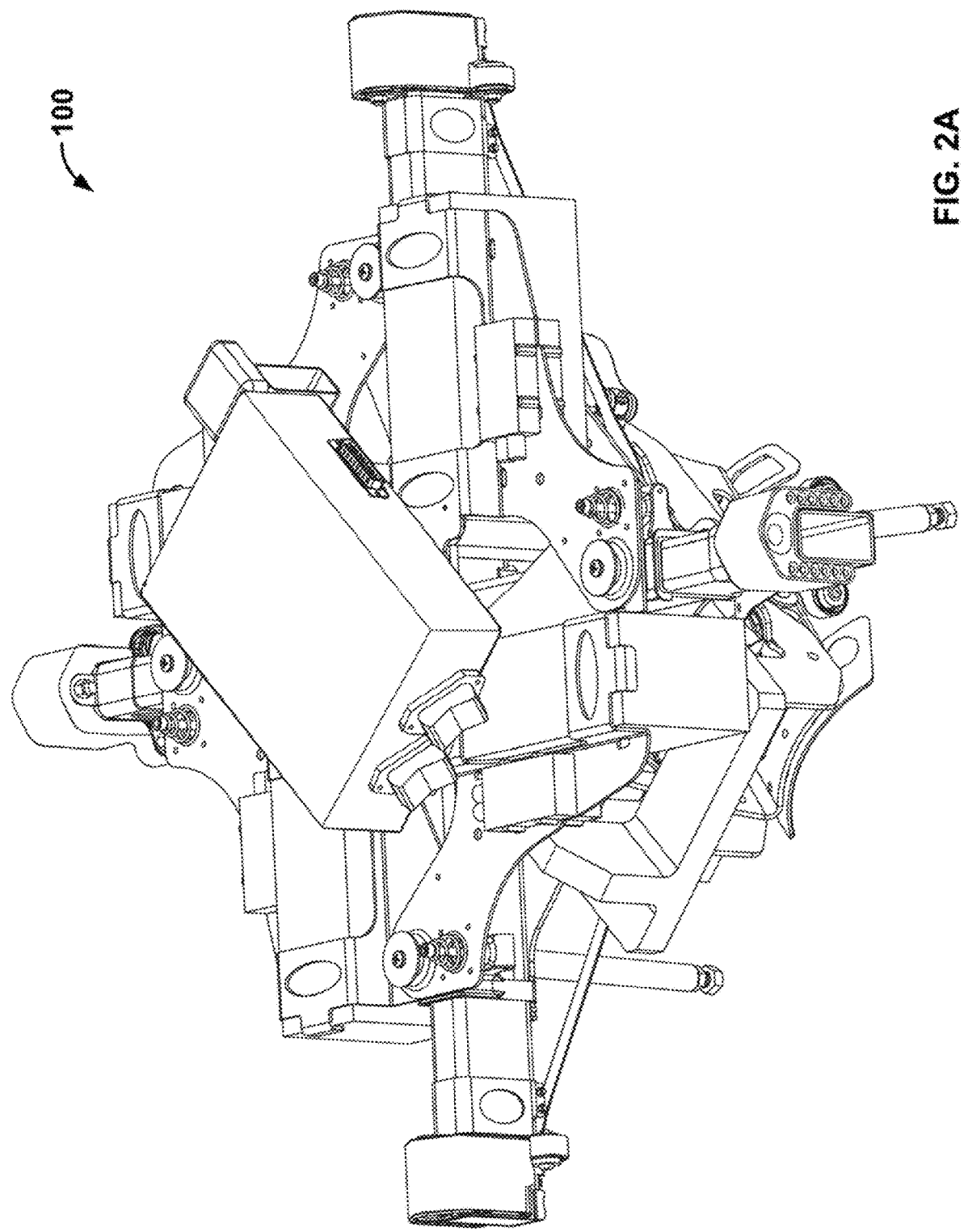
FIG. 2A is a top perspective view of the hub module of the multicopter of FIG. 1A.
Figure 2B:
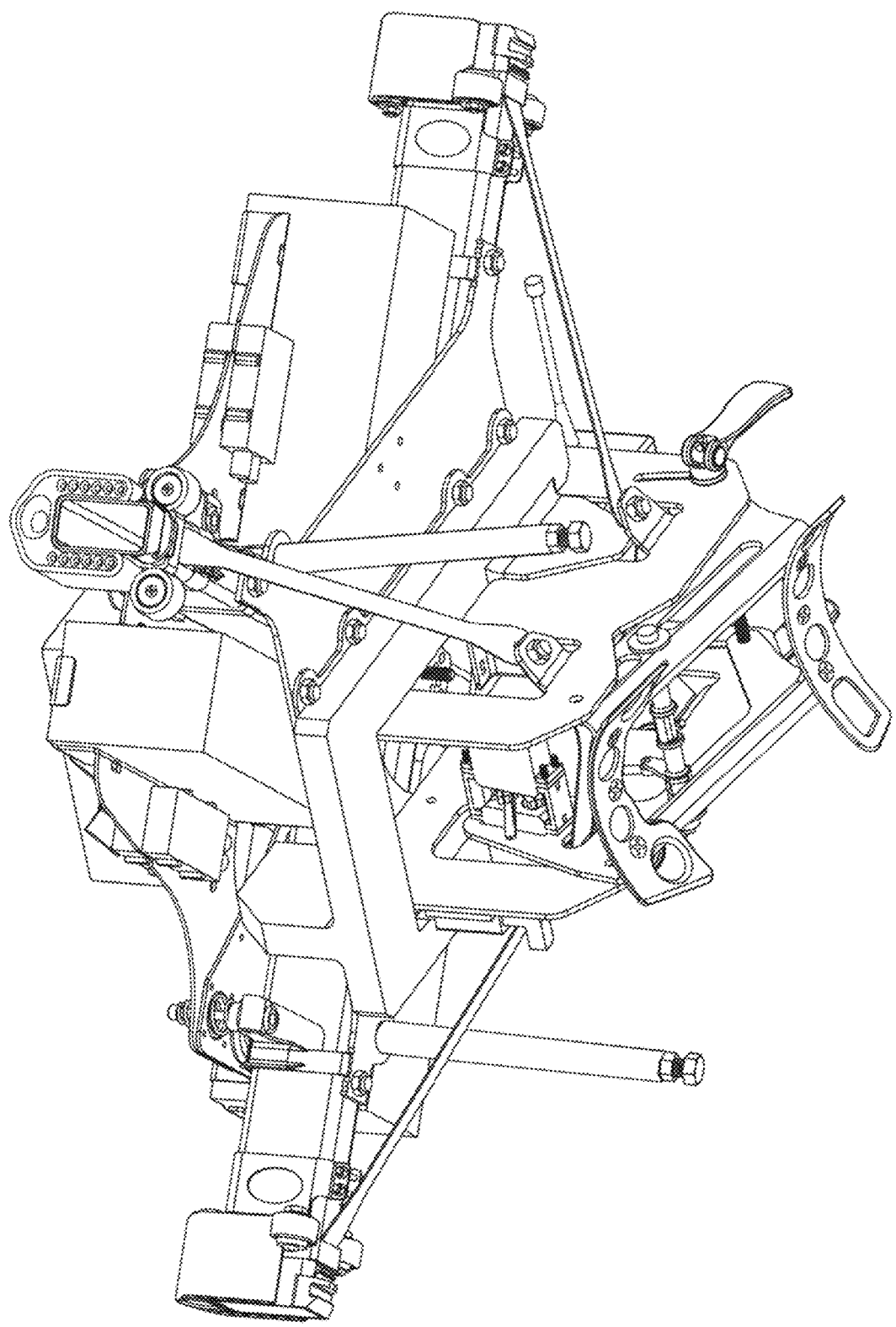
FIG. 2B is a bottom perspective view of the hub module of FIG. 2A.
Figure 2C:
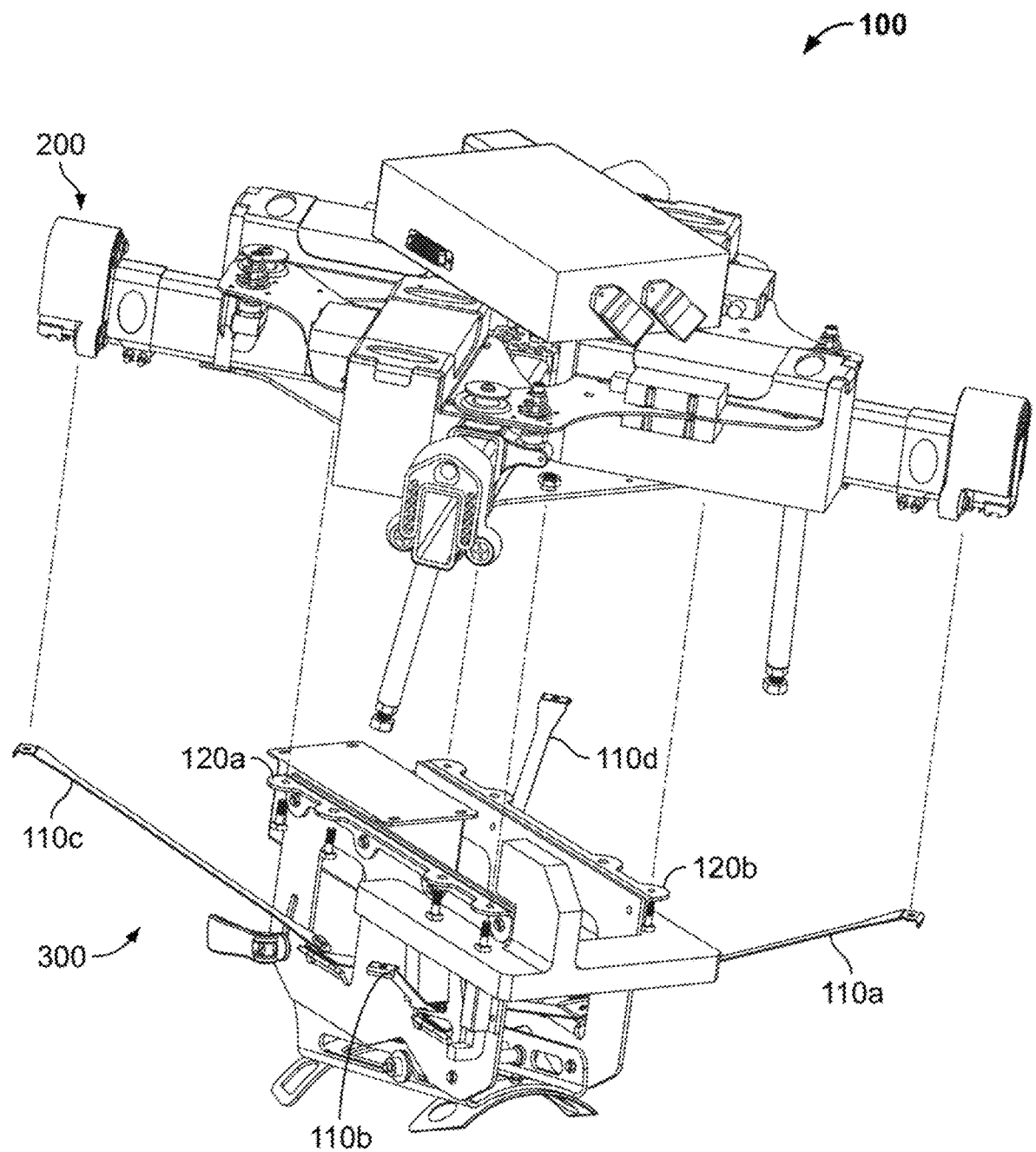
FIG. 2C is a partially exploded top perspective view of the hub module of FIG. 2A showing the hub base separated from the saddle.

FIGS. 2A, 2B, and 2C show the hub module 100. The hub module 100: (1) serves as the attachment point for the rotor arm modules 400a to 400d; (2) is the portion of the multicopter 10 to which the fixed-wing aircraft 20a is attached for launch; (3) is the portion of the multicopter 10 to which the flexible capture member 5000 is attached for retrieval of the fixed-wing aircraft 20*a*; (4) includes the power source for the multicopter 10; and (5) includes certain components used to control operation of the multicopter 10.

As best shown in FIG. 2C, the hub module 100 includes a hub base 200 and a saddle 300. The saddle 300 is attached to the underside of the hub base 200 via two brackets 120*a* and 120*b* and four struts 110*a*, 110*b*, 110*c*, and 110*d*. Each strut 110 is attached at one end to the hub base 200 and at the other end to the saddle 300. This is merely one example of how the saddle can be attached to the hub base, and in other embodiments the saddle may be attached to the hub base in any suitable manner. For instance, in another embodiment, rather than being attached to the hub base, each strut is attached to a different rotor arm module, such as to one of the rotor motor assemblies of the rotor arm modules.

1.1.1 Hub Base

FIGS. 3A, 3B, 3C, 3D, 3E, 3F, 3G, and 3H show the hub base 200 or components thereof. The hub base 200 is the portion of the hub module 100 that: (1) serves as the attachment point for the rotor arm modules 400*a* to 400*d*; (2) includes the power source for the multicopter 10; and (3) includes certain components used to control operation of the multicopter 10.

Figure 3A:
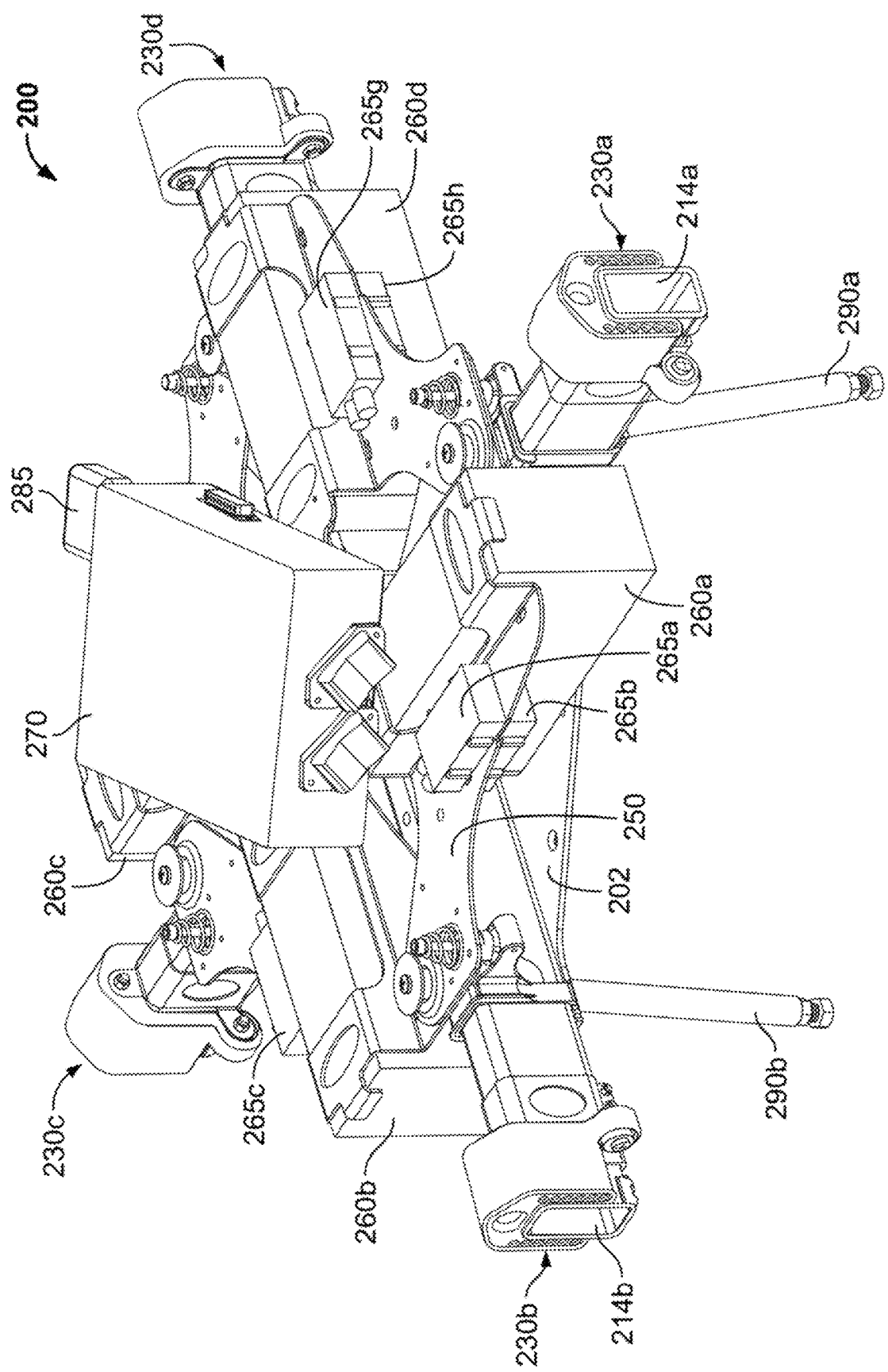
FIG. 3A is a top perspective view of the hub base of the hub module of FIG. 2A.
Figure 3B:
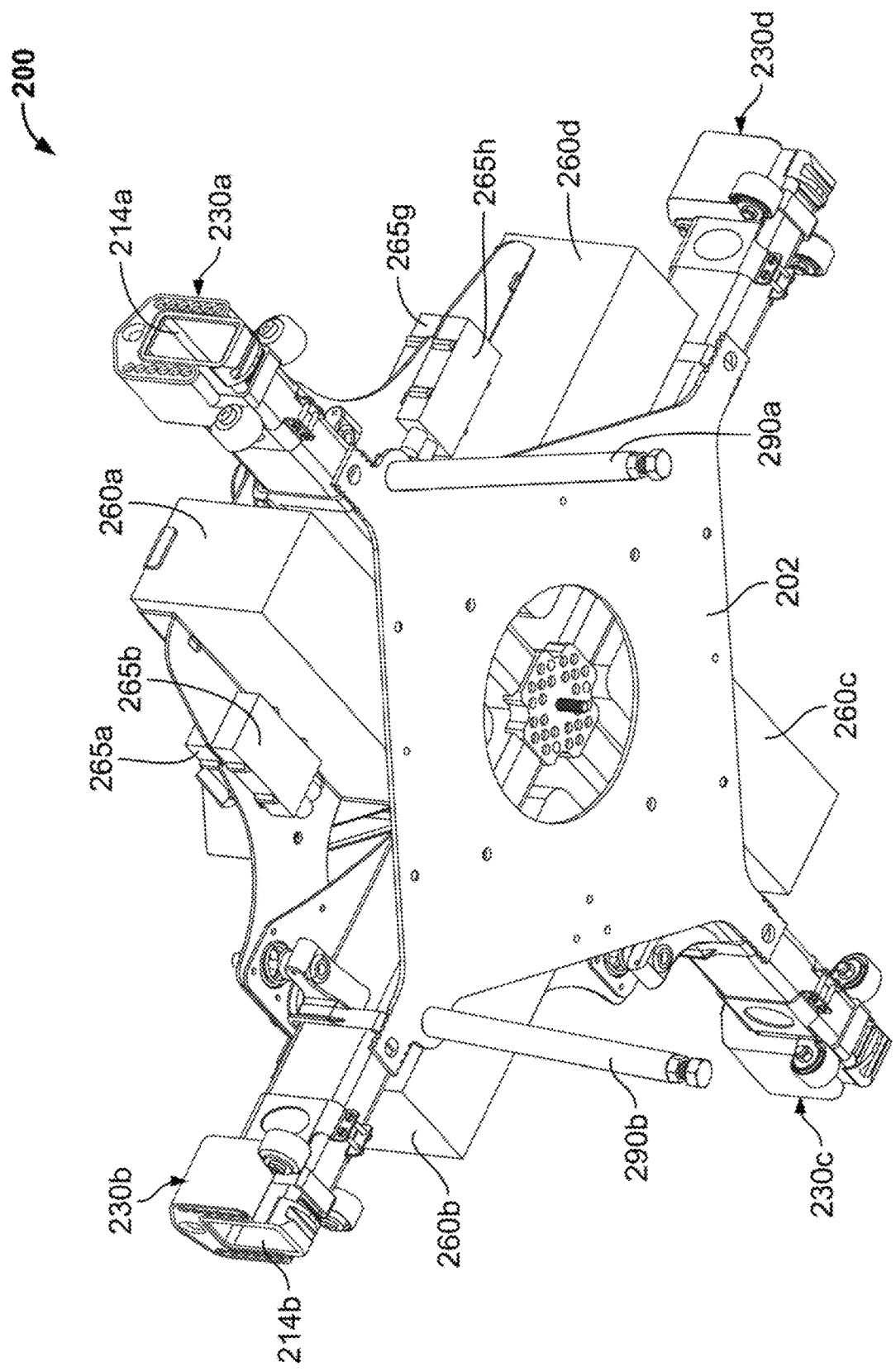
FIG. 3B is a bottom perspective view of the hub base of FIG. 3A.
Figure 3C:
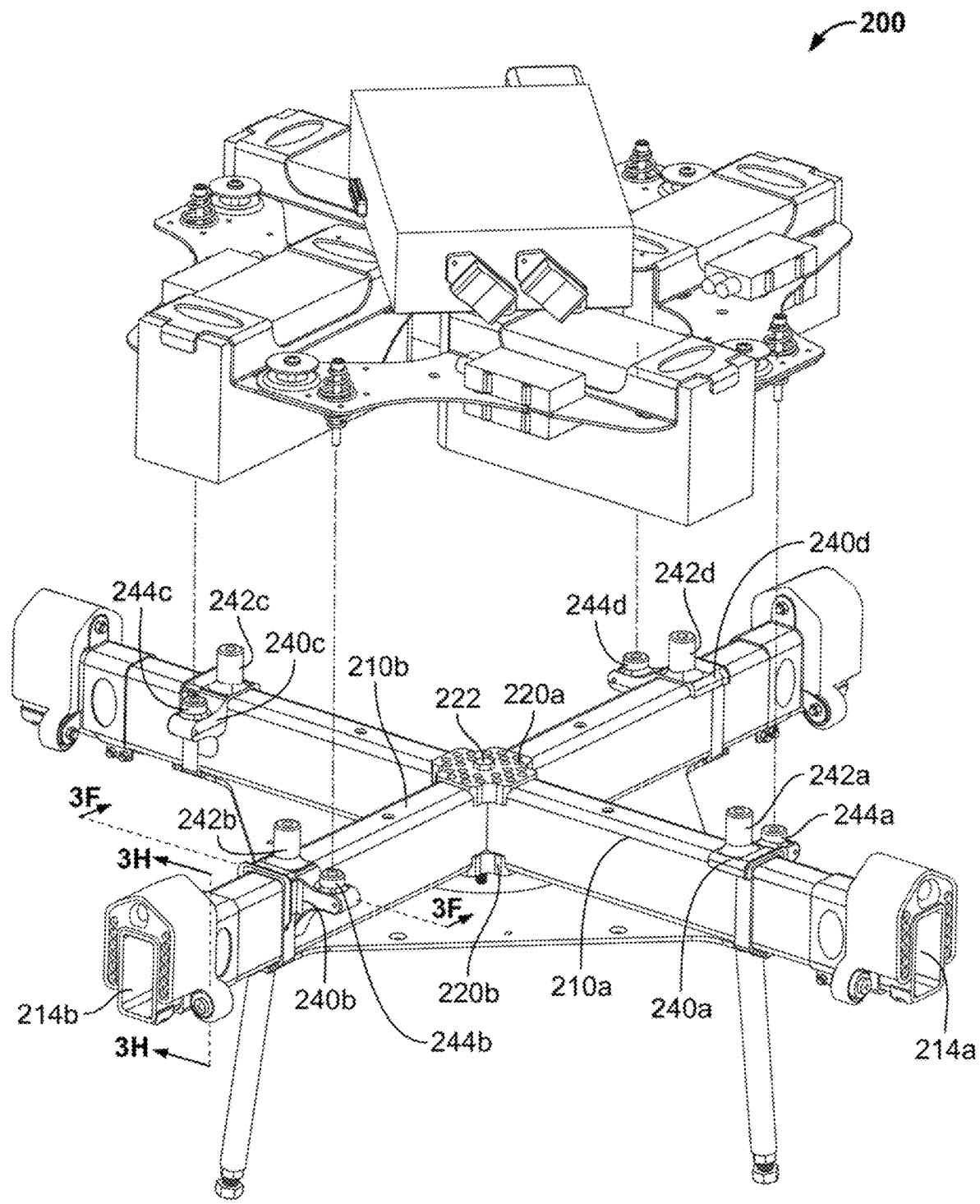
FIG. 3C is a partially exploded top perspective view of the hub base of FIG. 3A.
Figure 3D:
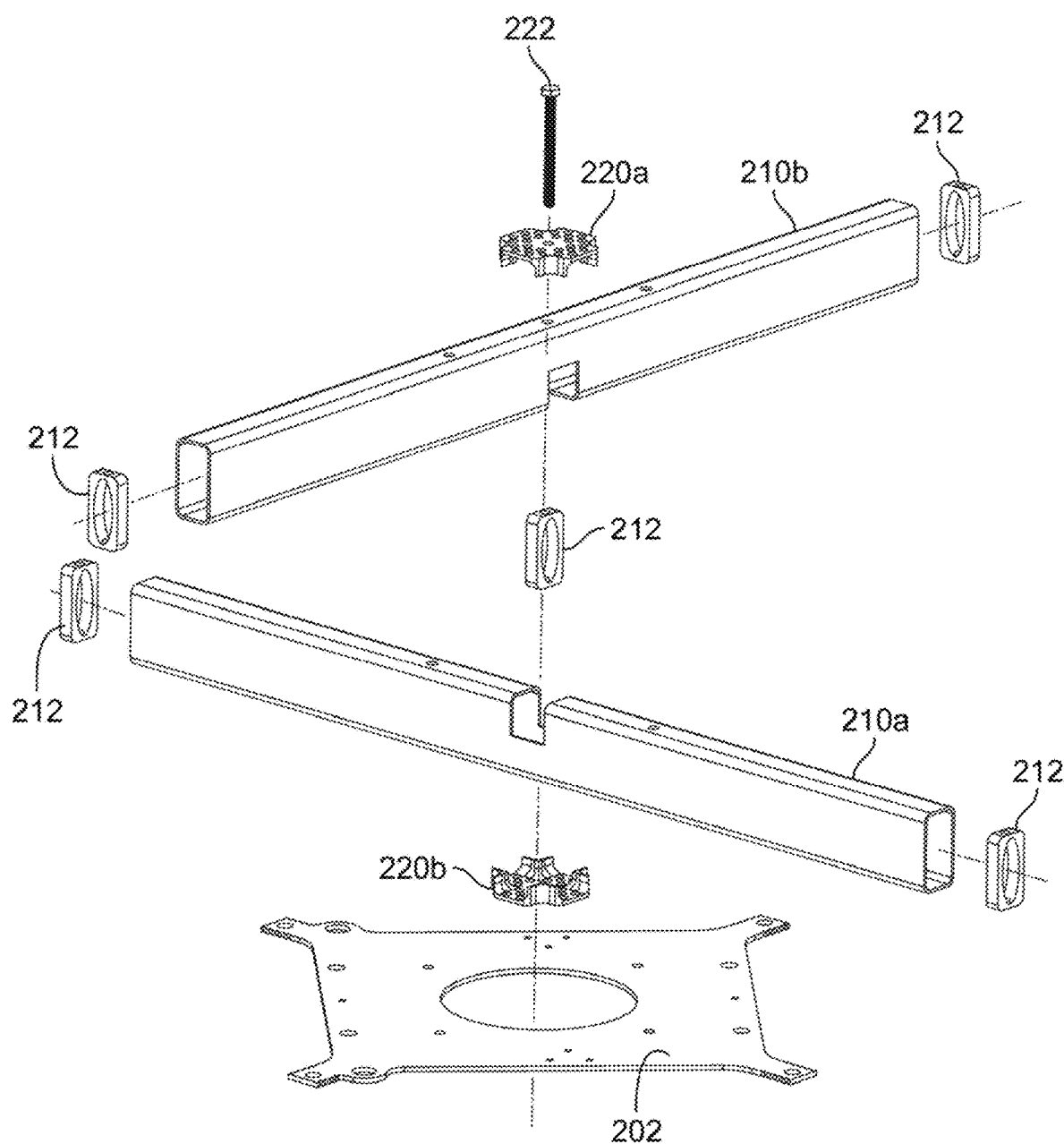
FIG. 3D is an exploded top perspective view of the supports and associated mounting hardware of the hub base of FIG. 3A.

As best shown in FIGS. 3C and 3D, the hub base 200 includes two hollow elongated rectangular supports 210*a* and 210*b*. The hollow supports 210*a* and 210*b* interlock with one another near their centers such that the hollow supports 210*a* and 210*b* are oriented transversely (such as generally perpendicularly) to one another and generally form a cross shape when viewed from above or below. Reinforcing plugs 212 are disposed within the hollow supports 210*a* and 210*b* such that fastener receiving openings (not labeled) of the reinforcing plugs 212 vertically align with fastener receiving openings (not labeled) of the hollow supports 210*a* and 210*b*. Upper and lower braces 220*a* and 220*b* sandwich the hollow supports 210*a* and 210*b*. A fastener 222 threaded through the upper brace 220*a*, the hollow support 210*a*, the reinforcing plug 212, the hollow support 210*b*, and the lower brace 220*b* holds the upper and lower braces 220*a* and 220*b* and the hollow supports 210*a* and 210*b* together. This ensures the hollow supports 210*a* and 210*b* remain interlocked and ensures their orientation with respect to one another does not substantially change.

The hollow supports 210*a* and 210*b* are attached to a hub base plate 202 via suitable fasteners (not labeled) threaded through the hollow supports 210*a* and 210*b* and the reinforcing plugs 212 disposed within the hollow supports 210*a* and 210*b*. As best shown in FIG. 2B, two stabilizers 290*a* and 290*b* are attached to and extend downward from either hollow support 210*a* and 210*b*. The free ends of the stabilizers 290*a* and 290*b* terminate in feet configured to contact the fixed-wing aircraft 20*a* to help prevent the fixed-wing aircraft 20*a* from rotating around its roll axis relative to the multicopter 10. The feet are adjustable in length (e.g., are threaded such that they can be shortened by threading further into the stabilizers or lengthened by unthreading further out of the stabilizers).

As best shown in FIG. 3C, first and third isolator plate mounts 240*a* and 240*c* are attached (such as via lashing) to the hollow support 210*a* and second and fourth isolator plate mounts 240*b* and 240*d* are attached (such as via lashing) to the hollow support 210*b* radially inward of the ends of the hollow supports 210*a* and 210*b*. Each isolator plate mount 240 includes a first isolator plate mounting post 242 defining a threaded fastener receiving opening at least partially therethrough and a second isolator plate mounting post 244 defining a threaded fastener receiving opening at least partially therethrough.

Figure 3E:
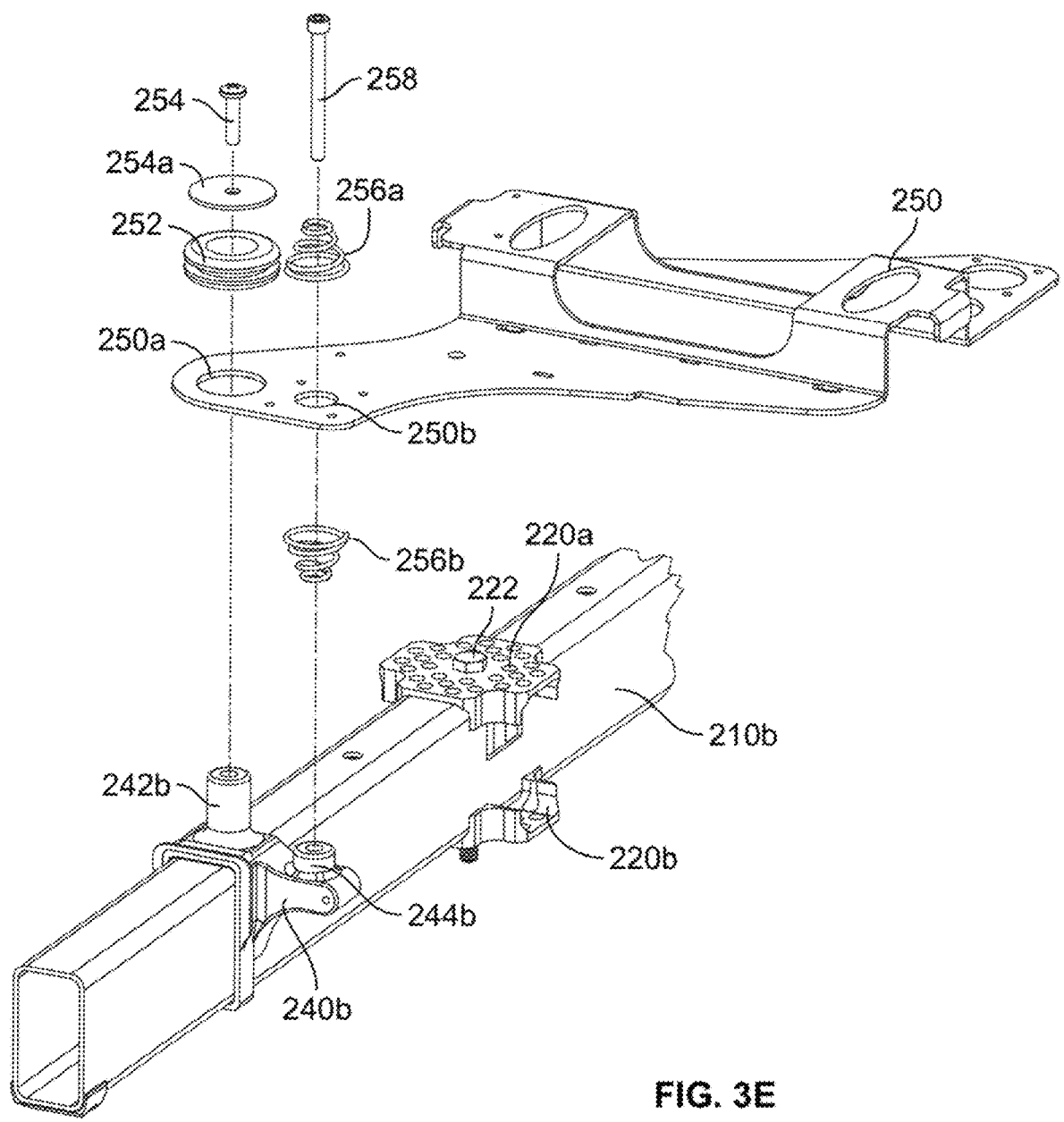
FIG. 3E is an exploded top perspective view of the isolator plate and associated mounting hardware of the hub base of FIG. 3A.
Figure 3F:
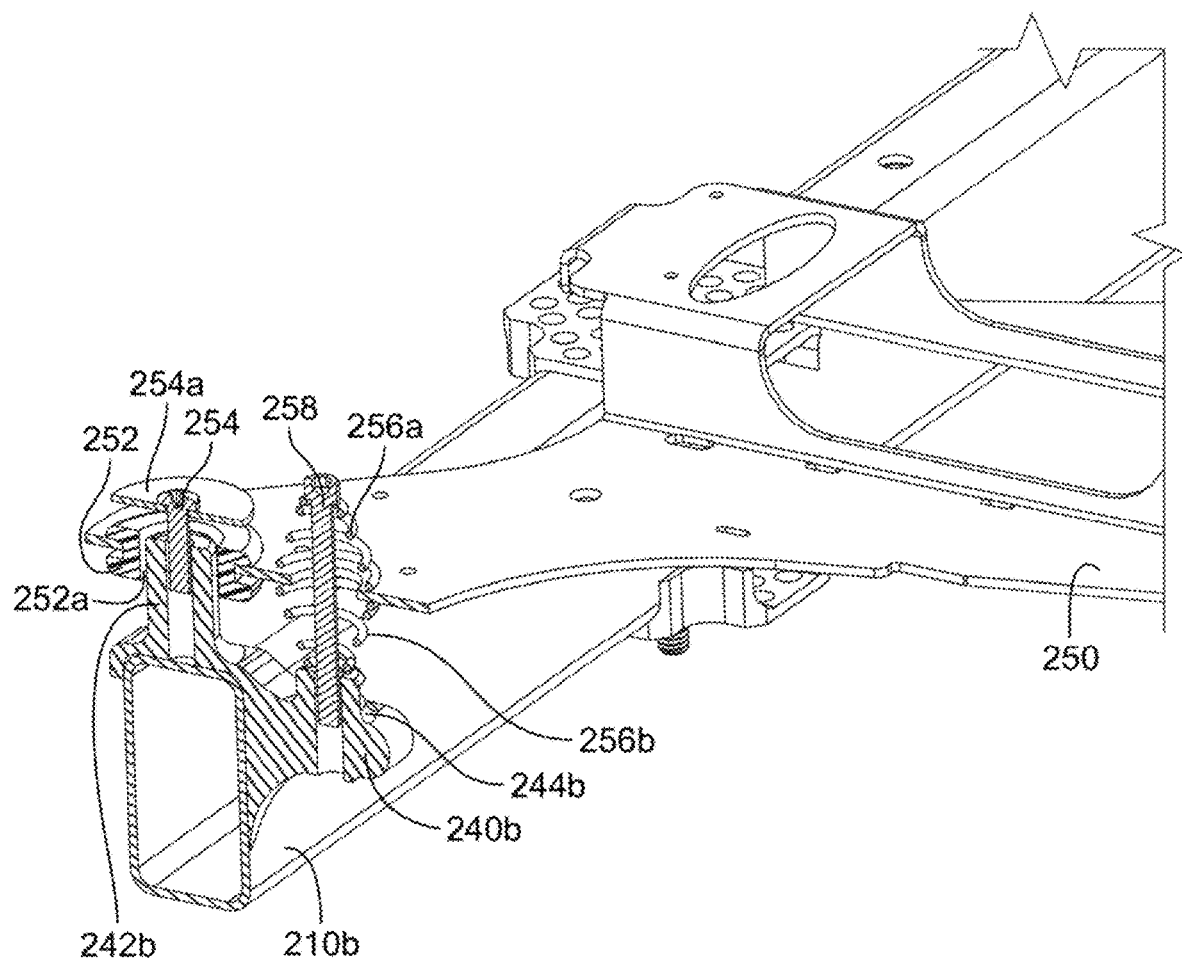
FIG. 3F is a partial cross-sectional view of one of the isolator plate mounts of the hub base of FIG. 3A taken substantially along line 3F-3F of FIG. 3C.

An isolator plate 250 is slidably mounted to the isolator plate mounts 240*a*, 240*b*, 240*c*, and 240*d*. FIGS. 3E and 3F show how the isolator plate 250 is mounted to the isolator plate mount 240*b*. For simplicity and brevity, illustrations of how the isolator plate 250 is mounted to the remaining three isolator plate mounts 240*a*, 240*c*, and 240*d* in a similar manner are not provided.

The isolator plate 250 defines first and second mounting openings 250*a* and 250*b* therethrough. An elastomeric grommet 252 is installed in the first mounting opening 250*a* of the isolator plate 250. The grommet 252 defines a first isolator plate mounting post receiving channel 252*a* therethrough, and the first isolator plate mounting post 242*b* is slidably received in the first isolator plate mounting post receiving channel 252*a*. A fastener 254 having a stop washer 254*a* beneath its head is partially threaded into the fastener receiving opening of the first isolator plate mounting post 242*b*. Upper and lower conical springs 256*a* and 256*b*—held in place by a fastener 258 partially threaded into the fastener receiving opening of the second isolator plate mounting post 244*b*—sandwich the isolator plate 250.

The hollow support 210*b* and the stop washer 254*a* constrain the vertical movement of the isolator plate 250. In other words, the isolator plate 250 can move vertically between a lower position in which the grommet 252 contacts the hollow support 210*b* and an upper position in which the grommet 252 contacts the stop washer 254*a*. The conical springs 256*a* and 256*b* act as a suspension that absorbs (or partially absorbs) vibrations of the hollow support 210*b* that would otherwise be directly transferred to the isolator plate 250, which could affect operation of certain components of the multicopter 10 (such as the controller 272).

The relatively high mass of the batteries 260*a* to 260*d* and the fact that they are mounted to the isolator plate 250 and close-coupled to the IMU 277 works with the suspension to help prevent undesired vibration of the isolator plate 250 and therefore the IMU 277. In certain embodiments, for the IMU 277 to perform well, the IMU 277 must resolve accelerations on the order of 0.1 gee and rotations of 0.1 radians/second. The IMU 277 cannot do this reliably when (~10-gee) vibration, caused by rotor unbalance, for example, is transmitted from the airframe of the multicopter 10 to the IMU 277. When the mass of the batteries 260*a* to 260*d* is used to ballast the IMU 277 on the isolator plate 250, and the isolator plate 250 is anchored to the airframe structure through the suspension, the IMU 277 enjoys the vibration-free mounting location. By mounting the isolator plate 250 well-outboard at its corners, the IMU 277 remains sufficiently well-coupled to the airframe that pitch and roll movements are transmitted to the IMU 277, which is able to effectively resolve these motions.

As best shown in FIGS. 3A and 3B, The following components are mounted to the isolator plate 250: (1) the batteries 260*a*, 260*b*, 260*c*, and 260*d*; (2) the ESCs 265*a* to 265*h*; (3) an avionics enclosure 270 that houses a variety of components including the controller 272 and the communications interface 274; (4) a GPS antenna mounting bracket 280 on which the GPS antenna 285 is mounted; (5) navigation lights (not shown); and (6) a Mode C transponder (not shown).

The four open ends of the hollow supports 210*a* and 210*b* form rotor arm module receiving sockets that can receive one of the rotor arm modules 400*a* to 400*d*. Specifically, the hollow support 210*a* forms a first rotor arm module receiving socket 214a and a third rotor arm module receiving socket (not shown) and the hollow support 210b forms a second rotor arm module receiving socket 214b and a fourth rotor arm module receiving socket (not shown).

As best shown in FIG. 3A, female blind mate assemblies are attached to the ends of the hollow supports 210a and 210b. Specifically, a first female blind mate assembly 230a is attached to one end of the hollow support 210a near the first rotor arm module receiving socket 214a, a second female blind mate assembly 230b is attached to one end of the hollow support 210b near the second rotor arm module receiving socket 214b, a third female blind mate assembly 230c is attached to the other end of the hollow support 210a near the third rotor arm module receiving socket 214c, and a fourth female blind mate assembly 230d is attached to the other end of the hollow support 210b near the fourth rotor arm module receiving socket 214d.

The female blind mate assemblies 230 (along with the corresponding male blind mate connectors described below with respect to the rotor arm modules) facilitate: (1) mechanical attachment of the rotor arm modules 400a, 400b, 400c, and 400d to the hub module 100; (2) power flow from the battery(ies) 260a, 260b, 260c, and/or 260d to the rotor motors 465a to 465h of the rotor arm modules 400a, 400b, 400c, and 400d; and (3) communication between the ESCs 265a to 265h and the rotor motors 465a to 465h.

Figure 3G:
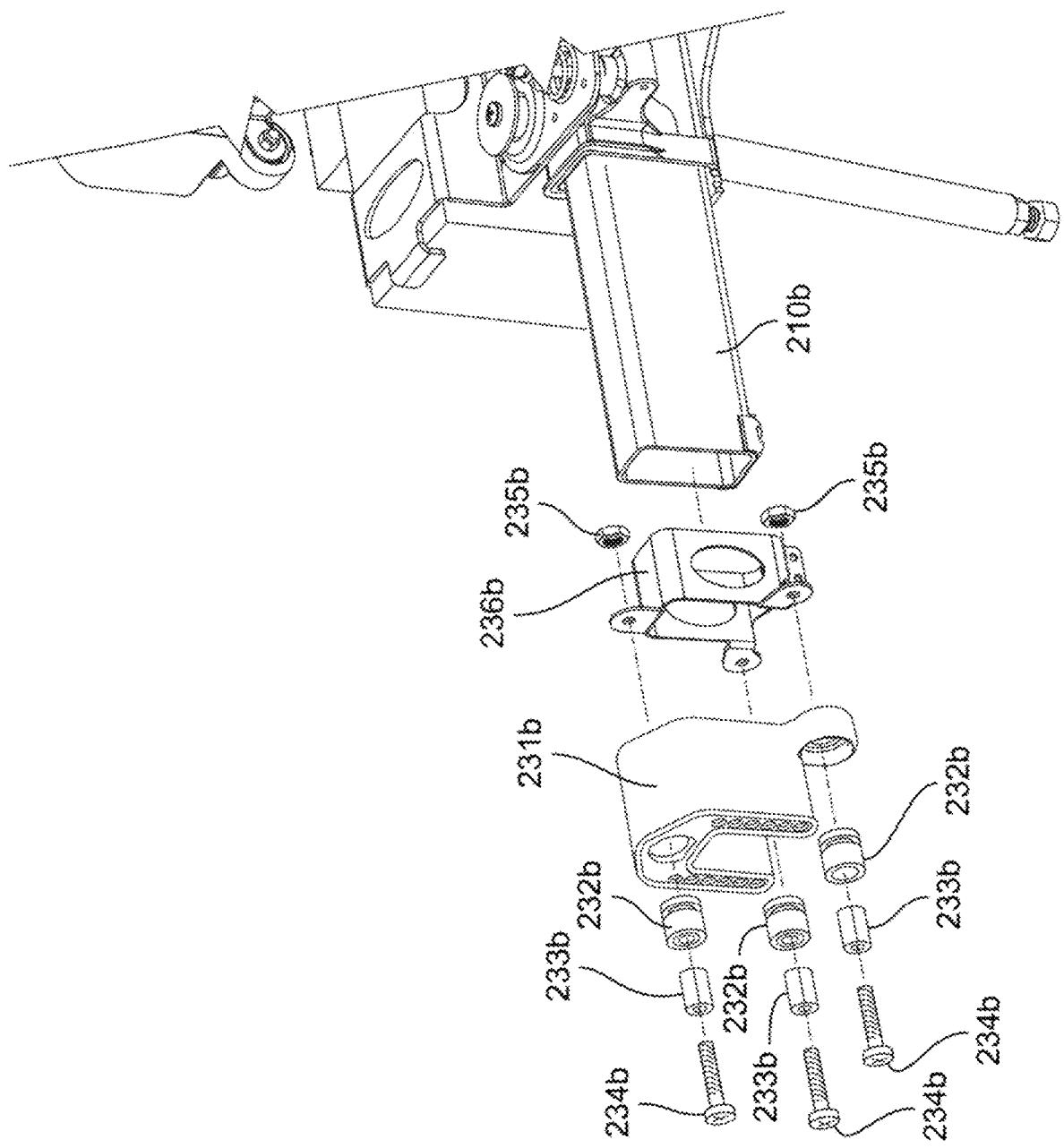
FIG. 3G is a partially exploded top perspective view of one of the female blind mate assemblies of the hub base of FIG. 3A.
Figure 3H:
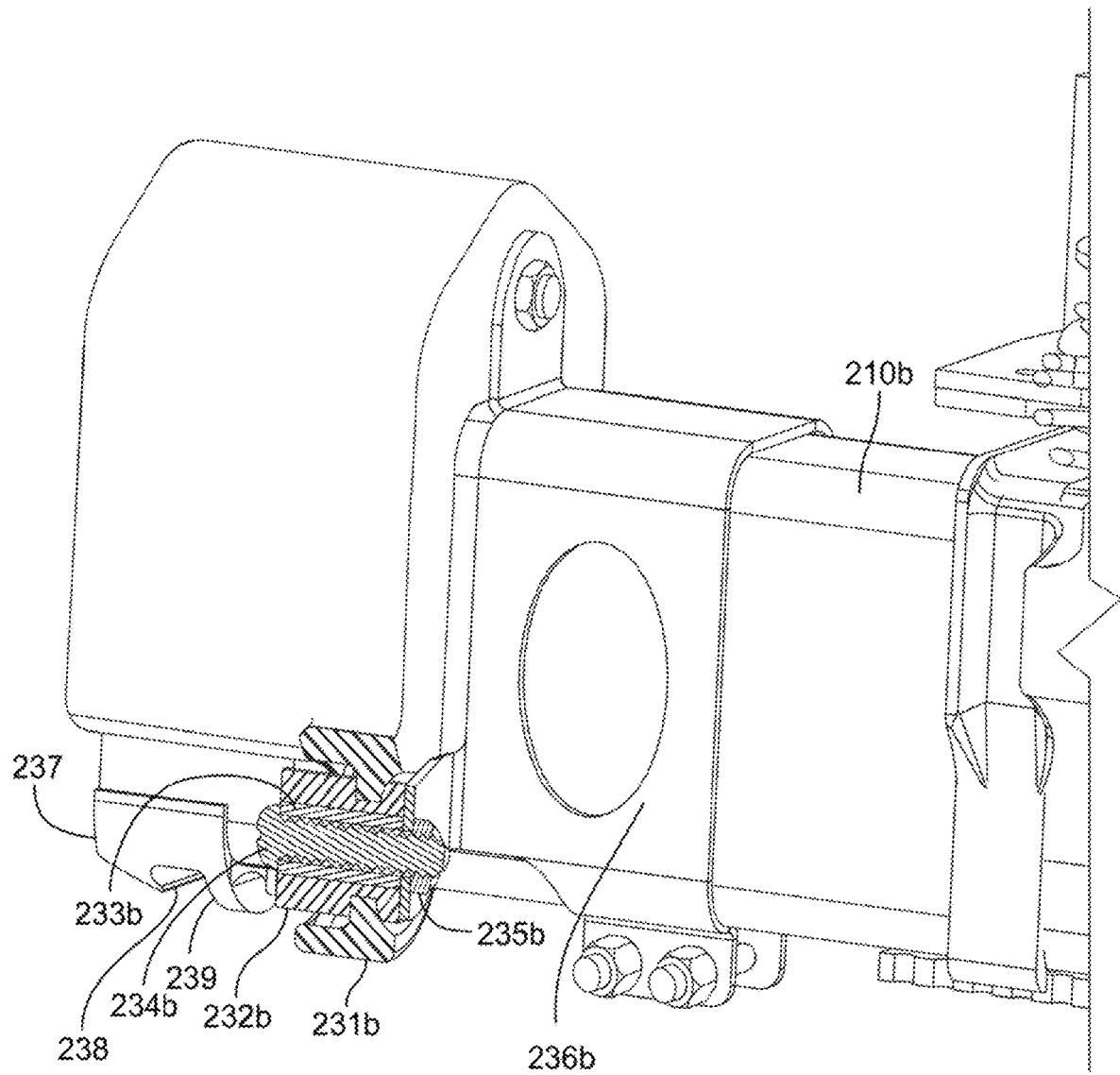
FIG. 3H is a partial cross-sectional view of one of the flexural mounts of the female blind mate assembly of FIG. 3G taken substantially along line 3H-3H of FIG. 3C.

FIGS. 3G and 3H show the second female blind mate assembly 230b. The female blind mate assemblies 230a, 230c, and 230d are similar to the second female blind mate assembly 230b and are therefore not separately shown or described.

The second female blind mate assembly 230b includes: (1) a female blind mate connector 231b including a plurality of pin receptacles (not labeled); (2) three elastomeric grommets 232b; (3) three rigid, hollow cylindrical spacers 233b; (4) three fasteners 234b; (5) three nuts 235b; (6) a mounting bracket 236b; and (7) mounting bracket fasteners (not labeled).

Although not shown for clarity, the female blind mate connector 231b and, particularly, the pin receptacles, are electrically connected to the corresponding ESCs 265c and 265d via wiring. In this example embodiment, the female blind mate connector 231b includes 12 pin receptacles, six of which are connected to the ESC 265c via wiring and the other six of which are connected to the ESC 265d via wiring.

The mounting bracket 236b is positioned at a desired location along the hollow support 210b, and the mounting bracket fasteners are tightened to clamp the mounting bracket 236b in place relative to the hollow support 210b.

The female blind mate connector 231b is flexurally mounted to the mounting bracket 236b via the elastomeric grommets 232b, the spacers 233b, the fasteners 234b, and the nuts 235b. Specifically, the elastomeric grommets 232b are fitted into corresponding cavities in the female blind mate connector 231b. As best shown in FIG. 3H, each cavity includes an inwardly projecting annular rib that fits into a corresponding annular cutout of the corresponding elastomeric grommet 232b. The spacers 233b are disposed within longitudinal bores defined through the elastomeric grommets 232b. The fasteners 234b extend through the hollow spacers 233b and through corresponding fastener receiving openings defined through the mounting bracket 236b into their corresponding nuts 235b. This secures the female blind mate connector 231b to the mounting bracket 236b.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached rotor arm module during flight. Because the female blind mate connector is not rigidly attached to the corresponding mounting bracket, it is less likely that the pins of the male blind mate connector (described below) received by the pin receptacles of the female blind mate connector will lose electrical contact—causing the multicopter 10 to lose control of at least one of its rotor motors—when loads are applied to the female blind mate connector.

As best shown in FIG. 3H, a latch plate 237 is attached to the underside of each hollow support 210a and 210b below each female blind mate connector 231 attached thereto. The latch plate 237 includes a claw engager 238 and a backstop 239. The latch plate 237 is described below with respect to the locking assemblies 420 of the rotor arm modules 400a to 400d.

In some embodiments, the hub module (either the hub base, the saddle, or both) or other elements of the multicopter include ballast to obtain a desired weight distribution and/or provide stability during flight.

1.1.2 Saddle

FIGS. 4A, 4B, 4C, 4D, 4E, 4F, 4G, 4H, 4I, and 4J show the saddle 300 or components thereof. The saddle 300 is the portion of the hub module 100: (1) to which the fixed-wing aircraft 20a is attached for launch; (2) from which the fixed-wing aircraft 20a is released for launch; and (3) to which the flexible capture member 5000 is attached for retrieval of the fixed-wing aircraft 20a. The saddle 300 also enables the operator to vary the pitch angle of the fixed-wing aircraft 20a relative to the multicopter 10.

Figure 4A:
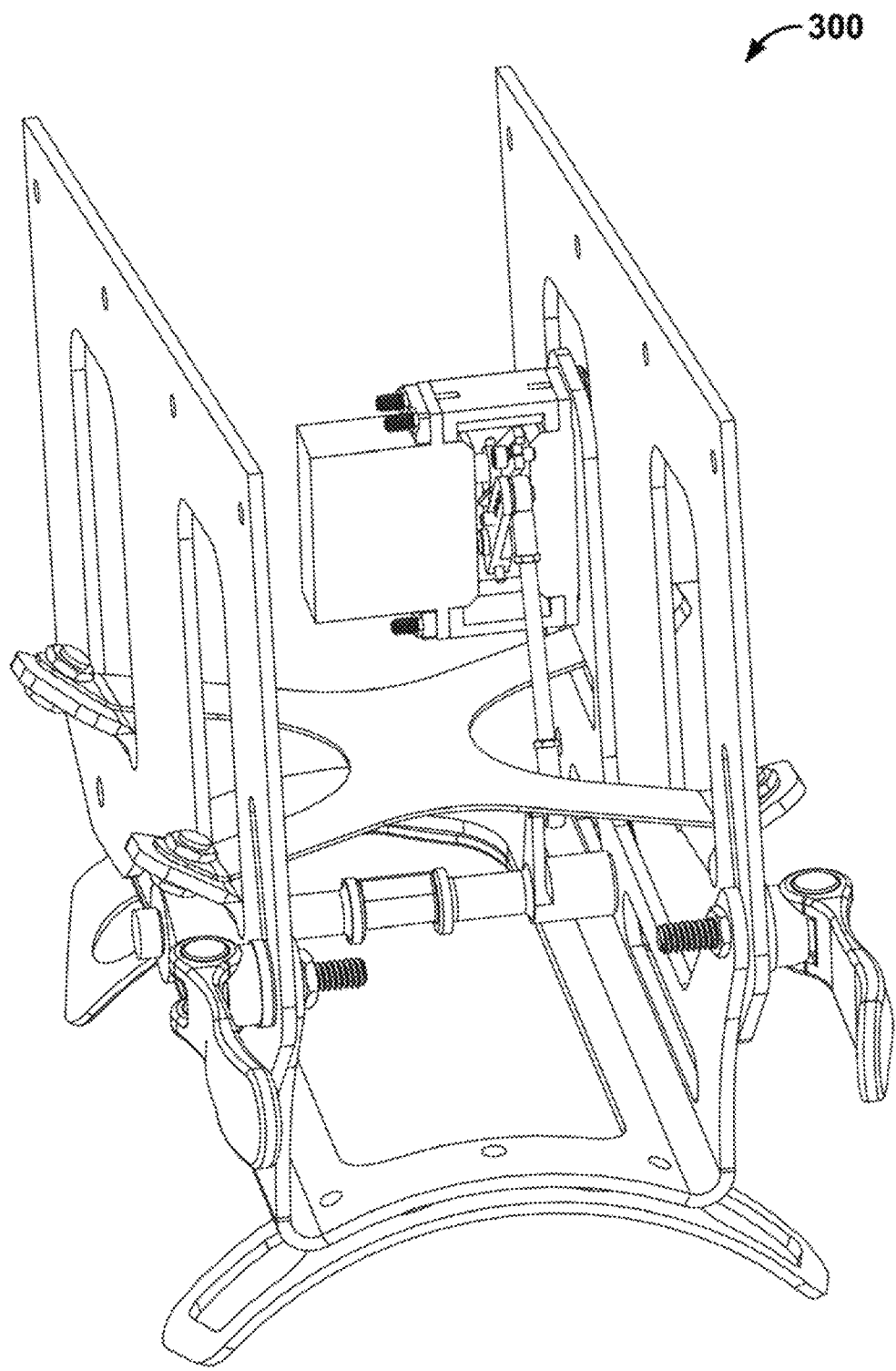
FIG. 4A is a top perspective view of the saddle of the hub module of FIG. 2A.
Figure 4B:
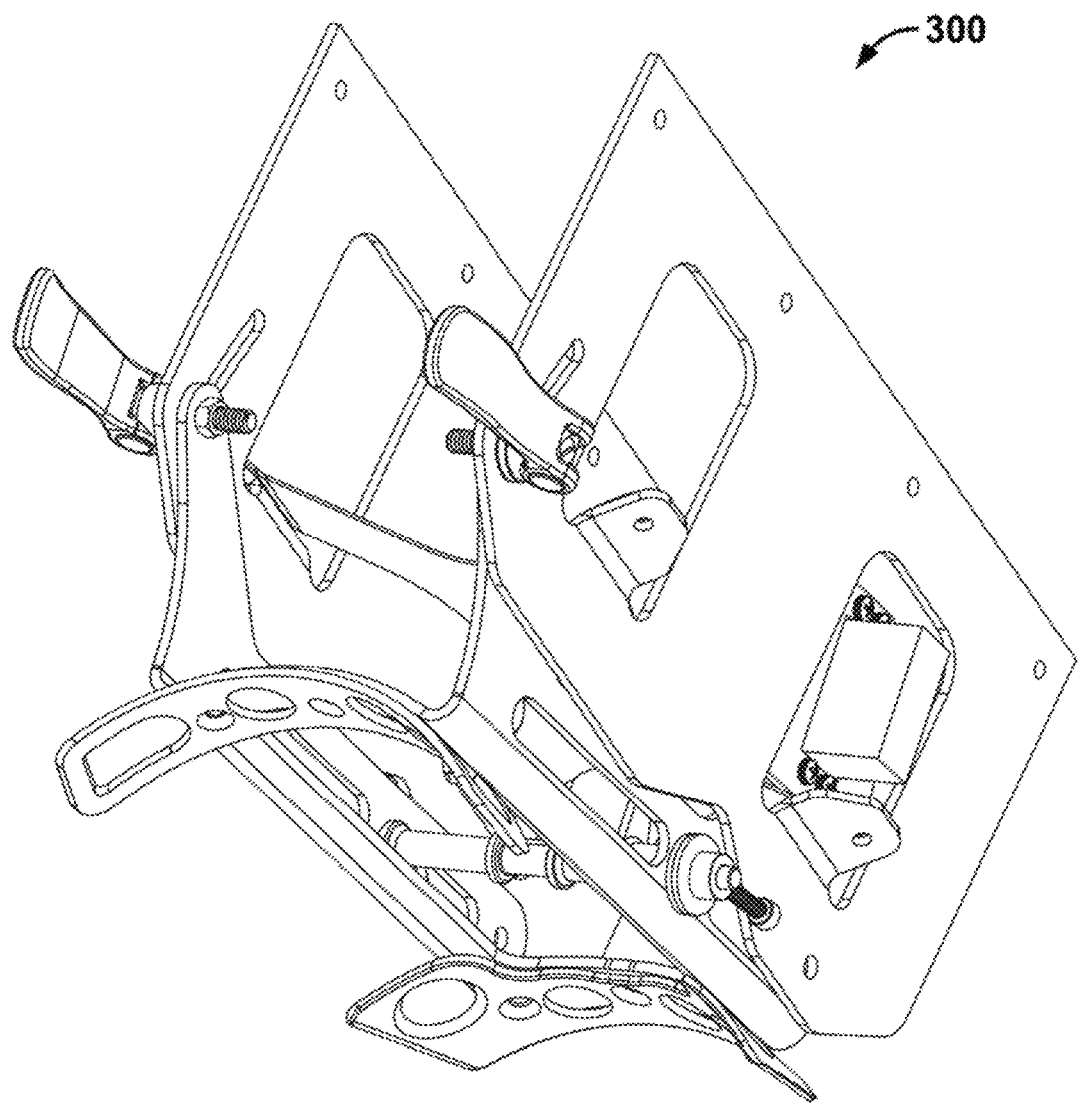
FIG. 4B is a bottom perspective view of the saddle of FIG. 4A.
Figure 4C:
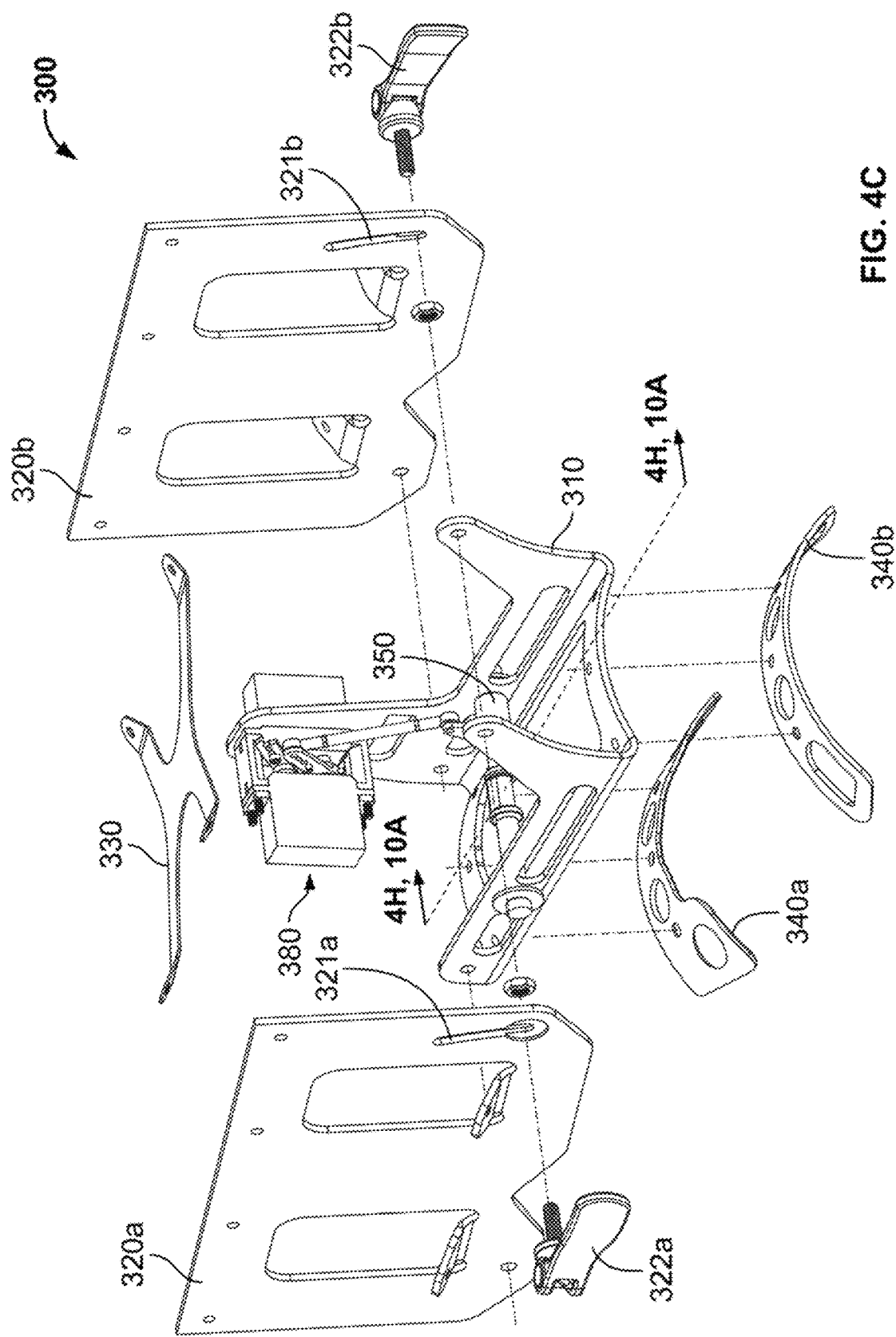
FIG. 4C is a partially exploded top perspective view of the saddle of FIG. 4A.

As best shown in FIG. 4C, the saddle 300 includes a saddle base bracket 310 and first and second saddle side plates 320a and 320b. The first and second saddle side plates 320a and 320b are pivotably connected to opposite sides of the saddle base bracket 310 near the front end of the saddle base bracket 310. The first and second saddle side plates 320a and 320b are also attached to opposite sides of the saddle base bracket 310 near the rear end of the saddle base bracket 310 via locking devices 322a and 322b (which are cam lever locks in this example embodiment but can be any suitable locking devices). The locking devices 322a and 322b extend through respective slots 321a and 322b defined through the respective first and second side plates 320a and 320b.

Figure 4D:
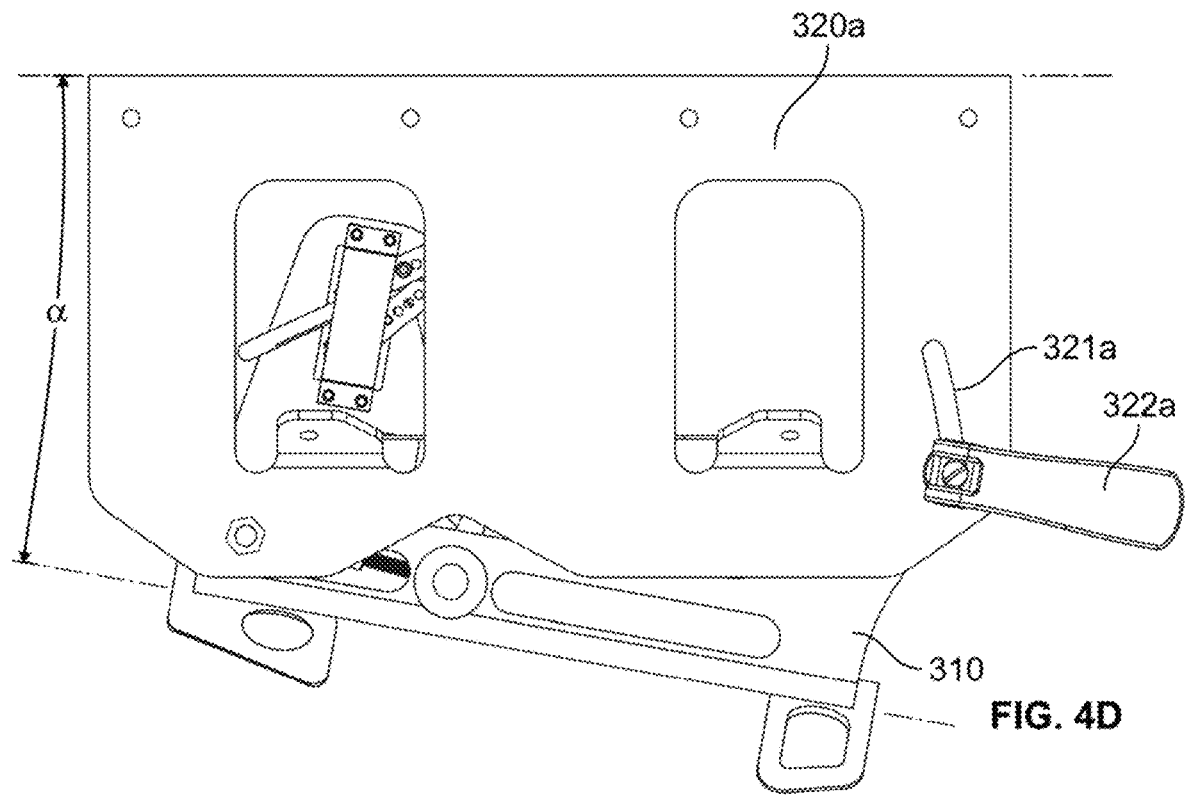
FIGS. 4D and 4E are side elevational views of the saddle of FIG. 4A showing different positions of the saddle.
Figure 4E:
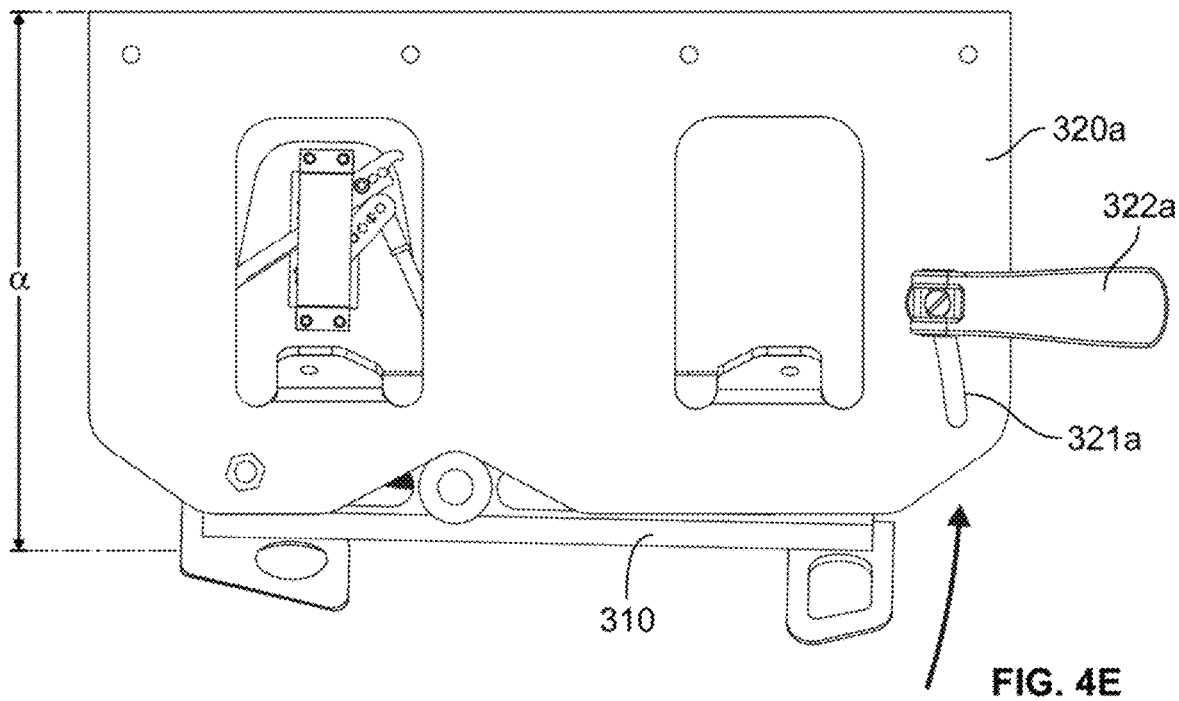

As shown in FIGS. 4D and 4E, the orientation of the slots 321a and 321b enables an operator to vary the angle α formed between a plane including the tops of the first and second saddle side plates 320a and 320b—to which the hub base 200 is attached—and a plane including the generally horizontally extending bottom portion of the saddle base plate 310. The angle α generally corresponds to the angle formed between the hub base plate 202 of the hub base 200 and the fuselage of the fixed-wing aircraft 20a when the fixed-wing aircraft 20a is attached to the saddle 300. To change the angle α, the operator unlocks the locking devices 322a and 322b, rotates the first and second side plates 320a and 320b relative to the saddle base bracket 310 around their pivotable attachments to the saddle base bracket 310 to the desired rotational position (or vice-versa), and re-locks the locking devices 322a and 322b. In this example embodiment, the angle α is variable from about 0 degrees to about 10 degrees, though in other embodiments the angle α is variable between any suitable angles.

In certain embodiments, an operator can cause the first and second side plates to rotate relative to the saddle while the multicopter 10 is flying. For instance, the operator may desire to release the fixed-wing aircraft nose-down from a hover. Conversely, the operator may desire to release the fixed-wing aircraft nose-up (such as nose-up about 10 degrees) to facilitate launch while the multicopter is dashing forward (this nose-up pitch reduces wind drag and better aligns the thrust vector of the fixed-wing aircraft with the desired direction of travel). The multicopter may include any suitable combination of elements to facilitate this remote pivoting, such as various motors, actuators, and the like.

As best shown in FIGS. 4A, 4B, and 4C, a stabilizing bracket 330 is attached to the first and second saddle side plates 320a and 320b and extends across the space between the first and second saddle side plates 320a and 320b. A downwardly curved front aircraft engaging bracket 340a is attached to the underside of the saddle base bracket 310 near the front of the saddle base bracket 310. A downwardly curved rear aircraft engaging bracket 340b is attached to the underside of the saddle base bracket 310 near the rear of the saddle base bracket 310.

Figure 4F:
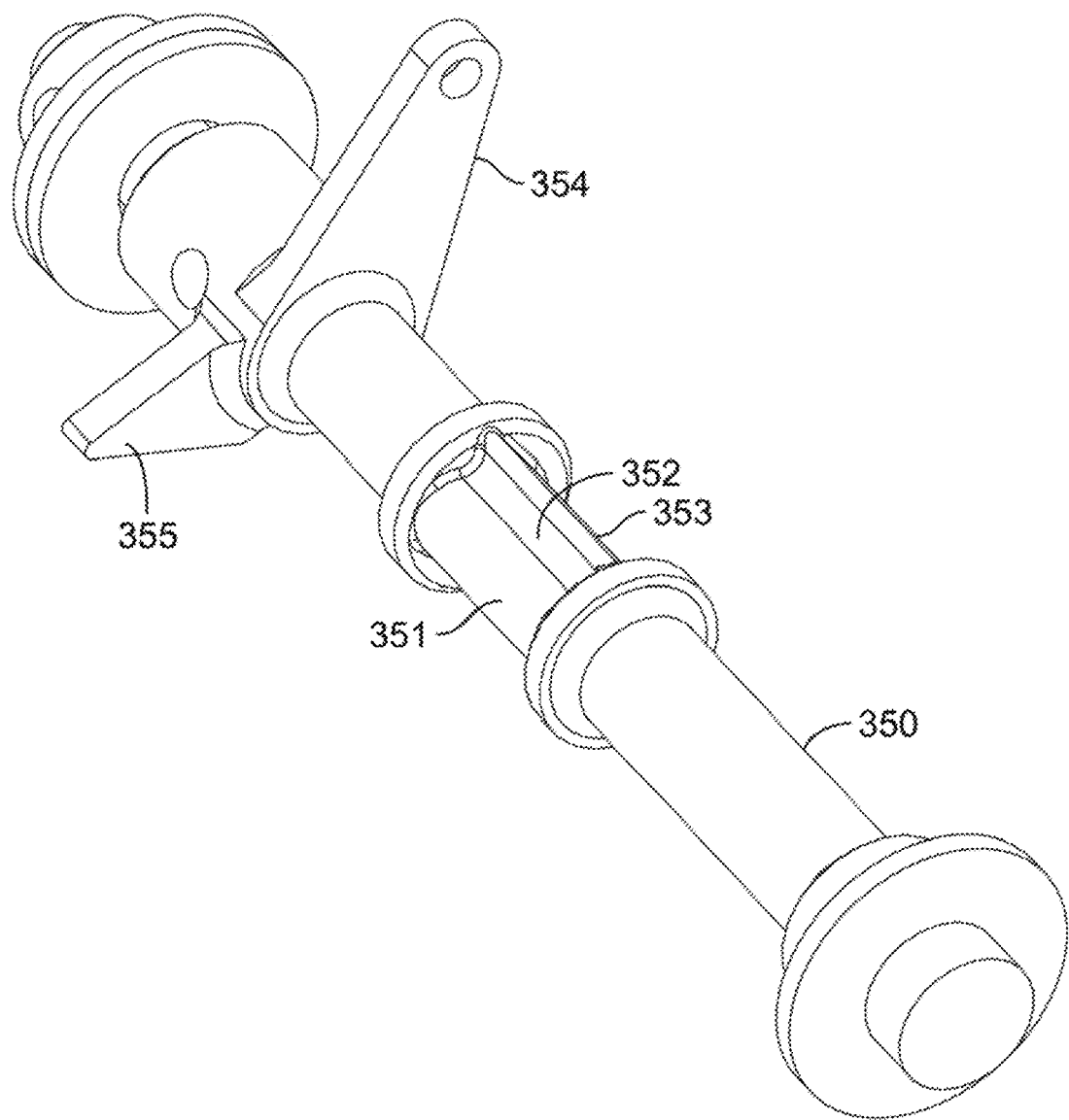
FIG. 4F is a top perspective view of the cam of the saddle of FIG. 4A.
Figure 4G:
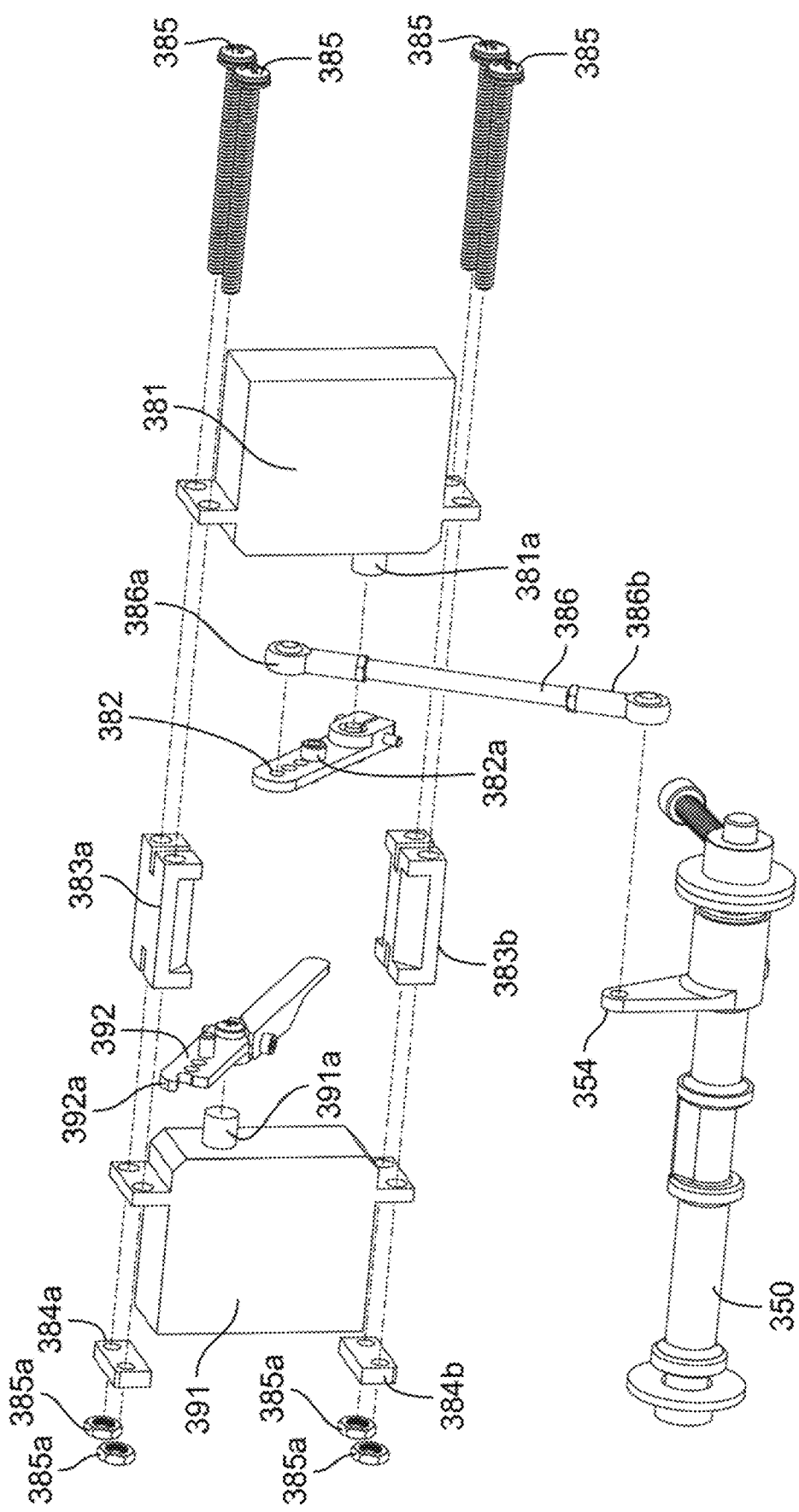
FIG. 4G is an exploded top perspective view of the aircraft attaching/releasing assembly and the cam of the saddle of FIG. 4A.
Figure 4H:
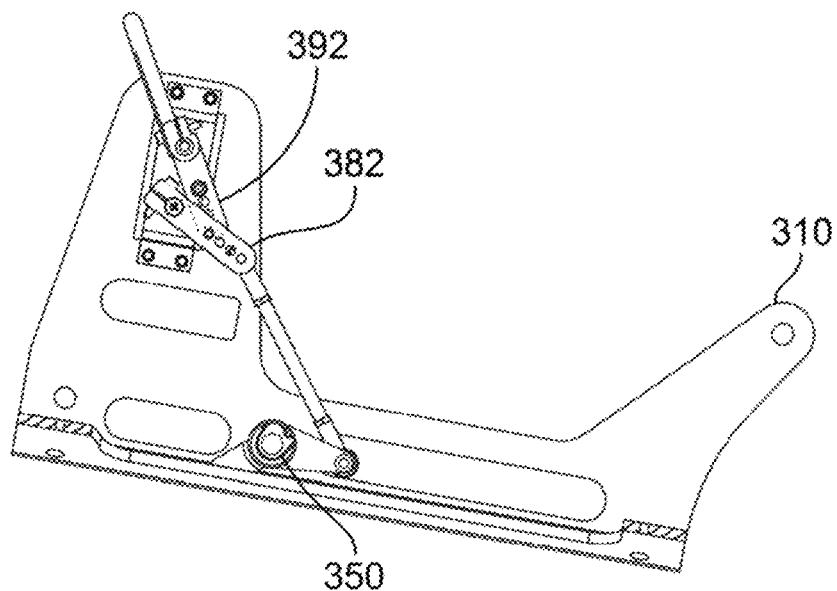
FIG. 4H is a partial cross-sectional view of the saddle of FIG. 4A taken substantially along line 4H-4H of FIG. 4C showing the cam in an attached rotational position.
Figure 4I:
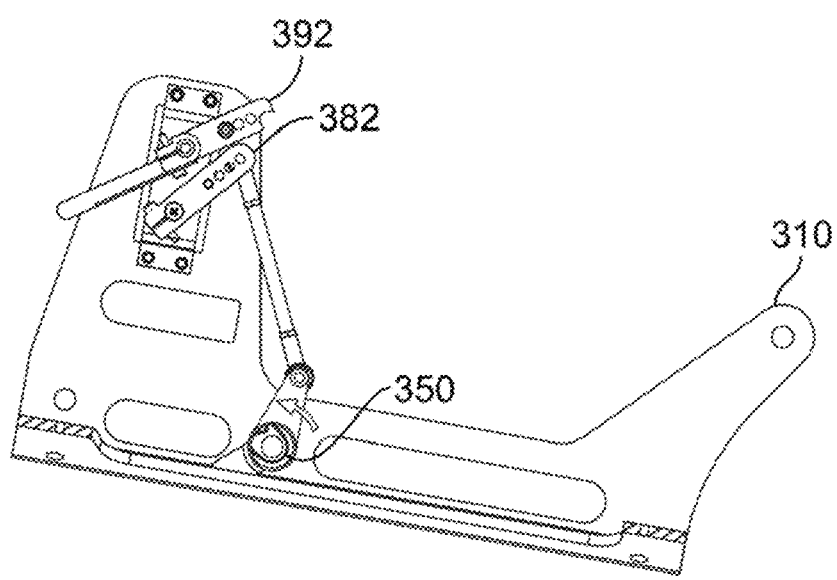
FIG. 4I is a partial cross-sectional view of the saddle of FIG. 4A taken substantially along line 4H-4H of FIG. 4C showing the cam in a release rotational position.

As best shown in FIG. 4C, a cam 350 is rotatably attached to and extends across the width of the saddle base bracket 310 such that the cam 350 is transverse (such as generally perpendicular) to the first and second saddle side plates 320a and 320b. As best shown in FIGS. 4F, 4H, and 4I, the portion of the cam 350 near its longitudinal center has an irregularly shaped profile including a first relatively wide ridge 351, a second relatively narrow ridge 353, and a valley 352 between the first and second ridges 351 and 353. This irregularly shaped profile facilitates attaching the fixed-wing aircraft 20a to the cam 350 (and therefore to the multicopter 10) and releasing the fixed-wing aircraft 20a from the cam 350 (and therefore from the multicopter 10), as described below with respect to FIGS. 12A, 12B, and 12C. The cam 350 also includes a cam control arm 354 and a foot 355 extending transversely (such as generally perpendicularly) from the longitudinal axis of the cam 350.

An aircraft attaching/releasing assembly 380 attached to the saddle base bracket 310 controls rotation of the cam 350 relative to the saddle base bracket 310. As best shown in FIG. 4G, the aircraft attaching/releasing assembly 380 includes: (1) a cam servo motor 381 having a cam servo motor shaft 381a; (2) a cam servo motor arm 382; (3) a cam servo motor arm lock device 382a; (4) upper and lower servo spacers 383a and 383b; (5) upper and lower nut plates 384a and 384b; (6) fasteners 385; (7) a cam rotation control link 386 having connectors 386a and 386b at either end; (8) a lock servo motor 391 having a lock servo motor shaft 391a; and (9) a lock servo arm 392 terminating at one end in a lock servo motor locking extension 392a.

The cam servo motor 381 and the lock servo motor 391 are attached to one another and to the saddle base bracket 310 via the fasteners 385, the upper and lower servo spacers 383a and 383b, and the upper and lower nut plates 384a and 384b. The cam servo motor arm 382 is attached near one end to the cam servo motor shaft 381a and near the other end to the connector 386a. The connector 386b is attached to the cam control arm 354 of the cam 350, which links the cam servo motor shaft 381a to the cam 350. The cam servo motor arm lock device 382a is attached to the cam servo motor arm 382 between the connector 386a and the cam servo motor shaft 381a. The lock servo arm 392 is attached to the lock servo motor shaft 391a. The rearwardly extending portion of the lock servo arm 392 terminates in the lock servo motor locking extension 392a, which is engageable to the cam servo motor arm lock device 382a in certain instances.

The cam servo motor 381 controls rotation of the cam 350 relative to the saddle base bracket 310. To rotate the cam 350, the cam servo motor 381 rotates the cam servo motor shaft 381a, which rotates the attached cam servo arm 382, which in turn rotates the cam 350 via the cam rotation control link 386. The cam servo motor 381 can rotate the cam 350 from an attached rotational position—shown in FIG. 4H—to a release rotational position—shown in FIG. 4I (and vice-versa).

The lock servo motor 391 controls rotation of the lock servo arm 392 between a cam rotation-preventing rotational position—shown in FIG. 4H—and a cam rotation-enabling rotational position—shown in FIG. 4I (and vice-versa). When the cam 350 is in the attached rotational position and the lock servo arm 392 is in the cam rotation-preventing rotational position, the lock servo motor locking extension 392a engages the cam servo motor arm lock device 382a of the cam servo motor arm 382. This prevents the cam servo motor 381 from rotating the cam 350 from the attached rotational position to the release rotational position.

FIGS. 4H and 4I show how the cam servo motor 381 and the lock servo motor 391 operate to rotate the cam 350 from the attached rotational position to the release rotational position. Initially, the cam servo motor 381 is in the attached rotational position and the lock servo motor 391 is in the cam rotation-preventing rotational position. Here, the lock servo motor locking extension 392a on the end of the lock servo arm 392 engages the cam servo motor arm lock device 382a of the cam servo motor arm 382.

Since the lock servo motor locking extension 392a is engaged to the cam servo motor arm lock device 382a of the cam servo motor arm 382, the cam servo motor 381 cannot rotate the cam 350 from the attached rotational position to the release rotational position (counter-clockwise from this viewpoint).

Rotating the cam 350 from the attached rotational position to the release rotational position is a two-step process. The operator first operates the lock servo motor 391 to rotate the lock servo arm 392 into the cam rotation-enabling rotational position (counter-clockwise from this viewpoint). Second, the operator operates the cam servo motor 381 to rotate the cam 350 from the attached rotational position to the release rotational position (counter-clockwise from this viewpoint).

Figure 12A:
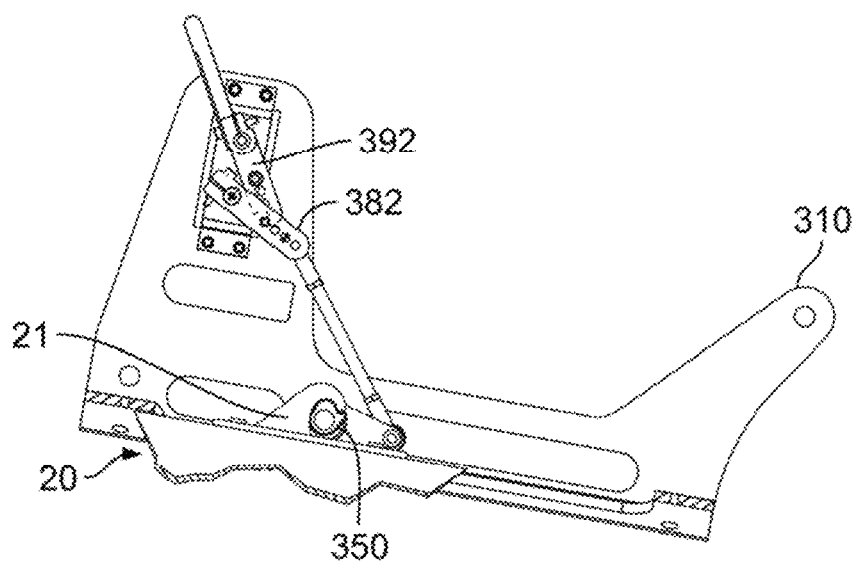
FIG. 12A is a partial cross-sectional view of the saddle of FIG. 4A showing the cam in an attached rotational position and a hook of the fixed-wing aircraft attached taken substantially along line 10A-10A of FIG. 4C.
Figure 12B:
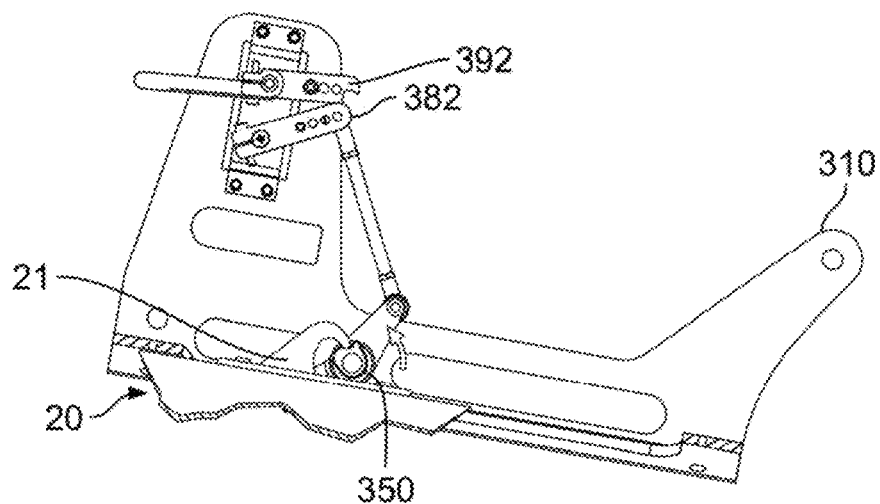
FIG. 12B is a partial cross-sectional view of the saddle of FIG. 4A showing the cam halfway between the attached rotational position and the release rotational position and the hook of the fixed-wing aircraft being pushed off of the cam taken substantially along line 10A-10A of FIG. 4C.
Figure 12C:
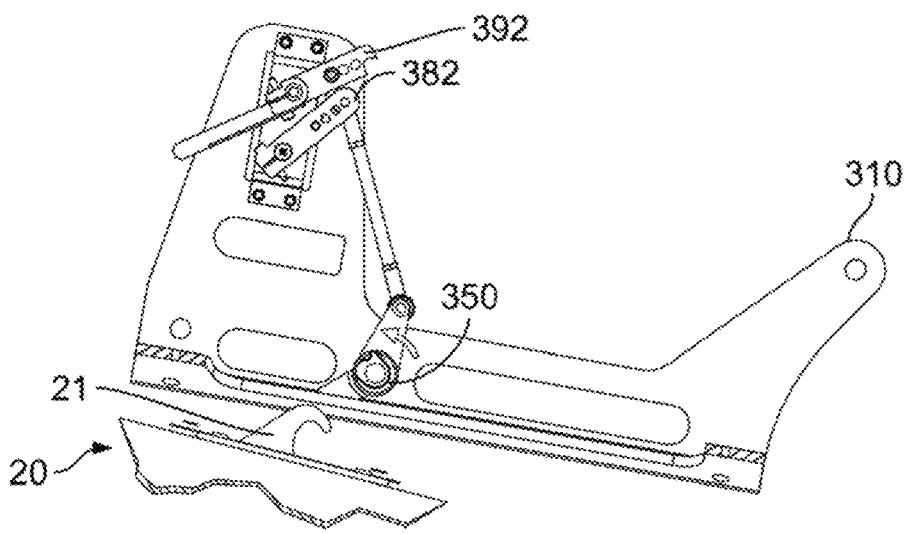
FIG. 12C is a partial cross-sectional view of the saddle of FIG. 4A showing the cam in the release rotational position and the hook of the fixed-wing aircraft released from the cam taken substantially along line 10A-10A of FIG. 4C.

FIGS. 12A-12C, described below, show how rotation of the cam from the attached rotational position to the release rotational position causes the fixed-wing aircraft to release from the cam.

The foot 355 controls the extent to which the cam 350 can rotate. The foot 355 is oriented such that when the cam 350 rotates a certain amount in a first direction relative to the saddle base bracket 310, the foot 355 contacts the saddle base bracket 310 and prevents the cam 350 from rotating any further in that first direction. Similarly, when the cam 350 rotates a particular amount in a second opposite direction relative to the saddle base bracket 310, the foot 355 contacts the saddle base bracket 310 and prevents the cam 350 from rotating any further in that second direction. The foot 355 is angled to stop the cam 350 from rotating before it exerts an undue force on the cam rotation control link 386, and by extension the cam motor arm 382 and the cam motor shaft 381a.

1.2 Rotor Arm Modules

The rotor arm modules 400a to 400d are mechanically attachable to and mechanically lockable to the hub module 200 and include: (1) the eight rotors of the multicopter 10; (2) the eight rotor motors that drive these rotors; (3) gear reduction trains that couple the rotor motors to their corresponding rotors; and (4) locking assemblies that lock the rotor arm modules 400a to 400d to the hub module 100.

FIGS. 5A, 5B, 5C, 5D, 5E, 5F, 5G, 5H, 5I, and 5J show the first rotor arm module 400a or components thereof. The other rotor arm modules 400b, 400c, and 400d are similar to the first rotor arm module 400a and are therefore not separately shown or described.

As best shown in FIGS. 5A, 5B, 5H, and 5J, the first rotor arm module 400a includes: (1) a generally rectangular hollow elongated rotor arm 410a; (2) a generally rectangular hollow rotor arm extension 410b; (3) a locking assembly 420; (4) a male blind mate connector 431; (5) upper and lower rotor motor assemblies 460a and 460b; and (6) a rotor assembly 470.

The rotor arm extension 410b is attached to the rotor arm 410a such that part of the rotor arm extension 410b is disposed within the rotor arm 410a and the remainder of the rotor arm extension 410b extends from the rotor arm 410a. The locking assembly 420 is attached to the underside of the rotor arm 410a near the end of the rotor arm 410a from which the rotor arm extension 410b extends. The male blind mate connector 431 is attached to the end of the rotor arm 410a from which the rotor arm extension 410b extends. The upper and lower rotor motor assemblies 460a and 460b and the rotor assembly 470 are attached to the rotor arm 410a in a manner described in detail below.

Although not shown, the open end of the rotor arm 410a opposite the end from which the rotor arm extension 410b extends forms a first front landing gear extension module receiving socket that can receive the first front landing gear extension module 500a, as described below.

As best shown in FIGS. 5A, 5B, 5C, 5D, 5E, and 5F, the male blind mate connector 431—along with its counterpart female blind mate connector 231a of the hub module 100—facilitate: (1) mechanical attachment of the first rotor arm module 400a to the hub module 100; (2) electrical power flow from the battery(ies) 260a, 260b, 260c, and/or 260d to the upper and lower rotor motors 465a and 465b of the first rotor arm module 400a; and (3) communication between the ESCs 265a and 265b their corresponding upper and lower rotor motors 465a and 465b.

The male blind mate connector 431 includes a plurality of pins 431a configured to mate with the pin receptacles of the female blind mate connector 231a. Although not shown for clarity, the male blind mate connector 431 and, particularly, the pins 431a, are electrically connected to the corresponding upper and lower rotor motors 465a and 465b via wiring. In this example embodiment, the male blind mate connector 431 includes 12 pins 431a, six of which are connected to the upper rotor motor 465a via wiring and the other six of which are connected to the lower rotor motor 465b via wiring. In this example embodiment, each motor only requires three motor leads to properly function, but the multicopter 10 includes two motor leads for each motor pole. By using two motor leads per motor pole, the multicopter 10 eliminates single-point failures (i.e., both leads would have to fail rather than just a single lead for the motor to fail).

To attach the rotor arm module 400a to the hub module 100, an operator inserts the rotor arm extension 410b into the first rotor arm module receiving socket 214 of the hub module 100 and slides the rotor arm module 400a toward the hub module 100 with enough force to mate the pins of the male blind mate connector 431 with the pin receptacles of the female blind mate connector 231a of the hub module 100.

As best shown in FIGS. 5C, 5D, 5E, and 5F, the locking assembly 420 includes a drawcatch 420a and a drawcatch lock 420b that: (1) facilitate attaching the first rotor arm module 400a to the hub module 100; (2) lock the first rotor arm module 400a to the hub module 100; and (3) facilitate detachment of the first rotor arm module 400a from the hub module 100.

Figure 5A:
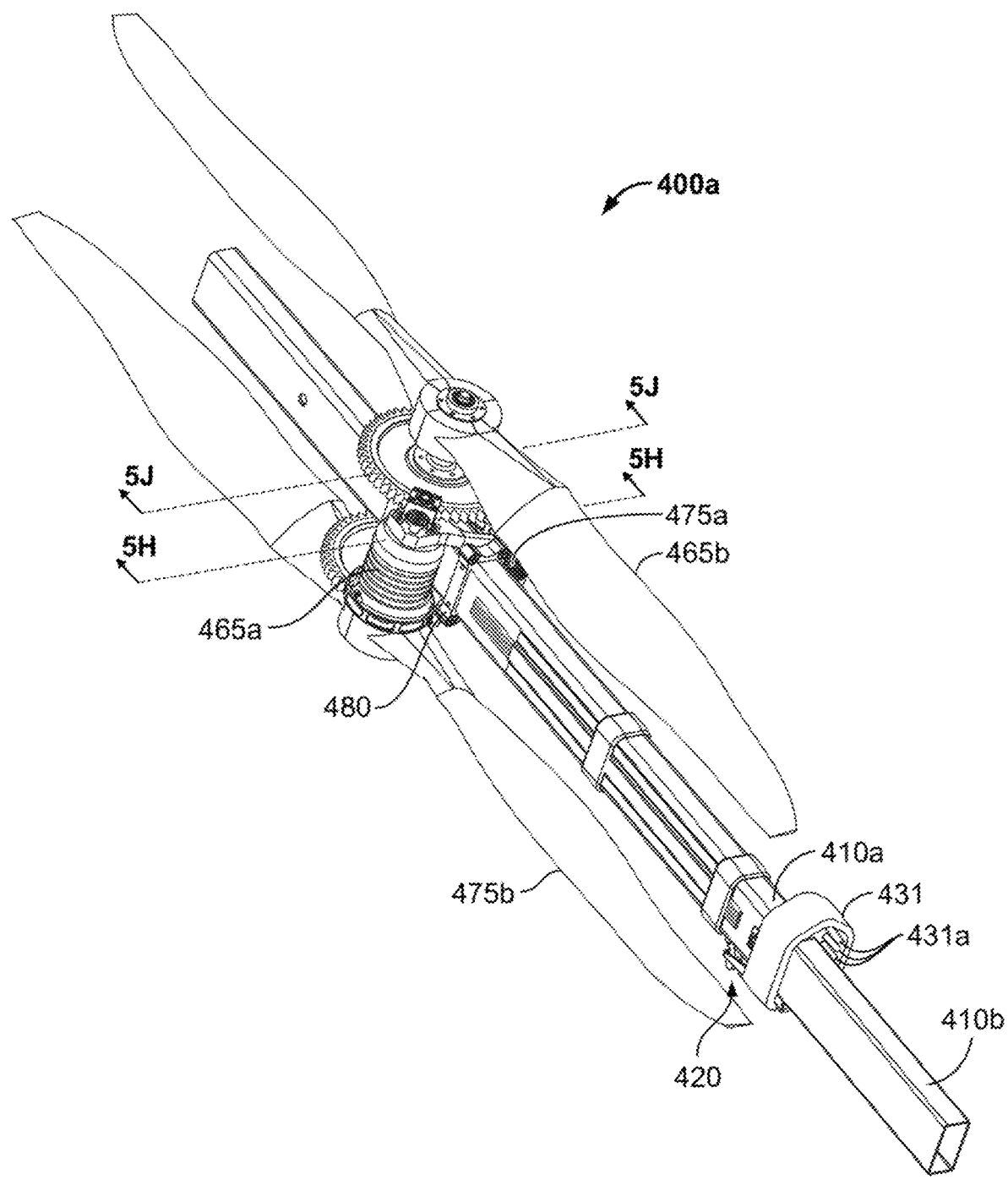
FIG. 5A is a top perspective view of one of the rotor arm modules of the multicopter of FIG. 1A.
Figure 5B:
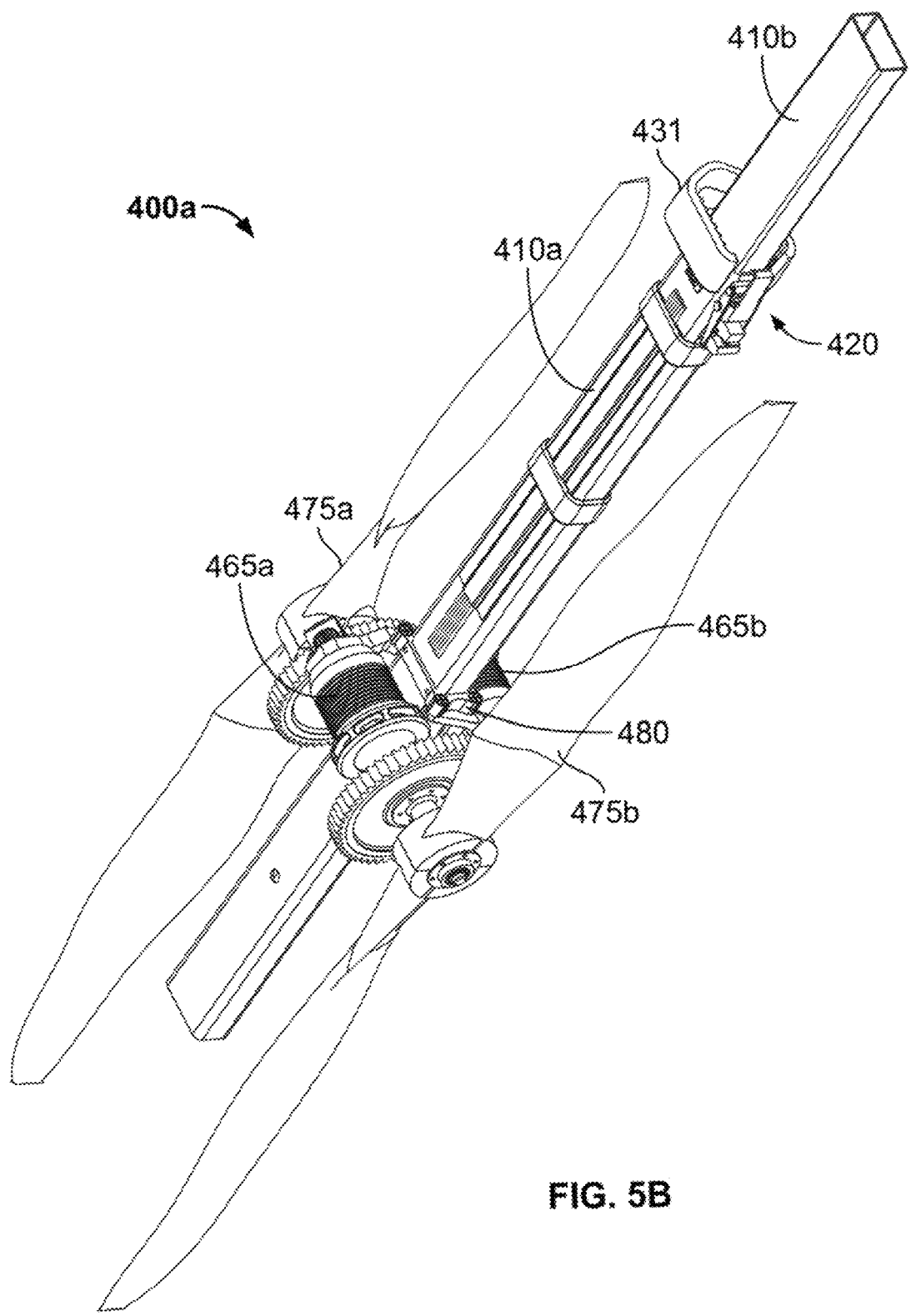
FIG. 5B is a bottom perspective view of the rotor arm module of FIG. 5A.
Figure 5C:
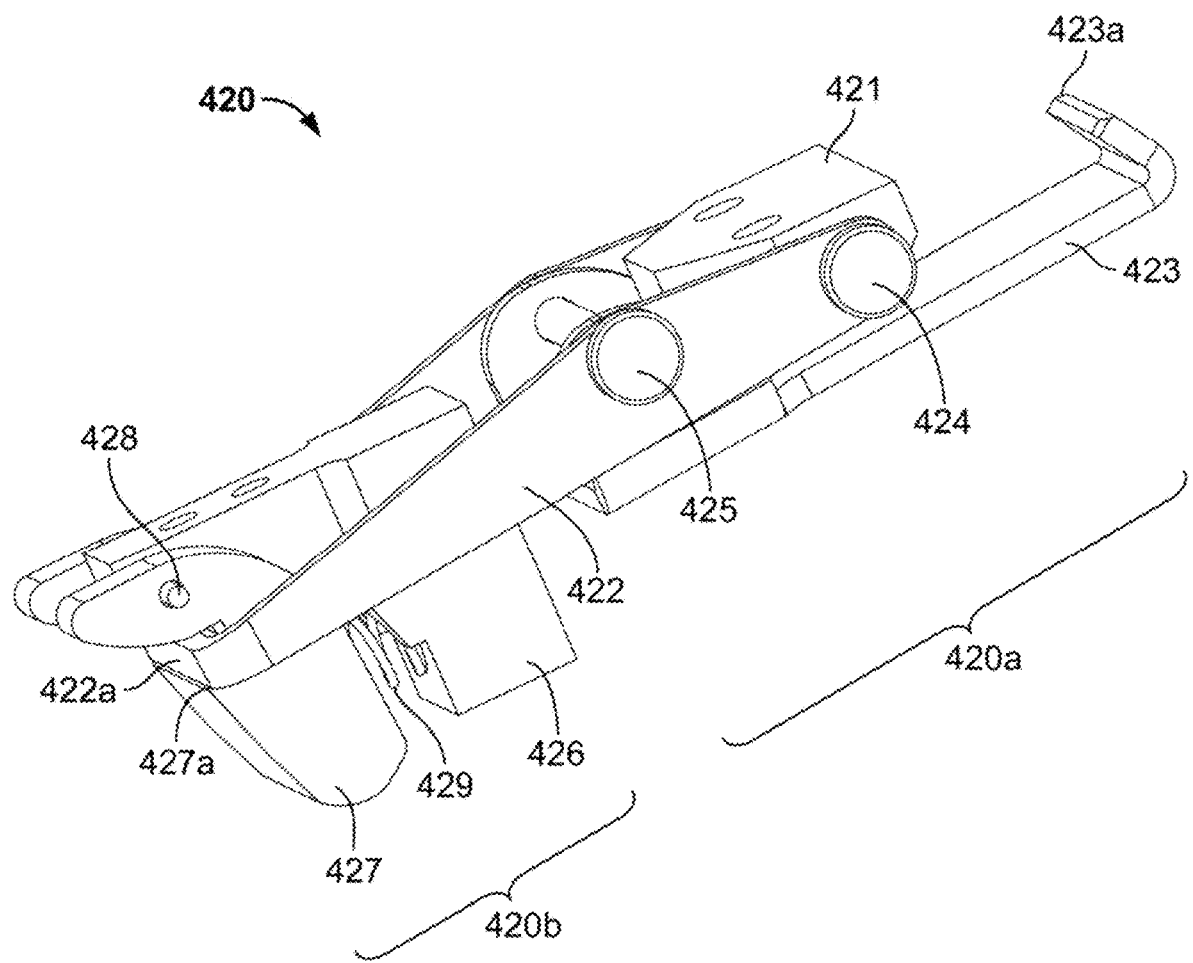
FIG. 5C is a top perspective view of the locking assembly of the rotor arm module of FIG. 5A.

As best shown in FIG. 5C, the drawcatch 420a includes: (1) a base 421; (2) a lever 422; (3) a claw 423; (4) a first fastener 424 (such as a clevis pin or other suitable fastener); and (5) a second fastener 425 (such as a clevis pin or other suitable fastener).

The drawcatch lock 420b includes: (1) a base 426; (2) a lock/release device 427 having a locking shelf 427a; (3) a pin 428 (or other suitable connector); and (4) a compression spring 429 (or other suitable biasing element).

The base 421 is attached to the underside of the rotor arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the rotor arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first rotor arm module 400a and the hub module 100 are locked together.

In addition to using the locking assembly 420 to lock the first rotor arm module 400a to the hub module 100, the operator can use the locking assembly 420 to facilitate mating the male blind mate connector 431 with the female blind mate connector 231a. If the male blind mate connector 431 and the female blind mate connector 231a are only partially mated (or not mated at all) and the latch plate engager 423a of the claw 423 is engaged to the claw engager 238 of the latch plate 237, rotating the handle 422a of the lever 422 around the first fastener 424 toward the lock/release device 427 to lock the handle 422a will pull the first rotor arm module 400a and the hub module 100 toward one another and cause the male blind mate connector 431 to mate with the female blind mate connector 231a.

Figure 5D:
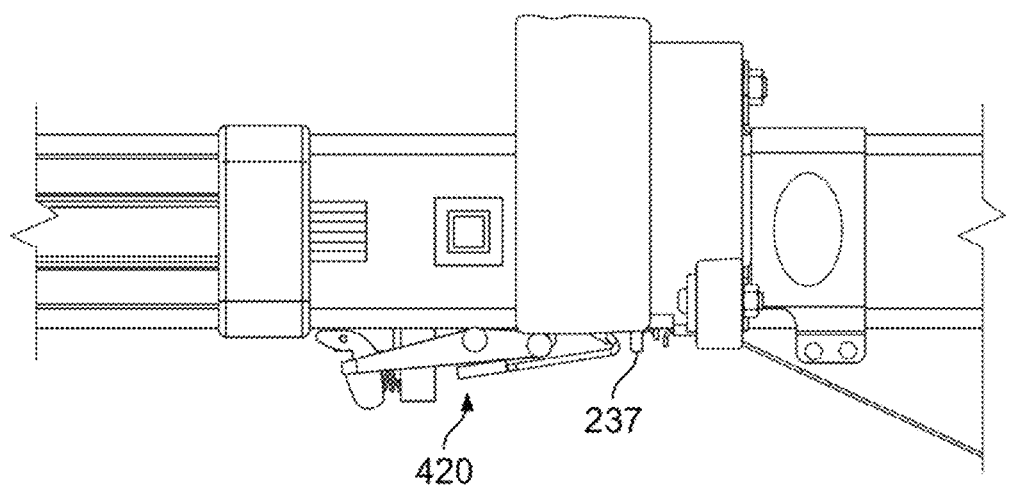
FIGS. 5D, 5E, and 5F are side elevational views of the rotor arm module of FIG. 5A detaching from the hub module of FIG. 2A via the locking assembly of FIG. 5C.
Figure 5E:
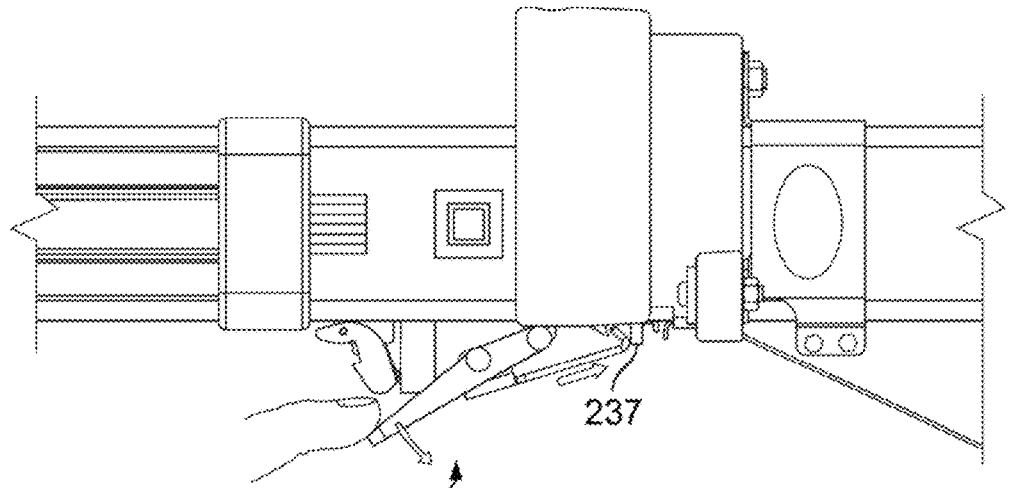

As shown in FIGS. 5D and 5E, the operator reverses this process to unlock the first rotor arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

Figure 5F:
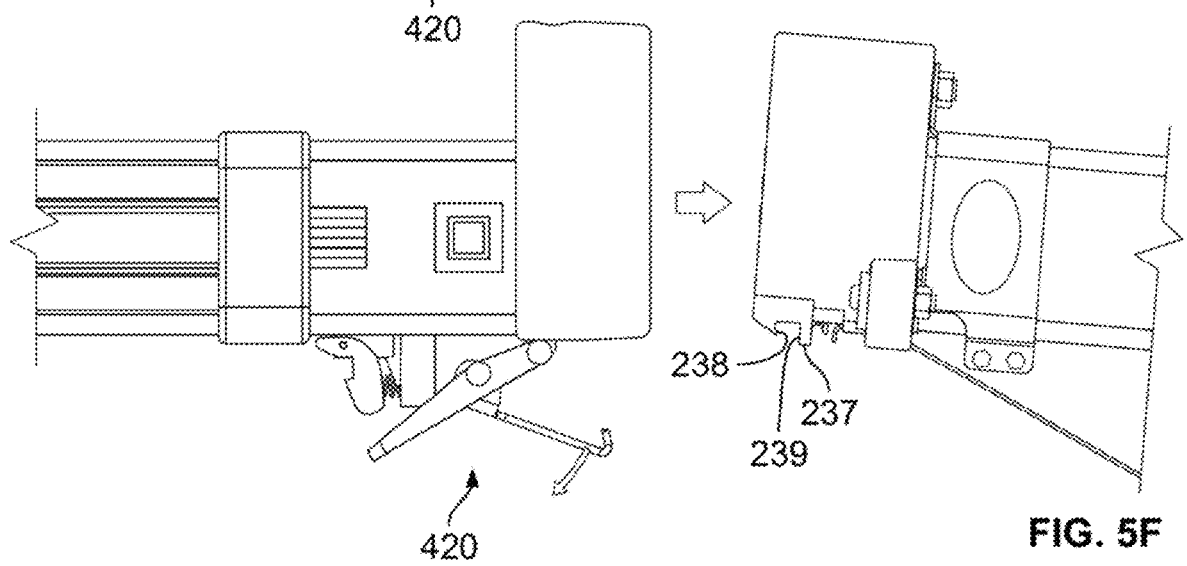

At this point, the operator can either physically pull the first rotor arm module 400a and the hub module 100 apart to separate the male and female blind mate connectors 431 and 231a or use the locking assembly 420 to aid in detachment. When using the locking assembly 420 to aid in detachment, as shown in FIG. 5F, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first rotor arm module 400a and the hub module 100 apart.

Turning to the upper and lower rotor motor assemblies 460a and 460b and the rotor assembly 470a, the upper and lower rotor motors 465a and 465b of the upper and lower motor assemblies independently drive respective upper and lower rotors 475a and 475b via separate gear reduction trains.

Figure 5G:
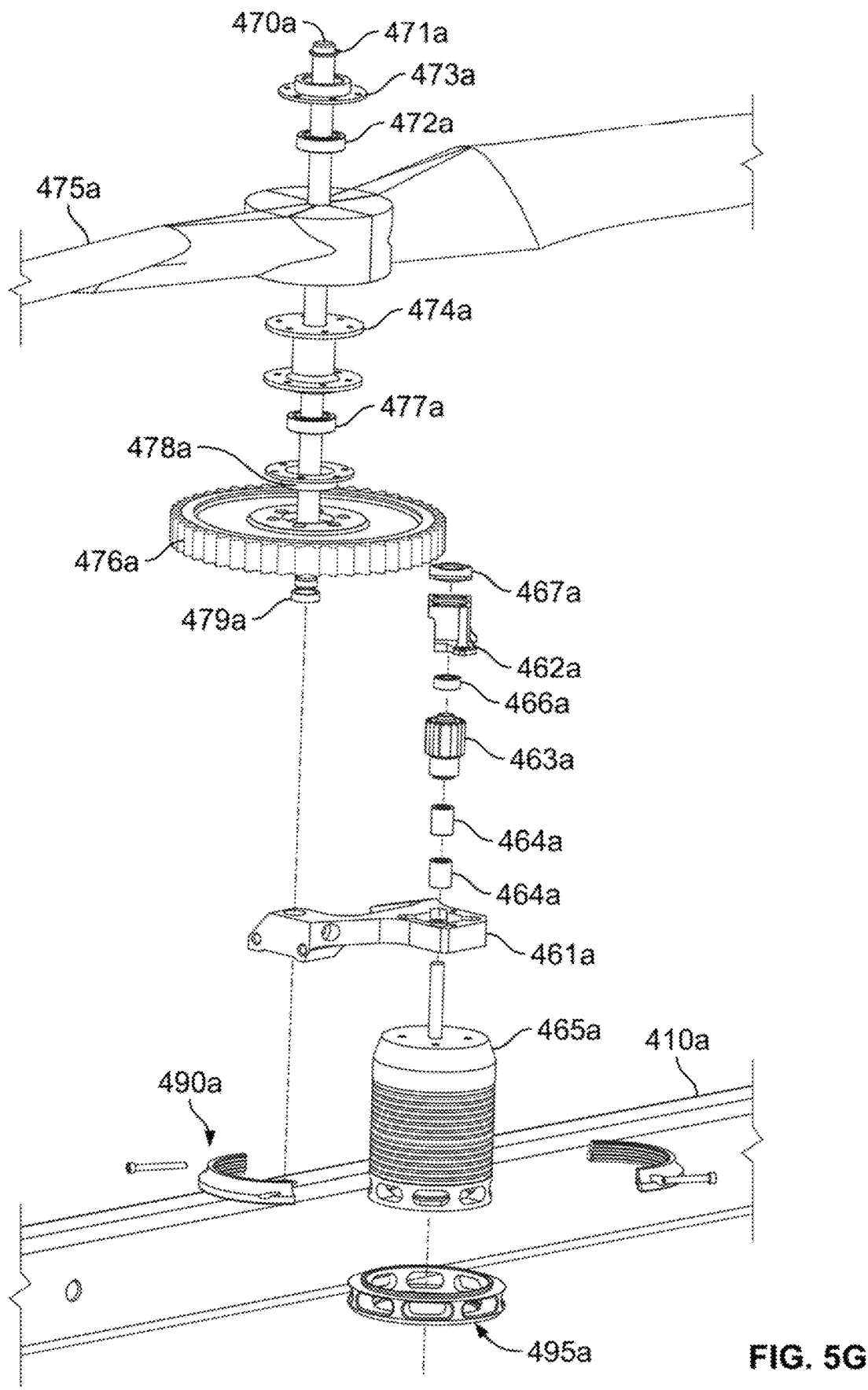
FIG. 5G is an exploded top perspective view of one of the rotor arm assemblies and part of the rotor assembly of the rotor arm module of FIG. 5A.
Figure 5H:
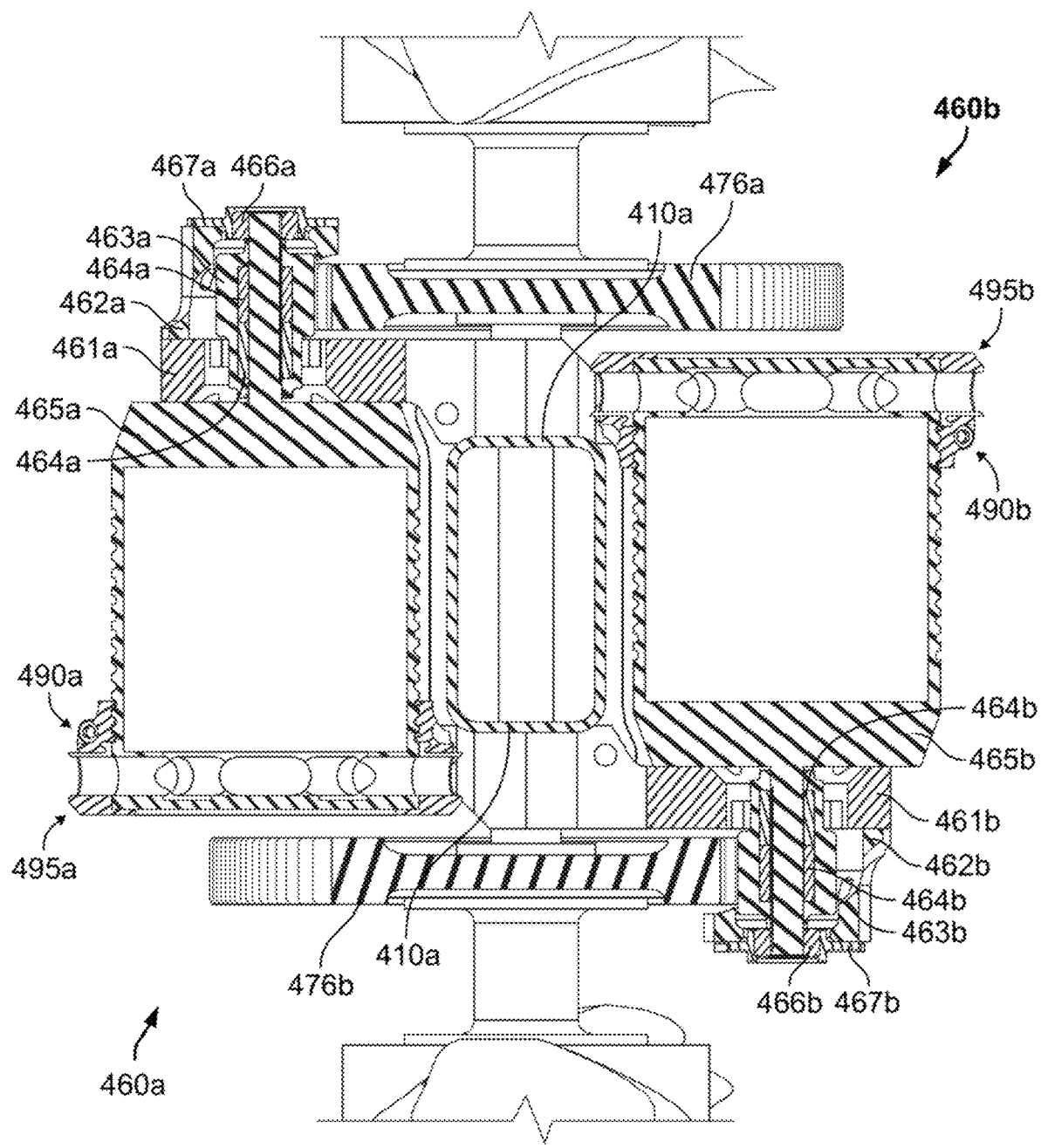
FIG. 5H is a cross-sectional view of the rotor motor assemblies of the rotor arm module of FIG. 5A taken substantially along line 5H-5H of FIG. 5A.

As best shown in FIGS. 5G and 5H, the upper rotor motor assembly 460a includes: (1) an upper rotor motor mount 461a, (2) an upper bearing spider 462a, (3) an upper pinion 463a, (4) upper bearings 464a, (5) the upper rotor motor 465a, (6) an upper bearing 466a, (7) an upper bearing cup 467a, (8) an upper two-piece cooling fan collar 490a, and (9) an upper rotor motor cooling fan 495a.

The upper rotor motor 465a is attached to the upper rotor motor mount 461a. The bearing spider 462a is attached to the upper rotor motor mount 461a. The upper bearings 464a are disposed on the motor shaft (not labeled) of the upper rotor motor 465a. The upper drive pinion 463a is disposed on the upper bearings 464a and on the motor shaft of the upper rotor motor 465a such that the upper drive gear 463a rotates with the motor shaft. The upper bearing 466a within the upper bearing cup 467a is disposed on the motor shaft of the upper rotor motor 465a. The upper bearing cup 467a is attached to the upper bearing spider 462a. The upper rotor motor cooling fan 495a is press-fit around the bottom of the upper rotor motor 465a and held in place via the upper two-piece cooling fan collar 490a.

The lower rotor motor assembly 460b includes: (1) a lower rotor motor mount 461b, (2) a lower bearing spider 462b, (3) a lower pinion 463b, (4) lower bearings 464b, (5) the lower rotor motor 465b, (6) a lower bearing 466b, (7) a lower bearing cup 467b, (8) a lower two-piece cooling fan collar 490b, and (9) a lower rotor motor cooling fan 495b.

The lower rotor motor 465b is attached to the lower rotor motor mount 461b. The lower bearing spider 462b is attached to the lower rotor mount 461b. The lower bearings 464b are disposed on the motor shaft (not labeled) of the lower rotor motor 465b. The lower pinion 463b is disposed on the lower bearings 464b and on the motor shaft of the lower rotor motor 465b such that the lower pinion 463b rotates with the motor shaft. The lower bearing 466b within the lower bearing cup 467b is disposed on the motor shaft of the lower rotor motor 465b. The lower bearing cup 467b is attached to the lower bearing spider 462b. The lower rotor motor cooling fan 495b is press-fit around the bottom of the lower rotor motor 465a and held in place via the lower two-piece cooling fan collar 490b.

Figure 5I:
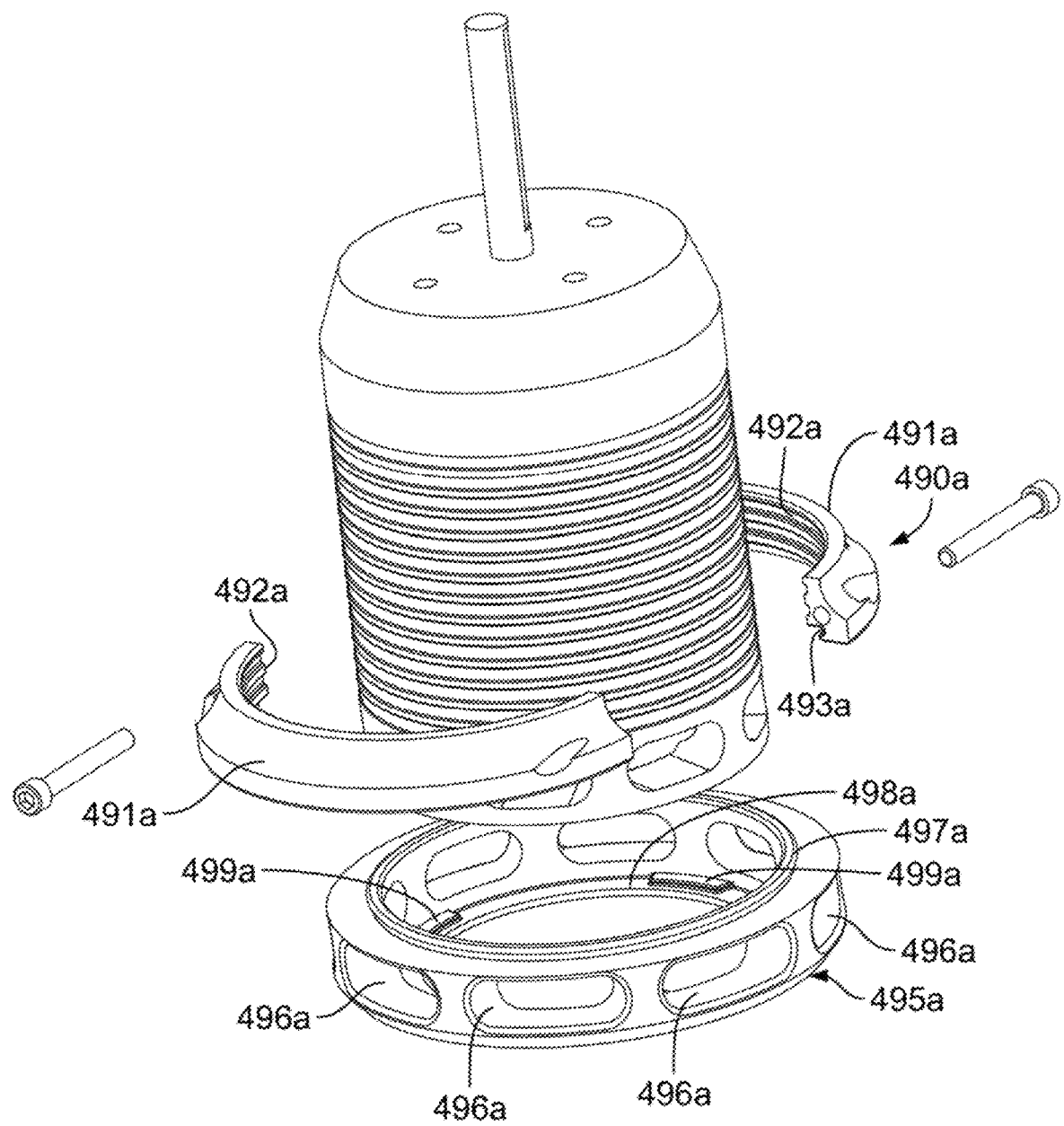
FIG. 5I is an exploded top perspective view of one of the rotor motor collars and one of the rotor motor fans of the rotor arm module of FIG. 5A.

The upper cooling fan collar 490a and the upper rotor motor cooling fan 495a are shown in detail in FIG. 5I. The lower cooling fan collar 490b and the lower rotor motor cooling fan 495b are similar to the upper cooling fan collar 490a and the upper rotor motor cooling fan 495b and are therefore not separately shown or described.

The upper rotor motor cooling fan 495a includes a generally annular body that defines a plurality of cooling fan openings 496a through its side walls (not labeled). A collar connection lip 497a extends upward from body and radially outward. A generally annular motor mounting shelf 498a extends radially inward from the bottom of the body. A plurality of motor seats 499a extend upward from the motor mounting shelf 498a.

The upper cooling fan collar 490a includes two identical collar halves 491a having generally half-annular bodies. An upper rotor motor mating surface 492a that extends around the (half) circumference of the collar half 491a is grooved to correspond with and mate with grooves on the exterior of the upper rotor motor 465a. A lip retaining chamber 493a that extends around the (half) circumference of the collar half 491a is shaped to receive and retain the lip 497a of the upper rotor motor cooling fan 495a.

The bottom of the upper rotor motor 465a is disposed within the space defined by the inner cylindrical surface of the cooling fan 495a such that the bottom of the upper rotor motor 465a contacts the motor seats 499a. The cooling fan openings 496a of the cooling fan 495a are generally aligned with corresponding cooling fan openings of the upper rotor motor 465. The collar halves 491 are fit onto the upper rotor motor 465a and the cooling fan 495a such that: (1) the lip retaining chambers 493a of the collar halves 491 receive the lip 497a of the upper rotor motor cooling fan 495a; and (2) the upper rotor motor mating surfaces 492a of the collar halves 491 mate with the grooves on the exterior of the upper rotor motor 465a. Two fasteners (not labeled) attach the collar halves 491a to each other to prevent separation.

The cooling fans solve two problems: limited motor power output due to overheating and motors falling apart. First, the power output of the rotor motors depends to a certain extent on cooling-power output generally decreases the hotter the rotor motors get. The cooling fans enlarge the radius of the cooling fan openings of the rotor motors. The increased radius drives cooling air at a greater flow rate, which improves cooling and allows motors to be used safely at increased loads without fear of failure.

Second, the flux rings of the rotor motors are typically glued onto the end caps of the rotor motors. This attachment is not secure due to the temperatures the rotor motors reach and the vibrations that occur during flight. The cooling fan collars double as redundant load paths for the motor flux rings since they mechanically engage the grooves on the exterior of the upper rotor motor, which eliminates the chance of the flux ring working its way off of the end cap.

Figure 5J:
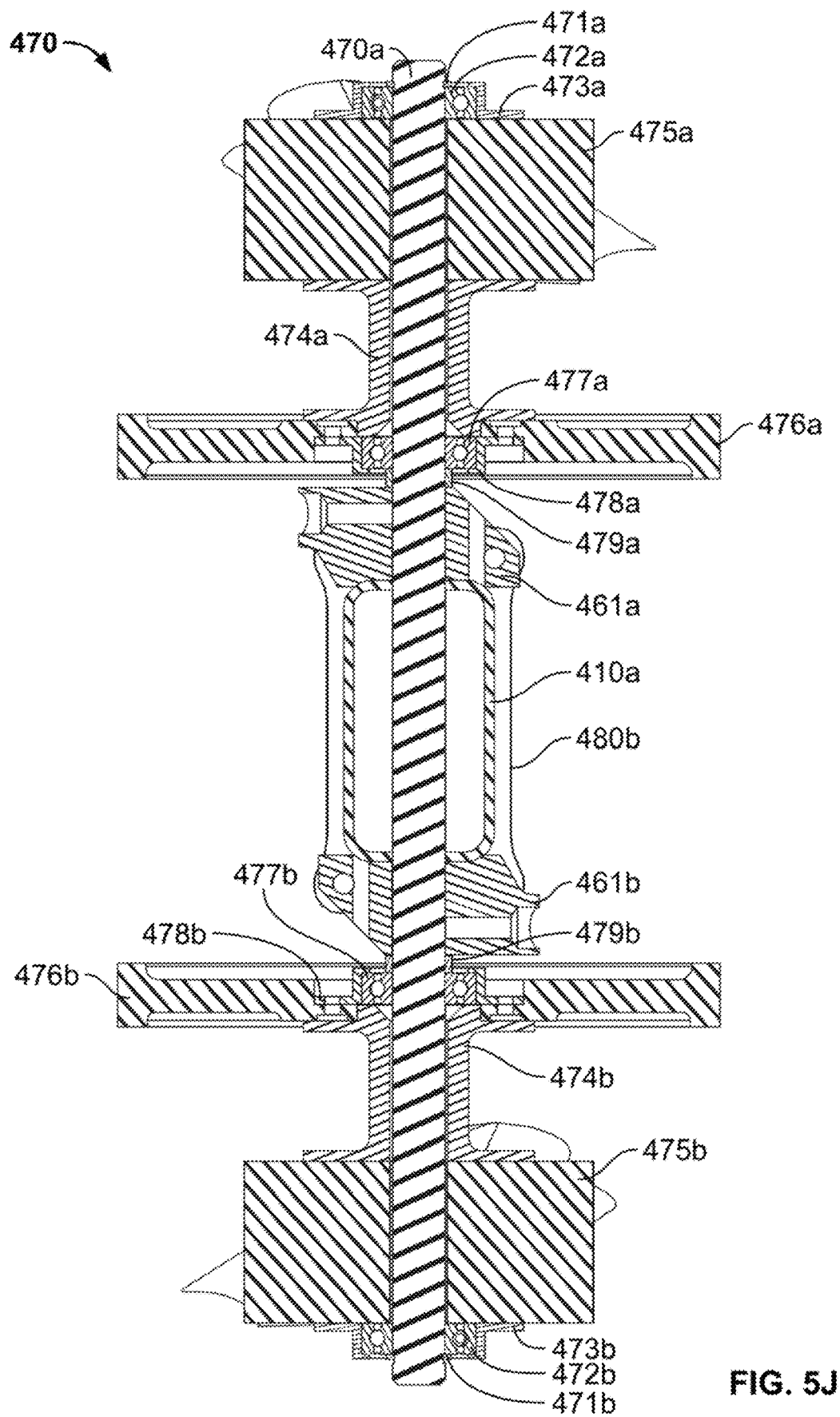
FIG. 5J is a cross-sectional view of the rotor assembly of the rotor arm module of FIG. 5A taken substantially along line 5J-5J of FIG. 5A.

As best shown in FIG. 5J, the rotor assembly 470 includes a spindle 470a and the following components rotatably mounted to the spindle 470a: (1) an upper retaining ring 471a, (2) a lower retaining ring 471b, (3) upper bearings 472a and 477a, (4) lower bearings 472b and 477b, (5) upper bearing cups 473a and 478a, (6) lower bearing cups 473b and 478b, (7) an upper torque tube 474a, (8) a lower torque tube 474b, (9) an upper rotor 475a, (10) a lower rotor 475b, (11) an upper driven gear 476a, (12) a lower driven gear 476b, (13) an upper spacer 479a, and (14) a lower spacer 479b.

Turning to the upper portion of the rotor assembly 470, the bearing 472a is disposed within the bearing cup 473a, which is fixedly attached to the top of the rotor 475a. The torque tube 474a is fixedly attached at one end to the underside of the rotor 475a and at the other end to top of the driven gear 476a. The bearing 477a is disposed within the bearing cup 478a, which is fixedly attached to the underside of the driven gear 476a. The spacer 479a is disposed between the bearing 477a and the upper rotor motor mount 461a. The upper retaining ring 471a is seated in a groove defined around the spindle 470a and prevents these components from sliding off of the spindle 470a.

Turning to the lower portion of the rotor assembly 470, the bearing 472b is disposed within the bearing cup 473b, which is fixedly attached to the bottom of the rotor 475b. The torque tube 474b is fixedly attached at one end to the top of the rotor 475b and at the other end to underside of the driven gear 476b. The bearing 477b is disposed within the bearing cup 478b, which is fixedly attached to the top of the driven gear 476b. The spacer 479b is disposed between the bearing 477b and the lower rotor motor mount 461b. The lower retaining ring 471b is seated in a groove defined around the spindle 470a and prevents these components from sliding off of the spindle 470a.

The spindle 470a extends through two vertically aligned spindle receiving openings (not labeled) defined through the rotor arm 410a. This prevents the spindle 470a from substantially translating relative to the rotor arm 410a. And since all of the components of the upper and lower motor assemblies 460a and 460b and the rotor assembly 470 are attached to the spindle 470a (directly or indirectly), the fact that the spindle 470a extends through the spindle receiving openings defined through the rotor arm 410a prevents any of the components of the upper and lower motor assemblies 460a and 460b and the rotor assembly 470 from substantially translating relative to the rotor arm 410a.

To prevent the upper and lower rotor motors 465a and 465b (and certain components attached thereto) from rotating relative to the rotor arm 410a, the upper and lower rotor motor mounts 461a and 461b are attached to both an inner bracket 480a and an outer bracket 480b. The brackets 480a and 480b are disposed around the rotor arm 410a, as best shown in FIGS. 5A, 5B, and 5J.

In operation, the controller 272 and the ESC 265a control the rate and direction of rotation of the motor shaft of the upper rotor motor 465a, which drives the upper pinion 463a, which in turn drives the upper driven gear 476a. Since the upper driven gear 476a is fixedly attached to the upper rotor 475a without any further gear reduction, the upper rotor 475a rotates at the same rate as and in the same rotational direction as the upper driven gear 476a. Similarly, the controller 272 and the ESC 265b control the rate and direction of rotation of the motor shaft of the lower rotor motor 465b, which drives the lower pinion 463b, which in turn drives the lower driven gear 476b. Since the lower driven gear 476b is fixedly attached to the lower rotor 475b without any further gear reduction, the lower rotor 475b rotates at the same rate as and in the same rotational direction as the lower driven gear 476b.

In this embodiment, the upper and lower rotors are generally the same size and shape. In another embodiment, the lower rotors are larger than (such as about 7% larger than) the upper rotors to compensate for the fact that the lower rotors operate in the upper rotors' downwash. Running larger lower rotors is one way to improve load sharing of upper and lower motors of a multicopter with counter-rotating blades. Another way to improve load sharing is to select a lower gear-reduction for the lower rotors. Yet another way is to select motors with higher KV (rpm/volt) values. Yet another way is to select lower rotors with coarser pitch.

1.3 Front Landing Gear Extension Modules and Landing Gear Modules

FIGS. 6A and 7A show the first front landing gear extension module 500a and the first front landing gear module 600a, respectively. The front landing gear modules (along with the rear landing gear modules, described below) support the multicopter 10 when assembled but not flying, and facilitate launch and landing of the multicopter 10 without damaging the multicopter 10. The front landing gear extensions are used to attach the front landing gear to the respective rotor arm modules, and also enable the front landing gear to move relative to the rotor arm modules to prevent rotor rotation in certain instances.

The second front landing gear extension module 500b and the second front landing gear module 600b are similar to the first front landing gear extension module 500a and the first front landing gear module 600a and are therefore not separately shown or described.

The first front landing gear extension module 500a includes a generally rectangular hollow support 510a, a landing gear module securing device 520 attached at one end of the support 510a, and a front landing gear locking device 530 (which is a cam lever lock in this embodiment but can be any suitable locking device) attached to the landing gear module securing device 520.

The first front landing gear module 600a includes a generally cylindrical leg 610, a generally semicircular foot 620 attached to a bottom end of the leg 610, and a collar 630 attached near the top end of the leg 610 via a fastener 632 (such as a set screw).

The front landing gear locking device 530 enables an operator to attach the first front landing gear module 600a to the first front landing gear extension module 500a. To do so, the operator unlocks the front landing gear locking device 530, inserts the first front landing gear module 600a into the landing gear module securing device 520 until the collar 630 is disposed within the landing gear module securing device 520, and re-locks the front landing gear locking device 530. The operator reverses this process to detach the first front landing gear module 600a from the first front landing gear extension module 500a.

The operator attaches the first front landing gear extension module 500a to the first rotor arm module 400a by inserting the end of the support 510a opposite the end to which the landing gear module securing device 520 is attached into the front landing gear extension module receiving socket of the first rotor arm module 400a. The operator then locks the first front landing gear extension module 500a into place, such as using suitable fasteners.

Although not shown, the operator can move the front landing gear module further radially inward or further radially outward by sliding the support of the front landing gear extension module further into or further out of the rotor arm of the corresponding rotor arm module. This enables the operator to move the front landing gear module from a first position in which the front landing gear module is clear of the rotors radially inward to a second position in which the rotors contact the front landing gear module. When in the second position, the front landing gear module prevents the rotors from rotating.

1.4 Rear Landing Gear Extension Modules and Landing Gear Module

FIGS. 6B and 7B show the first rear landing gear extension module 500c and the first rear landing gear module 600c, respectively. The rear landing gear modules (along with the front landing gear modules, described above) support the multicopter 10 when assembled but not flying, and facilitate launch and landing of the multicopter 10 without damaging the multicopter 10. The rear landing gear modules are shaped such that they act as vertical stabilizers (or fins) during flight, ensuring that the front of the multicopter 10 (and the nose of the fixed-wing aircraft 20a, if attached thereto) points generally into the airflow. The rear landing gear extensions are used to attach the rear landing gear to the respective rotor arm modules, and also enable the rear landing gear to move relative to the rotor arm modules to prevent rotor rotation in certain instances.

The second rear landing gear extension module 500d and the second rear landing gear module 600d are similar to the first rear landing gear extension module 500c and the first rear landing gear module 600c and are therefore not separately shown or described.

The first rear landing gear extension module 500c is a rectangular hollow support 510c.

The first rear landing gear module 600c includes a body having a generally triangular cross-section that tapers from front to back. The body includes two side surfaces 650a and 650b and a front surface 650c joining the side surfaces 650a and 650b. The side surfaces 650a and 650b are substantially longer than the front surface 650c is wide. The body transitions at its bottom into a generally circular foot 670. A rear landing gear extension module receiving socket is defined by a hollow rectangular support 680 extending through the body.

The operator attaches the first rear landing gear extension module 500c to the third landing gear module 600c by inserting one end of the support 510c of the first rear landing gear extension module 500c into the rear landing gear extension module receiving socket of the support 680. The operator then locks the first rear landing gear extension module 500c into place, such as using suitable fasteners.

The operator attaches the first rear landing gear extension module 500c to the third rotor arm module 400c by inserting the end of the support 510c of the first rear landing gear extension module 500c opposite the end to which the first rear landing gear module 600c is attached into the rear landing gear extension module receiving socket of the third rotor arm module 400c. The operator then locks the first rear landing gear extension module 500c into place, such as using suitable fasteners.

Once attached, the rear landing gear modules are oriented such that the side surfaces of the rear landing gear modules are substantially aligned with the saddle side brackets 320a and 320b of the saddle 300, as best shown in FIG. 1B. When the fixed-wing aircraft 20a is attached to the multicopter 10, these side surfaces of the rear landing gear modules are substantially parallel to a plane containing the roll axis of the fuselage of the fixed-wing aircraft 20a. The relatively long length of these side surfaces of the rear landing gear modules and their placement well-aft of the center-of-lift of the multicopter 10 cause the rear landing gear module to act as fins. This weather vane effect ensures that the nose of the fixed-wing aircraft 20a is oriented into the airflow when airborne. Good flow alignment is critically important for spin avoidance at the moment the multicopter 10 releases the fixed-wing aircraft 20a, when the fixed-wing aircraft 20a may be operating well-below stall speed.

In certain embodiments, one or more of the landing gear modules includes a shock absorber.

1.5 Separately Powered Upper and Lower Rotor Motors

As noted above, four batteries 260a to 260d power the multicopter 10, though in other embodiments a different quantity of batteries and/or different type(s) of batteries power the multicopter. In other embodiments, any suitable power source(s), such as a fuel-based power source or a solar-based power source, may be used instead of or along with batteries.

In this embodiment, a first pair of batteries 260a and 260b are connected in series and a second pair of batteries 260c and 260d are connected in series. Here, the first pair of batteries 260a and 260b power the upper rotor motors and do not power the lower rotor motors, while the second pair of batteries 260c and 260d power the lower rotor motors and do not power the upper rotor motors. This configuration ensures that, if one pair of batteries fails, the multicopter 10 is operable in a quadcopter mode with either all four upper rotor motors (if the second pair of batteries 260c and 260d fails) or all four lower rotor motors (if the first pair of batteries 260a and 260b fails).

The multicopter 10 also includes a gang circuit that connects the two pairs of batteries in parallel to enable a single charger connected to one of the pairs of batteries to also charge the other pair of batteries. The gang circuit is overload-protected and includes an automatically resetting circuit breaker. The gang circuit is beneficial because it reduces charging time, allowing an operator to recharge both batteries in parallel when only one charger is available.

1.6 Multicopter Operating Modes

The multicopter 10 is operable in one of two throttle modes: NORMAL throttle mode and TENSION throttle mode. The multicopter 10 is operable in three different flight modes: ALTHOLD flight mode, LOITER flight mode, and RTL flight mode. The multicopter 10 is operable in a half-power mode to, in certain situations, improve response and save power. The basic functionality of each operating mode is described below. The operator can toggle between these operating modes using suitable switches, a touch screen, or any other suitable device on the R/C controller.

On a typical R/C controller including left and right joysticks, the left joystick is typically used for throttle, while the right joystick is typically used for left/right and for/aft station-keeping of the aircraft.

1.6.1 SIMPLE Control Mode

SIMPLE control mode simplifies horizontal control by tying the R/C controller's right stick commands to geo-referenced coordinates. The multicopter 10 always operates in SIMPLE control mode, regardless of which of the three flight modes the multicopter 10 employs. Under SIMPLE control mode, forward right stick deflection drives the multicopter 10 in the direction in which the multicopter 10 was pointed at the instant it was armed, regardless of its yaw orientation during flight. Put differently, if the multicopter 10 was pointed North when armed but, while hovering for instance, the multicopter 10 rotated about its yaw axis such that its nose is pointed East, forward right stick deflection still drives the multicopter 10 North. While the operator may use the left stick to rotate the multicopter 10 about the yaw axis, this (rudder) input is rarely needed for launch or retrieval of the fixed-wing aircraft 20*a*. The rear landing gear modules ensure the multicopter 10 is pointed into the relative wind (like a weathervane), so the operator need not worry about aligning the fuselage with airflow.

1.6.2 TENSION Throttle Mode

When the multicopter 10 operates in TENSION throttle mode, the human operator has direct control over the throttle. The multicopter 10 can only be operated in TENSION throttle mode when it is operated in either ALTHOLD or LOITER flight modes. That is, the multicopter 10 cannot be operated in TENSION throttle mode when operated in RTL flight mode. TENSION throttle mode converts throttle stick inputs to direct throttle commands, which is primarily useful for tensioning the flexible capture tether 5000 during retrieval. An astute operator will climb at a controlled rate by feathering the throttle in TENSION throttle mode, he will slow high ascent as the tether pulls tight (described below), and then he maintains light tether tension, keeping the line straight as the fixed-wing aircraft approaches. The straight line allows human observers to confirm that the line will be swept by the fixed-wing leading edge and the capture is on-target. At impact, the operator increases throttle to arrest the fixed-wing aircraft's horizontal motion and minimize altitude loss. Then the feathers the throttle back to lower the aircraft to the ground.

1.6.3 NORMAL Throttle Mode

In Normal throttle mode, the controller interprets joystick commands as desired rate commands and applies whatever throttle is needed to achieve that climb or descent rate. When tethered to the ground the altitude controller very abruptly increases throttle to maximum (when its desired altitude is above current altitude) or it plummets to minimum throttle (when desired altitude is below current altitude) without regard for joystick position. This behavior makes it impossible for the human operator to regulate tether tension directly. Direct throttle control, offered by TENSION throttle mode, disables the altitude controller. In this mode, altitude is controlled strictly by tether length. In Tension Mode, the human operator controls tether tension directly, with throttle inputs, and the controller responds with lift-producing motor commands that are roughly proportional to commanded throttle position. By this technique, the retrieval process enjoys improved finesse and precise control without overworking the multicopter motors and batteries.

1.6.4 ALTHOLD Flight Mode

ALTHOLD flight mode converts throttle commands (left stick, vertical axis) to vertical rate commands. When operating in the ALTHOLD flight mode, the multicopter 10 will attempt to maintain current altitude when the left stick is in the middle position. The multicopter 10 will attempt to climb at up to 5 meters per second (or any other suitable rate) when the left stick is pushed up to max. The multicopter 10 will descend at up to 5 meters per second (or any other suitable rate) when the left stick is pulled to min. ALTHOLD flight mode converts right stick commands to lean angle, with maximum right stick deflection corresponding to 30 degrees (or any other suitable angle). When operating in ALTHOLD flight mode, the multicopter 10 will maintain zero lean when the right stick is in the middle position and will be blown downwind. If the fixed-wing aircraft 20*a* is mated to the multicopter 10 and producing thrust, this thrust will drive the multicopter 10 forward unopposed by lean angle. ALTHOLD flight mode does not depend on GPS for control, and works equally well indoors and in all locations where GPS reception is spotty or denied. ALTHOLD flight mode uses a compass for navigation, which means "SIMPLE MODE" works equally well without the use of GPS. Consequently, the operator simply pushes the right joystick gently into the wind for station-keeping, fully into the wind to execute a "dash" maneuver (for launch/release), and he will relax the right stick to allow the aircraft to drift downwind to return home after a dash. Finally, the operator will deflect the right stick opposite the aircraft's ground track to minimize ground speed just before touch-down.

1.6.5 LOITER Flight Mode

LOITER flight mode behaves like ALTHOLD flight mode in the vertical direction (i.e., converts throttle commands to vertical rate commands). Similarly, LOITER flight mode converts right stick inputs to horizontal rate commands. When operating in LOITER flight mode, the multicopter 10 attempts to maintain its current horizontal position over the Earth when the right stick is in the middle position. Maximum right stick deflection drives the multicopter 10 in the corresponding direction at up to 20 meters per second ground speed (or any suitable rate) or the maximum achievable speed against true wind, whichever is less. LOITER flight mode depends on GPS to close feedback loops around latitude and longitude positions. The controller 272 will automatically switch itself from LOITER flight mode to ALTHOLD flight mode when GPS reception is unacceptable, and will not allow a human operator to arm in LOITER flight mode when GPS reception is unacceptable.

1.6.6 RTL Flight Mode

Return to Launch (RTL) flight mode autonomously returns the multicopter 10 to its home position—i.e., the place on Earth where it was last armed. When operating in RTL mode, left stick inputs are ignored except when executing a SHUT DOWN command, and right stick inputs are used only during the final (vertical) descent phase. The operator uses the right stick to "nudge" the multicopter 10 a designated distance away from the storage and launch system 2000 to avoid interference at touchdown. Multicopter response to these nudge maneuvers will be similar to right stick inputs in LOITER flight mode, and the operator should execute them before the aircraft descends below 5 meters (or any other suitable distance) above ground level. To avoid human operator-induced oscillations and to minimize ground speed, the human operator's fingers should be kept off the control sticks during final descent and touch-down in RTL mode.

1.6.7 Half-Power Mode

When operating in half-power mode, the multicopter 10 shuts down half of its rotors—either the lower rotors or the upper rotors—and operates using only the remaining half of the rotors. Half-power mode is typically used after the multicopter 10 releases the fixed-wing aircraft 20*a* and the multicopter 10 is returning to its home position. Using all eight rotors to fly just the multicopter 10, which is relatively light when not carrying the fixed-wing aircraft 20*a*, provides too much power and induces sluggish response to operator commands. This is not ideal, especially when launching the multicopter 10 from an area full of obstructions that the multicopter 10 must deftly avoid on its way back to its home position. Operating in half-power mode in these instances provides a more appropriate amount of power and enables more precise responses to operator commands.

2. Storage and Launch System

The storage and launch system 2000 is shown in FIGS. 8A, 8B, 8C, 8D, 8E, 8F, 8G, 8H, and 8I. The storage and launch system 2000 is usable to compactly store the modular multicopter 10 in a single container after disassembly into the 13 modules and to facilitate launch of the fixed-wing aircraft 20*a* into free, wing-borne flight by acting as a launch mount for the fixed-wing aircraft 20*a*.

To facilitate storage of the multicopter 10 in a single container (including a container top 2000*a* and a container bottom 2000*b*), the storage and launch system 2000 includes: (1) a launch-assist assembly 2100 to which the front landing gear modules 600*a* and 600*b* are attachable; (2) a rotor arm module and rear landing gear module storage device 2200 to which the rotor arm modules 400*a* to 400*d* and the rear landing gear modules 600*c* and 600*d* are attachable; and (3) a hub module storage tray 2300 to which the hub module 100 is attachable.

To facilitate launch of the fixed-wing aircraft 20*a*, the launch-assist assembly 2100 is movable from a storage position into a launch position and includes certain elements on which the fixed-wing aircraft can be mounted and other elements that retain the fixed-wing aircraft 20*a* in a launch orientation before launch. Example embodiments of each of these elements are described below, followed by a description of an example method of storing the multicopter 10 using these example embodiments of the elements.

2.1 Launch-Assist Assembly

The launch-assist assembly 2100 is attached to the container bottom 2000*b* and is one element of the storage and launch system 2000 that facilitates launch of the fixed-wing aircraft 20*a*. The launch-assist assembly 2100 is movable from a position in which it lies substantially flat along the floor of the container bottom 2000*a* to enable storage of the multicopter 10 to a launch position in which it is generally spaced-apart from and upwardly angled relative to the floor of the container bottom 2000*a* to facilitate launch of the fixed-wing aircraft 20*a*.

Figure 8A:
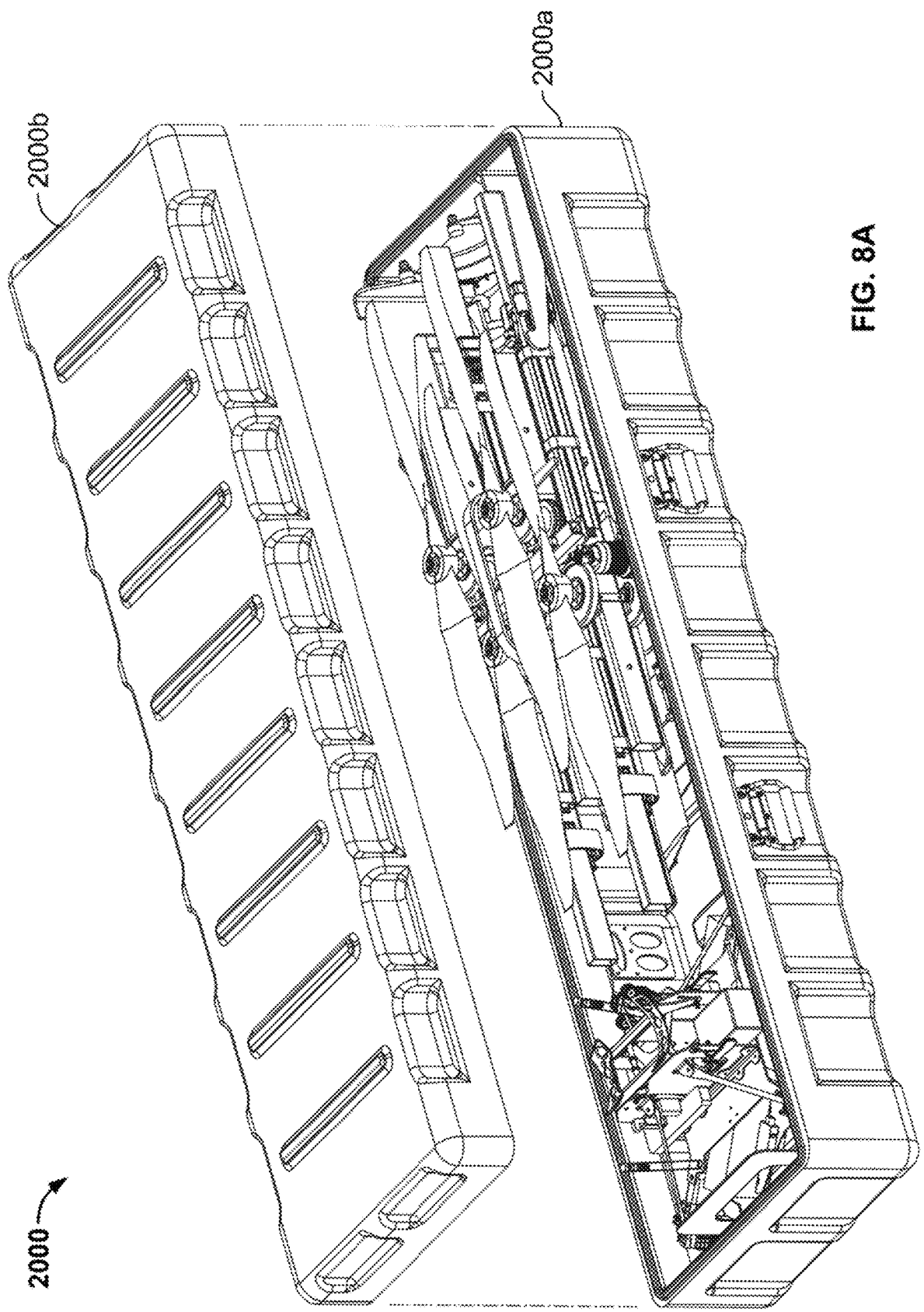
FIG. 8A is a partially exploded top perspective view of the multicopter of FIG. 1A stored in one example embodiment of the storage and launch system of the present disclosure.
Figure 8B:
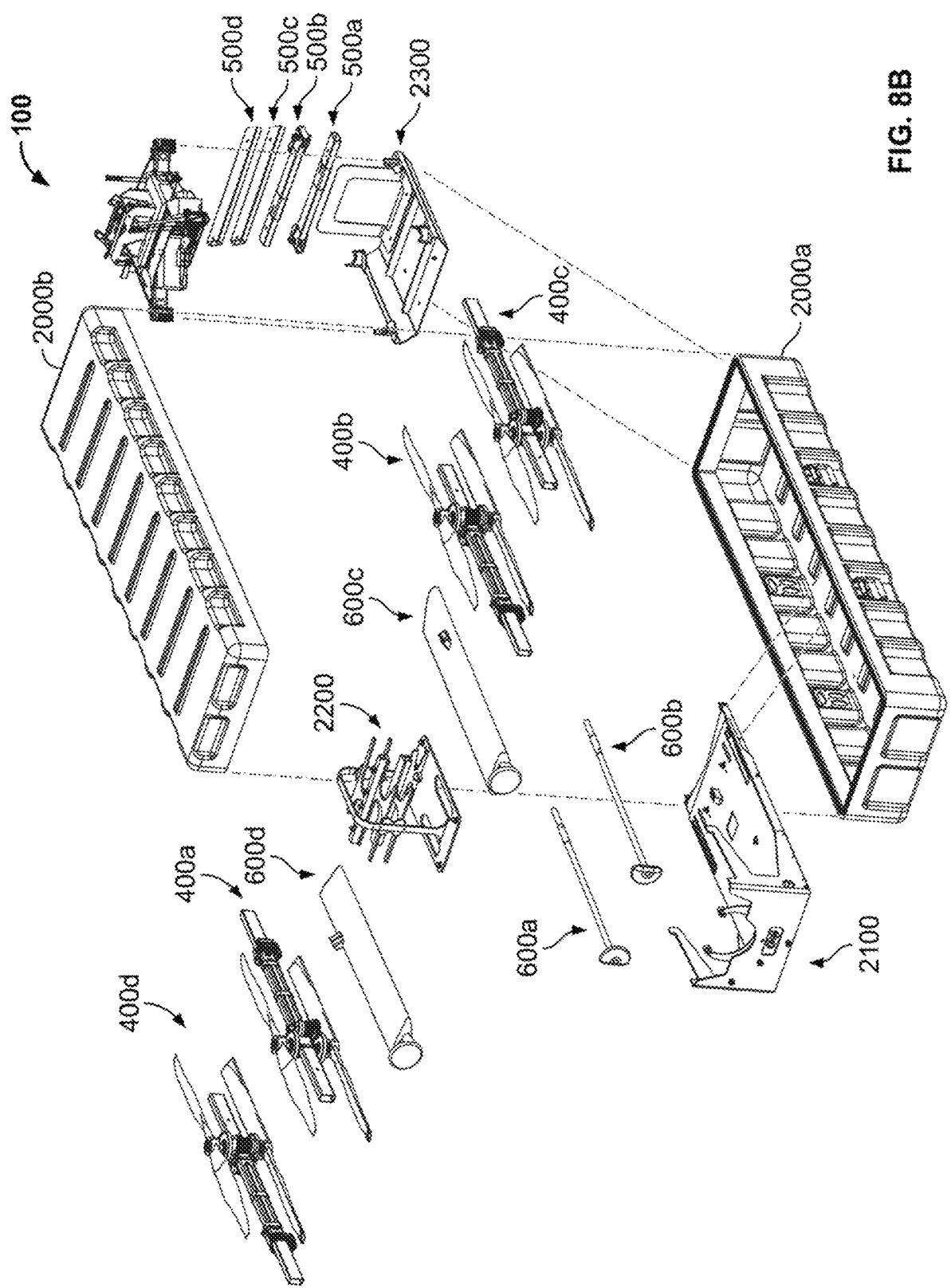
FIG. 8B is an exploded top perspective view of the storage and launch system of FIG. 8A, the 13 modules of the multicopter of FIG. 1A, and elements used to store the multicopter.
Figure 8C:
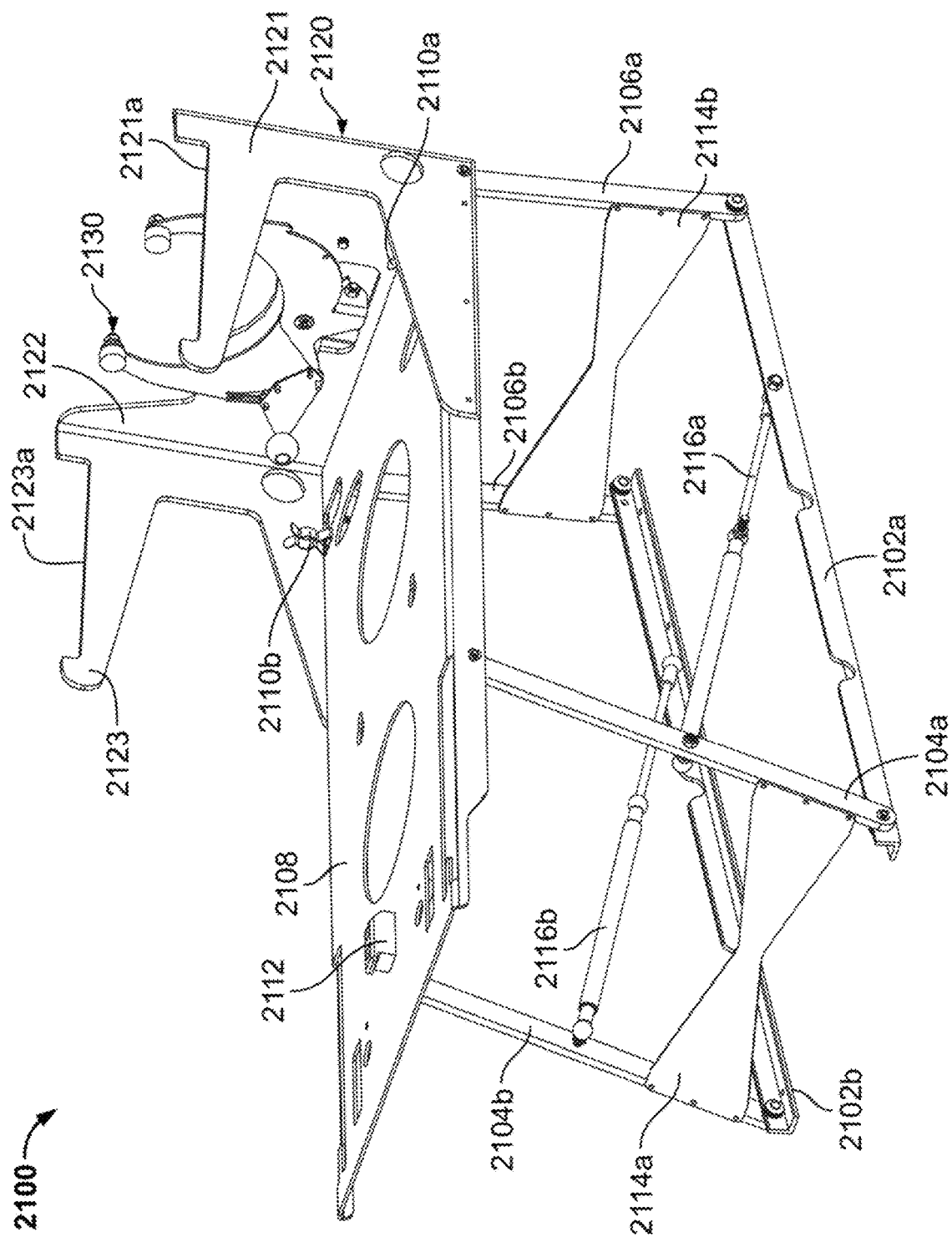
FIG. 8C is a top perspective view of the launch-assist assembly of the storage and launch system of FIG. 8A in the launch position.

As best shown in FIG. 8C, the launch-assist assembly 2100 includes: (1) first and second base brackets 2102*a* and 2102*b*; (2) first and second front legs 2104*a* and 2104*b*; (3) first and second rear legs 2106*a* and 2106*b*; (4) a tray 2108; (5) first and second front landing gear module retainers 2110*a* and 2110*b*; (6) a storage device lock engager 2112; (7) front and rear stabilizing brackets 2114*a* and 2114*b*; (8) first and second lockable gas springs 2116*a* and 2116*b*; and (9) an aircraft-engaging bracket 2120.

The first and second base brackets 2102*a* and 2102*b* are attached to the floor of the container bottom 2000*a* near one end. The first front leg 2104*a* is pivotably attached at one end to the front end of the first base bracket 2102*a* and pivotably attached at the other end to the tray 2108. Similarly, the second front leg 2104*b* is pivotably attached at one end to the front end of the second base bracket 2102*b* and pivotably attached at the other end to the tray 2108. The first rear leg 2106*a* is pivotably attached at one end to the rear end of the first base bracket 2102*a* and pivotably attached at the other end to the tray 2108. Similarly, the second rear leg 2106*b* is pivotably attached at one end to the rear end of the second base bracket 2102*b* and pivotably attached at the other end to the tray 2108. The front stabilizing bracket 2114*a* is attached to and extends between the first and second front legs 2104*a* and 2104*b*, and the rear stabilizing bracket 2114*b* is attached to and extends between the first and second rear legs 2106*a* and 2106*b*. The first lockable gas spring 2116*a* is pivotably attached at one end to the first base bracket 2102*a* between the first front leg 2104*a* and the first rear leg 2106*a* and pivotably attached at the other end to the first front leg 2104*a* between the first base bracket 2102*a* and the tray 2108. Similarly, the second lockable gas spring 2116*b* is pivotably attached at one end to the second base bracket 2102*b* between the second front leg 2104*b* and the second rear leg 2106*b* and pivotably attached at the other end to the second front leg 2104*b* between the second base bracket 2102*b* and the tray 2108. The storage device lock engager 2112, the first and second front landing gear module retainers 2110*a* and 2110*b*, and the aircraft engaging bracket 2120 are attached to the tray 2108.

The aircraft engaging bracket 2120 includes two spaced-apart generally parallel sides 2121 and 2123 having wing engaging surfaces 2121*a* and 2123*a*, respectively, and a back 2122 transverse (such as generally perpendicular) to, extending between, and connecting the sides 2121 and 2123. A fuselage-retaining assembly 2130 is rotatably mounted to the back plate 2122.

Figure 8D:
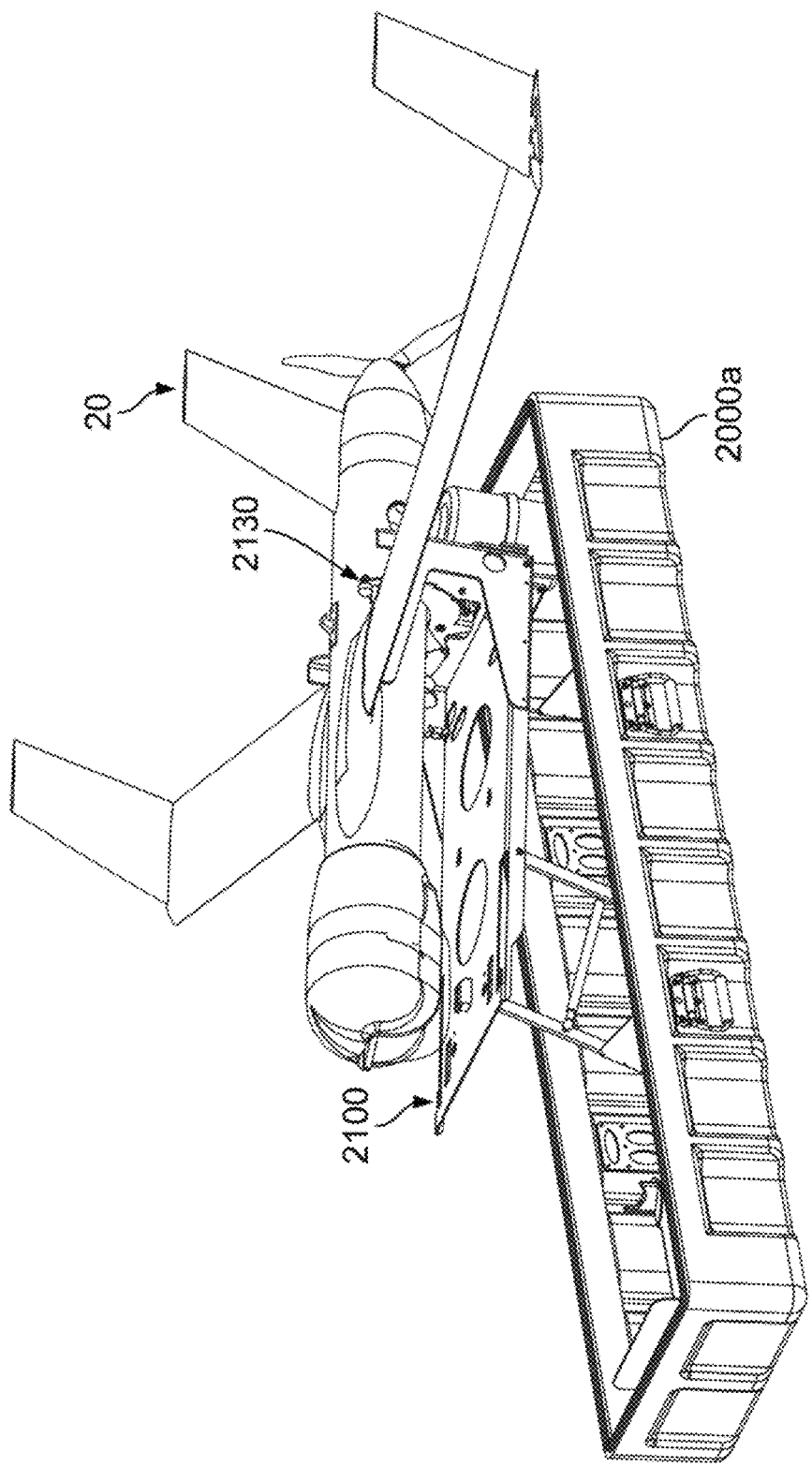
FIG. 8D is a top perspective view of the storage and launch system of FIG. 8A with the fixed-wing aircraft mounted thereto.

The above-described pivotable attachments enable the launch assist assembly 2100 to move from: (1) a storage position in which the first and second front legs 2104*a* and 2104*b*, the first and second back legs 2106*a* and 2106*b*, and the tray 2108 lay substantially flat along the floor of the container bottom 2000*a* (as best shown in FIGS. 8A and 8B); to (2) a launch position in which the first and second front legs 2104*a* and 2104*b* and the first and second back legs 2106*a* and 2106*b* extend upward from the floor of the container bottom 2000*a* such that the tray 2108 is spaced-apart from and upwardly angled relative to the floor of the container bottom 2000*a* (as best shown in FIGS. 8C and 8D) (and vice-versa). The operator can lock the launch assist assembly 2100 in the launch position by locking the first and second lockable gas springs 2116*a* and 2116*b*.

When in the launch position, the launch assist assembly 2100 facilitates launch of the fixed-wing aircraft 20*a* by orienting the fixed-wing aircraft 20*a* in a desired launch orientation and retaining the fixed-wing aircraft 20*a* in that orientation until the operator desires to launch the fixed-wing aircraft 20*a*. As best shown in FIG. 8D, in preparation for launch, the operator inserts the fuselage of the fixed-wing aircraft 20*a* into the fuselage-retaining assembly 2130 of the aircraft engaging bracket 2120 and lays the wings of the fixed-wing aircraft 20*a* atop the first and second wing engaging surfaces 2123*a* and 2123*b* of the aircraft engaging bracket 2120.

The fuselage-retaining assembly 2130 is sized to receive the fuselage of the fixed-wing aircraft 20*a*. The fuselage-retaining assembly 2130 is configured such that, after it receives the fuselage, the fuselage-retaining assembly 2130 does not release the fuselage until: (1) the operator disengages a safety mechanism; and (2) a force biasing the fuselage-retaining assembly 2130 against releasing the fuselage is overcome. This prevents undesired launch of the fixed-wing aircraft 20*a*.

Figure 8E:
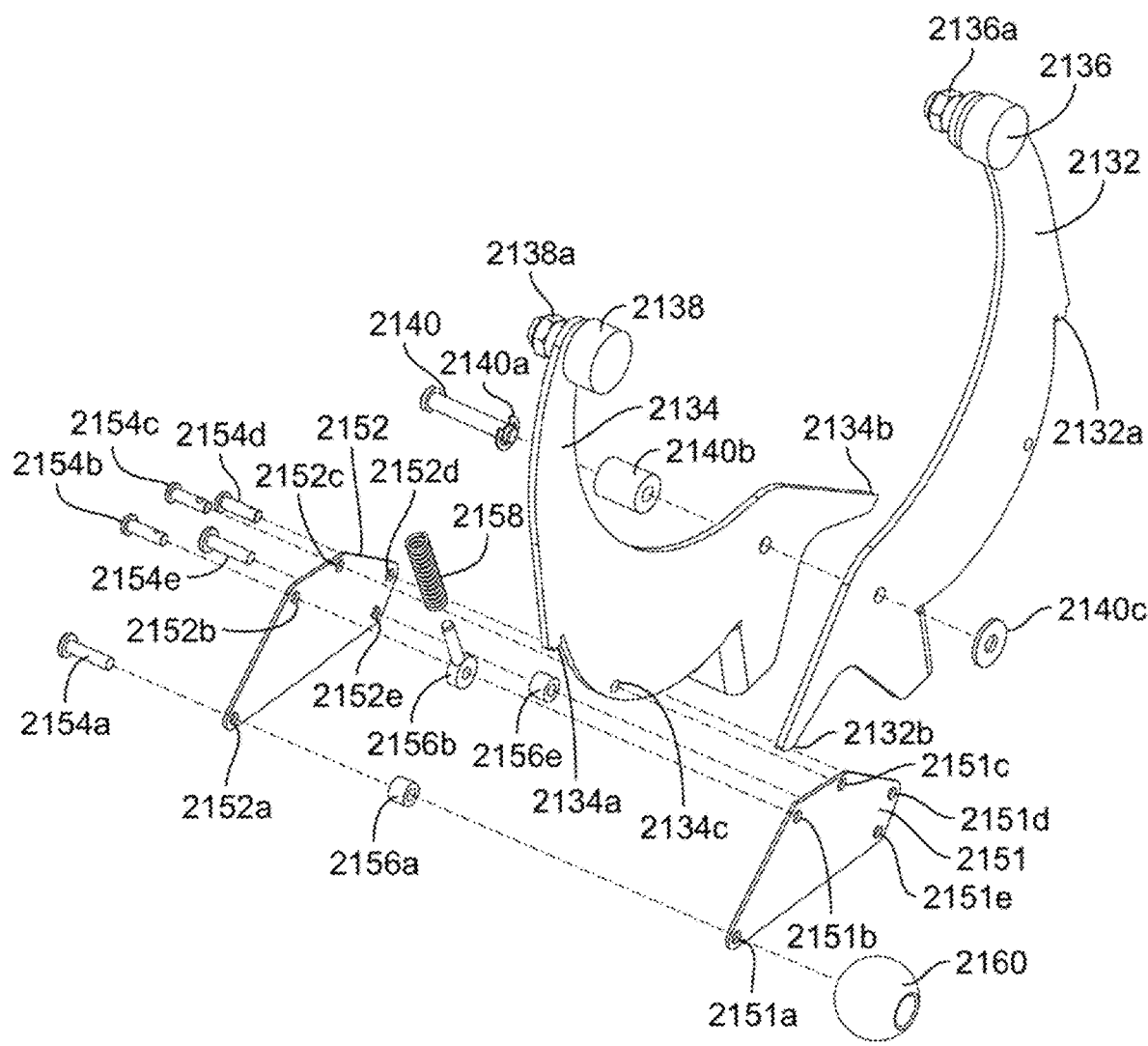
FIG. 8E is an exploded top perspective view of the fuselage-retaining assembly of the launch-assist assembly of FIG. 8C.
Figure 8F:
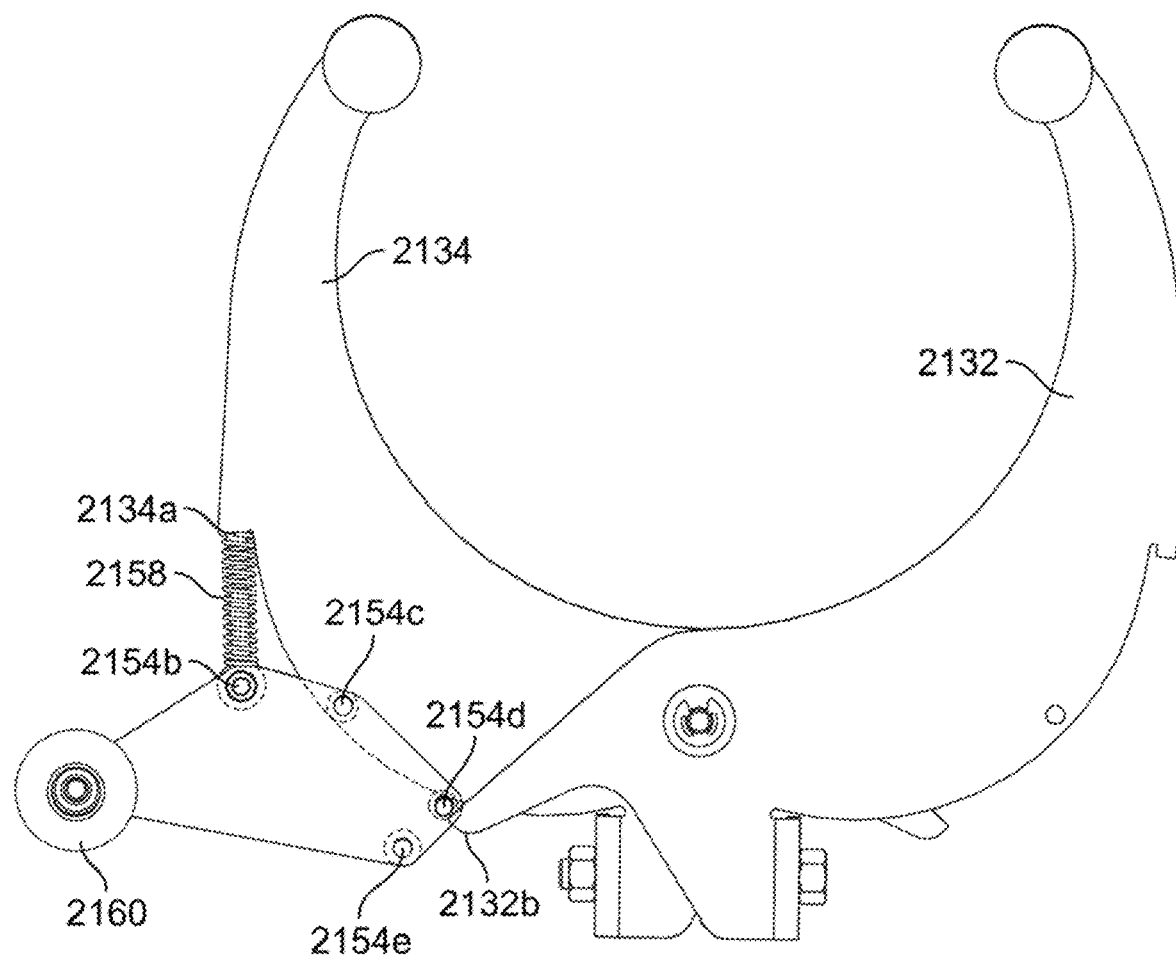
FIG. 8F is a front elevational view of the fuselage-retaining assembly of FIG. 8E.
Figure 8G:
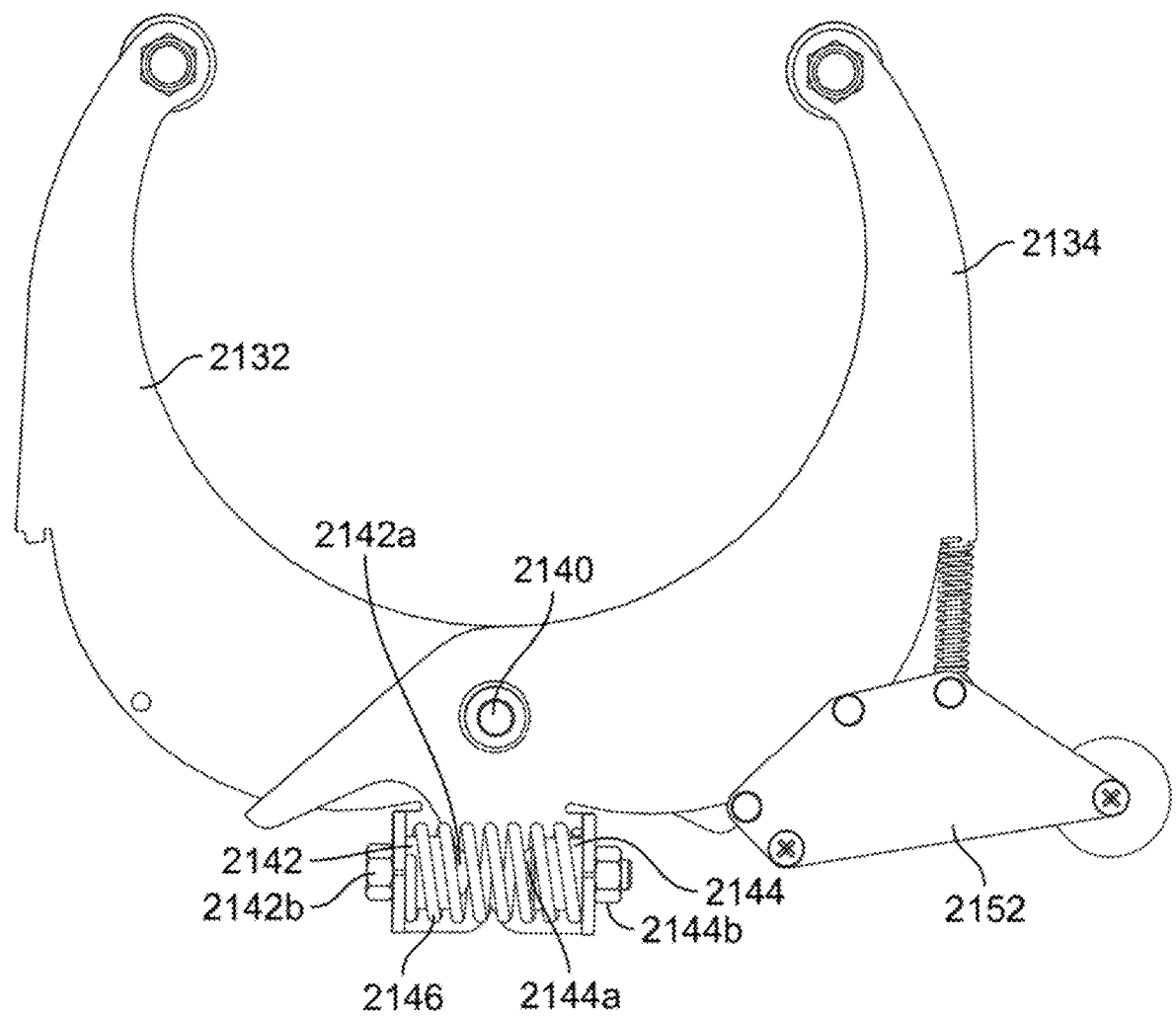
FIG. 8G is a back elevational view of the fuselage-retaining assembly of FIG. 8E.

As best shown in FIGS. 8E, 8F, and 8G, the fuselage-retaining assembly 2130 includes: (1) first and second pincers 2132 and 2134; (2) first and second rollers 2136 and 2138 and corresponding nuts 2136*a* and 2138*a*; (3) a grooved clevis pin 2140 and corresponding retaining ring 2140*a*, spacer 2140*b*, and washer 2140*c*; (4) first and second spring mounting spacers 2142 and 2144 and their corresponding fasteners 2142*a* and 2144*a* and nuts 2142*b* and 2144*b*; (5) a compression spring 2146; and (6) a safety mechanism 2150.

The safety mechanism 2150 includes: (1) front and rear plates 2151 and 2152; (2) fasteners 2154*a* and 2154*e*; (3) clevis pins 2154*b*, 2154*c*, and 2154*d*; (4) spacers 2156*a* and 2156*e*; (5) a rod end 2156*b*; (6) a compression spring 2158; and (7) a handle 2160.

The first and second pincers 2132 and 2134 are interchangeable, and have generally curved bodies that define rod end engagers 2132a and 2134a, respectively, along their outer edges and terminate at their lower ends in safety mechanism engagers 2132b and 2134b. The roller 2136 is attached via the nut 2136a to the upper end of the first pincer 2132, and the roller 2138 is attached via the nut 2138a to the upper end of the second pincer 2134. The rollers are rotatable with respect to their respective pincers. The first and second pincers 2132 and 2134 are pivotably connected to one another via the grooved clevis pin 2140, the spacer 2140b, the washer 2140c, and the retaining ring 2140a. Although not shown, the fuselage-retaining assembly 2130 is attached to the aircraft engaging bracket 2120 via this grooved clevis pin 2140.

In this embodiment, the first pincer is mounted on the grooved clevis pin in front of the second pincer (with respect to the view shown in FIG. 8E), though in other embodiments the second pincer may be mounted in front of the first pincer without changing how the fuselage-retaining assembly operates.

As best shown in FIG. 8G, the spring mounting spacer 2142 is mounted to a backwardly extending portion of the first pincer 2132 via the fastener 2142a and the nut 2142b. Similarly, the spring mounting spacer 2144 is mounted to a backwardly extending portion of the second pincer 2134 via the fastener 2144a and the nut 2144b. The compression spring 2146 is mounted on and extends between the spring mounting spacers 2142 and 2144.

The first and second pincers 2132 and 2134 are movable relative to one another from: (1) a fuselage-retaining orientation in which their upper ends are separated a first distance that is smaller than the diameter of the fuselage of the fixed-wing aircraft 20a (shown in FIGS. 8E and 8F); to (2) a fuselage-release orientation in which their upper ends are separated a second distance that is larger than the diameter of the fuselage of the fixed-wing aircraft 20a (not shown) (and vice-versa). Thus, when the first and second pincers 2132 and 2134 are in the fuselage-retaining orientation, the fuselage of the fixed-wing aircraft cannot escape the first and second pincers 2132 and 2134 (absent further separation of the pincers), while the fuselage can escape when the first and second pincers 2132 and 2134 are in the fuselage-release orientation.

The compression spring 2146 opposes separation of the first and second pincers 2132 and 2134 and therefore biases the first and second pincers 2132 and 2134 toward the fuselage-retaining orientation. Separating the first and second pincers 2132 and 2134 causes the backwardly extending portions of the first and second pincers 2132 and 2134 to compress the compression spring 2146, which causes the compression spring 2146 to exert forces on the backwardly extending portions of the first and second pincers 2132 and 2134 opposing that separation. Thus, to release the fuselage, this biasing force must be overcome.

Turning to the safety mechanism 2150, as best shown in FIG. 8E, the front plate 2151, the rear plate 2152, and the handle 2160 are attached to one another via: (1) the fastener 2154a extending through an opening 2152a in the rear plate 2152, through the spacer 2156a, through an opening 2151a in the front plate 2151, and into the handle 2160; (2) the clevis pin 2154b extending through an opening 2152a in the rear plate 2152, through an opening in the rod end 2156b, and through an opening 2151b in the front plate 2151; (3) the clevis pin 2154d extending through an opening 2152d in the second plate and an opening 2151d in the front plate 2151; and (4) the fastener 2154e extending through an opening 2152e in the rear plate 2152, through the spacer 2156e, and through an opening 2151e in the front plate 2151.

As best shown in FIGS. 8E and 8F, the safety mechanism 2150 is pivotably connected to the second pincer 2134 via the clevis pin 2154c extending through an opening 2152c in the rear plate 2152, an opening 2134c in the second pincer 2134, and an opening 2151c in the front plate 2151. One end of the safety compression spring 2158 is disposed around the rod end 2156b and the other end of the safety compression spring 2158 is disposed around the rod end engager 2134a of the second pincer 2134.

The safety mechanism 2150 is rotatable about the clevis pin 2134c from an engaged rotational position in which the safety mechanism 2150 prevents separation of the first and second pincers 2132 and 2134 from the fuselage-retaining orientation to the fuselage-release orientation (shown in FIGS. 8F and 8G) to a disengaged rotational position (not shown) in which the first and second pincers 2132 and 2134 are free to separate from the fuselage-retaining orientation to the fuselage-release orientation. The safety compression spring 2158 biases the safety mechanism 2150 into the engaged rotational position.

When in the engaged rotational position, the safety mechanism 2150 prevents separation of the first and second pincers 2132 and 2134 from the fuselage-retaining orientation to the fuselage-release orientation. Separating the first and second pincers 2132 and 2134 when the safety mechanism 2150 is in the engaged rotational position results in: (1) the safety mechanism engager 2132b of the first pincer 2132 engaging the clevis pin 2154d (since the clevis pin 2154d is in the path of rotation of the safety mechanism engager 2132b of the first pincer 2132); and (2) the rod end engager 2134a of the second pincer 2134 engaging the rod end 2136b. This prevents the first and second pincers 2132 and 2134 from rotation relative to one another and therefore prevents further separation of the first and second pincers 2132 and 2134 to the fuselage-release orientation.

To enable the first and second pincers 2132 and 2134 to separate from the fuselage-retaining orientation to the fuselage-release orientation, the operator disengages the safety mechanism by rotating the safety mechanism 2150 from the engaged rotational position to the disengaged rotational position. To do so, the operator pulls the handle 2160 upward with enough force to overcome the spring-biasing force of the compression spring 2158 and compress the compression spring 2158 until the clevis pin 2154d is no longer in the path of rotation of the safety mechanism engager 2132b of the first pincer 2132. At this point, the safety mechanism 2150 is in the disengaged rotational position, and the first and second pincers 2132 and 2134 can separate to the fuselage-release orientation.

In certain embodiments, a safety rope, tether, wire, cable, or other flexible member is attached to the handle (or any other suitable component) of the safety mechanism to facilitate disengaging the safety mechanism. When the flexible safety member is tensioned (such as via an operator pulling on the flexible safety member), the safety mechanism rotates from the engaged rotational position to the disengaged rotational position, thereby disengaging the safety mechanism. The flexible safety member may be relatively long, which enables the operator to stand a safe distance away from the fixed-wing aircraft during the launch process and still be able to disengage the safety mechanism.

By intentionally commanding full multicopter thrust without releasing the safety mechanism, an operator may execute a "refuse takeoff" test, which is particularly useful for confirming full-power performance of the complete electromechanical system without fear of flight-related mishap in the event that one or more components of the system should fail during the test.

2.2 Rotor Arm Module and Rear Landing Gear Module Storage Device

Figure 8H:
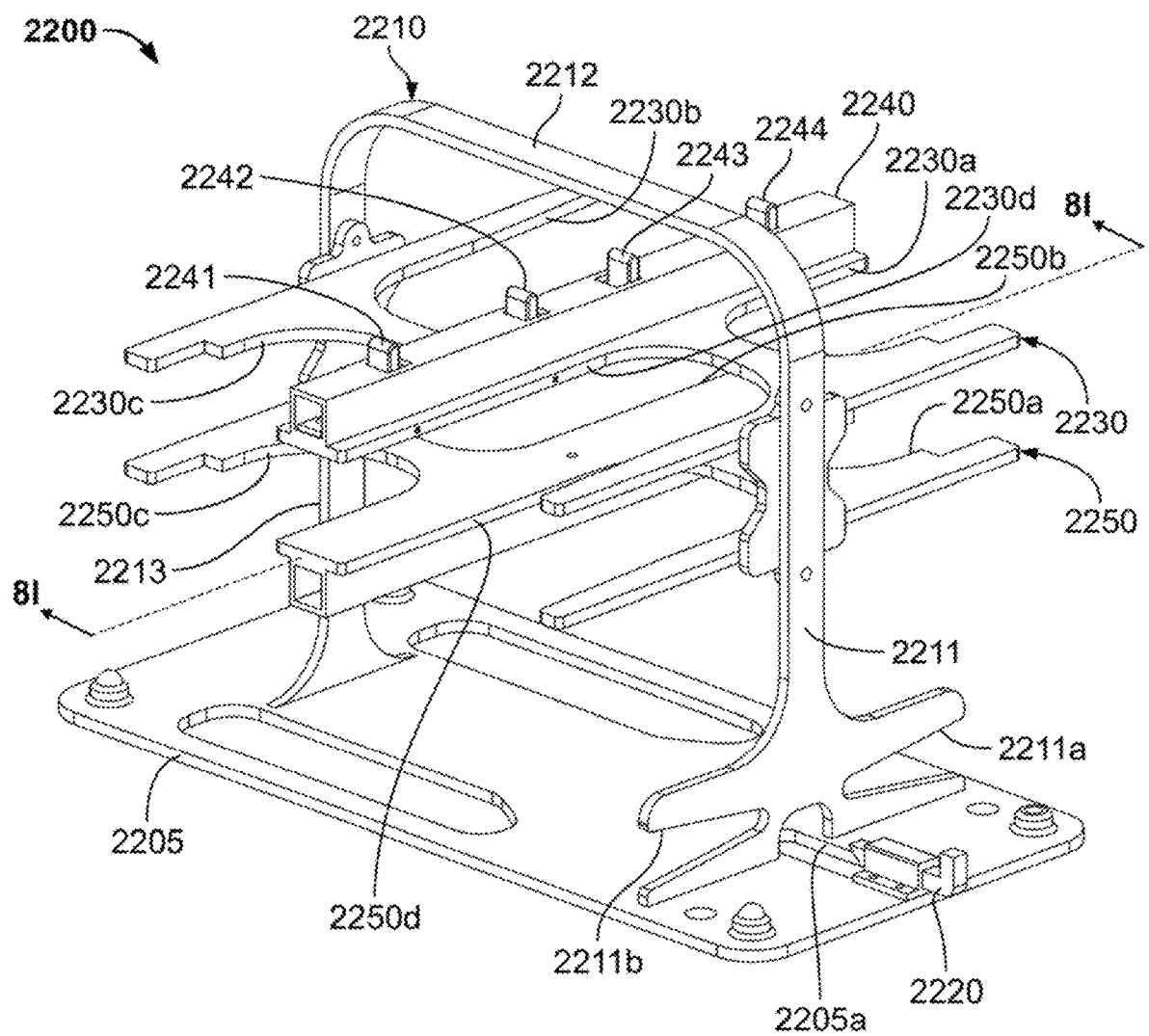
FIG. 8H is a top perspective view of the rotor arm module and rear landing gear module storage device of the present disclosure.
Figure 8I:
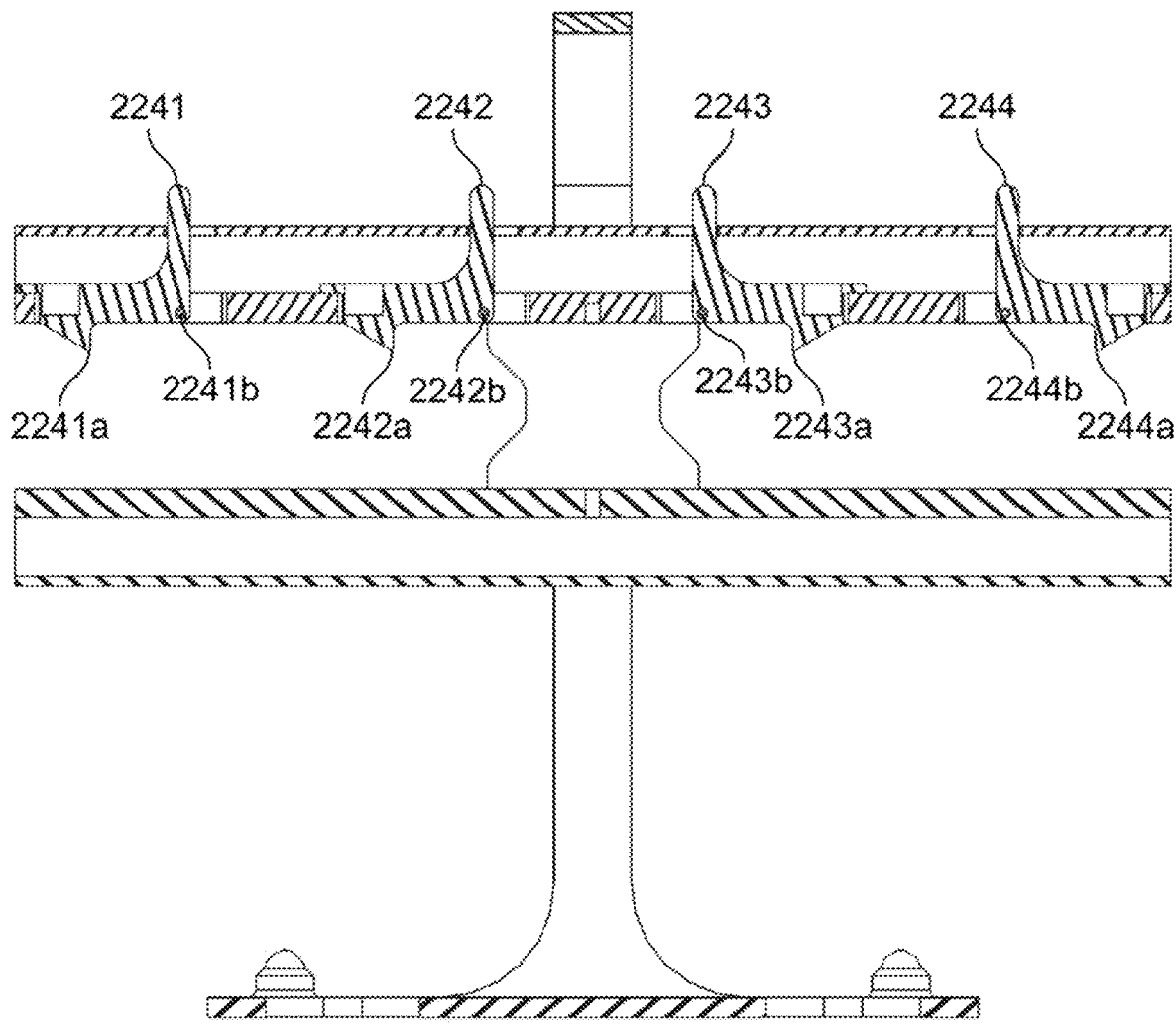
FIG. 8I is a cross-sectional view of the rotor arm module and rear landing gear module storage device of FIG. 8H taken substantially along line 8I-8I of FIG. 8H.

The rotor arm module and rear landing gear module storage device 2200 is shown in FIGS. 8H and 8I. The rotor arm module and rear landing gear module storage device 2200 is the element of the storage and launch system 2000 to which the rotor arm modules 400a to 400d and the rear landing gear modules 600c and 600d can be mounted and compactly stored. The rotor arm module and rear landing gear module storage device 2200 includes: (1) a base 2205; (2) a handle 2210; (3) an upper rotor arm module constraining plate 2230; (4) a lower rotor arm module constraining plate 2250; and (5) a lock 2220 (which is a slide bolt in this embodiment but can be any suitable device).

The base 2205 defines a storage device lock engager receiving cavity 2205a therethrough sized to receive the storage device lock engager 2112 of the launch-assist assembly 2100. The lock 2220 is fixedly attached to the base 2205 near the storage device lock engager receiving cavity such that the lock 2220 can engage the storage device lock engager 2112 when the storage device lock engager 2112 is received in the storage device lock engager receiving cavity 2205a to lock the rotor arm module and rear landing gear module storage device 2200 to the launch assist assembly 2100.

The handle 2210 includes two opposing, spaced-apart sides 2211 and 2213 and a top 2212 extending between the sides 2211 and 2213. The sides 2211 and 2213 are attached to the base 2205. The side 2211 includes two surfaces 2211a and 2211b each defining a rear landing gear module receiving cavity sized and shaped to receive a portion of one of the rear landing gear modules 600c and 600d.

The upper rotor arm module constraining plate 2230 is attached to the handle 2210. The upper rotor arm module constraining plate 2230 includes a plurality of surfaces 2230a, 2230b, 2230c, and 2230d each defining a rotor motor receiving cavity sized and shaped to receive a rotor motor of one of the rotor arm modules.

The upper rotor arm module constraining plate 2230 also includes a plurality of rotor arm module retainers 2241, 2242, 2243, and 2244 disposed within an enclosing bracket 2240. The rotor arm module retainer 2241 includes a locking tab 2241a extending below the upper rotor arm module constraining plate 2230 and is pivotably connected to the upper rotor arm module constraining plate 2230 via a pin 2241b. The rotor arm module retainer 2242 includes a locking tab 2242a extending below the upper rotor arm module constraining plate 2230 and is pivotably connected to the upper rotor arm module constraining plate 2230 via a pin 2242b. The rotor arm module retainer 2243 includes a locking tab 2243a extending below the upper rotor arm module constraining plate 2230 and is pivotably connected to the upper rotor arm module constraining plate 2230 via a pin 2243b. The rotor arm module retainer 2244 includes a locking tab 2244a extending below the upper rotor arm module constraining plate 2230 and is pivotably connected to the upper rotor arm module constraining plate 2230 via a pin 2244b.

The rotor arm module retainers are pivotable from a lock rotational position (shown in FIG. 8I) to a release rotational position (not shown). Suitable biasing elements (such as compression spring, not shown) bias the rotor arm module retainers to the lock rotational position.

The lower rotor arm module constraining plate 2250 is attached to the handle 2210 below the upper rotor arm module constraining plate 2230. The lower rotor arm module constraining plate 2250 includes a plurality of surfaces 2250a, 2250b, 2250c, and 2250d each defining a rotor motor receiving cavity sized and shaped to receive a rotor motor of one of the rotor arm modules.

2.3 Hub Module Storage Tray

Figure 8J:
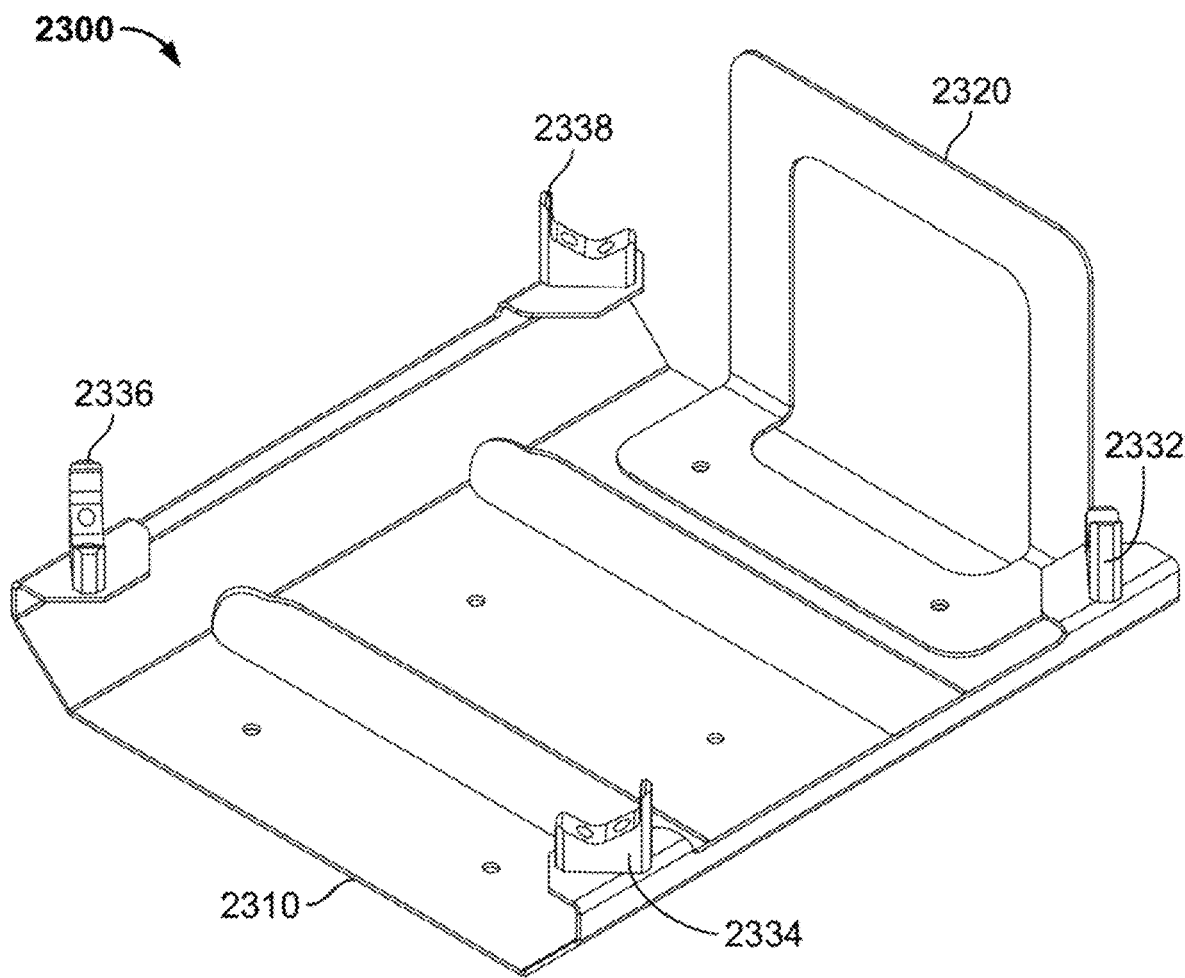
FIG. 8J is a top perspective view of the hub module storage tray of the present disclosure.

The hub module storage tray 2300 is shown in FIG. 8J. The hub module storage tray 2300 is the element of the storage and launch system 2000 to which the hub module 200 is mounted for storage. The hub module storage tray 2300 includes a generally rectangular base 2310, a handle 2320 fixedly attached to the base 2310, and four female blind mate connector engagers 2332, 2334, 2336, and 2338 fixedly attached to the base 2310. The female blind mate connector engagers are sized and shaped to engage the top surfaces of the female blind mate connectors 231 of the hub module 100.

2.4 Storing the Multicopter in the Multicopter Storage Container

To store the multicopter 10 in the container of the storage and launch system 2000, the operator first disassembles the multicopter 10 into the 13 modules or subassemblies, as described above. The operator moves the launch-assist assembly into its launch position.

The operator positions the rotor arm module and rear landing gear module storage device 2200 atop the launch-assist assembly 2100 such that the storage device lock engager 2112 of the launch-assist assembly 2100 is received in the storage device lock engager receiving cavity 2205a. The operator engages the storage device lock engager 2112 with the lock 2220 to lock the rotor arm module and rear landing gear module storage device 2200 to the launch assist assembly 2100.

The operator slides the rotor arm module 400a into the space between the upper and lower rotor arm module constraining plates 2230 and 2250 of the rotor arm module and rear landing gear module storage device 2200 until: (1) the lower rotor motor is disposed within the rotor motor receiving cavities defined by the surfaces 2230b and 2250b; and (2) the rotor arm module retainer 2243 locks the rotor arm module 400a into place.

The operator slides the rotor arm module 400b into the space between the upper and lower rotor arm module constraining plates 2230 and 2250 of the rotor arm module and rear landing gear module storage device 2200 until: (1) the lower rotor motor is disposed within the rotor motor receiving cavities defined by the surfaces 2230d and 2250d; and (2) the rotor arm module retainer 2242 locks the rotor arm module 400b into place.

The operator slides the rotor arm module 400c into the space between the upper and lower rotor arm module constraining plates 2230 and 2250 of the rotor arm module and rear landing gear module storage device 2200 until: (1) the upper rotor motor is disposed within the rotor motor receiving cavities defined by the surfaces 2230c and 2250c; and (2) the rotor arm module retainer 2241 locks the rotor arm module 400c into place.

The operator slides the rotor arm module 400d into the space between the upper and lower rotor arm module constraining plates 2230 and 2250 of the rotor arm module and rear landing gear module storage device 2200 until: (1) the upper rotor motor is disposed within the rotor motor receiving cavities defined by the surfaces 2230a and 2250a; and (2) the rotor arm module retainer 2244 locks the rotor arm module 400d into place.

The operator inserts the front landing gear modules 600a and 600b into the first and second front landing gear module retainers 2110a and 2110b on the tray 2108 of the launch-assist assembly 2100.

The operator inserts the rear landing gear module 600c into the rear landing gear module receiving cavity defined by the surface 2211b and the rear landing gear module 600d into the rear landing gear module receiving cavity defined by the surface 2211a.

The operator places the landing gear extensions 500a to 500d in the container bottom 2000a behind the handle 2320 of the hub module storage tray 2300. The operator attaches the container top 2000b to the container bottom 2000a to complete storage.

The operator inverts the hub module 100 and engages the female blind mate connector engagers 2332, 2334, 2336, and 2338 of the hub module storage tray 2300 with the female blind mate connectors 231 of the hub module 100.

The operator moves the launch-assist assembly 2100 to the storage position.

In certain embodiments, the container top or the container bottom includes one or more handles (such as an extendable handle) or one or more wheels to facilitate moving the container. In certain embodiments, the container top or the container bottom includes one or more locks configured to lock the container top to the container bottom.

3. Anchor System

The anchor system 3000 and components thereof is shown in FIGS. 9A-9H and 10A-10D. The anchor system 3000 is usable along with the multicopter 10, the flexible capture member 5000 (described below), and the aircraft-landing structure 8000 (described below) to retrieve the fixed-wing aircraft 20a from free, wing-borne flight. Generally, the components of the anchor system 3000 operate together to impose a regulated force on the flexible capture member 5000 during the fixed-wing aircraft retrieval process. This means that the anchor system 3000 is configured to regulate—i.e., maintain substantially constant—the tension in the flexible capture member 5000 while the multicopter 10 is station-keeping relative to the anchor system 3000 in preparation for retrieval of the fixed-wing aircraft 20a. This simplifies multicopter operation during the fixed-wing aircraft retrieval process by eliminating the need for the multicopter operator to control the altitude of the multicopter 10 to maintain a desired tension in the flexible capture member 5000.

The anchor system 3000 includes an anchor system base 3100, a first mounting bracket 3200, a second mounting bracket 3300, a separator bracket 3400, and a flexible capture member payout and retract system (not labeled). The flexible capture member payout and retract system includes a drum assembly 3500, a level wind system 3600, a transition assembly 3700, and a hydraulic system 7300.

3.1 Anchor System Base and Brackets

Figure 9A:
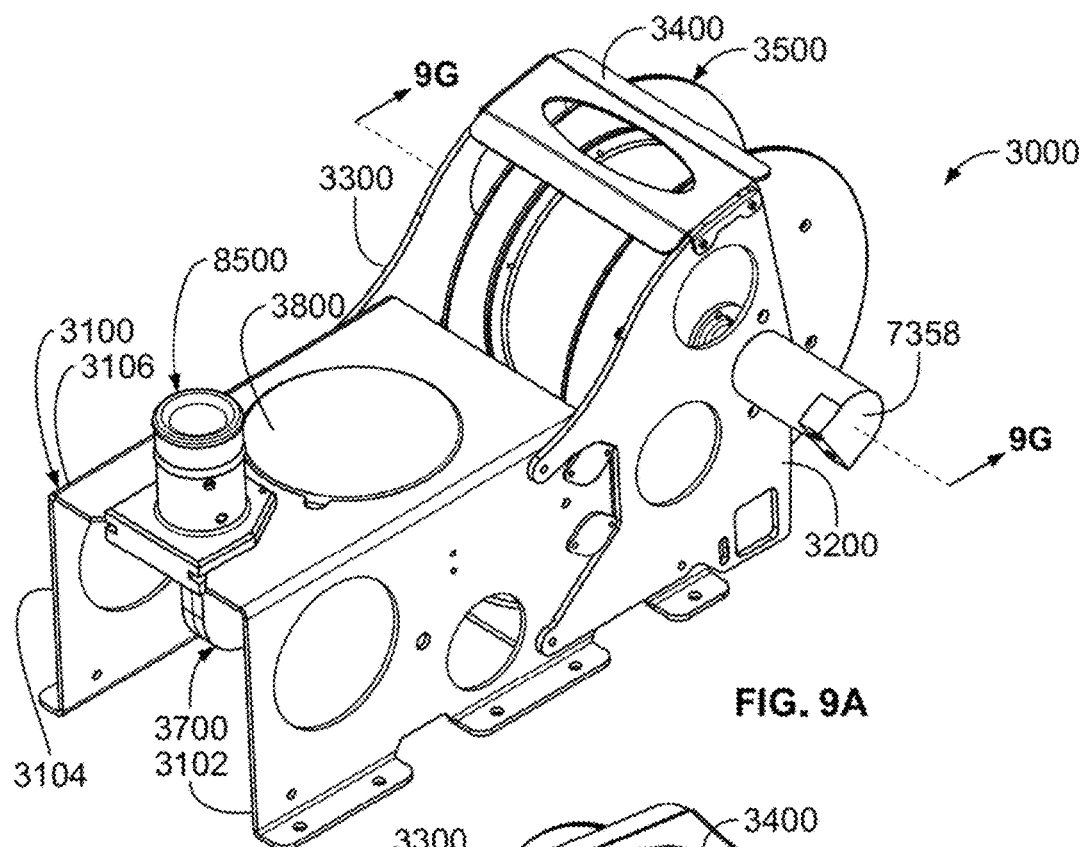
FIGS. 9A and 9B are a top perspective views of one example embodiment of the anchor system of the present disclosure.
Figure 9B:
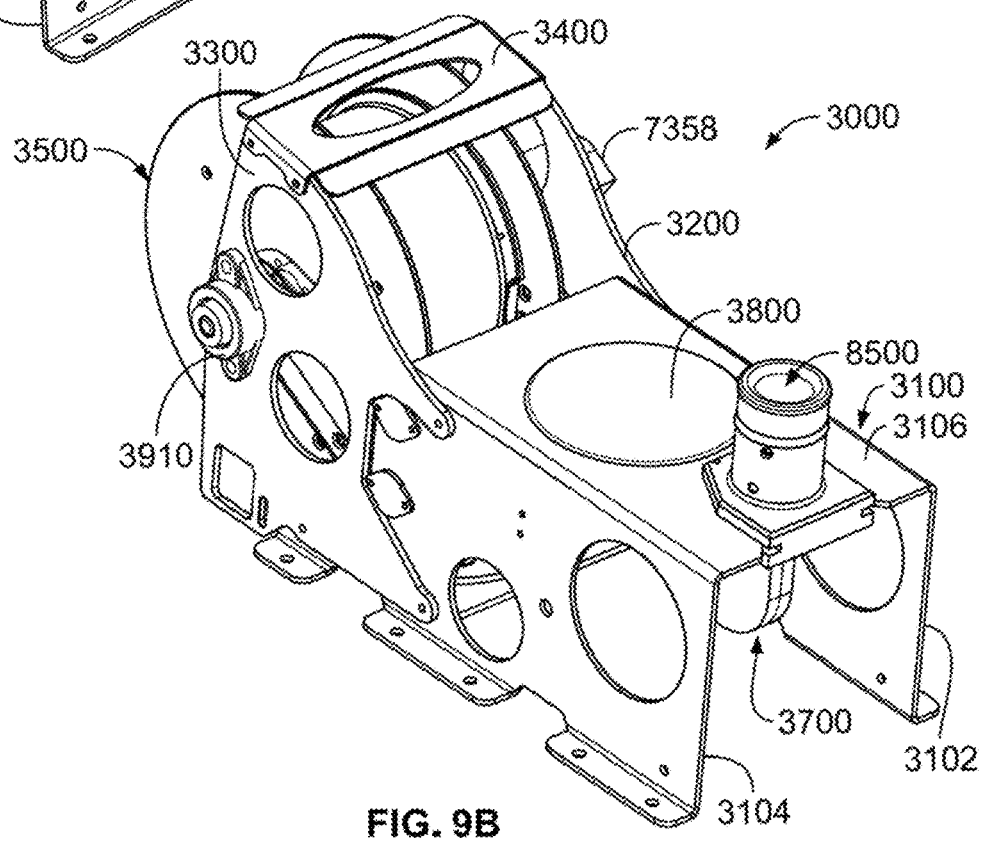
Figure 9C:
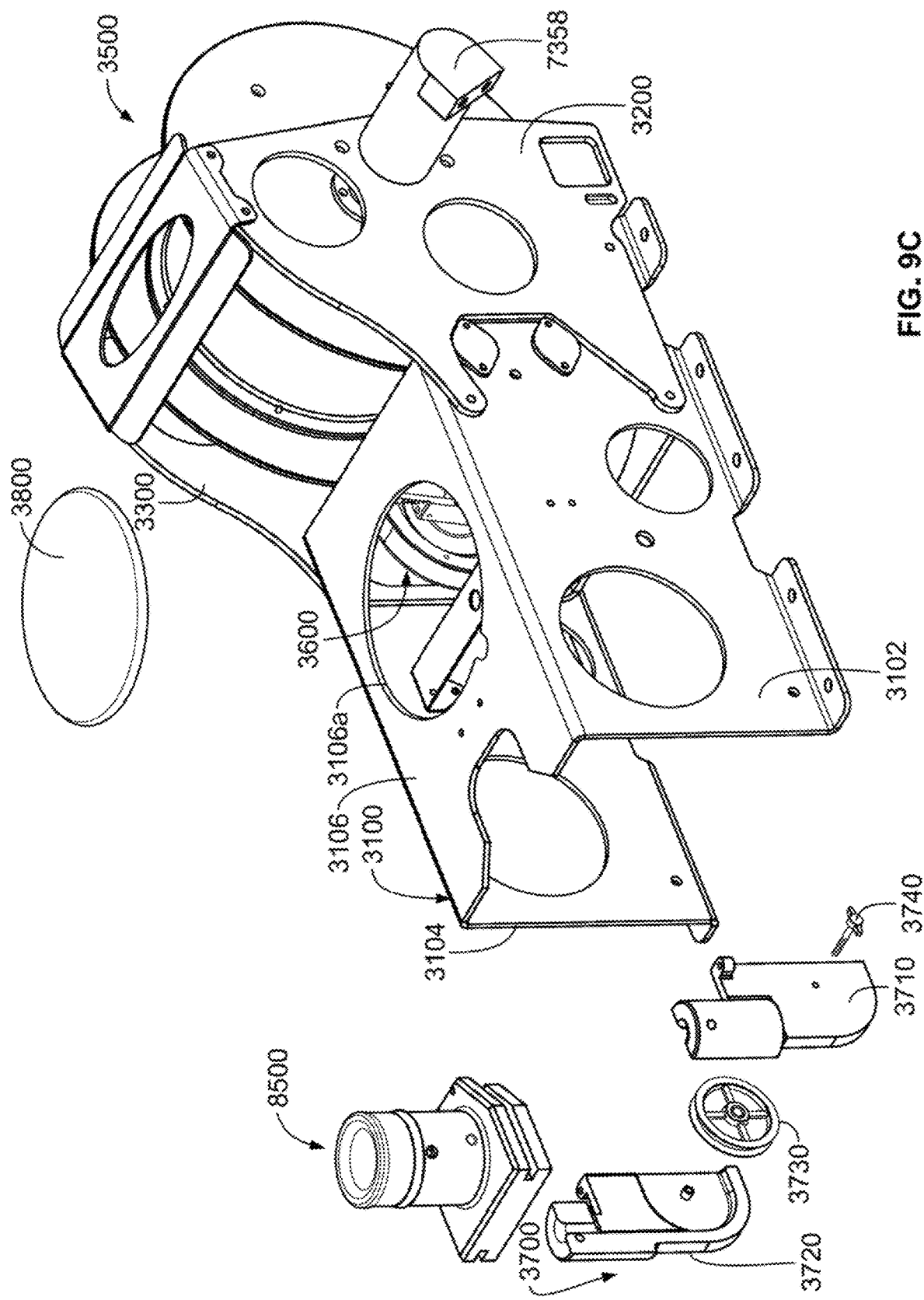
FIG. 9C is a partially exploded top perspective view of the anchor system of FIGS. 9A and 9B.

The anchor system base 3100 serves as a mount for certain other elements of the anchor system 3000. As best shown in FIGS. 9A-9E, the anchor system base 3100 includes two spaced-apart, generally parallel sides 3102 and 3104 and a top 3106 transverse (such as generally perpendicular) to, extending between, and connecting the sides 3102 and 3104. As best shown in FIG. 9C, the top 3106 includes a surface 3106a that defines a GPS antenna mounting opening through the top 3106 and a surface 3106b that defines a lower sealing and mounting component opening through the top 3106. The GPS antenna 3800 is attached to a mounting bracket (not labeled) that extends between the sides 3102 and 3104 such that the GPS antenna 3800 extends through the GPS antenna mounting opening of the top 3106. As described below, a lower sealing and mounting component 8500 of the aircraft-landing structure 8000 is attachable to the top 3106 of the anchor system base 3100 via the lower sealing and mounting component mounting opening to attach the aircraft-landing structure 8000 to the anchor system base 3100.

Figure 9D:
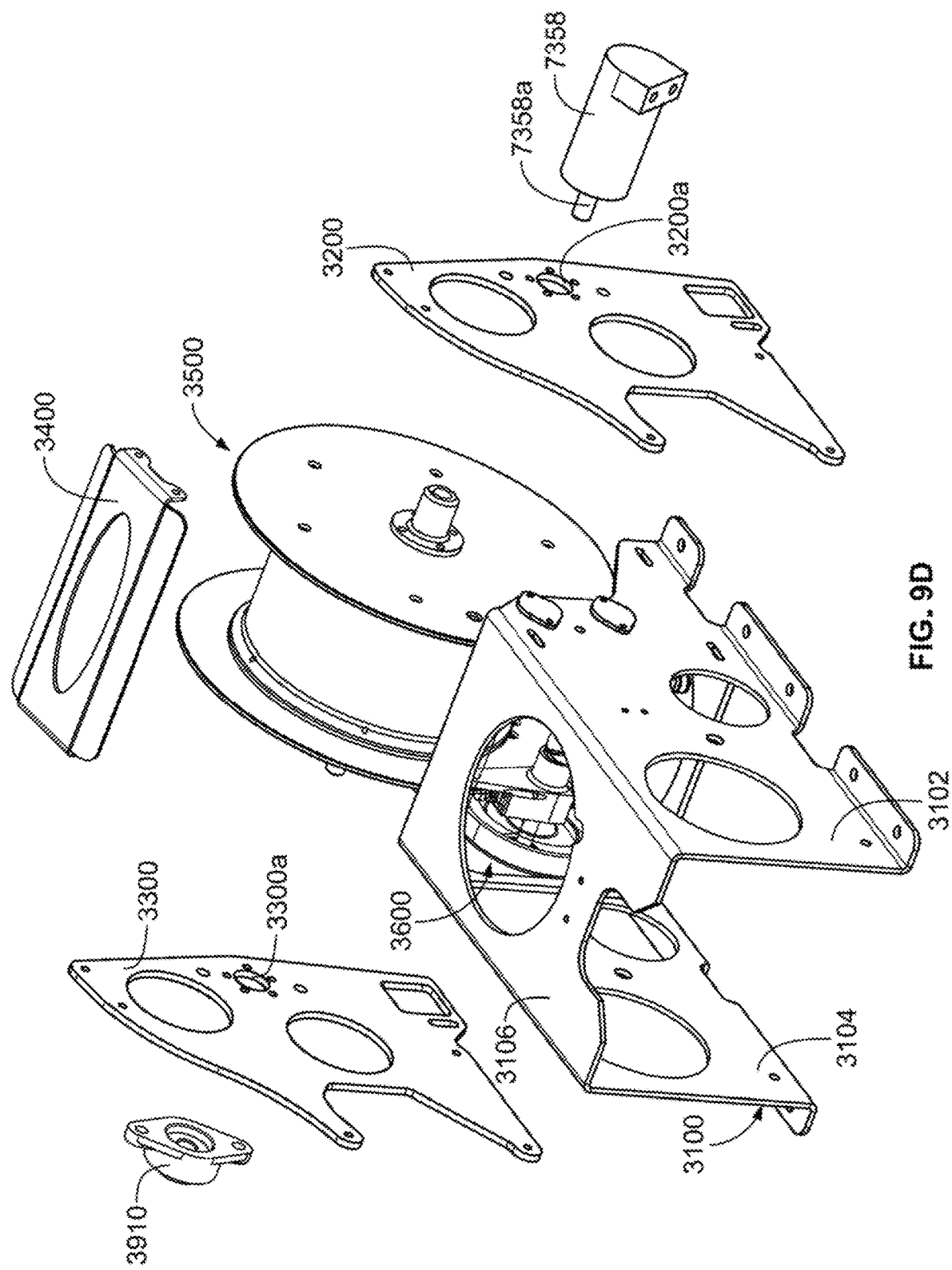
FIGS. 9D and 9E are partially exploded top perspective views of the anchor system of FIGS. 9A and 9B with some components removed.
Figure 9E:
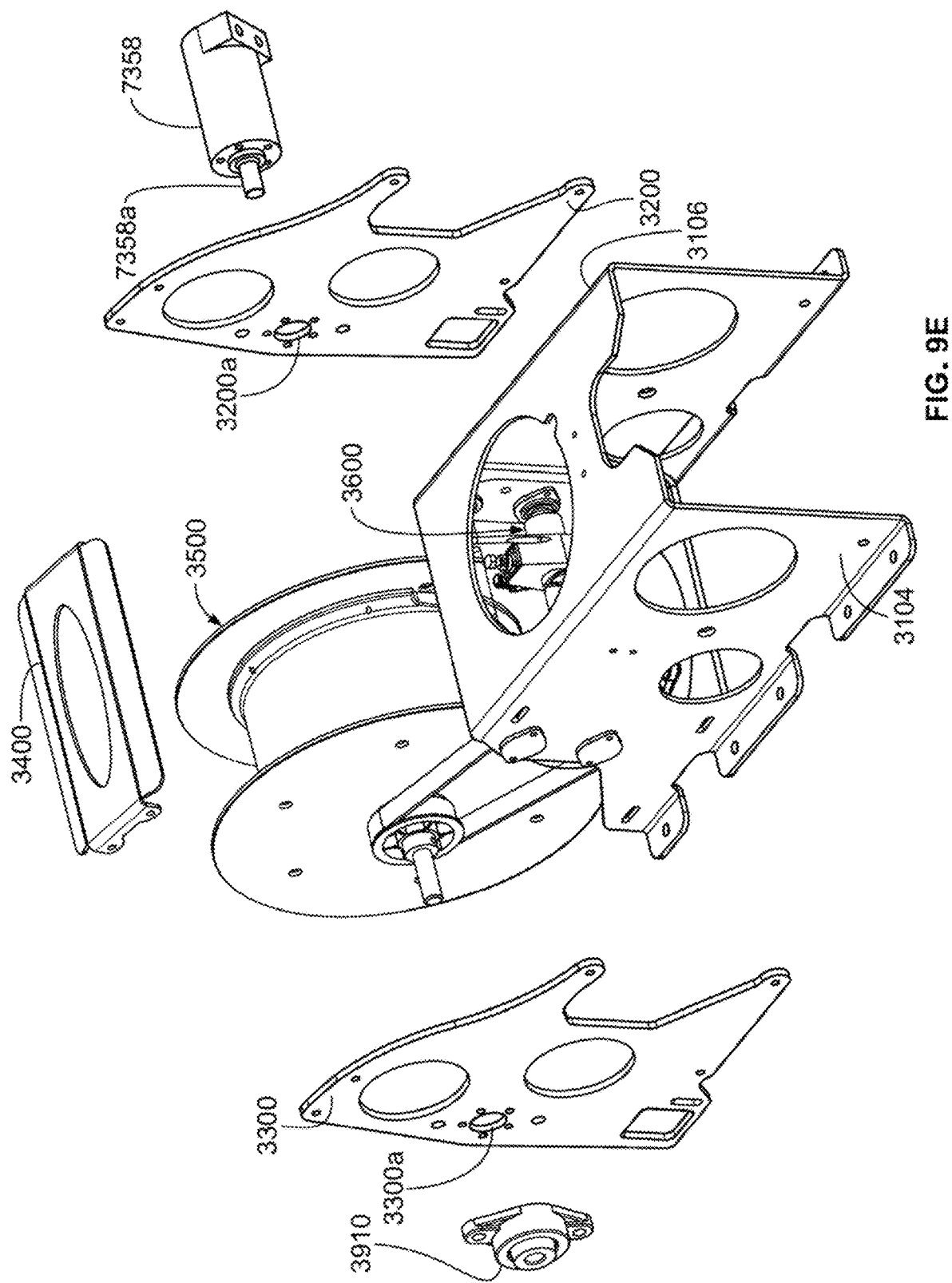

The first and second mounting brackets 3200 and 3300 serve as mounts for the drum assembly 3500 and part of the hydraulic system 7300. As best shown in FIGS. 9D and 9E, the first and second mounting brackets 3200 and 3300 are generally planar and include respective cylindrical surfaces 3200a and 3300a that respectively define first and second mounting openings through the first and second mounting brackets 3200 and 3300. The first mounting bracket 3200 is attached to the first side 3102 of the anchor system base 3100 via suitable fasteners (not shown), and the second mounting bracket 3300 is attached to the second side 3104 of the anchor system base 3100 via suitable fasteners (not shown). The separator bracket 3400 is attached to and extends between the first and second mounting brackets 3200 and 3300 via suitable fasteners (not shown) to maintain the spacing between these components.

3.2 Drum Assembly

The flexible capture member 5000 may be wound onto and off of the drum assembly 3500. As best shown in FIG. 9G, the drum assembly 3500 includes a drum 3510 having a cylindrical exterior surface 3510a and a cylindrical interior surface 3510b; a first drum flange 3512 having a circular exterior surface 3512a, a circular interior surface 3512b, a cylindrical perimeter surface 3512c, and a cylindrical mounting surface 3512d that defines a mounting opening through the first flange 3512; a second drum flange 3514 having a circular exterior surface 3514a, a circular interior surface 3514b, a cylindrical perimeter surface 3514c, and a cylindrical mounting surface 3514d that defines a mounting opening through the second flange 3514; a drum shaft 3520; a coupler 3532 including a tubular coupler shaft 3532a defining a shaft-receiving bore therethrough and a coupler flange 3532b extending radially outwardly from the coupler shaft 3532a; a first annular flange 3534; a second annular flange 3536; and a third annular flange 3537.

The first and second drum flanges 3512 and 3514 are fixedly attached to opposing longitudinal ends (not labeled) of the drum 3510 via fasteners (not shown) such that the interior surface 3510b of the drum 3510 and the interior surfaces 3512b and 3514b of the first and second drum flanges 3512 and 3514 define a cylindrical inner drum cavity (not labeled).

The coupler flange 3532b and the first annular flange 3534 are fixedly attached to one another and to the first drum flange 3512 via fasteners (not shown) such that: (1) the coupler flange 3532b contacts the exterior surface 3512a of the first drum flange 3512; (2) the first annular flange 3534 is within the inner drum cavity and contacts the interior surface 3512b of the first drum flange 3512; (3) the coupler flange 3532b and the first annular flange 3534 sandwich part of the first drum flange 3512 therebetween; and (4) a first portion of the coupler shaft 3532a is within the inner drum cavity while a second portion of the coupler shaft 3532a is outside of the inner drum cavity.

The second annular flange 3536 and the third annular flange 3538 are fixedly attached to one another and to the second drum flange 3514 via fasteners (not shown) such that: (1) the third annular flange 3538 contacts the exterior surface 3514a of the second drum flange 3514; (2) the second annular flange 3536 is within the inner drum cavity and contacts the interior surface 3514b of the second drum flange 3514; and (3) the second annular flange 3536 and the third annular flange 3538 sandwich part of the second drum flange 3514 therebetween.

The drum shaft 3520 extends across the inner drum cavity such that a first end 3520a of the drum shaft 3520 is received in the shaft-receiving bore defined through the coupler shaft 3532a and a second end 3520b of the drum shaft 3520 is outside of the inner drum cavity. The drum shaft 3520 is coupled to the coupler 3532 in any suitable manner such that the drum shaft 3520 is substantially axially fixed (i.e., cannot substantially move axially) relative to the coupler 3532 and such that the drum shaft 3520 and the coupler 3532 rotate together about the longitudinal axis of the drum shaft 3520. That is, the drum shaft 3520 and the coupler 3532 are coupled such that rotation of the drum shaft 3520 causes the coupler 3532 to rotate, and vice-versa. In this embodiment, this coupling is achieved via a fastener (not shown) threadably received by the coupler 3532 and the drum shaft 3520. This fixedly attaches the coupler 3532 and the drum shaft 3520. In other embodiments, the drum shaft is keyed to the coupler (or vice-versa) such that they rotate together. In other embodiments, retaining rings, pins, clips, or other elements axially fix the drum shaft relative to the coupler.

The drum shaft 3520 is mounted to the second mounting bracket 3300. Specifically, the second end 3520b of the drum shaft 3520 extends through the second mounting opening defined through the second mounting bracket 3300 and is received in a drum shaft flange bearing 3910 attached to the second mounting bracket 3300. This enables the drum shaft 3520 to rotate about its longitudinal axis relative to the second mounting bracket 3300. The drum shaft 3520 is mounted to the first mounting bracket 3200 via the below-described coupling of the coupler 3532 and a motor output shaft 7358a of a hydraulic motor 7358 of the hydraulic system 7300.

3.3 Level Wind System

The level wind system 3600 ensures that the flexible capture member 3600 is wound onto (and off of) the drum 3510 in a generally uniform manner. As best shown in FIG. 9F, the level wind system 3600 includes a level wind shaft 3610, a first traveler 3620, a second traveler 3630, a guide shaft 3640, a first pulley 3650, a second pulley 3660, and a belt 3670.

The first and second travelers 3620 and 3630 are slidably mounted to the level wind shaft 3610 in a spaced-apart fashion such that their respective guide elements (not shown) are received in channels (not labeled) defined in the exterior surface of the level wind shaft 3610 around its circumference. The arrangement and shape of these grooves define how far and how fast the first and second travelers 3620 and 3630 slide back and forth relative to the level wind shaft 3610 as the level wind shaft 3610 rotates. The first and second travelers 3620 and 3630 are also slidably mounted to the guide shaft 3640 to prevent the first and second travelers 3620 and 3630 from about the longitudinal axis of the level wind shaft 3610.

The level wind shaft 3610 is mounted to the sides 3102 and 3104 of the anchor system base 3100. More specifically, the ends of the level wind shaft 3610 are received in respective level wind shaft flange bearings (not labeled) attached to the sides 3102 and 3104 of the anchor system base 3100 such that the level wind shaft 3610 can rotate about its longitudinal axis relative to the sides 3102 and 3104 of the anchor system base 3100. Similarly, the guide shaft 3400 is mounted to the sides 3102 and 3104 of the anchor system base 3100. More specifically, the ends of the guide shaft 3640 are received in respective guide shaft flange bearings (not labeled) attached to the sides 3102 and 3104 of the anchor system base 3100 such that the guide shaft 3640 can rotate about its longitudinal axis relative to the sides 3102 and 3104 of the anchor system base 3100.

The first pulley 3650 is mounted to and coupled to the level wind shaft 3610 in any suitable manner such that the first pulley 3650 is substantially axially fixed (i.e., cannot substantially move axially) relative to the level wind shaft 3610 and such that the first pulley 3650 and the level wind shaft 3610 rotate together about the longitudinal axis of the level wind shaft 3610. That is, the first pulley 3650 and the level wind shaft 3610 are coupled such that rotation of the first pulley 3650 causes the level wind shaft 3610 to rotate, and vice-versa. In this embodiment, this coupling is achieved via a fastener (not shown) threadably received by the first pulley 3650 and the level wind shaft 3610. This fixedly attaches the first pulley 3650 to the level wind shaft 3610. In other embodiments, the level wind shaft is keyed to the first pulley (or vice-versa) such that they rotate together. In other embodiments, retaining rings, pins, clips, or other elements axially fix the first pulley relative to the level wind shaft.

As best shown in FIG. 9G, the second pulley 3660 is mounted to and coupled to the drum shaft 3520 in any suitable manner such that the second pulley 3660 is substantially axially fixed (i.e., cannot substantially move axially) relative to the drum shaft 3520 and such that the second pulley 3660 and the drum shaft 3520 rotate together about the longitudinal axis of the drum shaft 3520. That is, the second pulley 3660 and the drum shaft 3520 are coupled such that rotation of the drum shaft 3520 causes the second pulley 3660 to rotate, and vice-versa. In this embodiment, this coupling is achieved via a fastener (not shown) threadably received by the second pulley 3660 and the drum shaft 3520. This fixedly attaches the second pulley 3660 to the drum shaft 3520. In other embodiments, the drum shaft is keyed to the second pulley (or vice-versa) such that they rotate together. In other embodiments, retaining rings, pins, clips, or other elements axially fix the second pulley relative to the drum shaft.

The belt 3670 fits around and operatively connects the first and second pulleys 3650 and 3660 such that rotation of one of the pulleys causes the other to rotate.

In operation, as the drum shaft 3520 of the drum assembly 3500 rotates, the second pulley 3660 rotates therewith. Rotation of the second pulley 3660 causes the first pulley 3650 to rotate due to their connection via the belt 3670. Rotation of the first pulley 3650 causes the level wind shaft 3610 to rotate. Rotation of the level wind shaft 3610 causes the first and second travelers 3620 and 3630 to slide relative to the level wind shaft 3610 due to their guide elements being received in the grooves defined in the level wind shaft 3610. This sliding of the first and second travelers 3620 and 3630 (which is keyed to rotation of the drum shaft 3520) guides placement of the flexible capture member 5000 as it is wound onto (or off of) the drum 3510.

3.4 Transition Assembly

The transition assembly 3700 is configured to route the flexible capture member 5000 from the aircraft-landing structure 8000 to the level wind system 3600. As best shown in FIG. 9C, the transition assembly 3700 includes a first transition assembly housing portion 3710, a second transition assembly housing portion 3720, a transition pulley 3730, and a fastener 3740. The first and second transition assembly housing portions 3710 and 3720 are attachable to one another via the fastener 3740, and together define a transition pulley cavity and a flexible capture member receiving bore in fluid communication with the transition pulley cavity. The transition pulley 3730 is rotatably mounted on a spindle (not labeled) within the transition pulley cavity such that the transition pulley 3730 can rotate relative to the first and second transition assembly housing portions 3710 and 3720. As described in detail below, the transition assembly 3700 is attachable to the lower sealing and mounting component 8500, which in turn is slidably receivable on the anchor system base 3100.

3.5 Hydraulic System

The hydraulic system 7300 is configured to regulate the tension in the flexible capture member 5000 during the fixed-wing aircraft retrieval process. As best shown in FIGS. 10A-10D, the hydraulic system 7300 includes an electric hydraulic pump 7350 (such as one of the PU-Series Hydraulic Economy Electric Pumps sold by Enerpac) having an inlet port and an outlet port, an accumulator 7352 (such as the Piston-Style Hydraulic Accumulator #6716K51 sold by McMaster-Carr) having an inlet/outlet port, a pressure relief valve 7356 (such as the Adjustable Stainless Steel Relief Valve #5027K11 sold by McMaster-Carr) having an inlet port and an outlet port, the hydraulic motor 7358 (such as the Pilot Flange Mount J Series Hydraulic Motor #5PZL3 sold by Grainger) having an inlet port and an outlet port, a hydraulic fluid tank 7362 (such as that included in one of the PU-Series Hydraulic Economy Electric Pumps sold by Enerpac) having an inlet port and an outlet port, and a pressure switch 7364 (such as the Extended-Life Pressure Switch #4735K46 sold by McMaster-Carr).

The hydraulic motor 7358 is attached to the first mounting bracket 3200 such that the motor output shaft 7358a extends through the first mounting opening defined through the first mounting bracket 3200 and is received in the shaft-receiving bore defined through the coupler shaft 3532a of the coupler 3532. The motor output shaft 7358a is coupled to the coupler 3532 in any suitable manner such that the motor output shaft 7358a and the coupler 3532 rotate together. That is, the motor output shaft 7358a and the coupler 3532 are coupled such that rotation of the motor output shaft 7358a causes the coupler 3532 to rotate, and vice-versa. In this embodiment, the motor output shaft 7358a is keyed to the coupler 3532.

The remaining components of the hydraulic system 7300 are attached to each other; the container housing the anchor system 3000; and/or the anchor base 3100, the first mounting bracket 3200, or the second mounting bracket 3300.

The inlet port of the electric hydraulic pump 7350 is in fluid communication with the outlet port of the tank 7362, and the outlet port of the electric hydraulic pump 7350 is in fluid communication with the inlet/outlet port of the accumulator 7352, the inlet port of the pressure relief valve 7356, and the inlet port of the hydraulic motor 7358. The inlet port of the hydraulic motor 7358 is in fluid communication with the inlet port of the pressure relief valve 7356. The outlet port of the hydraulic motor 7358 is in fluid communication with the outlet port of the pressure relief valve 7356 and the inlet port of the tank 7362. In this embodiment, these components are in fluid communication with one another via suitable flexible or rigid tubing (not shown), though any suitable lines, hoses, or tubing may be used to fluidically connect these components. The hydraulic system 7300 also includes various fittings and connectors (not shown) that facilitate fluidically connecting these components. These fittings and connectors are well-known in the art and are not described herein for brevity.

When electrically connected to a power source and powered on, the electric hydraulic pump 7350 draws hydraulic fluid (such as oil or any other suitable fluid) from the tank 7362 and through its inlet port and pumps the hydraulic fluid out of its outlet port at a pump outlet pressure (800 psi in this example embodiment).

In certain situations, as explained below, the accumulator 7352 receives hydraulic fluid at its inlet/outlet and stores hydraulic fluid at a particular pressure to reduce pressure switch chatter (as described below). The accumulator gas charge is preloaded to the pressure switch lower set point (650 psi in this example embodiment, as described below) to minimize pressure switch chatter frequency.

The pressure switch is configured to measure the pressure of hydraulic fluid at the accumulator 7352. The pressure switch 7364 selectively connects the electric hydraulic pump 7350 to a power source 7400 based on the pressure P1 of hydraulic fluid at the accumulator 7352. The pressure switch measures P1 and: (1) electrically connects the power source 7400 and the electric hydraulic pump 7350 when P1 is less than a pressure switch lower set point (650 psi in this example embodiment); and (2) electrically disconnects the power source 7400 and the electric hydraulic pump 7350 when P1 is greater than or equal to a pressure switch upper set point (800 psi in this example embodiment). The combination of the accumulator 7352 and the pressure switch 7364 ensures that the electric hydraulic pump 7350 only operates as needed to maintain the pressure of the hydraulic fluid in the accumulator 7352.

The pressure relief valve 7356 receives hydraulic fluid at its inlet port and prevents the hydraulic fluid from exiting its outlet port until the pressure of the hydraulic fluid reaches a pressure relief valve set point (850 psi in this example embodiment). In other words, the pressure relief valve 7356 is movable between a closed configuration in which the pressure relief valve 7356 prevents the hydraulic fluid from flowing from its inlet port to its outlet port and an open configuration in which the pressure relief valve 7356 enables the hydraulic fluid to flow from its inlet port to its outlet port. The pressure relief valve 7356 is biased to the closed configuration, and moves to the open configuration when the pressure of the hydraulic fluid reaches the pressure relief valve set point.

Depending on the scenario, the hydraulic motor 7358 receives hydraulic fluid at either its inlet port from the electric hydraulic pump 7350 or its outlet port from the pressure relief valve 7356. When the hydraulic motor 7358 receives hydraulic fluid at its inlet port from the electric hydraulic pump 7350, the hydraulic fluid flows through the hydraulic motor 7358 and exits its outlet port. The flow of the hydraulic fluid in this direction causes the output shaft of the hydraulic motor 7358 to rotate in a direction that, as described below, causes the flexible capture member to wrap around the drum 3510. On the other hand, when excessive force on the flexible capture member 5000 forces the drum 3510 to rotate in a manner that enables flexible capture member payout, the hydraulic motor 7358 receives hydraulic fluid at its outlet port from the pressure relief valve 7356, and the hydraulic fluid flows through the hydraulic motor 7358 and exits its inlet port. The flow of the hydraulic fluid in this direction is intentionally lossy, forming an energy sink for the kinetic energy of the aircraft being captured.

3.5.1 Flexible Capture Member Haul-In Phase

Figure 10A:
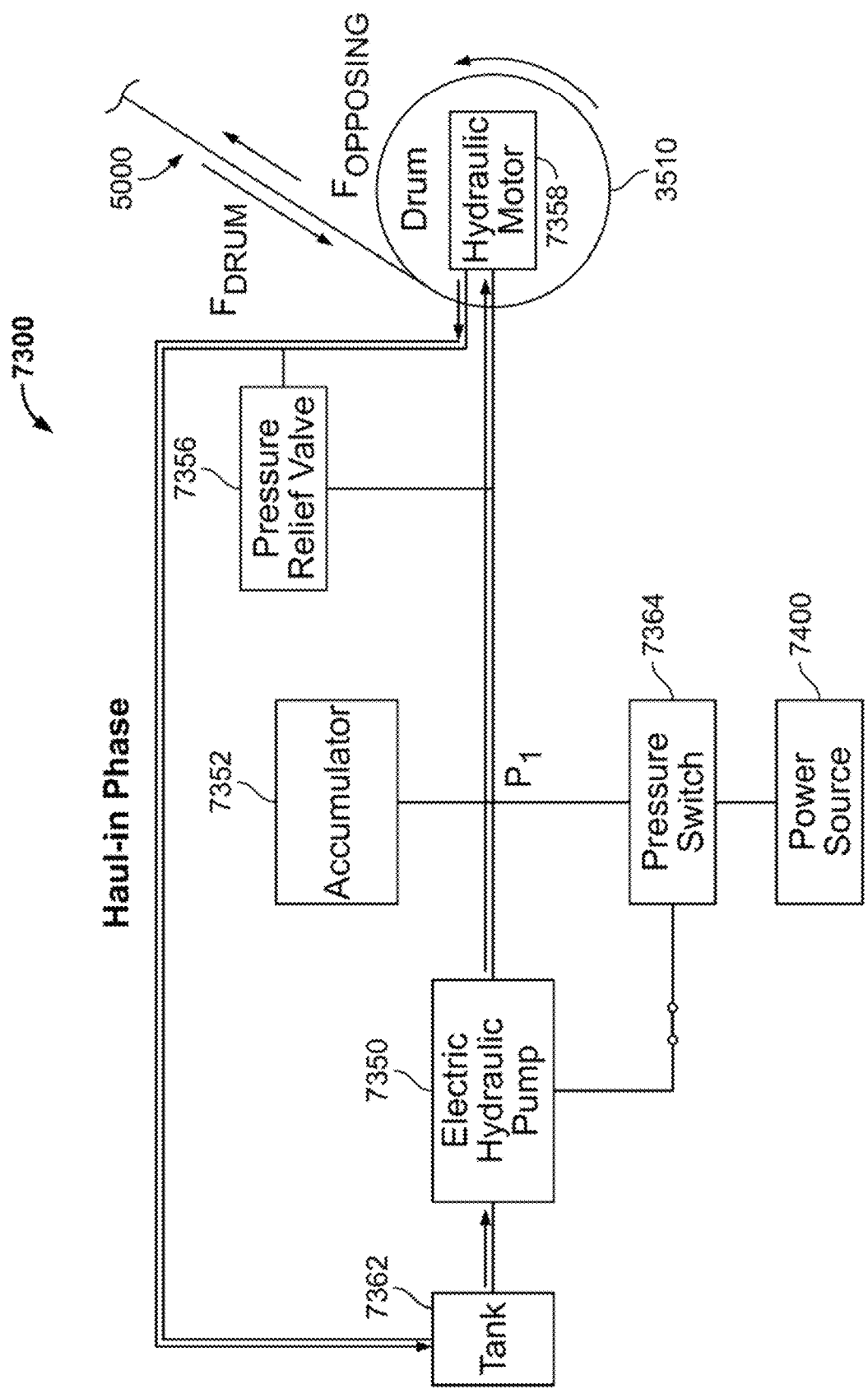
FIG. 10A is a schematic block diagram of a hydraulic system of the anchor system of FIGS. 9A and 9B during a flexible capture member haul-in phase of the fixed-wing aircraft retrieval process.

FIG. 10A is a schematic block diagram of part of the hydraulic system 7300 during the flexible capture member haul-in phase (sometimes called the "haul-in phase" for brevity) of the fixed-wing aircraft retrieval process. The haul-in phase is defined for the purposes of this section as occurring when the force $F_{DRUM}$ the drum 3510 imposes on the flexible capture member (via the torque the hydraulic motor 7358 exerts on the coupler 3532) exceeds any force $F_{OPPOSING}$ imposed on the flexible capture member 5000 that opposes $F_{DRUM}$ (such as when the flexible capture member is slack below a recently captured fixed-wing aircraft or when the multicopter is descending following capture of the fixed-wing aircraft).

During the haul-in phase, the pressure P1 of the hydraulic fluid at the accumulator 7352 is or falls below the 650 psi pressure switch lower set point. Accordingly, the pressure switch 7364 electrically connects the electric hydraulic pump 7350 to the power source 7400. The electric hydraulic pump 7350 draws hydraulic fluid from the tank 7362 and pumps the hydraulic fluid at the pump outlet pressure to the inlet/outlet port of the hydraulic accumulator 7352, the inlet port of the pressure relief valve 7356, and the inlet port of the hydraulic motor 7358.

Since at this point the pressure P1 of the hydraulic fluid at the accumulator 7352 is less than the 800 psi pressure switch upper set point, the pressure switch 7364 continues electrically connecting the electric hydraulic pump 7350 to the power source 7400 throughout the haul-in phase.

Since the pressure P1 at the accumulator 7352 is less than the 850 psi pressure relief valve set point, the pressure relief valve 7356 prevents the hydraulic fluid from flowing through it.

The hydraulic fluid instead flows through the hydraulic motor 7358 and exits the outlet port of the hydraulic motor 7358. The flow of the hydraulic fluid through the hydraulic motor 7358 in this direction (i.e., from inlet port to outlet port) causes the output shaft of the hydraulic motor 7358 to exert a counter-clockwise (from the viewpoint of FIG. 10A) torque on the coupler 3532, which transmits that torque to the drum shaft 3520, which transmits that torque to the drum flanges 3512 and 3514, which transmits that torque to the drum 3510. This torque imposes a force $F_{DRUM}$ on the flexible capture member 5000 via the drum 3510. Since the force $F_{OPPOSING}$ on the flexible capture member 5000 is less than $F_{DRUM}$, the torque the hydraulic motor 7358 exerts on the coupler 3532 causes the drum 3510 to rotate counter-clockwise (from the viewpoint of FIG. 10A) relative to the anchor system base 3100. This causes the flexible capture member 5000 to wrap around the drum 3510 (and decrease the amount of flexible capture member 5000 extending between the drum 3510 and the multicopter 10).

The hydraulic fluid flows from the outlet port of the hydraulic motor 7358 to the inlet port of the tank 7362.

In this example embodiment, the components and set points are sized, shaped, arranged, set, or otherwise configured such that $F_{DRUM}$ is about 80 pounds during the haul-in phase.

3.5.2 Neutral Phase

Figure 10B:
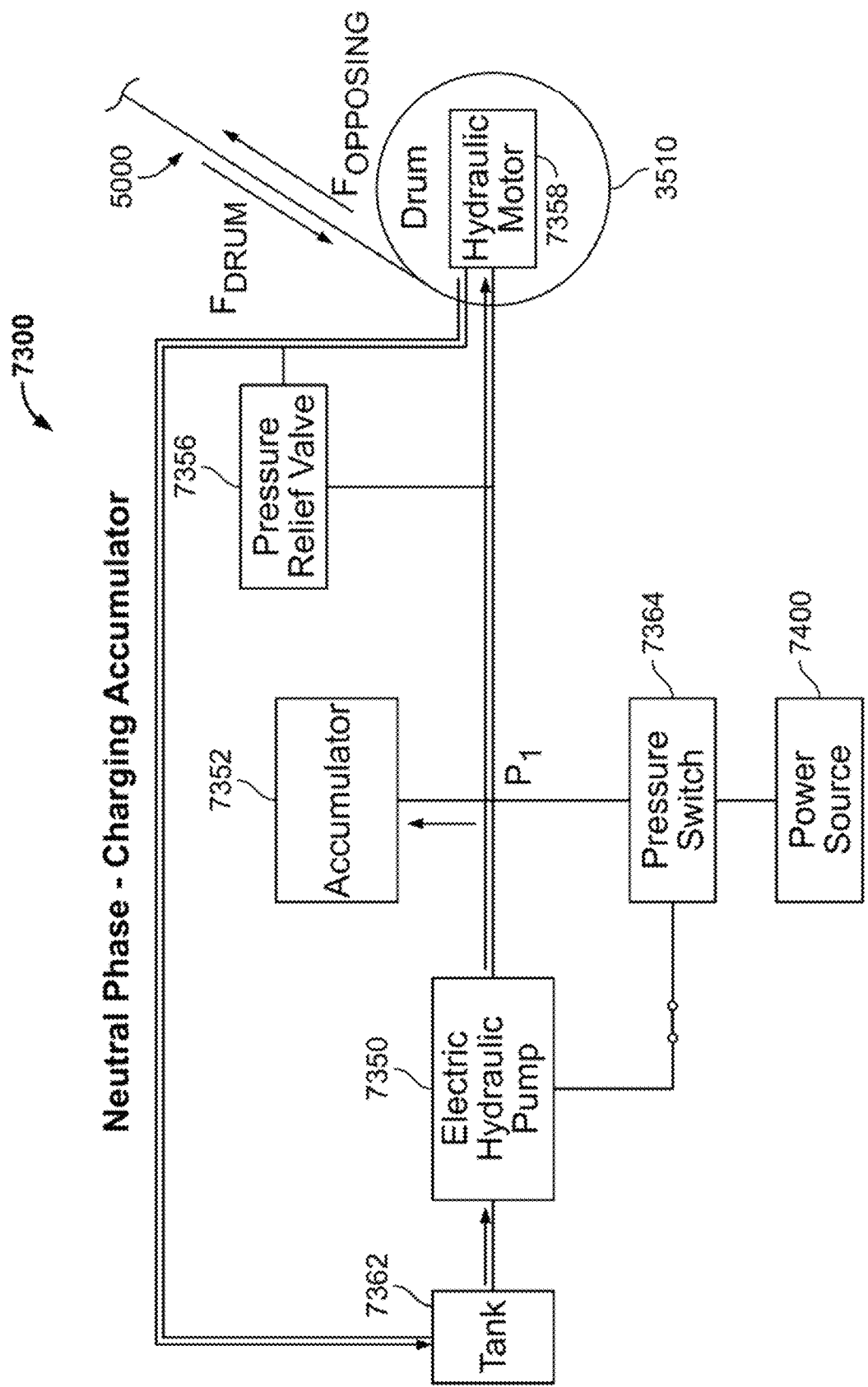
FIG. 10B is a schematic block diagram of the hydraulic system of FIG. 10A during a neutral phase of the fixed-wing aircraft retrieval process while the accumulator is charging.
Figure 10C:
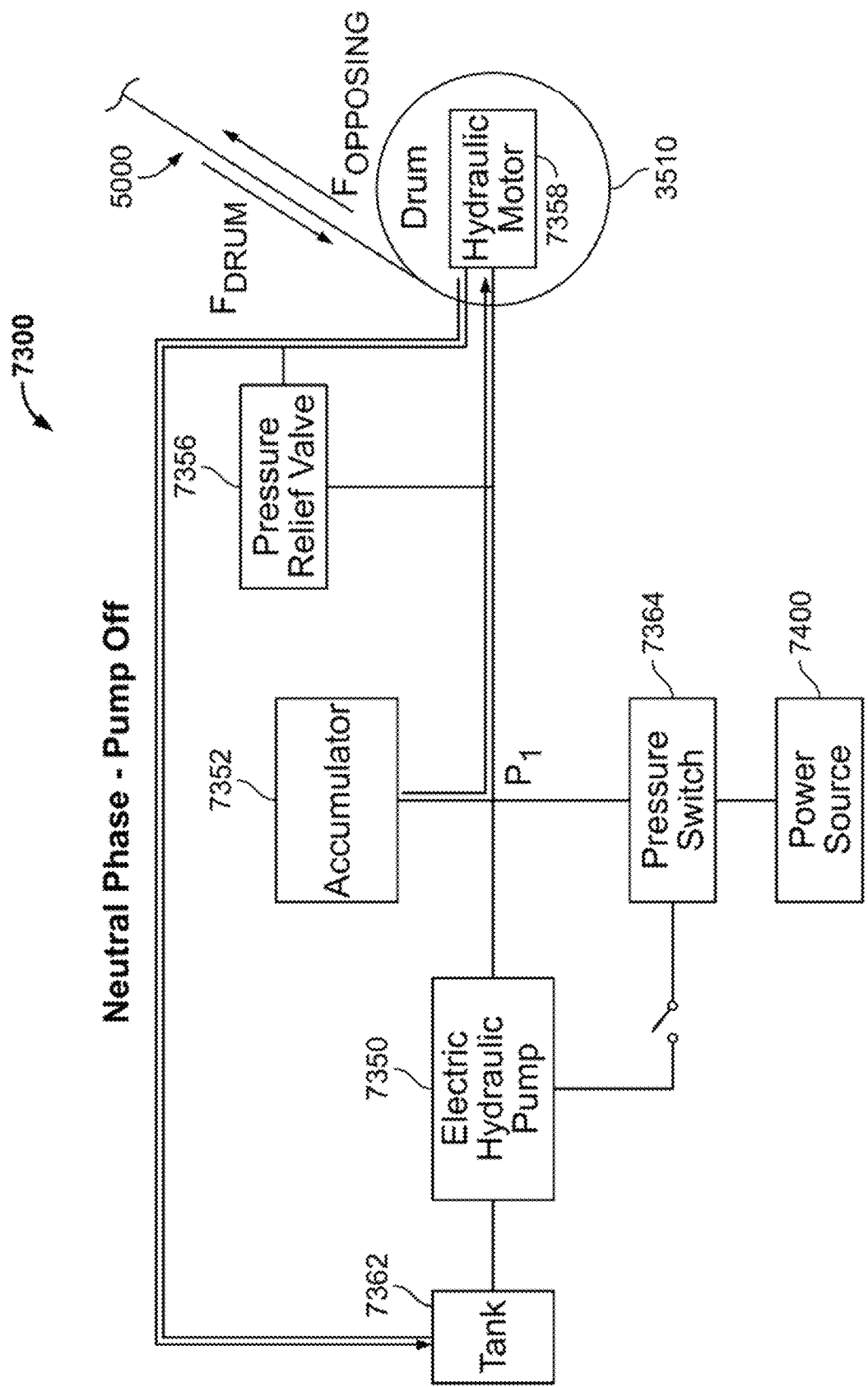
FIG. 10C is a schematic block diagram of the hydraulic system of FIG. 10A during a neutral phase of the fixed-wing aircraft retrieval process after the accumulator has been charged and the pump is powered off.

FIGS. 10B and 10C are schematic block diagrams of part of the hydraulic system 7300 during the flexible capture member neutral phase (sometimes referred to as the "neutral phase" for brevity) of the fixed-wing aircraft retrieval process. The neutral phase is defined for the purposes of this section as occurring when the force $F_{DRUM}$ the drum 3510 imposes on the flexible capture member (via the torque the hydraulic motor 7358 exerts on the coupler 3532) equals a force $F_{OPPOSING}$ imposed on the flexible capture member 5000 that opposes $F_{DRUM}$ (such as when the multicopter is station-keeping above the anchor system in preparation for fixed-wing aircraft retrieval).

During the neutral phase, the drum 3510 does not rotate relative to the anchor system base 3100. Even so, hydraulic fluid leaks through the hydraulic motor 7358 and drains into the tank 7362. The accumulator 7352 eliminates the need to constantly run the electric hydraulic pump 7350 during the neutral phase in response to this leakage and ensure $F_{DRUM}$ remains constant to regulate the tension in the flexible capture member 5000.

As shown in FIG. 10B, once $F_{OPPOSING}$ equals $F_{DRUM}$, the electric hydraulic pump 7350 continues to operate because P1 is less than the 650 psi pressure switch lower set point. But since hydraulic fluid flow through the hydraulic rotor 7358 has been reduced to mere leakage, pressure P1 begins to build and the accumulator 7352 begins charging. As shown in FIG. 10C, once the pressure P1 reaches the 800 psi pressure switch upper set point, the accumulator 7352 is charged and the pressure switch 7364 electrically disconnects the electric hydraulic pump 7350 from the power source 7400. The accumulator 7352 begins discharging to replenish the hydraulic fluid leaking through the hydraulic motor 7358. Once the pressure P1 falls below the 650 psi pressure switch lower set point, the pressure switch 7364 electrically connects the electric hydraulic pump 7350 to the power source 7400 to again charge the accumulator 7352. The use of the accumulator 7352 and the pressure switch 7364 therefore ensures that leakage through the hydraulic motor 7358 is accounted for and that $F_{DRUM}$ will not decrease as hydraulic fluid leaks through the hydraulic motor 7358.

In this example embodiment, the components and set points are sized, shaped, arranged, set, or otherwise configured such that $F_{DRUM}$ is about 80 pounds during the neutral phase.

3.5.3 Flexible Capture Member Payout Phase

FIG. 10D is a schematic block diagram of part of the hydraulic system 7300 during the flexible capture member payout phase (sometimes referred to as the "payout phase" for brevity) of the fixed-wing aircraft retrieval process. The payout phase is defined for the purposes of this section as occurring when the force $F_{DRUM}$ the drum 3510 imposes on the flexible capture member (via the torque the hydraulic motor 7358 exerts on the coupler 3532) is less than a force $F_{OPPOSING}$ imposed on the flexible capture member 5000 that opposes $F_{DRUM}$ (such as when the multicopter is climbing to prepare for fixed-wing aircraft retrieval or just after the fixed-wing aircraft captures and begins to deflect the flexible capture member).

During the payout phase, $F_{OPPOSING}$ causes the drum 3510 to spin clockwise (from the viewpoint of FIG. 10D) and pay out flexible capture member 5000 wrapped around the drum 3510 (and increase the amount of flexible capture member 5000 extending between the drum 3510 and the multicopter 10). This clockwise spinning of the drum 3510 forces hydraulic fluid to flow into the outlet port of the hydraulic motor 7358, through the hydraulic motor 7358, and exit the inlet port of the hydraulic motor 7358. Since hydraulic fluid cannot enter the outlet port of the electric hydraulic pump 7350, this causes the pressure P1 of the hydraulic fluid at the accumulator 7352 to increase. Once the pressure P1 reaches the 850 psi pressure relief valve set point, the pressure relief valve 7356 enables hydraulic fluid to flow through it. This causes hydraulic fluid to flow from the inlet port of the hydraulic motor 7358 to the inlet port of the pressure relief valve 7356 and from the outlet port of the pressure relief valve 7356 to the outlet port of the hydraulic motor 7358 until the drum 3510 stops rotating clockwise (from the viewpoint of FIG. 10D) and P1 drops below the 850 psi pressure relief valve set point.

During the payout phase, hydraulic fluid does not necessarily drain to the tank 7362, and the electric hydraulic pump

7350 thus doesn't need to replenish any drained hydraulic fluid. This means that P1 will not drop below the 650 psi pressure switch lower set point, and the pressure switch 7364 electrically disconnects the electric hydraulic pump 7350 from the power source 7400 during most (if not all) of the payout phase.

Accordingly, the relative positioning and configuration of the components of the hydraulic system enable the hydraulic motor to spin in either direction while maintaining torque on the drum shaft in the desired direction (counter-clockwise in the embodiment show in FIGS. 10A-10D) to maintain $F_{DRUM}$ on the flexible capture member In this example embodiment, $F_{DRUM}$ is controlled by the pressure relief valve set point (the higher the set point, the higher $F_{DRUM}$) and friction. In this example embodiment, $F_{DRUM}$ is about 85 pounds during the payout phase (i.e., greater than $F_{DRUM}$ in the haul-in and neutral phases)

4. Aircraft-Landing Structure

Controlling the multicopter 10 post-capture to lower the fixed-wing aircraft 20a to the ground (or another non-compliant structure) risks damaging the fixed-wing aircraft 20a. For instance, the multicopter 10 could descend too quickly or stall while descending and drop, causing the fixed-wing aircraft 20a to impact the ground at high speed. Even a slow and well-controlled descent of the multicopter 10 could coincide with poorly timed pendulum swing of the fixed-wing aircraft 20a, resulting in damage when the fixed-wing aircraft 20a touches down on the surface.

In certain situations, a compliant aircraft-landing structure 8000 is employed to gently receive the fixed-wing aircraft 20a post-capture and hold it in place above the ground (or other non-compliant surface) in a generally secure manner to facilitate retrieval at a later point. The use of this compliant aircraft-landing structure 8000 minimizes potential impact damage to the fixed-wing aircraft 20a and enables the multicopter 10 to land the fixed-wing aircraft 20a on the aircraft-landing structure 8000 and then land itself a safe distance away.

FIGS. 11A-11M illustrate one example embodiment of the aircraft-landing structure 8000 and its components, which include: an inflatable aircraft-supporting body 8100; multiple gussets 8105; a tubular spacer guide 8110; spaced-apart cylindrical inflatable supports 8200a, 8200b, 8200c, and 8200d; a guiding assembly 8300 including a spacer 8310 and an upper guiding component 8400 and an intermediate guiding component 8500 attached to the spacer 8310; an inflation device 8600; a deflation device 8700; and a lower guiding and mounting component 8800.

The aircraft-supporting body 8100 is formed from one or more pieces of fabric material (such as nylon, polyester, dacron, vinyl, or other composite laminate sheets) that are stitched, adhered, or otherwise fastened together in an airtight manner to generally form a frustoconical shape when inflated. The gussets 8105 and the tubular spacer guide 8110 are made of similar material. As best shown in FIGS. 11E-11G, the tubular spacer guide 8110 is attached to the aircraft-supporting body 8100 in a suitable manner (such as via stitching or adhesive) near its top and extends from there into the interior of the aircraft-supporting body 8100. The gussets 8105 are attached to and extend radially between the spacer guide 8110 and an inner surface 8100a of the aircraft-supporting body 8100. These gussets 8105 and the spacer guide 8110 assist in maintaining the guiding assembly 8300 upright when the aircraft-supporting body 8100 is inflated.

Each support 8200a-8200d is formed from one or more pieces of material (such as any of those listed above) that are stitched, adhered, or otherwise fastened together in an airtight manner to generally form cylinders when inflated. The supports are attached to the underside of the aircraft-supporting body 8100 via stitching, adhesive, or any other suitable manner. The interiors of the supports 8200a-8200d are in fluid communication with the interior of the aircraft-supporting body 8100 to enable fluid (e.g., air) to flow among these components. This enables the aircraft-supporting body 8100 and the supports 8200a-8200d to be inflated via a single inflator attached to the inflation device 8600. The supports 8200a-8200d have dumbbells 8205a-8025d respectively attached thereto. The dumbbells 8205a-8205d add weight to the supports 8200a-8200d to help maintain the aircraft-landing structure 8000 upright as the fixed-wing aircraft 20a contacts the flexible capture member 5000, as described below. The dumbbells may be replaced with any suitable components that add weight to the supports. In one embodiment, the supports are partially filled with material, such as sand, to weigh them down. In other embodiments, stakes are used to anchor the supports to the ground instead of or in addition to weighted elements.

As best shown in FIGS. 11E-11G, the spacer 8310 of the guiding assembly 8300 extends through the spacer guide 8110 such that a first end 8310a of the spacer 8310 is external to the aircraft-supporting body 8100 and an opposing second end 8310b of the spacer 8310 is inside of the interior of the aircraft-supporting body 8100. Hose clamps (not labeled) or any other suitable devices clamp the upper portion 8100a of the aircraft-supporting body 8100 and the spacer guide 8110 to the exterior cylindrical surface 8310c of the spacer 8310 to attach these components to one another. The spacer 8310 includes a cylindrical interior surface 8310d that defines a flexible capture member receiving bore. The upper guiding component 8400 is attached to the first end 8310a of the spacer 8310 via suitable fasteners, and the intermediate guiding component 8500 is attached to the second end 8310b of the spacer 8310 via suitable fasteners.

As best shown in FIGS. 11H and 11I, the upper guiding component 8400 includes a tubular body 8410, a tubular mounting element 8420, lower and upper roller bearings 8430a and 8430b, a retaining element 8440, a needle bearing supporter 8450, and multiple needle bearings 8460.

The body 8410 defines a cylindrical interior surface 8412 that forms a flexible capture member receiving bore therethrough. The mounting element 8420 surrounds part of the body 8410. The upper roller bearing 8430b surrounds part of the body 8410 and is positioned between an upper surface (not labeled) of the mounting element 8420 and a lip (not labeled) of the body 8410. The lower roller bearing 8430a surrounds part of the body 8410 and is positioned between a lower surface (not labeled) of the mounting element 8420 and the retaining element 8440, which is disposed within a channel defined around the circumference of the body 8410. The retaining element 8440 retains the body 8410, the mounting element 8420, and the roller bearings 8430a and 8430b in place relative to one another. The needle bearing supporter 8450 is attached to the body 8410 via fasteners, and the needle bearings 8460 are rotatably attached to the needle bearing supporter 8450 such that they can rotate relative to the needle bearing supporter 8450.

The mounting element 8420 of the upper guiding component 8400 is fixedly attached to the first end 8310a of the spacer 8310 of the guiding assembly 8300 via one or more fasteners. After attachment, the roller bearings 8430a and 8430b enable the body 8410 and the attached needle bearing supporter 8450 and needle bearings 8460 to rotate together about the longitudinal axis of the body 8410 relative to the mounting element 8430 and the guiding assembly 8300.

Figure 11A:
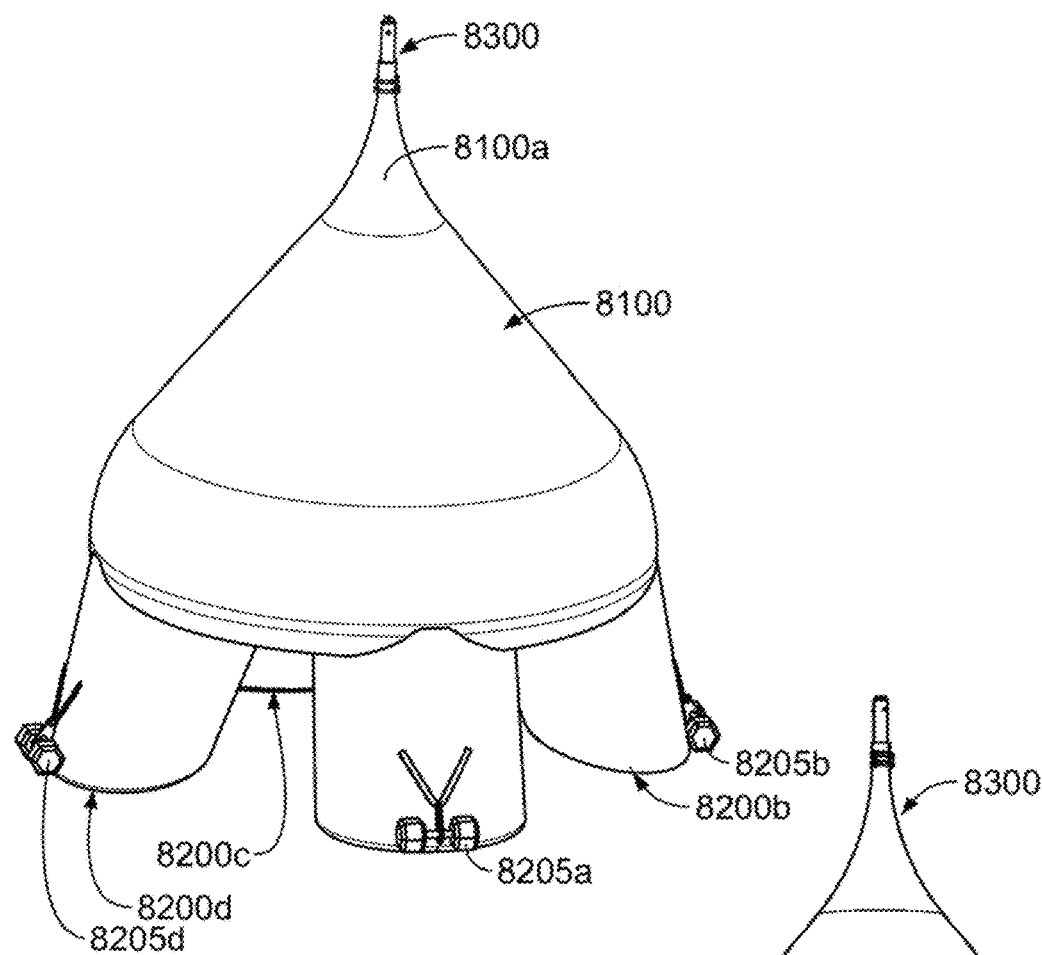
FIG. 11A is a top perspective view of an aircraft-landing structure of the present disclosure.
Figure 11B:
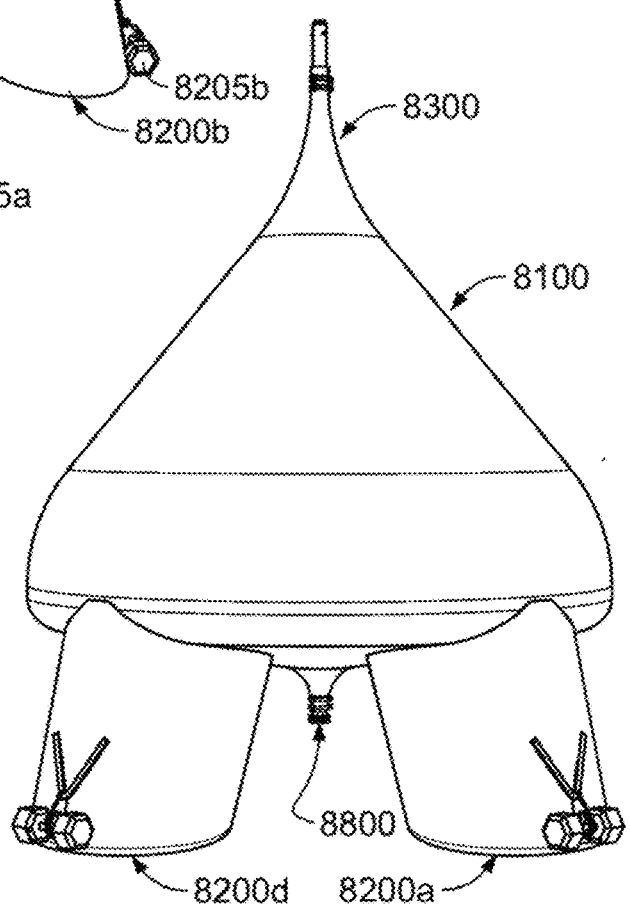
FIG. 11B is a front elevational view of the aircraft-landing structure of FIG. 11A.
Figure 11C:
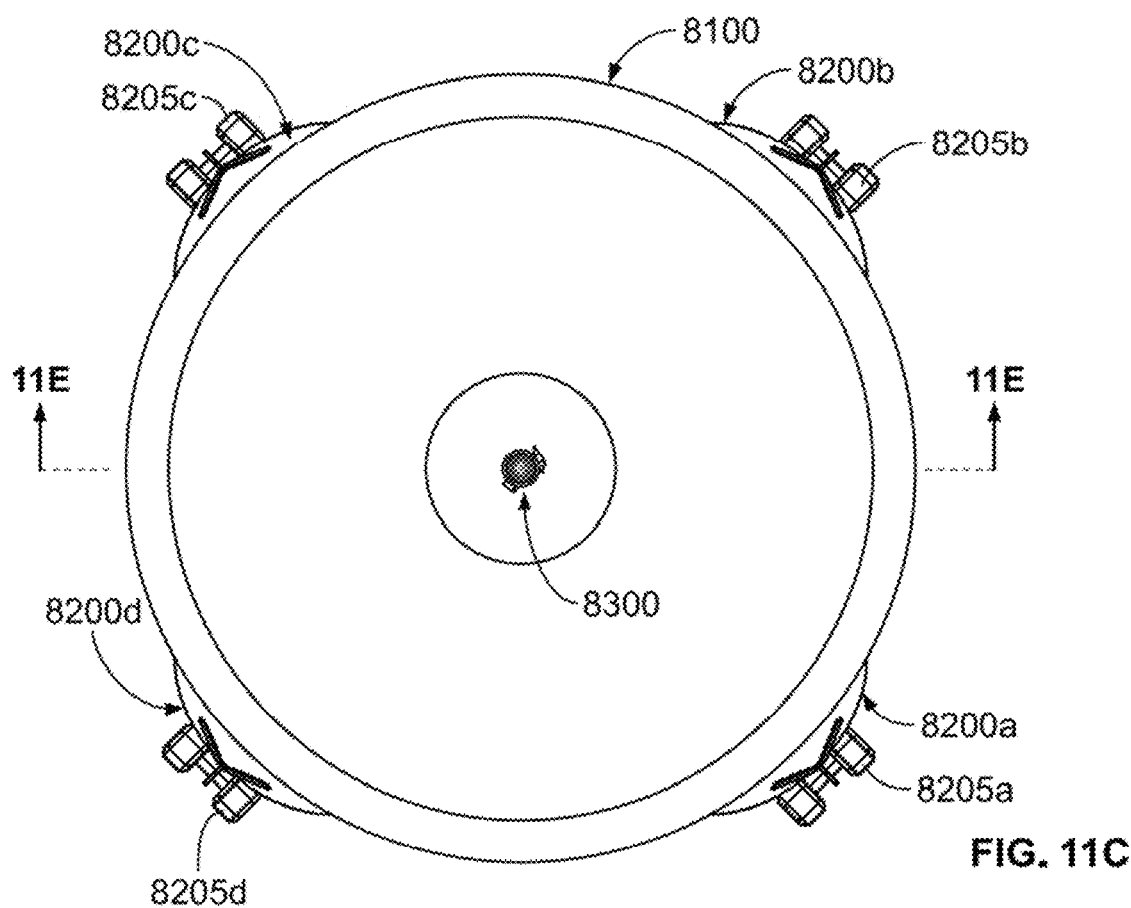
FIG. 11C is a top plan view of the aircraft-landing structure of FIG. 11A.
Figure 11D:
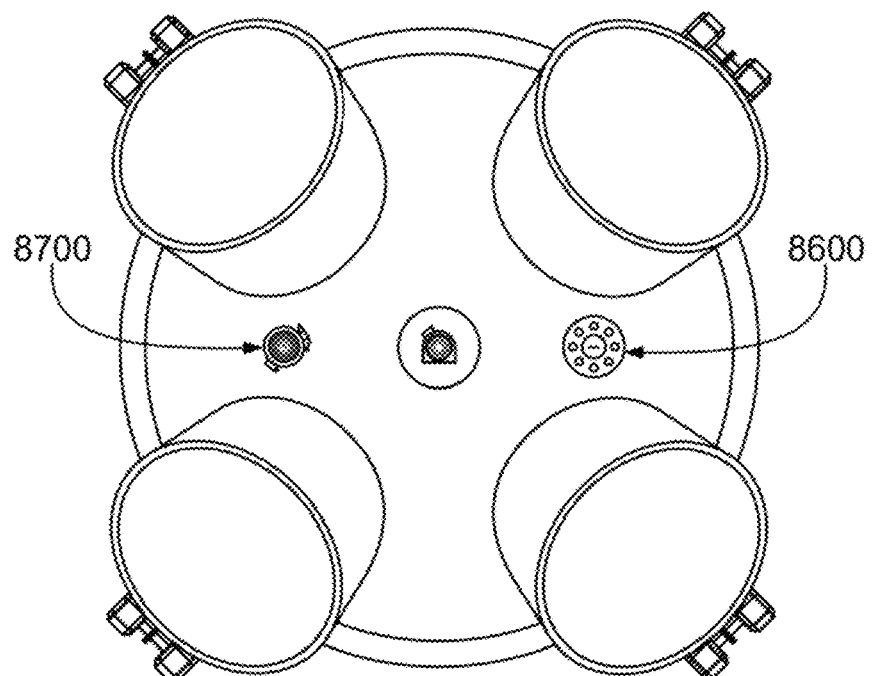
FIG. 11D is a bottom plan view of the aircraft-landing structure of FIG. 11A.
Figure 11E:
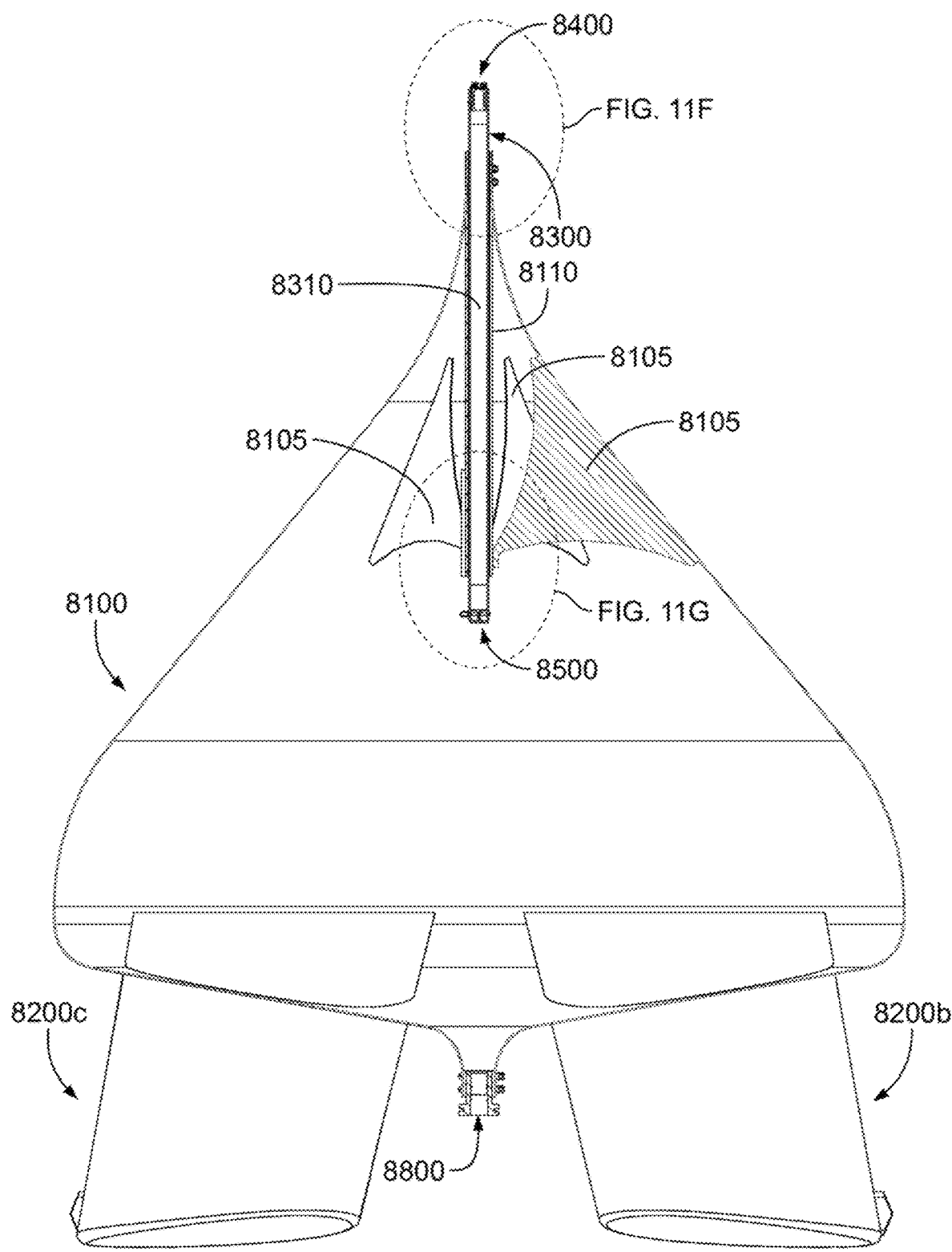
FIG. 11E is a cross-sectional side elevational view of the aircraft-landing structure of FIG. 11A taken substantially along line 11E-11E of FIG. 11C.
Figure 11F:
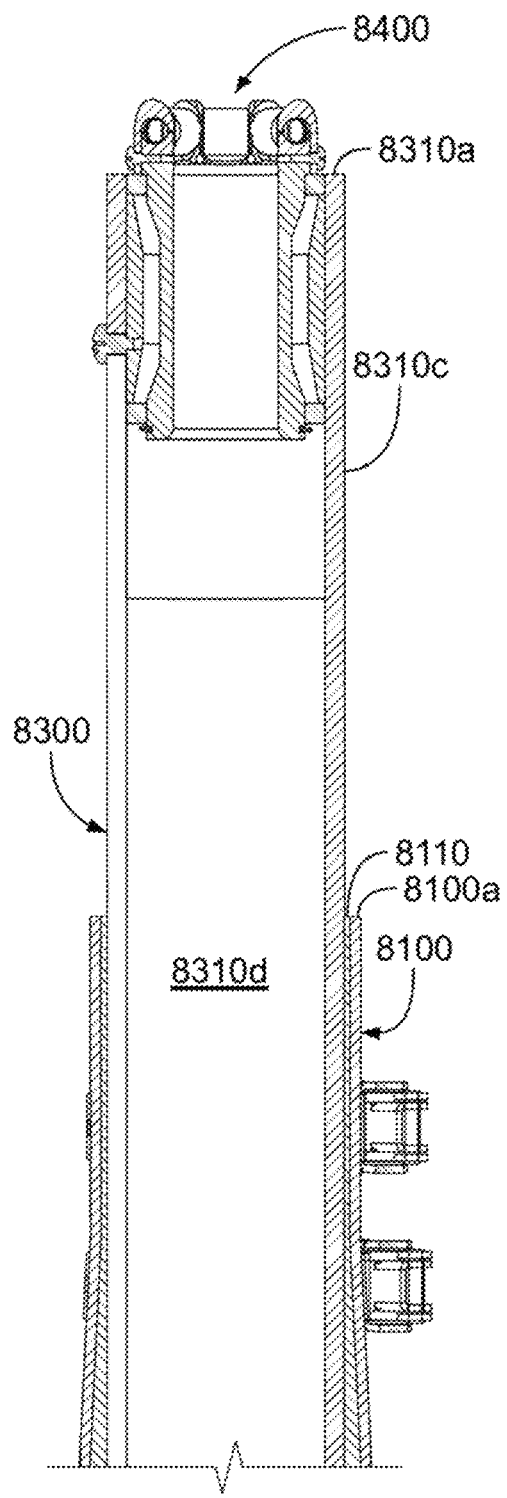
FIG. 11F is a cross-sectional side elevational view of an upper portion of the aircraft-landing structure of FIG. 11A taken substantially along line 11E-11E of FIG. 11C.
Figure 11G:
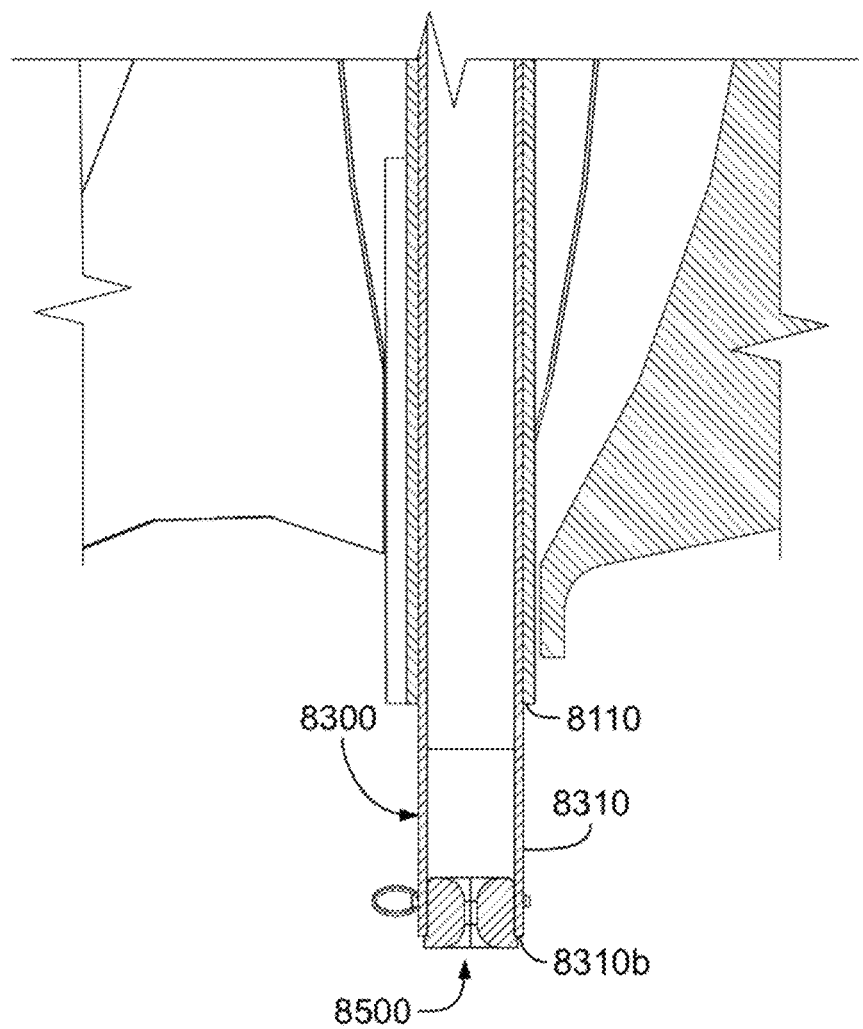
FIG. 11G is a cross-sectional side elevational view of an intermediate portion of the aircraft-landing structure of FIG. 11A taken substantially along line 11E-11E of FIG. 11C.
Figure 11J:
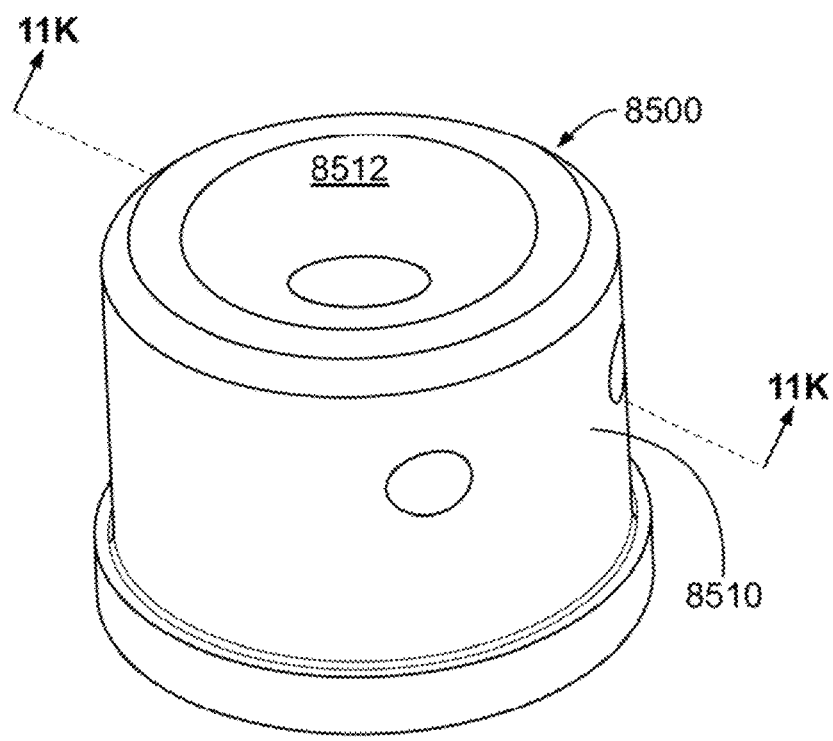
FIG. 11J is a top perspective view of the intermediate guiding component of the aircraft-landing structure of FIG. 11A.
Figure 11K:
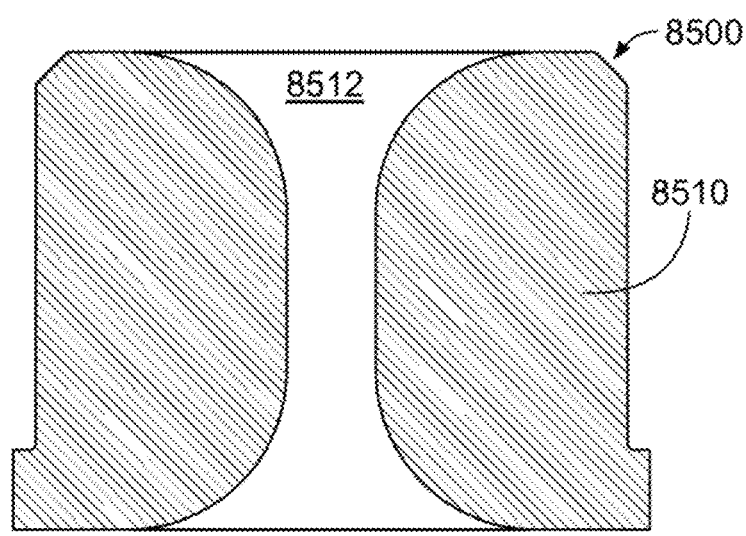
FIG. 11K is a cross-sectional side elevational view of the intermediate guiding component of FIG. 11J taken substantially along line 11K-11K of FIG. 11J.

As best shown in FIGS. 11J and 11K, the intermediate guiding component 8500 includes a body 8510 having an inner surface 8512. Moving from top to bottom in FIG. 11K, the inner surface 8512 tapers radially inwardly into a cylindrical shape and then tapers back radially outwardly. The inner surface 8512 defines a flexible capture member receiving bore. The body 8510 is fixedly attached to the second end 8310b of the spacer 8310 of the guiding assembly 8300 via one or more fasteners.

Figure 11L:
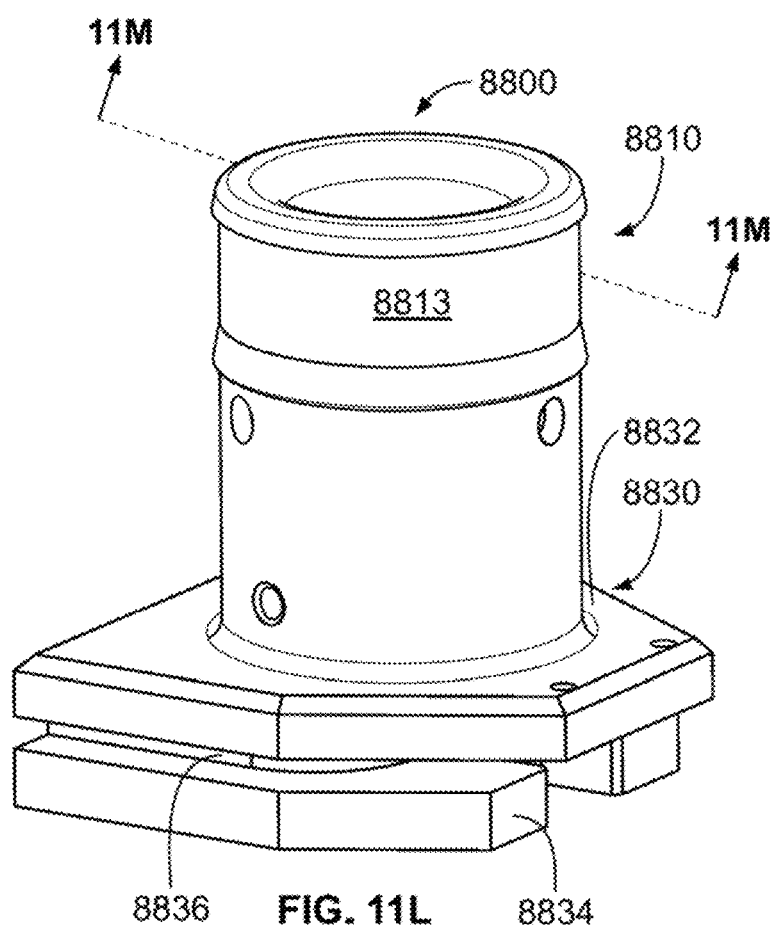
FIG. 11L is a top perspective view of the lower guiding and mounting component of the aircraft-landing structure of FIG. 11A.
Figure 11M:
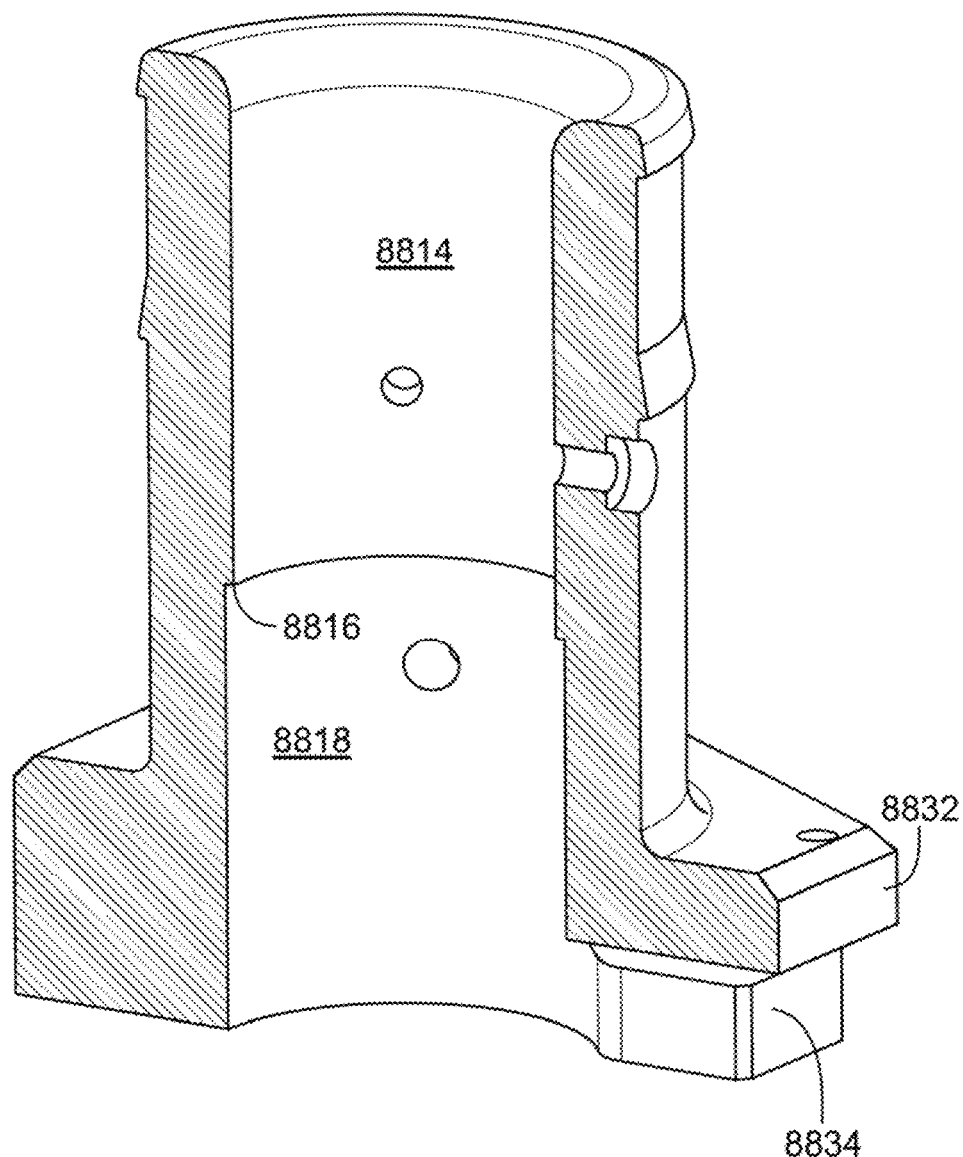
FIG. 11M is a cross-sectional side elevational view of the lower guiding and mounting component of FIG. 11L taken substantially along line 11M-11M of FIG. 11L.

As best shown in FIGS. 11L and 11M, the lower guiding and mounting component 8800 includes a transition assembly receiving component 8810 connected to an anchor system base mounting component 8830. The transition assembly receiving component 8810 is generally cylindrical and includes an exterior cylindrical aircraft-landing structure attachment surface 8813 and interior cylindrical surfaces 8814 and 8818. An annular lip 8816 that extends radially outwardly from the cylindrical surface 8818 separates the interior cylindrical surfaces 8814 and 8818. The interior cylindrical surface 8814 defines a flexible capture member receiving bore, and the interior cylindrical surface 8818 defines a transition assembly receiving bore.

The anchor system base mounting component 8830 includes an upper portion 8832 and a lower portion 8834 spaced apart by a middle portion 8836. The middle portion 8836 is partially recessed radially inward relative to the upper and lower portions 8832 and 8834. This defines an anchor system base receiving channel (not labeled). As best shown in FIG. 11E, hose clamps (not labeled) clamp a lower portion (not labeled) of the aircraft-supporting body 8100 to the aircraft-landing structure attachment surface 8813 of the transition assembly receiving component 8810 to attach these components to one another. The transition assembly receiving bore receives part of the transition assembly 3700 in the transition assembly receiving bore, and a fastener is used to attach the transition assembly 3700 to the transition assembly receiving bore. Once attached, the flexible capture member receiving bore of the lower guiding and mounting component 8800 is in fluid communication with the flexible capture member receiving bore of the transition assembly 3700. The lower guiding and mounting component 8800 is attached to the anchor system base 3100 via the anchor system base receiving channel. That is, the anchor system base 3100 slidably receives the lower guiding and mounting component 8800. A fastener may be used to further secure these elements together.

As best shown in FIG. 11D, the inflation device 8600 is attached to (such as via stitching, adhesive, or in any other suitable manner) and extends downward from the underside of the aircraft-supporting body 8100. The inflation device 8600 is in fluid communication with the interior of the aircraft-supporting body 8100 (which is in fluid communication with the interiors of the supports 8200a-8200d). The inflation device 8600 is sized, positioned, and otherwise configured to be attached to a suitable inflator (such as via a hose clamp or any other suitable manner of attachment) to enable inflation of the aircraft-supporting body 8100 and the supports 8200 and 8300 as described below.

As best shown in FIG. 11D, the deflation device 8700 is located on the underside of the aircraft-supporting body 8100. The deflation device 8700 includes a deflation element, such as a removable cap or a valve, that is switchable between a deflation configuration in which the deflation element enables air to flow out of the aircraft-supporting body 8100 and a sealed configuration in which the deflation element does not enable air to flow out of the aircraft-supporting body 8100. The deflation device 8700 enables an operator to quickly deflate the aircraft-supporting body 8100 and the supports 8200a-8200d with minimal effort, such as by removing a cap or opening a valve.

In another embodiment, the aircraft-landing structure does not include the intermediate guiding element. In this embodiment, the upper guiding element and the lower guiding and mounting element are attached to opposing ends of the spacer such that the spacer extends between the upper guiding element and the lower guiding and mounting element.

In another embodiment, the anchor system base threadably receives the lower guiding and mounting component.

In other embodiments, the aircraft-supporting body includes stabilizing ribs extending along its tapered walls. In further embodiments, the bottom of the aircraft-supporting body is stiff in bending.

In another embodiment, a plurality of tension members are attached to and extend between the interior of the aircraft-supporting body and the outer surface of the flexible capture member receiving tube. These tension members help support the weight/tension of the flexible capture member receiving tube and help maintain the apex of the aircraft-landing structure erect.

In certain embodiments, tie-downs (such as ropes, bungees, and the like) may be used to secure the aircraft-landing structure to the ground or to a suitable base structure, such as the above-described aircraft system base.

In other embodiments, the aircraft-supporting body is formed from compliant rods rather than inflatable tubes.

5. Flexible Capture Member

As best shown in FIGS. 12D-12G, the flexible capture member 5000 is attachable to the multicopter 10 and the anchor system 3000 and threadable through the aircraft-landing structure 8000 to facilitate retrieval of the fixed-wing aircraft 20a from free, wing-borne flight. The flexible capture member may be a rope (such as a Spectra rope) or other similar element.

In some embodiments, the flexible capture member includes an elastic portion, such as a bungee or similar element, at the end attachable to the multicopter. The elastic portion may be rigged such that a portion of the strain energy is directed into a damping element such as a metal ring or a one-way pulley. By rigging the elastic portion as a compliant damper (as opposed to a spring), more energy is absorbed during capture, and undesirable ricochet is minimized.

In some embodiments, the flexible capture member includes a capture portion that is thicker near its ends (such as within 12 feet of each end) that it is in its center. In one embodiment, both ends of the capture portion terminate in a Brummel eye splice in which the buried tails constitute the thicker portion of the capture portion.

In some embodiments in which the flexible capture member includes a rope, the flexible capture member includes an elastic member inside the core of the rope. The elastic member shortens the rope as it slackens and is wound onto the drum. During payout, the elastic member allows the rope to lengthen as it leaves the drum, and a lossy payout device is formed.

6. Accessories Container and Other Components

Figure 9H:
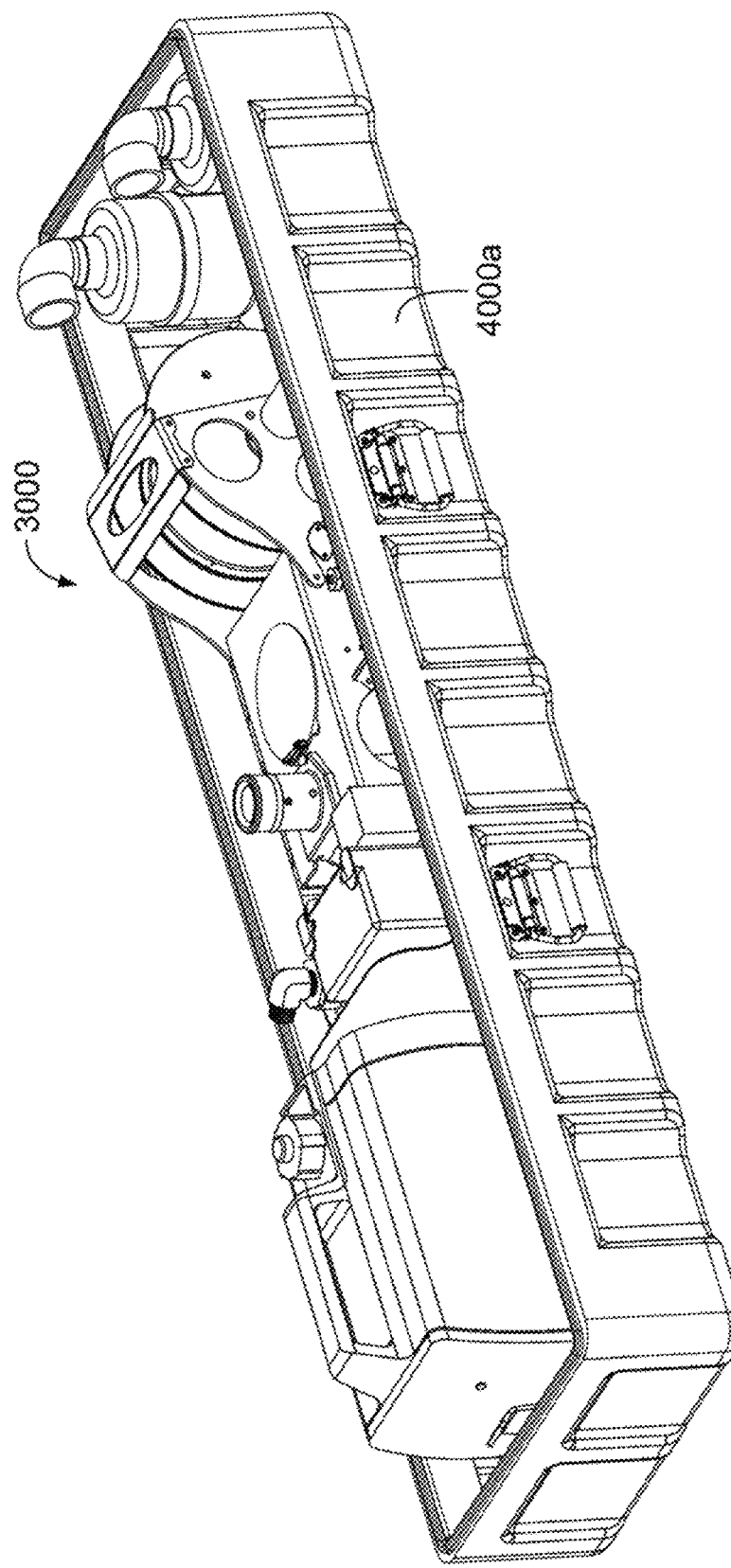
FIG. 9H is a top perspective view of the anchor system of FIGS. 9A and 9B stored in a storage container with other accessories.

As best shown in FIG. 9H, the anchor system 3000 is attached to the container bottom 4000a of an anchor system and accessory storage container to enable easy and compact storage of the anchor system 3000 and various accessories, such as (but not limited to): a generator; the flexible capture member 5000; an R/C transmitter stand that helps enforce geo-referenced joystick commands of the R/C controller; a fire extinguisher; shovels; hard hats. Further, certain components of the hydraulic system 7300 are attached to the container bottom 4000*a*.

7. Methods of Operation

As described in detail below: (1) the multicopter 10 and the storage and launch system 2000 are usable to facilitate launch of the fixed-wing aircraft 20*a* into free, wing-borne flight; and (2) the multicopter 10, the anchor system 3000, the flexible capture member 5000, and the aircraft-landing structure 8000 are usable to facilitate retrieval of the fixed-wing aircraft 20*a* from free, wing-borne flight.

7.1 Multicopter-Assisted Fixed-Wing Aircraft Launch Method

The multicopter-assisted fixed-wing aircraft launch method begins with the multicopter 10 disassembled and stored in the storage and launch system 2000, as best shown in FIG. 8A. The multicopter operator unpacks the 13 modules and moves the launch-assist assembly 2100 of the storage and launch system 2000 to its launch position, as best shown in FIG. 8C.

The multicopter operator (or the fixed-wing aircraft operator) mounts the fixed-wing aircraft 20*a* to the launch-assist assembly 2100 by: (1) disengaging the safety mechanism 2150 of the fuselage-retaining assembly 2130, which enables the pincers 2132 and 2134 to separate from the fuselage-retaining orientation to the fuselage-release orientation; (2) lowering the fuselage of the fixed-wing aircraft 20*a* between the pincers 2132 and 2134 (the fact that the safety mechanism 2150 is disengaged enables weight of the fixed-wing aircraft to force the pincers 2132 and 2134 to separate to receive the fuselage); (3) positioning the wings of the fixed-wing aircraft 20*a* on the wing engaging surfaces 2121*a* and 2123*a* of the aircraft engaging bracket 2120 of the launch-assist assembly 2100; and (4) engaging the safety mechanism 2150, which prevents the pincers 2132 and 2134 from separating to the fuselage-release position and retains the fuselage of the fixed-wing aircraft 20*a* between the pincers 2132 and 2134. FIG. 8D shows the fixed-wing aircraft 20*a* mounted to the launch-assist assembly 2100 in this manner.

The multicopter operator (or the fixed-wing aircraft operator) selects the appropriate cooling nozzle for the engine cooling system for the fixed-wing aircraft 20*a*. The multicopter operator attaches that cooling nozzle to the engine cooling system and hangs the engine cooling system on the back of the aircraft engaging bracket 2120 of the launch-assist assembly 2100 such that the engine of the fixed-wing aircraft 20*a* is in the cooling nozzle's path.

The multicopter operator switches on an idle power circuit of the multicopter 10 to perform various preflight checks, such as operating mode status checks, throttle response checks, attitude indicator response checks, heading accuracy checks, R/C range checks, and the like. Switching on the idle power circuit does not power the rotor motors. The idle power circuit thus enables the multicopter operator to conduct most preflight checks without having to worry about accidentally switching on one or more of the rotor motors.

The multicopter operator then attaches the hub module 100 to the fixed-wing aircraft 20*a* by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo arm 392 into the cam rotation-preventing rotational position (clockwise from this viewpoint) such that the lock servo motor locking extension 392*a* on the end of the lock servo arm 392 engages the cam servo motor arm lock device 382*a* of the cam servo motor arm 382; and (3) seating a rearwardly curved hook 21 attached to the fuselage of the fixed-wing aircraft 20*a* on the cam 350 such that hook generally rests on the ridge 351 of the cam 350 and the tip of the hook is disposed in the valley 353 of the cam 350. FIG. 12A shows the hub module 100 attached to the fixed-wing aircraft 20*a*.

At this point the fixed-wing aircraft 20*a* is attached to the cam 350 (and the hub base 100), the fuselage of the fixed-wing aircraft 20*a* contacts the front and rear aircraft engaging brackets 340*a* and 340*b* (to prevent rotation about the pitch and yaw axes of the fixed-wing aircraft 20*a*), and the stabilizers 290*a* and 290*b* contact the wings of the fixed-wing aircraft 20*a* (to prevent rotation about the roll axis of the fixed-wing aircraft 20*a*).

Since the lock servo motor locking extension 392*a* is engaged to the cam servo motor arm lock device 382*a* of the cam servo motor arm 382, the cam servo motor 381 cannot rotate the cam 350 from the attached rotational position to the release rotational position (counter-clockwise from this viewpoint). This prevents undesired release of the fixed-wing aircraft 20*a* from the cam 350 (and thus the multicopter 10).

After the hub module 100 is attached to the fixed-wing aircraft 20*a*, the multicopter operator: (1) attaches the front and rear landing gear modules 600*a* to 600*d* to their respective front and rear landing gear extension modules 500*a* to 500*d*; (2) attaches the front and rear landing gear extension modules 500*a* to 500*d* to their respective rotor arm modules 400*a* to 400*d*; and (3) attaches and locks the rotor arm modules 400*a* to 400*d* to the hub module 100 to complete assembly of the multicopter 10.

The multicopter operator ensures the front and rear landing gear modules 600*a* to 600*d* are not in the path of rotation of the rotors of their corresponding rotor arm modules 400*a* to 400*b*, and connects the main power line of the multicopter 10. Unlike the idle power circuit, the main power lines are capable of delivering current sufficient to drive the rotor motors and cause the multicopter 10 to fly.

The multicopter operator begins the engine start-up procedure for the fixed-wing aircraft 20*a*. The multicopter operator selects the ALTHOLD flight mode for the multicopter 10. The multicopter operator (or an assistant) disengages the safety mechanism 2150 of the fuselage-retaining assembly 2130, which enables the pincers 2132 and 2134 to separate from the fuselage-retaining orientation to the fuselage-release orientation.

The multicopter operator advances the throttle to begin vertically climbing and lift the fixed-wing aircraft 20*a* from between the pincers 2132 and 2134 (which are free to separate and release the fuselage of the fixed-wing aircraft 20*a* since the safety mechanism 2150 is disengaged). Once the multicopter 10 and attached fixed-wing aircraft 20*a* have reached a designated altitude, the multicopter operator controls the multicopter 10 to begin dashing forward. At this point, if the airspeed, GPS reception, and pitch angle of the fixed-wing aircraft 20*a* is within a suitable range (e.g., 10 to 20 degrees), the multicopter 10 can release the fixed-wing aircraft 20*a*.

Releasing the fixed-wing aircraft 20*a* from the cam 350 (and the multicopter 10) is a two-step process, as shown in FIGS. 12B and 12C. To release the fixed-wing aircraft 20*a* from the cam 350 (and thus the multicopter 10), the multicopter operator first remotely controls the lock servo motor 391 (via the R/C controller) to rotate the lock servo arm 392 into the cam rotation-enabling rotational position (counterclockwise from this viewpoint). Second, the multicopter operator remotely controls the cam servo motor 381 (via the R/C controller) to rotate the cam 350 from the attached rotational position to the release rotational position (counterclockwise from this viewpoint). As shown in the progression from FIG. 12B to FIG. 12C, as the cam servo motor 381 rotates the cam 350 from the attached rotational position to the release rotational position, the valley 352 and the ascending edge of the ridge 353 forces the hook 21 off of the cam 350, thereby releasing the fixed-wing aircraft 20a from the cam 350 (and the multicopter 10).

After release, the multicopter operator may switch the multicopter 10 to half-power mode and recover the multicopter 10 either manually via ALTHOLD and/or LOITER flight modes or semi-autonomously via RTL flight mode.

7.2 Multicopter-Assisted Fixed-Wing Aircraft Retrieval Method

FIGS. 12D-12G diagrammatically show retrieval of the fixed-wing aircraft 20a from free, wing-borne flight via use of the multicopter 10, the anchor system 3000, the flexible capture member 5000, and the aircraft-landing structure 8000. FIG. 12H is a graph 7900 of the pressure P1 of the hydraulic fluid at the accumulator 7352 of the hydraulic system 7300 over time during the fixed-wing aircraft retrieval process. For simplicity, in this example embodiment P1 is assumed to be 0 psi at time T0.

To retrieve the fixed-wing aircraft 20a from free, wing-borne flight, the anchor system operator positions the anchor system 3000 at a retrieval location. Before time T0, while the electric hydraulic pump 7350 is switched off, the anchor system operator pulls some of the flexible capture member 5000 off of the drum 3510 and feeds it through the level wind system 3600 and around the transition pulley 3730 of the transition assembly 3700. From there, the anchor system operator feeds the flexible capture member 5000 through the flexible capture member receiving bores of the transition assembly 3700, the lower guiding and mounting component 8800, the intermediate guiding component 8500, and the upper guiding component 8400 such that the free end of the flexible capture member 5000 exits the upper guiding component 8400. The anchor system operator then attaches the free end of the flexible capture member 5000 to the hub module 100 of the multicopter 10 in a suitable manner. Since the flexible capture member 5000 is slack between the drum 3510 and the multicopter 10, $F_{OPPOSING}$ is negligible at time T0. The anchor system operator activates a blower (not shown) to inflate the aircraft-landing structure 8000.

At time T0, the anchor system operator switches the electric hydraulic pump 7350 on to begin a haul-in phase of the fixed-wing aircraft retrieval process to take up the slack in the flexible capture member 5000. Since P1 is 0 psi—i.e., less than the 650 psi pressure switch lower set point—the pressure switch 7364 electrically connects the power source 7400 and the electric hydraulic pump 7350. As described above, the electric hydraulic pump 7350 pumps hydraulic fluid at the 800 psi pump outlet pressure to drive the hydraulic motor 7358 to rotate the drum 3510 counterclockwise (from the viewpoint in FIG. 10A) and take up the slack in the flexible capture member 5000.

At time T1, all of the slack in the flexible capture member 5000 has wound around the drum 3510, and $F_{OPPOSING}$ equals $F_{DRUM}$. This begins a neutral phase of the fixed-wing aircraft retrieval process before multicopter climb. Flow through the hydraulic motor 7358 slows to mere leakage, and electric hydraulic pump 7350 begins charging the accumulator 7352. Once P1 reaches the 800 psi pressure switch upper set point, the pressure switch 7364 electrically disconnects the power source 7400 and the electric hydraulic pump 7350. The accumulator 7352 begins discharging in response to for the hydraulic fluid leaking through the hydraulic motor 7358. The pressure switch 7364 continues alternating between electrically connecting and electrically disconnecting the power source 7400 and the electric hydraulic pump 7350 during the neutral phase so P1 alternates between 650 and 800 psi.

At time T2, the multicopter operator begins controlling the multicopter 10 to ascend to a retrieval position above the anchor system 3000. This begins a payout phase of the fixed-wing aircraft retrieval process. The climbing multicopter 10 exerts a force $F_{OPPOSING}$ on the flexible capture member 5000 that exceeds $F_{DRUM}$, which causes the drum 3510 to spin clockwise (from the viewpoint in FIG. 10D) and payout the flexible capture member 5000. As described above, this increases P1 to (or even above) the 850 psi pressure relief valve set point. Once the multicopter 10 reaches its desired height (just before time T3), the multicopter operator controls the multicopter 10 to stop climbing and begin station-keeping relative to the anchor system 3000. Since $F_{OPPOSING}$ equals $F_{DRUM}$, P1 decreases to 800 psi.

Figure 12D:
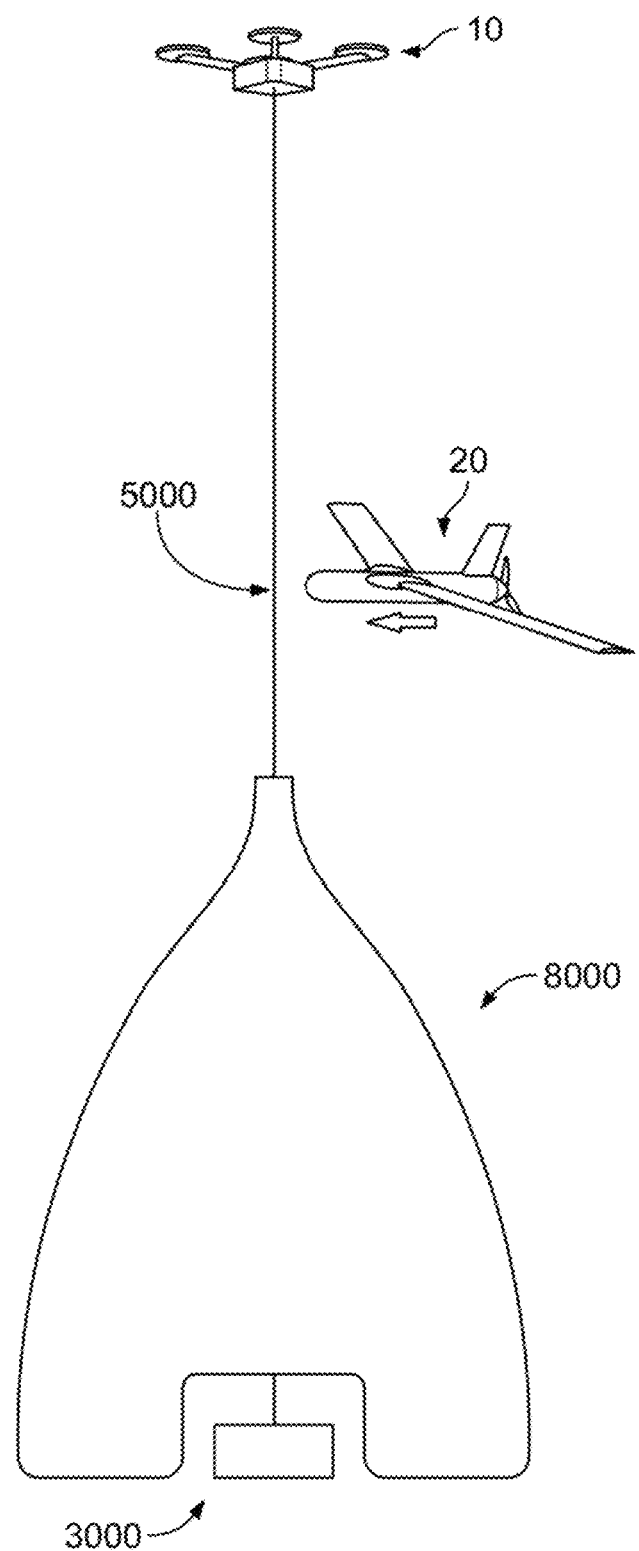
FIG. 12D is a diagrammatic view of the multicopter of FIG. 1A, the fixed-wing aircraft of FIG. 1A, a flexible capture member, the aircraft-landing structure of FIG. 11A, and the anchor system of FIGS. 9A and 9B just before the fixed-wing aircraft captures the flexible capture member.

At time T3, as shown in FIG. 12D, the multicopter operator controls the multicopter 10 to station-keep relative to the anchor system 3000, at which point $F_{OPPOSING}$ equals $F_{DRUM}$. This begins a neutral phase of the fixed-wing aircraft retrieval process, described above with respect to T1 through T2.

At time T4, as shown in FIG. 12E, the fixed-wing aircraft operator controls the fixed-wing aircraft 20a to contact and capture part of the flexible capture member 5000 extending between the multicopter 10 and the drum 3510. This begins a payout phase of the fixed-wing aircraft retrieval process. The impact of the fixed-wing aircraft 20a on the flexible capture member 5000 exerts a force $F_{OPPOSING}$ on the flexible capture member 5000 that exceeds $F_{DRUM}$, which causes the drum 3510 to spin clockwise (from the viewpoint in FIG. 10D) and payout the flexible capture member 5000. As described above, this increases P1 to (or even above) 850 psi—i.e., the pressure relief valve set point. In the payout phase, P1 maintains its 850 psi value as of time T4. Once the movement of the fixed-wing aircraft 20a has dampened such that $F_{OPPOSING}$ no longer exceeds $F_{DRUM}$ (just before time T5), P1 decreases to 800 psi.

At time T5, as shown in FIG. 12F, the multicopter operator controls the multicopter 10 to descend toward the aircraft-landing structure 8000, and there is slack in the flexible capture member 5000 extending between the captured fixed-wing aircraft 20a and the drum 3510. Accordingly, $F_{OPPOSING}$ is less than $F_{DRUM}$, and the haul-in phase begins, as described above for time T0 through T1.

Figure 12G:
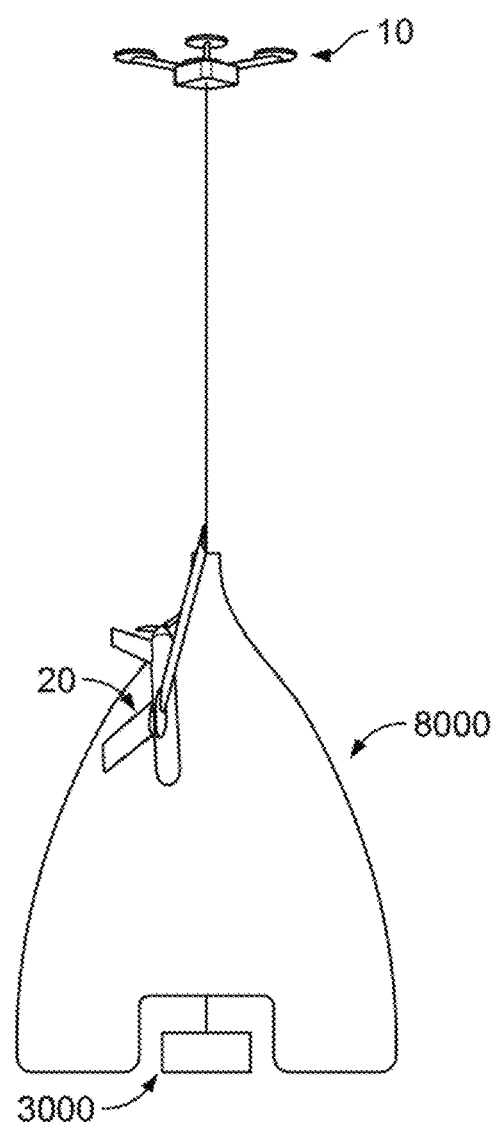
FIG. 12G is a diagrammatic view of the multicopter, the fixed-wing aircraft, the flexible capture member, the aircraft-landing structure, and the anchor system after the multicopter has lowered the fixed-wing aircraft onto the aircraft-landing structure.
Figure 12H:
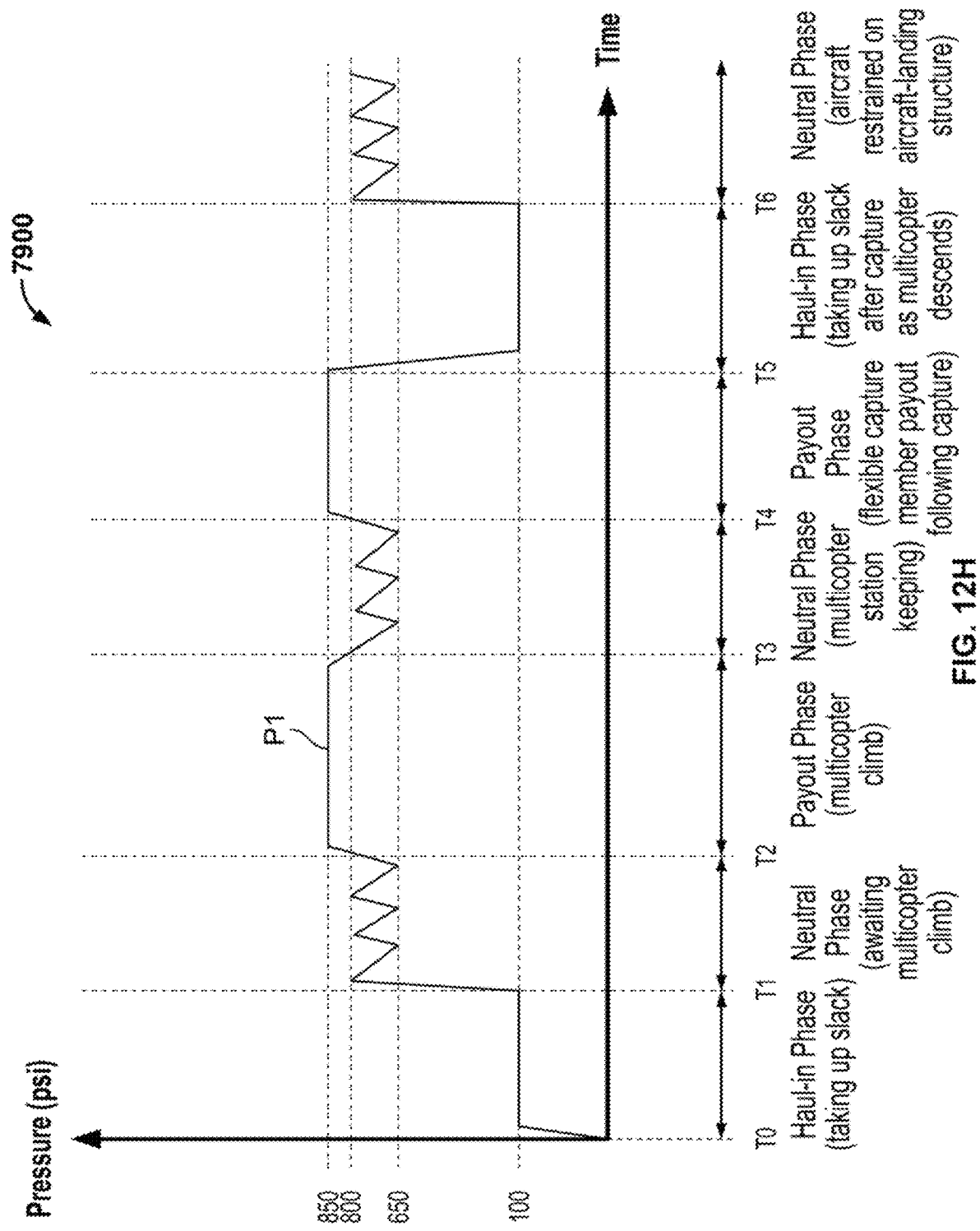
FIG. 12H is a graph of two pressures during the fixed-wing aircraft retrieval process employing the anchor system with the hydraulic system of FIGS. 10A-10D.

At time T6, as shown in FIG. 12G, after the fixed-wing aircraft 20a has reached and is resting on the aircraft-landing structure 8000, the multicopter operator controls the multicopter 10 to hover, and $F_{OPPOSING}$ equals $F_{DRUM}$. This begins a neutral phase of the fixed-wing aircraft retrieval process, described above with respect to T1 through T2. The multicopter operator controls the multicopter 10 to land clear of the aircraft-landing structure 8000 and the fixed-wing aircraft 20a.

The hydraulic system 7300 of the anchor system 3000 is configured to ensure the fixed-wing aircraft 20a remains atop the aircraft landing structure 8000. For this to happen, the force $F_{DRUM}$ must be greater than the weight of the fixed-wing aircraft 20a. In this example embodiment, the fixed-wing aircraft 20a weighs about 60 pounds while $F_{DRUM}$ is about 80 pounds in the neutral phase, so the hydraulic system ensures the fixed-wing aircraft 20a remains atop the aircraft landing structure 8000.

Additionally, the aircraft landing structure 8000 is sized, shaped, and inflated at a suitable pressure to support the fixed-wing aircraft 20a without buckling or tipping over to ensure that the fixed-wing aircraft 20a does not fall to the ground. In this example embodiment, a 0.3 psi inflation pressure is used along with inflatable supports that have 1200 square inch footprints such that each inflatable support can support about 360 pounds without buckling. The fixed-wing aircraft 20a weighs about 60 pounds, so the inflatable supports are more than able to support the fixed-wing aircraft 20a even under severe wind loading conditions. For instance, even a 30 mph wind pushing sideways on the aircraft-landing structure would apply a maximum compression of 100 pounds on a leeward inflatable support (assuming 50 pound weights are used to weigh each inflatable support down, as described above). This plus the 60 pound fixed-wing aircraft's weight is well below the 360 pound maximum.

The anchor system 3000 is therefore configured to quickly and automatically modify its operation to regulate the force $F_{DRUM}$ applied to the flexible capture member as the fixed-wing aircraft retrieval process switches between the haul-in, neutral, and payout phases.

8. Alternative Hydraulic System

FIGS. 13A-13D illustrate part of a second embodiment of the hydraulic system 7300a that includes: (1) the electric hydraulic pump 7350; (2) the accumulator 7352; (3) a pressure regulator 7354 (such as the Hydraulic Pressure Regulator #9474T11 sold by McMaster-Carr) having an inlet port and an outlet port; (4) the pressure relief valve 7356; (5) the hydraulic motor 7358; (6) a check valve 7360 (such as the Super High-Pressure Check Valve #5010K63 sold by McMaster-Carr) having an inlet port and an outlet port; (7) the hydraulic fluid tank 7362; and (8) the pressure switch 7364.

The inlet port of the electric hydraulic pump 7350 is in fluid communication with the outlet port of the tank 7362, and the outlet port of the electric hydraulic pump 7350 is in fluid communication with the inlet/outlet port of the accumulator 7352 and the inlet port of the pressure regulator 7354. The outlet port of the pressure regulator 7354 is in fluid communication with the inlet port of the pressure relief valve 7356 and the inlet port of the hydraulic motor 7358. The inlet port of the hydraulic motor 7358 is in fluid communication with the inlet port of the pressure relief valve 7356. The outlet port of the hydraulic motor 7358 is in fluid communication with the outlet port of the pressure relief valve 7356 and the inlet port of the check valve 7360. The outlet port of the check valve 7360 is in fluid communication with the inlet port of the tank 7362. In this embodiment, these components are in fluid communication with one another via suitable flexible tubing (not shown), though any suitable lines, hoses, or tubing may be used to fluidically connect these components. The hydraulic system 7300a also includes various fittings and connectors (not shown) that facilitate fluidically connecting these components. These fittings and connectors are well-known in the art and are not described herein for brevity.

When electrically connected to a power source and powered on, the electric hydraulic pump 7350 draws hydraulic fluid (such as oil or any other suitable fluid) from the tank 7362 and through its inlet port and pumps the hydraulic fluid out of its outlet port at a pump outlet pressure (800 psi in this example embodiment).

In certain situations, as explained below, the accumulator 7352 receives hydraulic fluid at its inlet/outlet and stores hydraulic fluid at a particular pressure to reduce pressure switch chatter (as described below). The accumulator gas charge is preloaded to the pressure switch lower set point (800 psi in this example embodiment, as described below) to minimize pressure switch chatter frequency.

The pressure switch is configured to measure the pressure of hydraulic fluid at the accumulator 7352. The pressure switch 7364 selectively connects the electric hydraulic motor 7350 to a power source 7400 based on the pressure P1 of hydraulic fluid at the accumulator 7352. The pressure switch measures P1 and: (1) electrically connects the power source 7400 and the electric hydraulic pump 7350 when P1 is less than the pressure switch lower set point (800 psi in this example embodiment); and (2) electrically disconnects the power source 7400 and the electric hydraulic pump 7350 when P1 is greater than or equal to a pressure switch upper set point (1,000 psi in this example embodiment). The combination of the accumulator 7352 and the pressure switch 7364 ensures that the electric hydraulic pump 7350 only operates as needed to maintain the pressure of the hydraulic fluid in the accumulator 7352.

The pressure regulator 7354 receives hydraulic fluid at its inlet port. If the pressure of the hydraulic fluid is greater than a pressure regulator set point (800 psi in this example embodiment), the pressure regulator 7354 reduces the pressure of the hydraulic fluid to the 800 psi pressure regulator set point and enables the reduced-pressure hydraulic fluid to exit its outlet port at this precisely tuned pressure regulator set point. If the pressure of the hydraulic fluid received at the inlet port is less than the 800 psi pressure regulator set point, the pressure regulator 7354 enables the hydraulic fluid to flow through it and exit its outlet port without substantially changing the pressure.

The pressure relief valve 7356 receives hydraulic fluid at its inlet port and prevents the hydraulic fluid from exiting its outlet port until the pressure of the hydraulic fluid reaches a pressure relief valve set point (850 psi in this example embodiment) that is greater than the 800 psi pressure regulator set point, as described above.

Depending on the scenario, the hydraulic motor 7358 receives hydraulic fluid at either its inlet port from the pressure regulator 7354 or its outlet port from the pressure relief valve 7356. When the hydraulic motor 7358 receives hydraulic fluid at its inlet port from the pressure regulator 7354, the hydraulic fluid flows through the hydraulic motor 7358 and exits its outlet port. The flow of the hydraulic fluid in this direction causes the output shaft of the hydraulic motor 7358 to rotate in a direction that, as described below, causes the flexible capture member to wrap around the drum 3510. On the other hand, when excessive force on the flexible capture member forces the drum 3510 to rotate in a manner that enables flexible capture member payout, the hydraulic motor 7358 receives hydraulic fluid at its outlet port from the pressure relief valve 7356, and the hydraulic fluid flows through the hydraulic motor 7358 and exits its inlet port. The flow of the hydraulic fluid in this direction is intentionally lossy, forming an energy sink for the kinetic energy of the aircraft being captured.

The check valve 7360 receives hydraulic fluid at its inlet port and enables the hydraulic fluid to exit its outlet port, but prevents hydraulic fluid (or air) from flowing from its outlet port to its inlet port. In other embodiments, the tension-regulating flexible capture member payout and retract device does not include the check valve 7360.

8.1 Flexible Capture Member Haul-In Phase

Figure 13A:
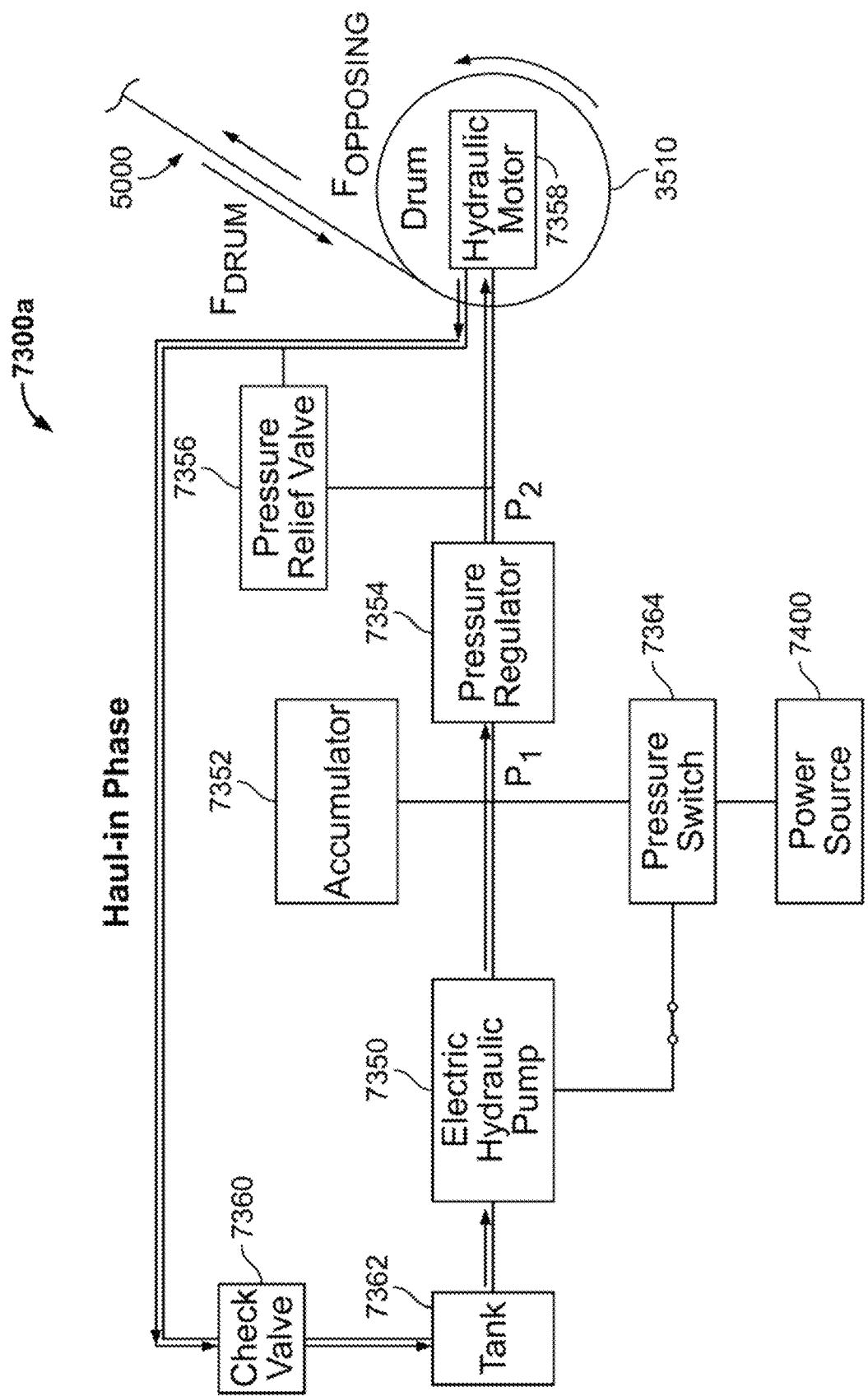
FIG. 13A is a schematic block diagram of an alternative hydraulic system of an alternative anchor system during a flexible capture member haul-in phase of the fixed-wing aircraft retrieval process.

FIG. 13A is a schematic block diagram of part of the hydraulic system, 7300*a* during the haul-in phase of the fixed-wing aircraft retrieval process.

During the haul-in phase, initially, the pressure P1 of the hydraulic fluid at the accumulator 7352 is below the 800 psi pressure switch lower set point. Accordingly, the pressure switch 7364 electrically connects the electric hydraulic pump 7350 to the power source 7400. The electric hydraulic pump 7350 draws hydraulic fluid from the tank 7362 and pumps the hydraulic fluid at the pump outlet pressure to the inlet/outlet port of the hydraulic accumulator 7352 and the inlet port of the hydraulic pressure regulator 7354.

Since at this point the pressure P1 of the hydraulic fluid at the accumulator 7352 is less than the 800 psi pressure switch lower set point, the pressure switch 7364 continues electrically connecting the electric hydraulic pump 7350 to the power source 7400 throughout the haul-in phase.

The pressure regulator 7354 enables the hydraulic fluid it receives from the electric hydraulic pump 7350 to flow through it. The hydraulic fluid flows from the outlet port of the pressure regulator 7354 to the inlet port of the pressure relief valve 7356 and the inlet port of the hydraulic motor 7358. Since the pressure P2 of the hydraulic fluid downstream of the pressure regulator 7354 and upstream of the pressure relief valve 7356 and the hydraulic motor 7358 is less than the 850 psi pressure relief valve set point, the pressure relief valve 7356 prevents the hydraulic fluid from flowing through it.

The hydraulic fluid instead flows from the outlet port of the pressure regulator 7354 to the inlet port of the hydraulic motor 7358, through the hydraulic motor 7358, and exits the outlet port of the hydraulic motor 7358. The flow of the hydraulic fluid through the hydraulic motor 7358 in this direction (i.e., from inlet port to outlet port) causes the output shaft of the hydraulic motor 7358 to exert a counter-clockwise (from the viewpoint of FIG. 13A) torque on the drum shaft. This torque imposes a force $F_{DRUM}$ on the flexible capture member 5000 via the drum 3510. Since the force $F_{OPPOSING}$ on the flexible capture member 5000 is less than $F_{DRUM}$, the torque the hydraulic motor 7358 exerts on the drum shaft causes the drum shaft and the drum 3510 to rotate counter-clockwise (from the viewpoint of FIG. 13A) relative to the anchor system base. This causes the flexible capture member 5000 to wrap around the drum 3510 (and decrease the amount of flexible capture member 5000 extending between the drum 3510 and the multicopter 10).

The hydraulic fluid flows from the outlet port of the hydraulic motor 7358 to the inlet port of the check valve 7360, and exits the outlet port of the check valve 7360 into the inlet port of the tank 7362.

In this example embodiment, the components and set points are sized, shaped, arranged, set, or otherwise configured such that $F_{DRUM}$ is about 80 pounds during the haul-in phase.

8.2 Neutral Phase

Figure 13B:
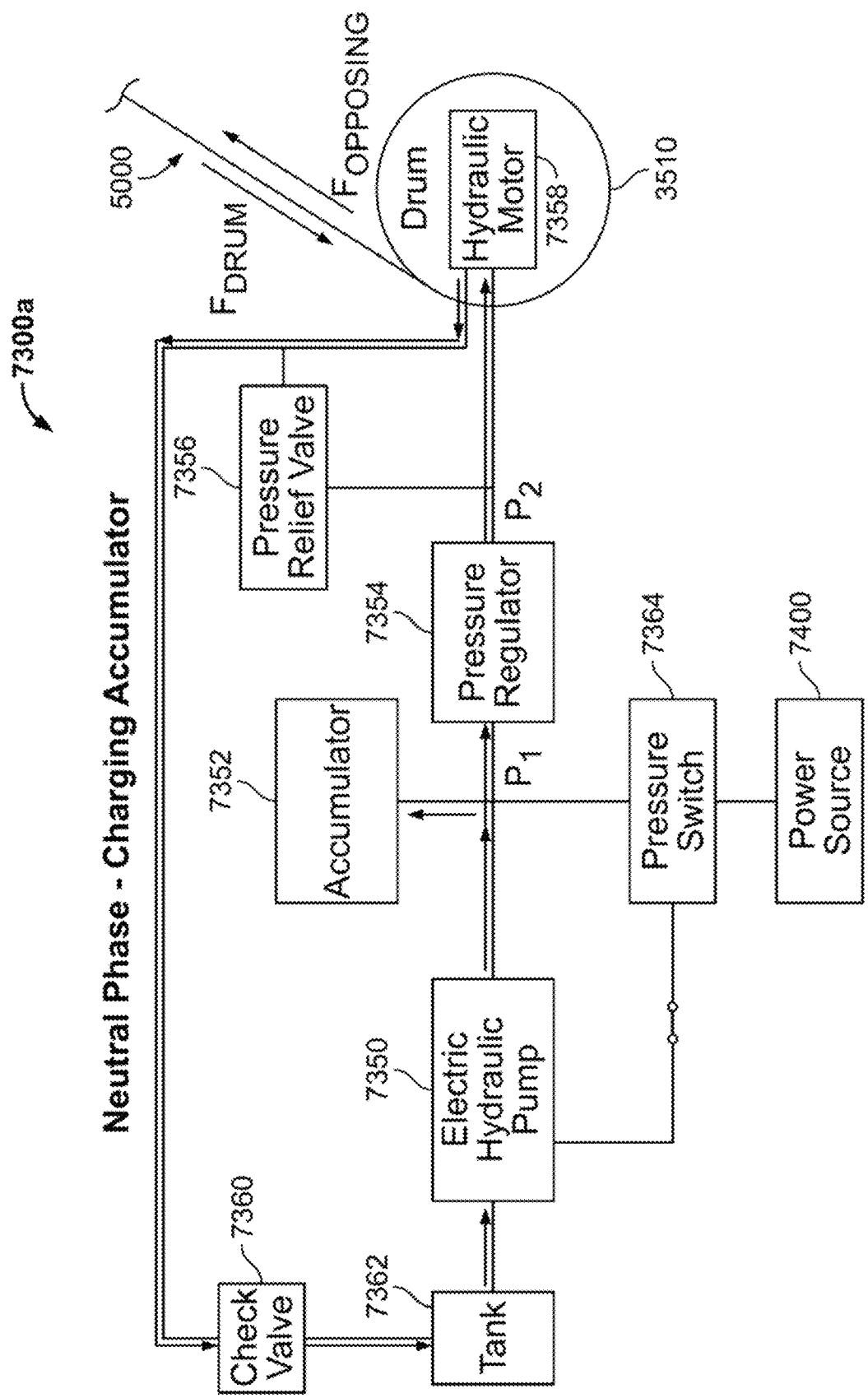
FIG. 13B is a schematic block diagram of the hydraulic system of FIG. 13A during a neutral phase of the fixed-wing aircraft retrieval process while the accumulator is charging.
Figure 13C:
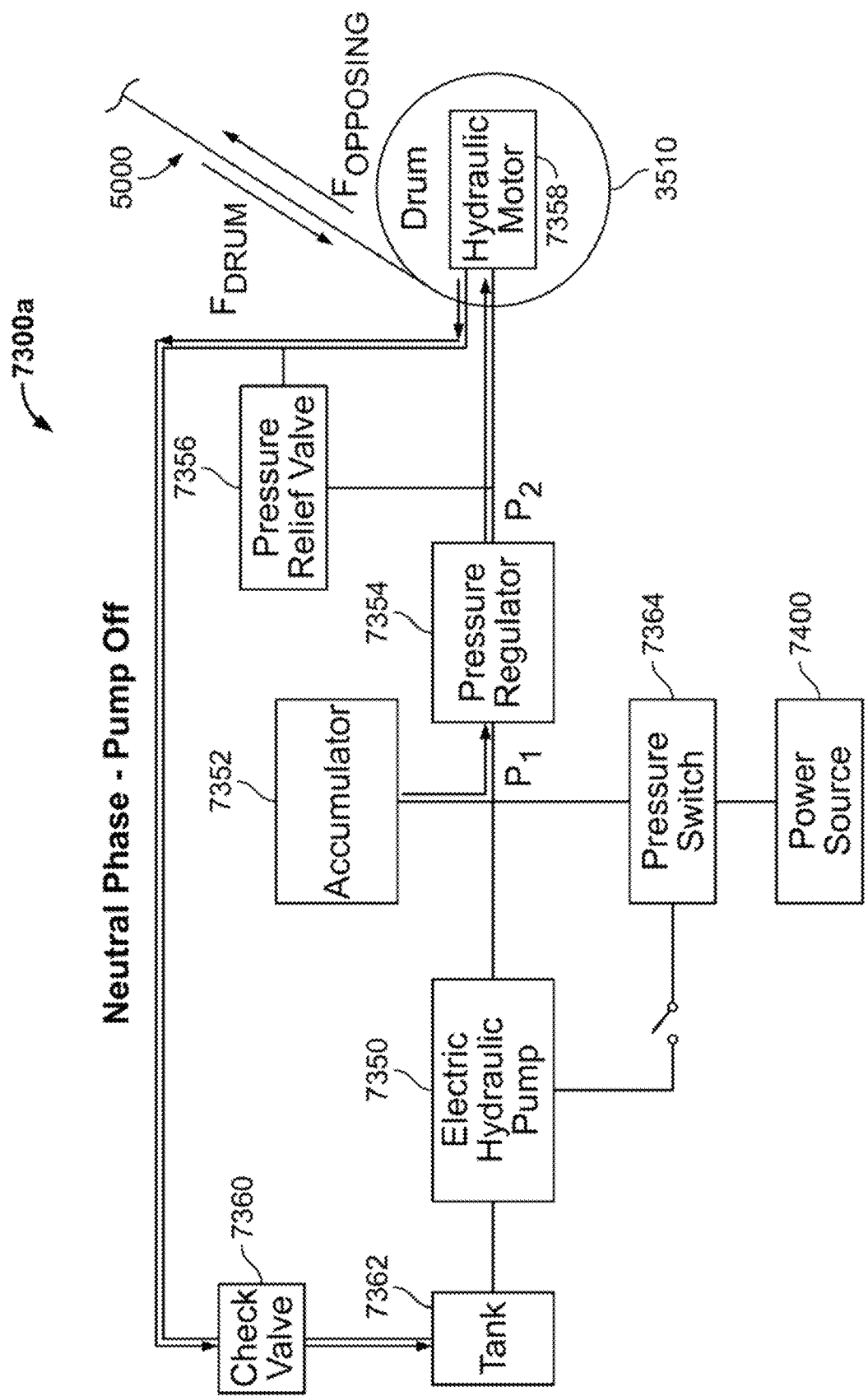
FIG. 13C is a schematic block diagram of the hydraulic system of FIG. 13A during a neutral phase of the fixed-wing aircraft retrieval process after the accumulator has been charged and the pump is powered off.

FIGS. 13B and 13C are schematic block diagrams of part of the hydraulic system 7300*a* during the neutral phase of the fixed-wing aircraft retrieval process.

In the neutral phase, the drum 3510 does not rotate relative to the anchor system base. Even so, hydraulic fluid leaks through the hydraulic motor 7358 and drains through the check valve 7360 and into the tank 7362. The accumulator 7352 eliminates the need to constantly run the electric hydraulic pump 7350 during the neutral phase in response to this leakage and ensure $F_{DRUM}$ remains constant to regulate the tension in the flexible capture member.

As shown in FIG. 13B, once $F_{OPPOSING}$ equals $F_{DRUM}$, the electric hydraulic pump 7350 continues to operate because P1 is less than the 800 psi pressure switch lower set point. But since hydraulic fluid flow through the hydraulic rotor 7358 has been reduced to mere leakage, pressure P1 begins to build and the accumulator 7352 begins charging. As shown in FIG. 13C, once the pressure P1 reaches the 1,000 psi pressure switch upper set point, the accumulator 7352 is charged and the pressure switch 7364 electrically disconnects the electric hydraulic pump 7350 from the power source 7400. The accumulator 7352 begins discharging to replenish the hydraulic fluid leaking through the hydraulic motor 7358. Once the pressure P1 falls below the 800 psi pressure switch lower set point, the pressure switch 7364 electrically connects the electric hydraulic pump 7350 to the power source 7400 to again charge the accumulator 7352. The use of the accumulator 7352 and the pressure switch 7364 therefore ensures that leakage through the hydraulic motor 7358 is accounted for and that $F_{DRUM}$ will not decrease as hydraulic fluid leaks through the hydraulic motor 7358.

In this example embodiment, the components and set points are sized, shaped, arranged, set, or otherwise configured such that $F_{DRUM}$ is about 80 pounds during the neutral phase.

8.3 Flexible Capture Member Payout Phase

Figure 13D:
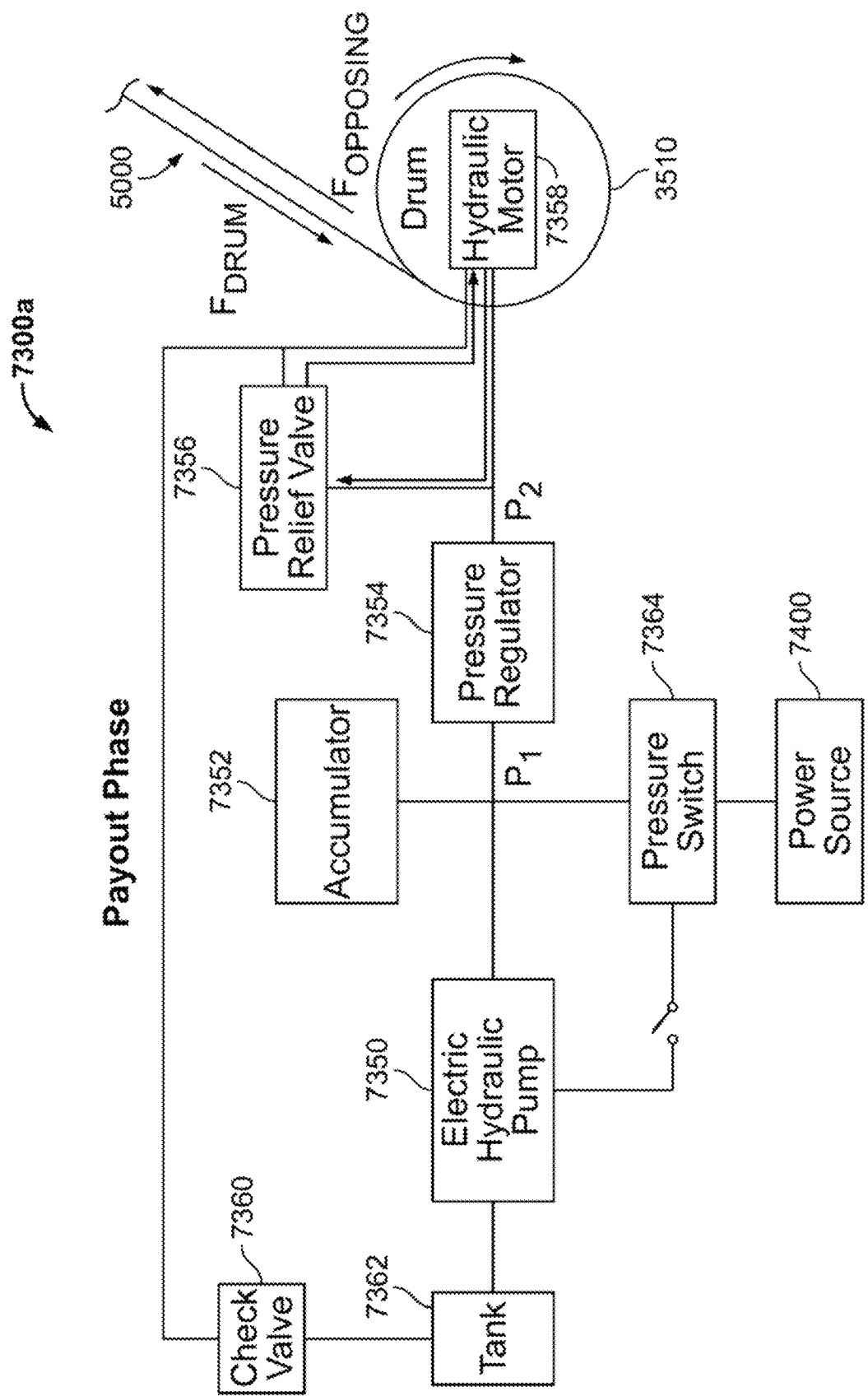
FIG. 13D is a schematic block diagram of the hydraulic system of FIG. 13A during a flexible capture member payout phase of the fixed-wing aircraft retrieval process.

FIG. 13D is a schematic block diagram of part of the tension-regulating flexible capture member payout and retract device 7300 during the payout phase of the fixed-wing aircraft retrieval process.

In the payout phase, $F_{OPPOSING}$ causes the drum 3510 to spin clockwise (from the viewpoint of FIG. 13D) and pay out flexible capture member wrapped around the drum 3510. This clockwise spinning of the drum 3510 forces hydraulic fluid to flow into the outlet port of the hydraulic motor 7358, through the hydraulic motor 7358, and exit the inlet port of the hydraulic motor 7358. Since hydraulic fluid cannot enter the outlet port of the pressure regulator 7354, this causes the pressure P2 of the hydraulic fluid downstream of the pressure regulator 7354 and upstream of the pressure relief valve 7356 and the hydraulic motor 7358 to increase. Once the pressure P2 of the hydraulic fluid downstream of the pressure regulator 7354 and upstream of the pressure relief valve 7356 and the hydraulic motor 7358 reaches the 850 psi pressure relief valve set point, the pressure relief valve 7356 enables hydraulic fluid to flow through it. This causes hydraulic fluid to flow from the inlet port of the hydraulic motor 7358 to the inlet port of the pressure relief valve 7356 and from the outlet port of the pressure relief valve 7356 to the outlet port of the hydraulic motor 7358 until the drum 3510 stops rotating clockwise (from the viewpoint of FIG. 13D) and P2 drops below the pressure relief valve set point (850 psi in this example embodiment) (i.e., until $F_{OPPOSING}$ falls below $F_{DRUM}$).

During the payout phase, hydraulic fluid does not drain to the tank 7362, and the electric hydraulic pump 7350 thus doesn't need to replenish any drained hydraulic fluid. This means that P1 will not drop below the 800 psi pressure switch lower set point, and the pressure switch 7364 electrically disconnects the electric hydraulic pump 7350 from the power source 7400 during most (if not all) of the payout phase.

Accordingly, the relative positioning and configuration of the components of the hydraulic system enable the hydraulic motor to spin in either direction while maintaining torque on the drum shaft in the desired direction (counter-clockwise in the embodiment show in FIGS. 13A-13D) to maintain $F_{DRUM}$ on the flexible capture member In this example embodiment, $F_{DRUM}$ is controlled by the pressure relief valve set point (the higher the set point, the higher $F_{DRUM}$) and friction. In this example embodiment, $F_{DRUM}$ is about 85 pounds during the payout phase.

8.4 Example Fixed-Wing Aircraft Capture Process

Figure 13E:
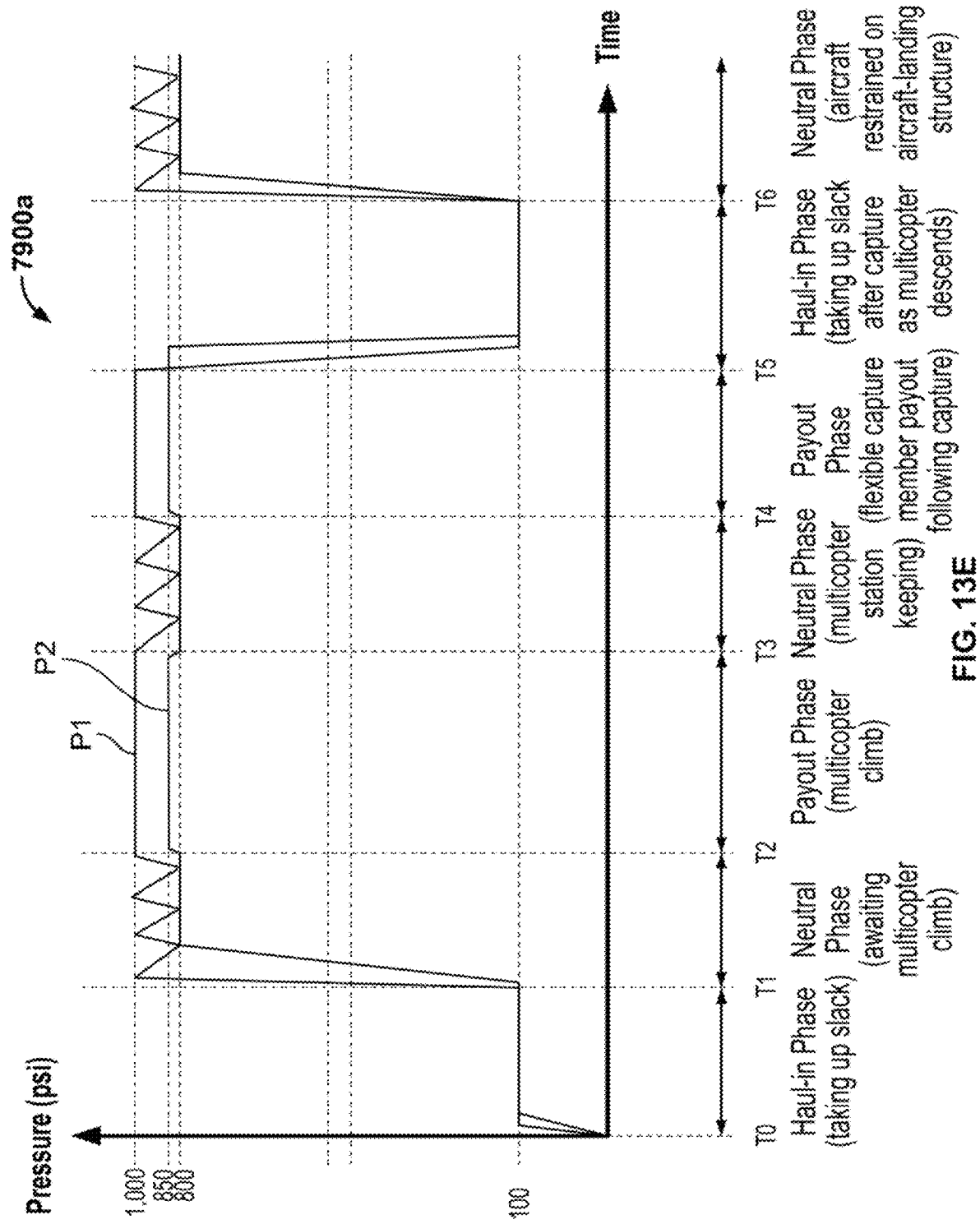
FIG. 13E is a graph of two pressures during the fixed-wing aircraft retrieval process employing the hydraulic system of FIGS. 13A-13D.

FIG. 13E is a graph 7900 of the pressure P1 of the hydraulic fluid at the accumulator 7352 and the pressure P2 of the hydraulic fluid downstream of the pressure regulator 7354 and upstream of the pressure relief valve 7356 and the hydraulic motor 7358 over time during the fixed-wing aircraft retrieval process. For simplicity, in this example embodiment P1 and P2 are assumed to be 0 psi at time T0.

Before time T0, while the electric hydraulic pump 7350 is switched off, the anchor system operator pulls some of the flexible capture member 5000 off of the drum 3510 and attaches the flexible capture member 5000 to the multicopter. Since the flexible capture member is slack between the drum 3510 and the multicopter, $F_{OPPOSING}$ is negligible at time T0.

At time T0, the anchor system operator switches the electric hydraulic pump 7350 on to begin a haul-in phase of the fixed-wing aircraft retrieval process to take up the slack in the flexible capture member 5000. Since P1 is 0 psi—i.e., less than the 800 psi pressure switch lower set point—the pressure switch 7364 electrically connects the power source 7400 and the electric hydraulic pump 7350. As described above, the electric hydraulic pump 7350 pumps hydraulic fluid at the 100 psi pump outlet pressure to drive the hydraulic motor 7358 to rotate the drum 3510 counter-clockwise (from the viewpoint in FIG. 13A) and take up the slack in the flexible capture member 5000. P2 and P1 are generally equal in the haul-in phase (though P2 may be slightly lower than P1 due to pressure loss via the tubing and connectors).

At time T1, all of the slack in the flexible capture member 5000 has wound around the drum 3510, and $F_{OPPOSING}$ equals $F_{DRUM}$. This begins a neutral phase of the fixed-wing aircraft retrieval process before multicopter climb. Flow through the hydraulic motor 7358 slows to mere leakage, and electric hydraulic pump 7350 begins charging the accumulator 7352. When P1 reaches 1,000 psi pressure switch upper set point, the pressure switch 7364 electrically disconnects the power source 7400 and the electric hydraulic pump 7350. The accumulator 7352 begins discharging in response to the hydraulic fluid leaking through the hydraulic motor 7358. The pressure switch 7364 continues alternating between electrically connecting and electrically disconnecting the power source 7400 and the electric hydraulic pump 7350 during the neutral phase so P1 alternates between 800 and 1,000 psi. P2 tracks P1 until reaching the 800 psi pressure regulator set point.

At time T2, the multicopter operator begins multicopter climb, which begins a payout phase of the fixed-wing aircraft retrieval process. The climbing multicopter exerts a force $F_{OPPOSING}$ on the flexible capture member 5000 that exceeds $F_{DRUM}$, which causes the drum 3510 to spin clockwise (from the viewpoint in FIG. 13D) and payout the flexible capture member 5000. As described above, this increases P2 to (or even above) the 850 psi pressure relief valve set point. In the payout phase, P1 maintains its 1,000 psi value as of time T2. Once the multicopter reaches its desired height (just before time T3), it stops climbing and begins station-keeping. Since $F_{OPPOSING}$ equals $F_{DRUM}$, P2 decreases to 800 psi.

At time T3, the multicopter is station-keeping and $F_{OPPOSING}$ equals $F_{DRUM}$. This begins a neutral phase of the fixed-wing aircraft retrieval process, described above with respect to T1 through T2.

At time T4, the fixed-wing aircraft contacts and captures the flexible capture member 5000 extending between the multicopter and the drum 3510. This begins a payout phase of the fixed-wing aircraft retrieval process. The impact of the fixed-wing aircraft on the flexible capture member 5000 exerts a force $F_{OPPOSING}$ on the flexible capture member 5000 that exceeds $F_{DRUM}$, which causes the drum 3510 to spin clockwise (from the viewpoint in FIG. 13D) and payout the flexible capture member 5000. As described above, this quickly increases P2 to (or even above) 850 psi—i.e., the pressure relief valve set point. In the payout phase, P1 maintains its 1,000 psi value as of time T4. Once the movement of the fixed-wing aircraft has dampened such that $F_{OPPOSING}$ no longer exceeds $F_{DRUM}$ (just before time T5), P2 decreases to 800 psi.

At time T5, there is slack in the flexible capture member 5000 extending between the captured fixed-wing aircraft and the drum 3510. Accordingly, $F_{OPPOSING}$ is less than $F_{DRUM}$, and the haul-in phase begins, as described above for time T0 through T1.

At time T6, the fixed-wing aircraft has reached and is resting on the aircraft-landing structure, and $F_{OPPOSING}$ equals $F_{DRUM}$. This begins a neutral phase of the fixed-wing aircraft retrieval process, described above with respect to T1 through T2.

The tension-regulating flexible capture member payout and retract device 7300 is therefore configured to quickly and automatically modify its operation to regulate the force $F_{DRUM}$ applied to the flexible capture member as the fixed-wing aircraft retrieval process switches between the haul-in, neutral, and payout phases.

8.5 Variations

As generally described above, the sizing and configuration of the components of the hydraulic system along with the different pressure set points result in the example $F_{DRUM}$ for the different phases of the fixed-wing aircraft retrieval process. One may vary the sizing and configuration of the components or the different pressure set points to achieve a desired $F_{DRUM}$ for the different phases of the fixed-wing aircraft retrieval process.

In various embodiments, a stopper is attached to a suitable position of the flexible capture member between the anchor system and the multicopter. The stopper is sized to not fit through the one of the components of the aircraft-landing structure or one of the components of the anchor system, and therefore partitions the flexible capture member into a portion that can be wound onto the drum (the portion between the drum and the stopper) and a portion that cannot be wound onto the drum (the portion between the stopper and the multicopter). One benefit is that the stopper ensures that a length of slack flexible capture member extends between the multicopter and the anchor system before the multicopter ascends for retrieval, which prevents the anchor system from prematurely pulling on the multicopter. This length of slack flexible capture member also facilitates landing the multicopter after retrieval since the multicopter will not have to fight against any force imposed by the anchor system.

In an alternative embodiment, the hydraulic system is instead an electrically powered winch with a slipping clutch that operates in a manner similar to that of the hydraulic system described above to regulate the tension in the flexible capture member during the fixed-wing aircraft retrieval process. In this embodiment, the electrically powered winch may include an electric motor having an output shaft, a drive shaft, a slipping clutch, a drum shaft, and a drum. The output shaft of the electric motor is operably connected to the drive shaft in a suitable manner such that the electric motor drives the drive shaft. The slipping clutch, if included, is fixedly attached to and rotatable with the drive shaft. If no clutch is present, the electric motor may be forced to oppose its intended direction. Specifically, a brushed DC motor with a constant current electrical power supply would enable the motor to spin either direction while maintaining torque in the desired direction for purpose of maintaining tension on the spool of flexible capture member.

The drum shaft is mounted to the anchor system base via suitable bearings so the drum shaft can freely rotate relative to the anchor system base. The drum is fixedly attached to and rotatable with the drum shaft. The slipping clutch is positioned adjacent the drum.

In operation, when the electric motor is powered on, the output shaft of the electric motor drives the drive shaft and the slipping clutch, and the slipping clutch transmits torque to the drum and causes the drum to rotate and exert a force $F_{DRUM}$ on the flexible capture member as described above. This continues as long as $F_{OPPOSING}$ is less than $F_{DRUM}$. Once $F_{OPPOSING}$ equals or exceeds $F_{DRUM}$, the slipping clutch slips and enables the drum to payout flexible capture member. To dissipate payout energy, the clutch may be configured as an eddy current brake that regulates $F_{DRUM}$. Since this slipping clutch process generates a substantial amount of heat, a cooling device, such as a blower or fan, may be employed to reduce operating temperatures.

9. Alternative Saddle

FIGS. 14A-14I show part of an alternative embodiment of the saddle 300a and components thereof. The saddle 300a is the portion of the hub module that: (1) the fixed-wing aircraft is attached to and released from to launch the fixed-wing aircraft into free, wing-borne flight; and (2) the flexible capture member is attached to for retrieval of the fixed-wing aircraft from free, wing-borne flight. This embodiment of the saddle 300a is sized, shaped, arranged, and otherwise configured to attach to and release the fixed-wing aircraft 20b without requiring any modification to the fixed-wing aircraft 20b. The size, shape, arrangement, and configuration of the components of the saddle 300a may be modified such that the saddle 300a can attach to and release other fixed-wing aircraft (such as the fixed-wing aircraft 20a).

The saddle 300a includes a saddle base bracket 6310 and first and second saddle side brackets 6312 and 6314 straddling the saddle base bracket 6310. A cross-brace 6318 is connected to and extends between the first and second saddle side brackets 6312 and 6314 near their back ends. As described in more detail below, the front ends of the first saddle side bracket 6312, the second saddle side bracket 6314, and the saddle base bracket 6310 are connected or otherwise mounted to a front engager 6320 such that the front engager 6320 can rotate relative to the first saddle side bracket 6312, the second saddle side bracket 6314, and the saddle base bracket 6310. Although not shown for clarity, the saddle base bracket 6310 is fixedly connected to the hub base via suitable mounting brackets, and the first and second saddle side brackets 6312 and 6314 are fixedly connected to the hub base via suitable fasteners.

Figure 14A:
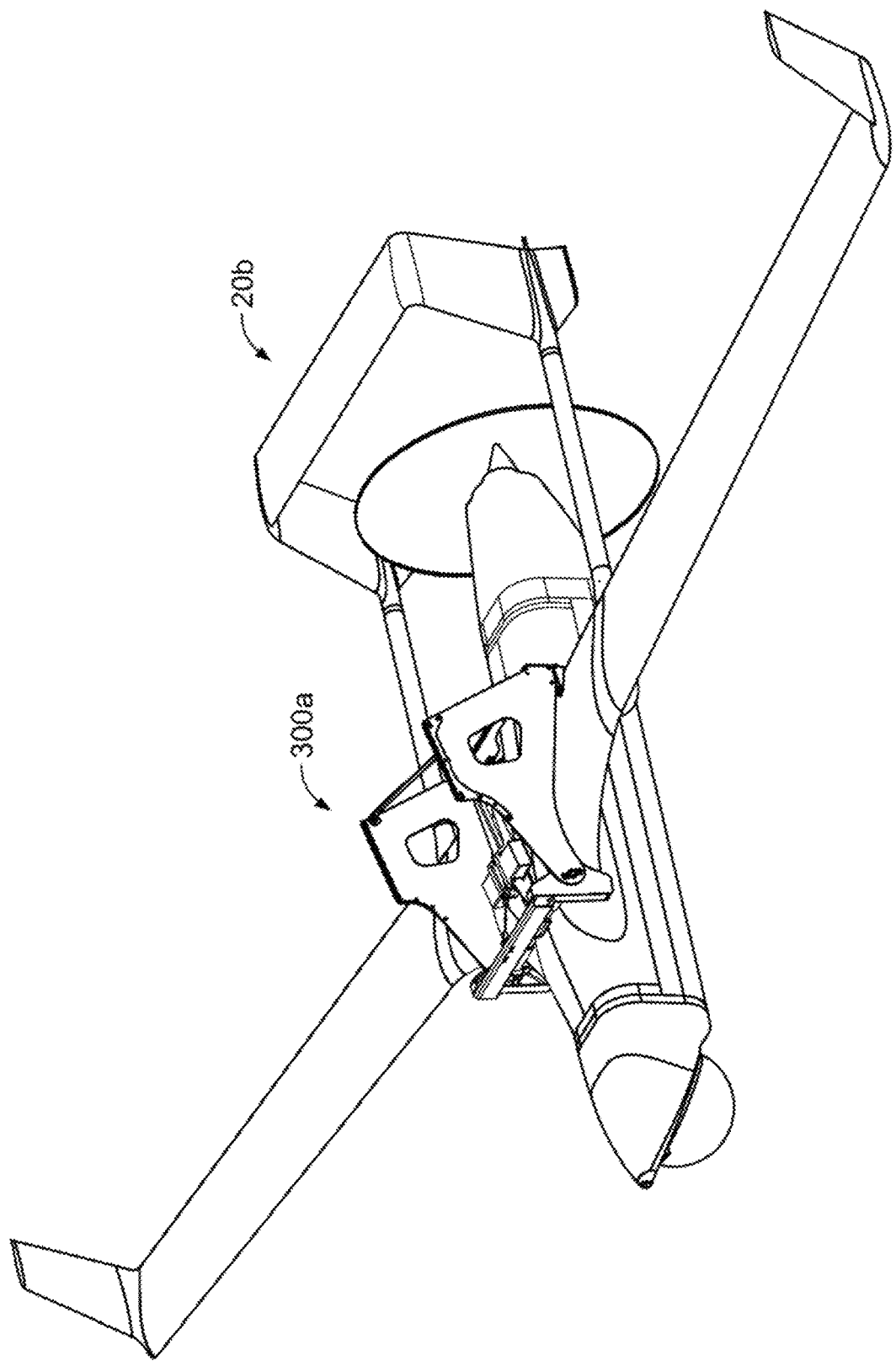
FIG. 14A is a top perspective view of an alternative fixed-wing aircraft attached to an alternative saddle.
Figure 14B:
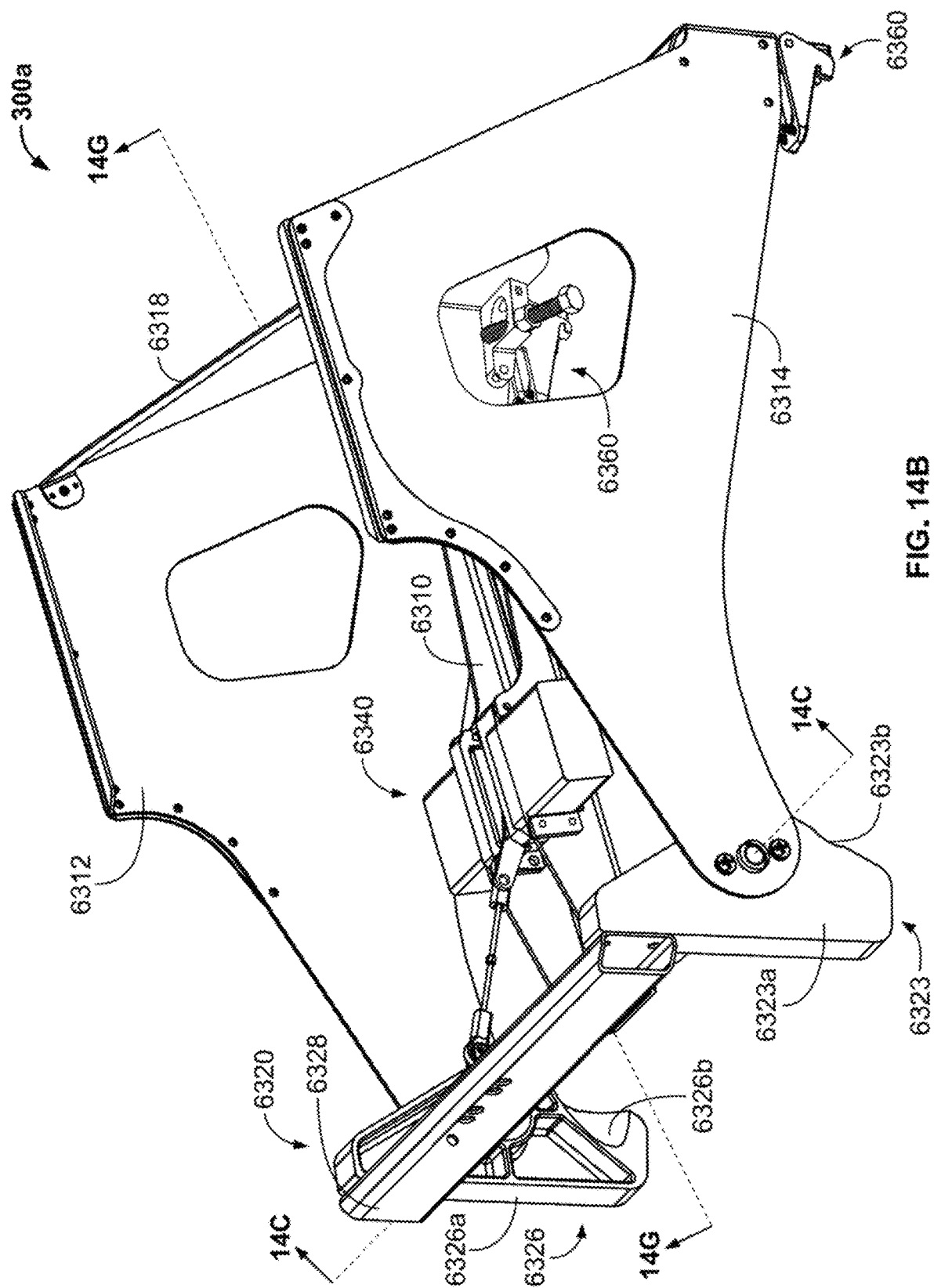
FIG. 14B is a top perspective view of the saddle of FIG. 14A.
Figure 14C:
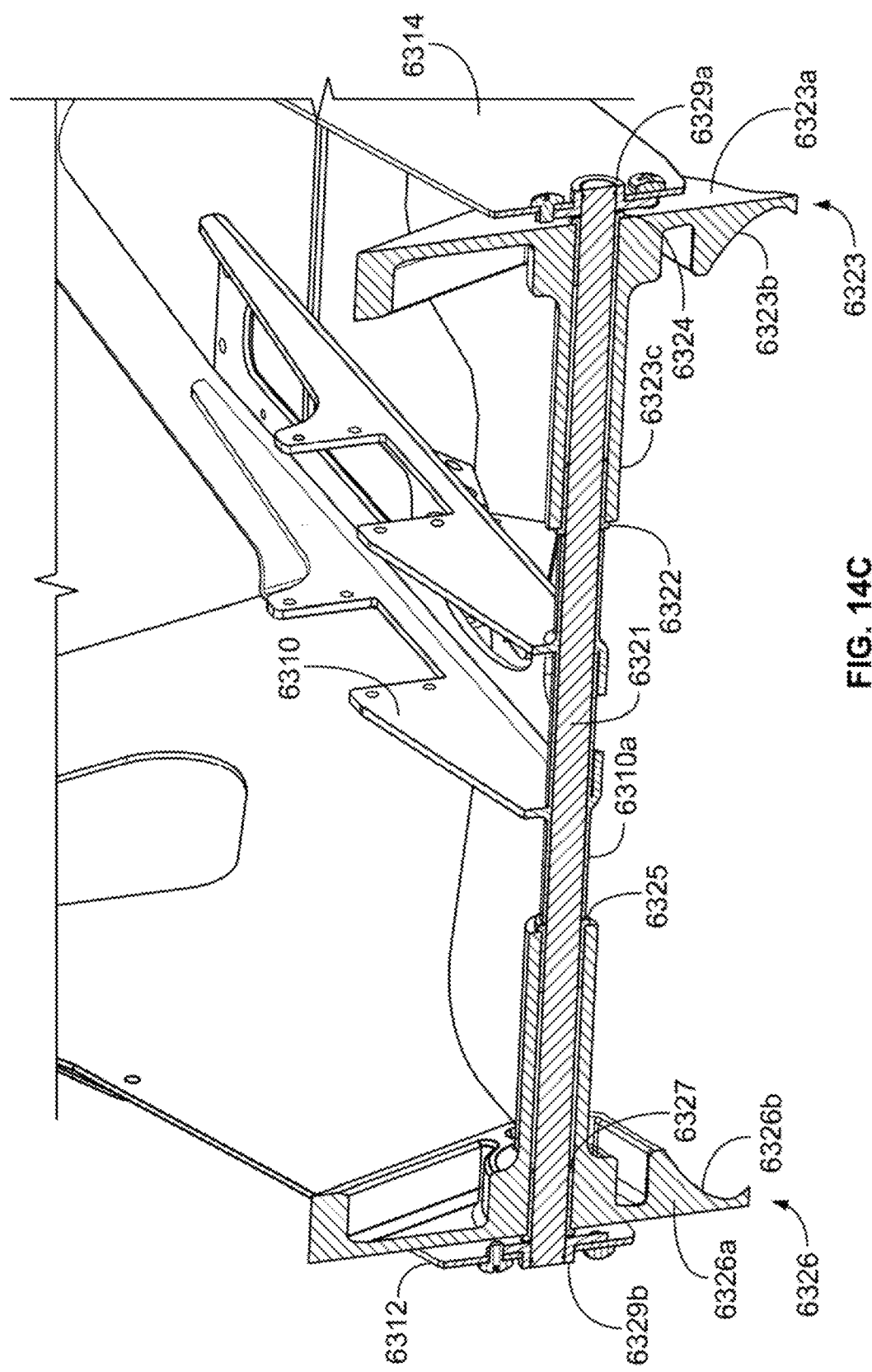
FIG. 14C is a cross-sectional view of the saddle of FIG. 14A taken substantially along line 14C-14C of FIG. 14B and with certain elements removed.

As best shown in FIGS. 14B and 14C, the front engager 6320 includes: a shaft 6321; first and second leading-edge engagers 6323 and 6326; sleeve bearings 6322, 6324, 6325, and 6327; and a stabilizer 6328.

The first leading-edge engager 6323 includes a generally triangular base 6323a having a tube 6323c extending therefrom. A shaft-receiving bore (not labeled) extends through the base 6323a and the tube 6323c. The base 6323a defines a contoured leading edge engaging surface 6323b that is shaped to receive and engage the portion of the leading edge of the wing of the fixed-wing aircraft 20b to which the saddle 300a will attach, as described below. The base 6323a includes a plurality of strengthening ribs extending outward from the tube 6323c. Similarly, the second leading-edge engager 6326 includes a generally triangular base 6326a having a tube 6326c extending therefrom. A shaft-receiving bore (not labeled) extends through the base 6326a and the tube 6326c. The base 6326a defines a contoured leading edge engaging surface 6326b that is shaped to receive and engage the portion of the leading edge of the wing of the fixed-wing aircraft 20b to which the saddle 300a will attach, as described below. The base 6326a includes a plurality of strengthening ribs extending outward from the tube 6326c.

As noted above, the front engager 6230 is connected or otherwise mounted to the saddle base bracket 6310 and the first and second saddle side brackets 6312 and 6314 such that the front engager 6320 is rotatable relative to those components. The saddle base bracket 6310 includes a tubular mounting portion 6310a that defines a shaft-receiving bore therethrough. Part of the shaft 6321 is received in the shaft-receiving bore of the tubular mounting portion 6310a such that first and second free ends of the shaft are positioned on opposing sides of the tubular mounting portion 6310a. The shaft 6321 is rotatably fixed relative to the saddle base bracket 6310, though in other embodiments the shaft 6321 may rotate relative to the saddle base bracket 6310. Suitable bearings may be incorporated at the interfaces between the saddle base bracket and the shaft to facilitate rotation of the shaft relative to the saddle base bracket.

The first and second leading-edge engagers 6323 and 6326 are rotatably mounted to the shaft 6321 on opposite sides of the tubular mounting portion 6310a of the saddle base bracket 6310 via the sleeve bearings 6322, 6324, 6325, and 6327. Specifically, the sleeve bearings 6322 and 6324 are press fit into the opposing ends of the shaft-receiving bore through the first leading-edge engager 6323 such that the sleeve bearings 6322 and 6324 cannot rotate relative to the first leading-edge engager 6323. Part of the shaft 6321 is received in the sleeve bearings 6322 and 6324 and the shaft-receiving bore of the first leading-edge engager 6323 such that the first end of the shaft 6321 protrudes from the sleeve bearing 6324. The first end of the shaft 6321 is received in a first retaining element 6329a fixedly attached to the second saddle side bracket 6314. The first retaining element 6329a prevents substantial axial movement of the shaft 6321 relative to the first retaining nub 6329a, and retains the first leading-edge engager 6323 on the shaft 6321. At this point, the first leading-edge engager 6323 is mounted to the shaft 6321 via the sleeve bearings 6322 and 6324 such that the first leading-edge engager 6323 is rotatable about the longitudinal axis of the shaft 6321 relative to the saddle base bracket 6310. The longitudinal axis of the shaft 6321 is above the leading edges of the wings of the fixed-wing aircraft 20b.

Similarly, the sleeve bearings 6326 and 6325 are press fit into the opposing ends of the shaft-receiving bore through the second leading-edge engager 6326 such that the sleeve bearings 6326 and 6325 cannot rotate relative to the second leading-edge engager 6326. Part of the shaft 6321 is received in the sleeve bearings 6326 and 6325 and the shaft-receiving bore of the second leading-edge engager 6326 such that the second end of the shaft 6321 protrudes from the sleeve bearing 6325. The second end of the shaft 6321 is received in a second retaining element 6329*b* fixedly attached to the first saddle side bracket 6312. The second retaining element 6329*b* prevents substantial axial movement of the shaft 6321 relative to the second retaining element 6329*a*, and retains the second leading-edge engager 6326 on the shaft 6321. At this point, the second leading-edge engager 6326 is mounted to the shaft 6321 via the sleeve bearings 6326 and 6325 such that the second leading-edge engager 6326 is rotatable about the longitudinal axis of the shaft 6321 relative to the saddle base bracket 6310.

The stabilizer 6328 is attached to the base 6323*a* of the first leading-edge engager 6323 and to the base 6326*a* of the second leading-edge engager 6326 such that the stabilizer 6328 extends between and connects the first and second leading-edge engagers 6323 and 6326. The stabilizer 6328 ensures the first and second leading-edge engagers 6323 and 6326 rotate relative to the saddle base bracket 6310 and the first and second saddle side brackets 6312 and 6314 substantially simultaneously rather than independently of one another.

Figure 14D:
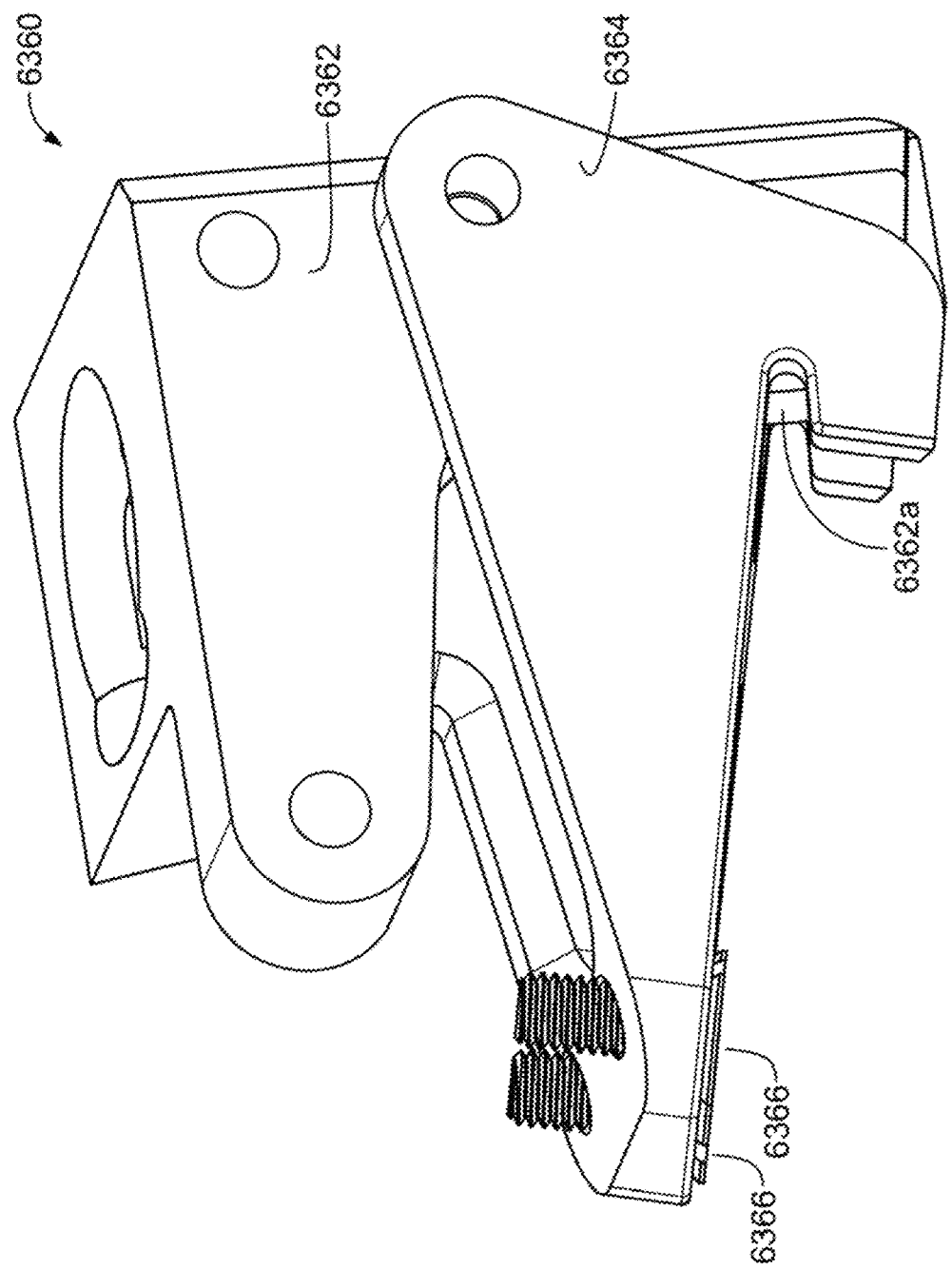
FIGS. 14D and 14E are, respectively, assembled and exploded top perspective views of a rear engager of the saddle of FIG. 14A.
Figure 14E:
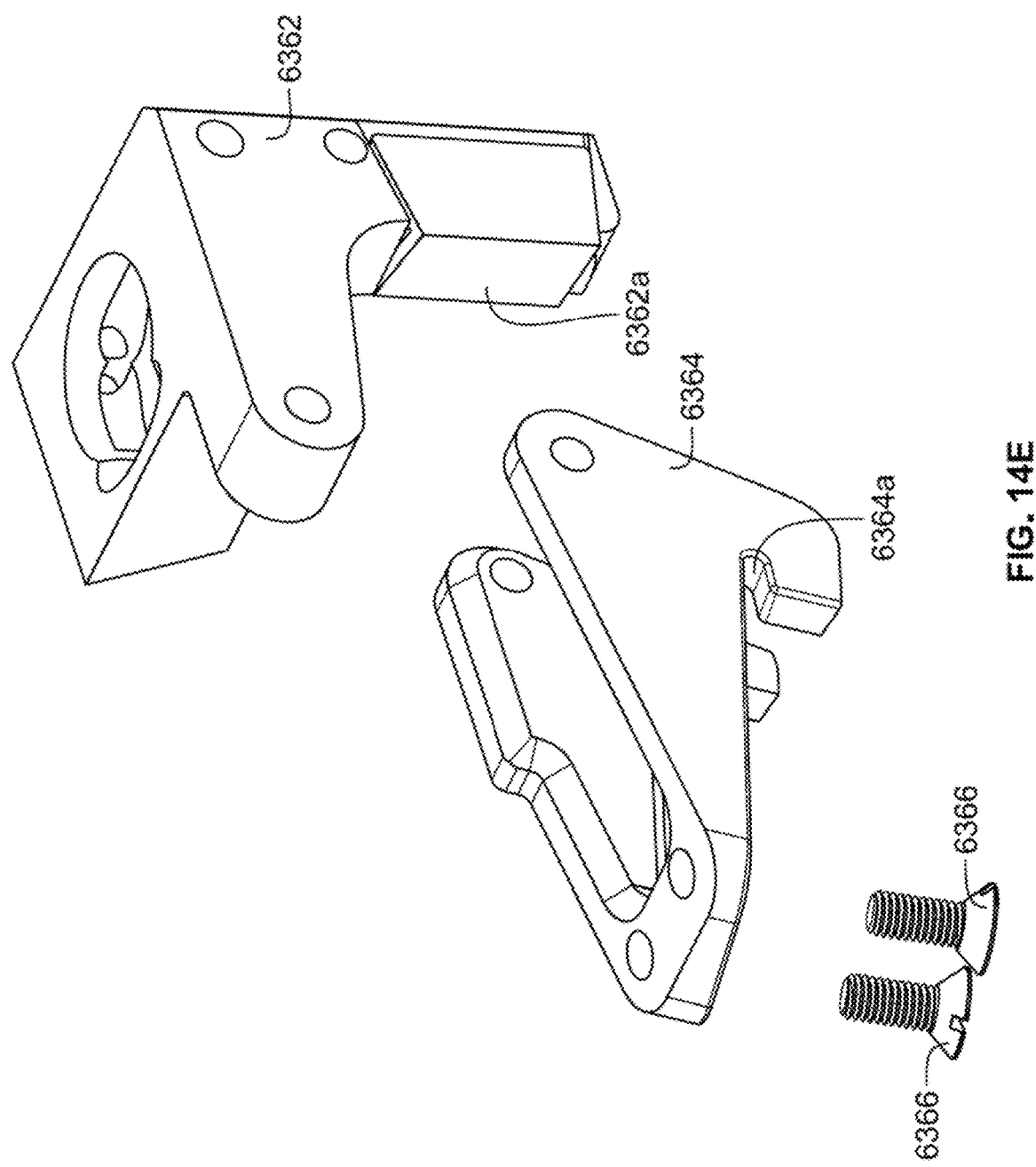
Figure 14F:
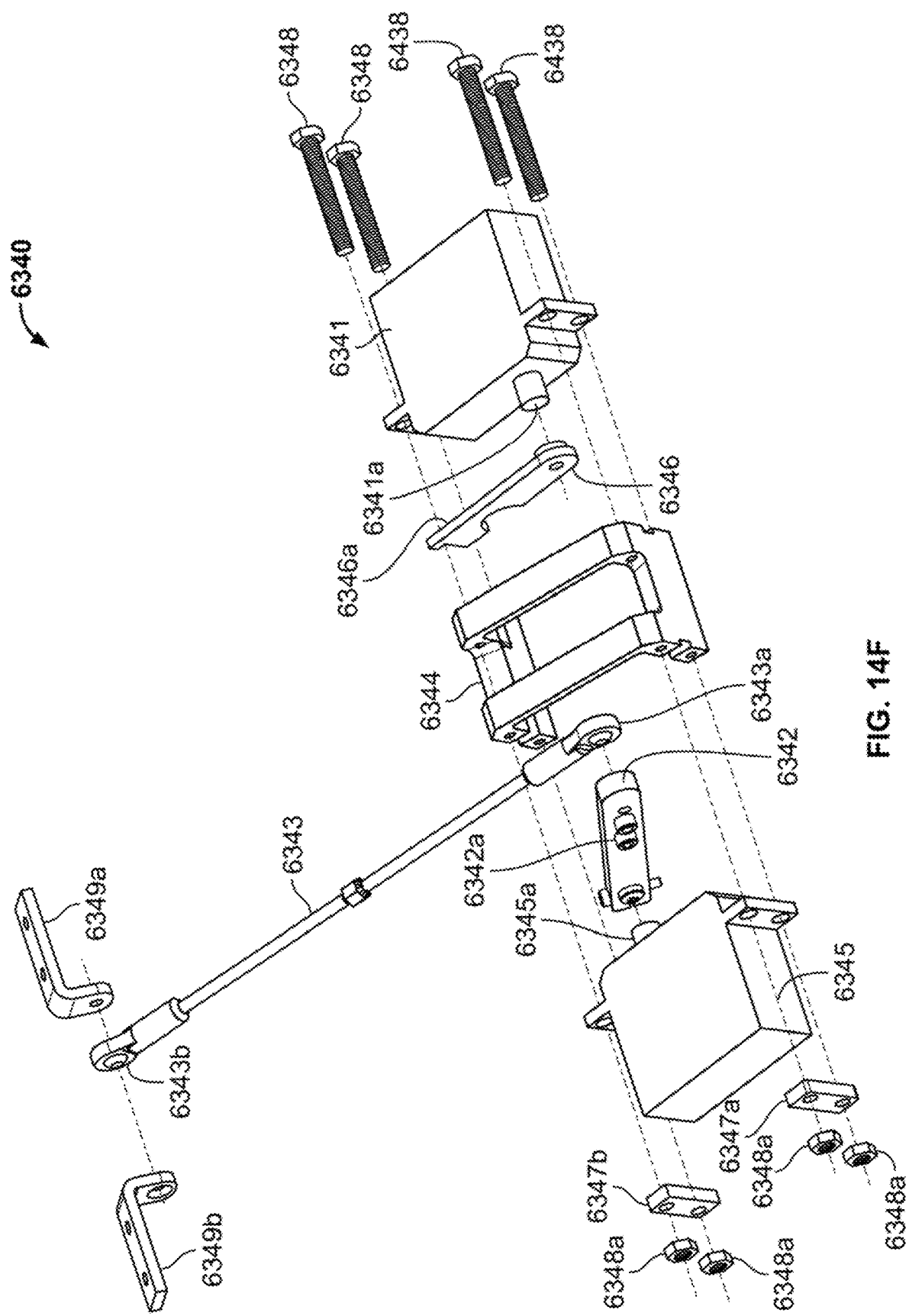
FIG. 14F is an exploded top perspective view of the attachment/release device of the part of the saddle of FIG. 14A.

As best shown in FIGS. 14B and 14F, an aircraft attaching/releasing assembly 6340 is attached to the saddle base bracket 6310 and to the front engager 6320 and controls rotation of the first engager 6320 about the longitudinal axis of the shaft 6321 relative to the saddle base bracket 6310. As best shown in FIG. 14F, the aircraft attaching/releasing assembly 6340 includes: a front engager servo motor 6345 having a front engager servo motor shaft 6345*a*, a front engager arm 6342, a front engager arm lock device 6342*a*, a servo spacer 6344, first and second nut plates 6347*a* and 6347*b*, fasteners 6348 and corresponding nuts 6348*a*, a front engager rotation control link 6343 having connectors 6343*a* and 6343*b* at opposite ends, a lock servo motor 6341 having a lock servo motor shaft 6341*a*, a lock arm 6346 terminating at one end in a locking extension 6346*a*, and first and second front engager attachment brackets 6349*a* and 6349*b*.

The front engager servo motor 6345 and the lock servo motor 6341 are attached to one another and to the saddle base bracket 6310 via the fasteners 6348, the servo spacer 6344, the first and second nut plates 6347*a* and 6347*b*, and the nuts 6348*a*.

The front engager arm 6342 is attached near one end to the front engager servo motor shaft 6345*a* and near the other end to the connector 6343*a*. The connector 6343*b* is attached to the stabilizer 6328 of the front engager 6320 via the first and second front engager attachment brackets 6349*a* and 6349*b* (such as via suitable fasteners, not shown). This operatively links the front engager servo motor shaft 6345*a* to the front engager 6320. The front engager arm lock device 6342*a* is attached to the front engager arm 6342 between the connector 6343*a* and the front engager servo motor shaft 6345*a*.

The lock arm 6346 is attached to the lock servo motor shaft 6341*a* near one end. The free end of the lock arm 6346 terminates in the locking extension 6346*a*, which is engageable to the front engager arm lock device 6342*a* in certain instances to prevent clockwise (from the viewpoint shown in FIGS. 14G-14I) rotation of the front engager arm 6342.

The front engager servo motor 6345 controls rotation of the front engager 6320 (and, specifically, the first and second leading-edge engagers 6323 and 6326) about the longitudinal axis of the shaft 6321 relative to the saddle base bracket 6310. To rotate the front engager 6320, the front engager servo motor 6345 rotates the front engager servo motor shaft 6345*a*, which rotates the attached front engager arm 6342, which in turn rotates the front engager 6320 via the front engager rotation control link 6343. The front engager servo motor 6345 can rotate the front engager 6320 between an attached rotational position—shown in FIGS. 14G and 14H—and a release rotational position—shown in FIG. 14I.

Figure 14G:
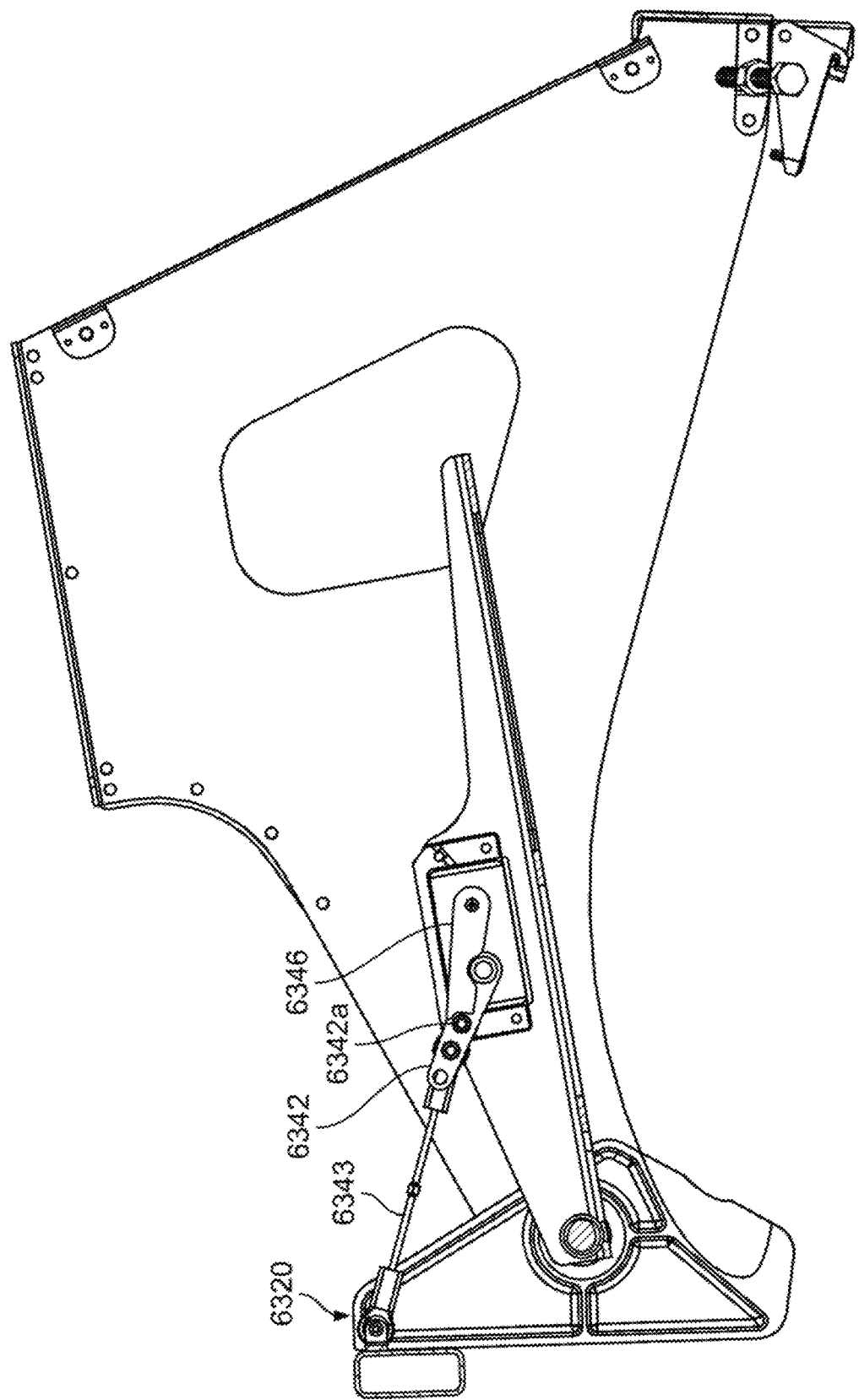
FIGS. 14G-14I are cross-sectional side elevational views of the part of the saddle of FIG. 14A showing different configurations of the lock arm and the front engager arm.
Figure 14H:
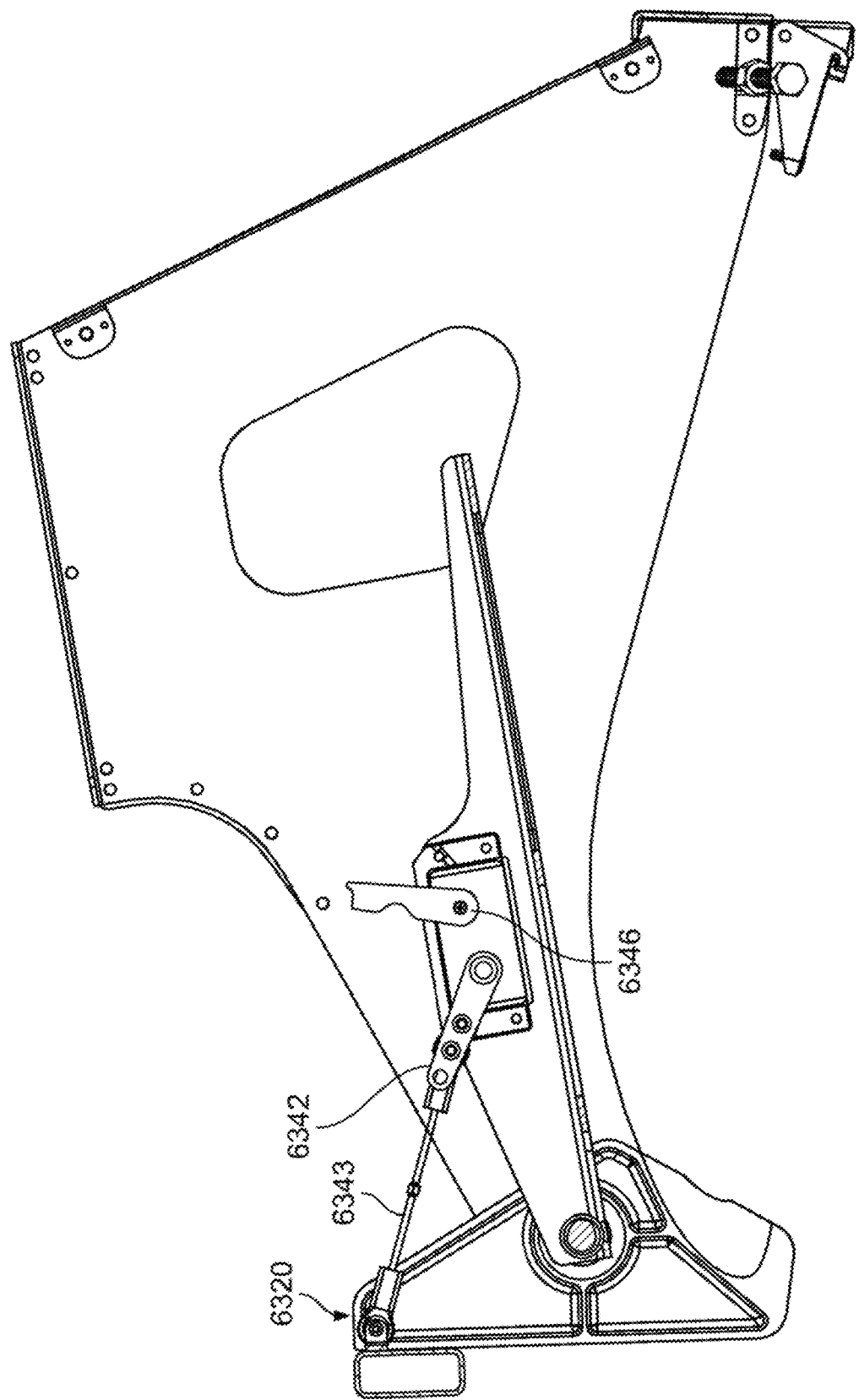
Figure 14I:
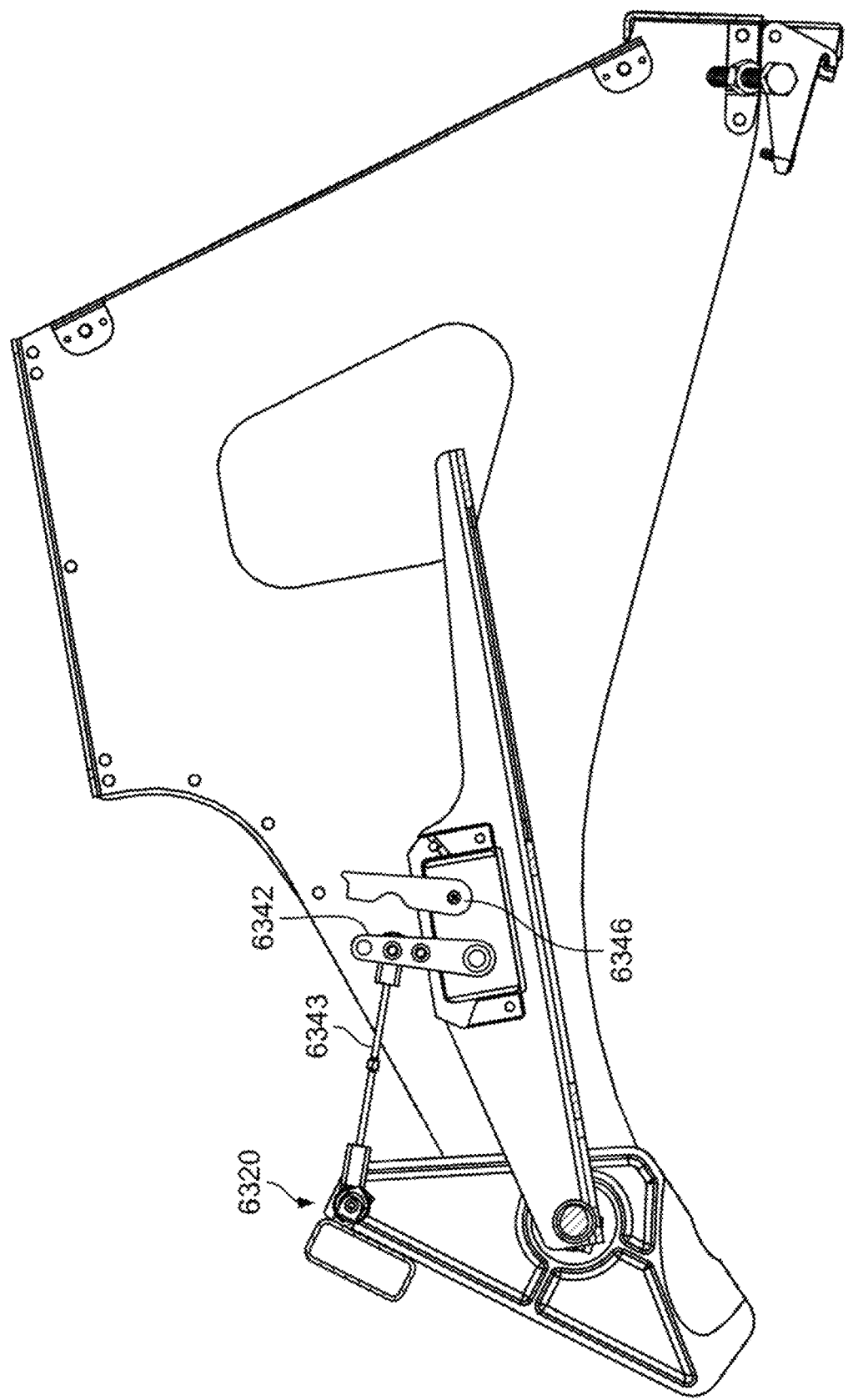

The lock servo motor 6341 controls rotation of the lock arm 6346 between a front engager rotation-preventing rotational position—shown in FIG. 14G—and a front engager rotation-enabling rotational position—shown in FIGS. 14H and 14I. When the front engager 6320 is in the attached rotational position and the lock arm 6346 is in the front engager rotation-preventing rotational position, the locking extension 6346*a* engages the front engager arm lock device 6342*a* of the front engager arm 6342. This prevents the front engager servo motor 6345 from rotating the front engager 6320 clockwise (from the viewpoint shown in FIGS. 14G-14I) from the attached rotational position to the release rotational position. As best shown in FIG. 14G, the servo spacer 6344 prevents counter-clockwise rotation (from the viewpoint shown in FIGS. 14G-14I) of the front engager arm 6342.

FIGS. 14G-14I show how the front engager servo motor 6345 and the lock servo motor 6341 cooperate to rotate the front engager 6320 from the attached rotational position to the release rotational position. Initially, the front engager arm 6342 is in the attached rotational position and the lock arm 6346 is in the front engager rotation-preventing rotational position. Here, the locking extension 6346*a* on the end of the lock arm 6346 engages the front engager arm lock device 6342*a* of the front engager arm 6342.

Since the locking extension 6346*a* engages the front engager lock device 6342*a* of the front engager arm 6342, the front engager servo motor 6345 cannot rotate the front engager 6320 from the attached rotational position to the release rotational position (clockwise from this viewpoint). And as indicated above, the servo spacer 6344*b* prevents counter-clockwise rotation of the front engager arm 6342 (from this viewpoint).

Rotating the front engager 6320 from the attached rotational position to the release rotational position is a two-step process. As shown in FIG. 14H, the operator first operates the lock servo motor 6341 to rotate the lock arm 6346 into the front engager rotation-enabling rotational position (clockwise from this viewpoint). Second, as shown in FIG. 14I, the operator operates the front engager servo motor 6345 to rotate the front engager 6320 from the attached rotational position to the release rotational position (clockwise from this viewpoint).

As shown in FIG. 14B, separate (but in this embodiment, identical) rear engagers 6360 (here, trailing-edge engagers) are attached to the first and second saddle side brackets 6312 and 6314. As best shown in FIGS. 14D and 14E, the rear engager 6360 includes a body 6362 and a pivotable portion 6364 pivotably connected to the body 6362 via a suitable pivot shaft (not shown). The body 6362 includes a trailing edge engaging surface 6362*a*. The pivotable portion 6364 includes multiple surfaces that define a trailing edge receiving channel 6364*a* sized and shaped to receive the trailing edge of a wing of the fixed-wing aircraft 20*b*. Fasteners 6366 are threadably received in the pivotable portion 6364. The fasteners 6366 engage the top surface of the wing of the fixed-wing aircraft 20*b*, and can be threaded further into or further out of the pivotable portion 6364 as desired to adjust clearance between the pivotable portion 6364 and the exterior upper surface of the wing. In one embodiment, the fasteners are formed from a relatively soft material, such as Teflon, and the pivotable portion is formed from a relatively harder material, such as aluminum.

The body 6362 is fixedly attached to the appropriate saddle side bracket via suitable fasteners (not shown for clarity) such that the trailing edge engaging surface 6362a and the pivotable portion 6364 extend below the body 6362.

In operation, to launch the fixed-wing aircraft 20b an operator first attaches the hub module to the fixed-wing aircraft 20b, assembles the multicopter, hoists the fixed-wing aircraft 20b using the multicopter and brings it to a desired airspeed, and releases the fixed-wing aircraft 20b from the multicopter, as generally described above.

For a multicopter including the saddle 300a, the operator attaches the hub module to the fixed-wing aircraft 20b by: (1) operating the front engager servo motor 6345 (either manually or remotely via the R/C controller) to rotate the front engager 6320 to the release rotational position; (2) inserting the trailing edges of the wings of the fixed-wing aircraft 20b into the trailing edge receiving channels 6364a of the pivotable portions 6364 of the rear engagers 6360; (3) positioning the saddle 300a relative to the fixed-wing aircraft 20b such that the leading edge engaging surfaces 6323b and 6326b of the front engager 6320 are adjacent the leading edges of the wings of the fixed-wing aircraft 20b; (4) operating the front engager servo motor 6345 (either manually or remotely via the R/C controller) to rotate the front engager 6320 to the attached rotational position such that the leading edge engaging surfaces 6323b and 6326b of the front engager 6320 contact the leading edges of the wings of the fixed-wing aircraft 20b; and (5) operating the lock servo motor 6341 (either manually or remotely via the R/C controller) to rotate the lock arm 6346a into the front engager rotation-preventing rotational position so the locking extension 6346a on the end of the lock arm 6346 engages the front engager arm lock device 6342a of the front engager arm 6342.

At this point the fixed-wing aircraft 20b is attached to the saddle 300a (and the multicopter) because the front engager 6320 and the rear engagers 6360 engage the wings of the fixed-wing aircraft 20b therebetween. The pivotable portions 6364 of the rear engagers 6360 are rotationally positioned relative to the bodies 6362 of the rear engagers 6360 such that the trailing-edge engaging surfaces 6362a are not within the trailing-edge receiving channels of the pivotable portions 6364. The positioning of the servo spacer 6344b and the fact that the locking extension 6346a is engaged to the front engager arm lock device 6342a of the front engager arm 6342 ensure the front engager servo motor 6345 cannot rotate the front engager 6320 from the attached rotational position to the release rotational position. This prevents undesired release of the fixed-wing aircraft 20b from the saddle 300a (and the multicopter).

Releasing the fixed-wing aircraft 20b from the saddle 300a while the multicopter is airborne is a two-step process. To release the fixed-wing aircraft 20b from the saddle 300a (and the multicopter), the operator first remotely controls the lock servo motor 6341 (via the R/C controller) to rotate the lock arm 6346 into the front engager rotation-enabling rotational position. Second, the operator remotely controls the front engager servo motor 6345 (via the R/C controller) to rotate the front engager 6320 from the attached rotational position to the release rotational position. As the front engager servo motor 6345 rotates the front engager 6320 from the attached rotational position to the release rotational position, the first and second leading edge engaging surfaces 6323b and 6326b of the front engager 6320 rotate away from and begin to lose contact with the leading edge of the wing of the fixed-wing aircraft 20b. As the front engager 6320 continues to rotate clear of the wings of the fixed-wing aircraft 20b, the pivotable portions 6364 of the rear engagers 6360 enable the fixed-wing aircraft 20b to freely pivot relative to the saddle base bracket 6310, the first and second saddle side brackets 6312 and 6314, and the bodies 6362 of the rear engagers 6360 as gravity pulls the fixed-wing aircraft 20b downward. The center of gravity of the fixed-wing aircraft 20a is positioned forward of the rear engagers. As this occurs, the trailing edge engaging surfaces 6362a of the bodies 6362 of the rear engagers 6360 gradually enter the trailing-edge receiving channels of the pivotable portions 6364. As this occurs, the trailing-edge engaging surfaces 6362a contact the trailing edge of the wings and force them out of the trailing edge receiving channels, thus releasing the fixed-wing aircraft 20a from the saddle 300a (and the multicopter) into free flight.

As the fixed-wing aircraft 20a rotates downward, its empennage rises relative to the multicopter 10 as the nose of the fixed-wing aircraft 20a drops. The rear engagers are configured such that the trailing edges of the wings of the fixed-wing aircraft 20a are forced out of the trailing edge receiving channels before the empennage of the fixed-wing aircraft 20a contacts one of the rotors of the multicopter 10.

In another embodiment, the rear engagers include an ejector device (not shown) having an ejector plate movable from a loaded position to an eject position (and vice-versa). The ejector plate is biased to the eject position via a spring or other suitable biasing element. In this embodiment, the act of clamping the wings of the fixed-wing aircraft between the front and rear engagers causes the trailing edges of the wings of the fixed-wing aircraft to contact the ejector plate and overcome the biasing force of the biasing element to move the ejector plate to the loaded position, and hold it there while the wings are clamped. During release, once the front engager rotates clear of the wings, the biasing element moves the ejector plate from the loaded position to the eject position. While this occurs, the ejector plate contacts the trailing edges of the wings and forces them away from the saddle 300a.

In the embodiment described above with respect to FIGS. 14A-14I, the leading edge engagers of the front engager rotate in a plane generally parallel to a longitudinal axis of the fuselage of the fixed-wing aircraft to attach the fixed-wing aircraft to the saddle 300a and to release the fixed-wing aircraft from the saddle 300a. In another embodiment, the leading edge engagers of the front engager rotate in a plane generally perpendicular to the longitudinal axis of the fuselage of the fixed-wing aircraft to attach the fixed-wing aircraft to the saddle 300a to and release the fixed-wing aircraft from the saddle 300a. For example, the free ends of the leading edge engagers may rotate inward, toward the fuselage, to move from the release rotational position to the attached rotational position and may rotate outward, away from the fuselage, to move from the attached rotational position to the release rotational position.

In certain embodiments, the leading-edge engagers (and particularly the leading-edge engaging surfaces) are sized, shaped, arranged, and otherwise configured to force the nose of the fixed-wing aircraft downward during release.

As noted above, this embodiment of the saddle 300a may be sized, shaped, arranged, and otherwise configured to attach to and release any suitable fixed-wing aircraft by clamping its wings between front and rear engagers. An operator could—without changing any other components of the multicopter—swap out one saddle base bracket, front engager, and rear engager combination (or the entire saddle including those components) configured for one type of aircraft with another saddle base bracket, front engager, and rear engager combination (or the entire saddle including those components) configured for a different type of aircraft. This adds yet another layer of modularity to the multicopter and enables it to carry many different types of fixed-wing aircraft without requiring any modification of those fixed-wing aircraft.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention claimed is:

1. An anchor system for retrieving an aircraft from free flight, the anchor system comprising:
a base;
a drum shaft rotatably mounted to the base;
a drum attached to the drum shaft to rotate with the drum shaft; and
a motor comprising a motor shaft operatively connected to the drum shaft to impose a regulated torque on the drum shaft independent of spin direction of the motor shaft, wherein the motor is configured to impose a first regulated torque on the drum shaft when an opposing torque exerted on the drum shaft is less than the first regulated torque and to impose a second regulated torque different from the first regulated torque on the drum shaft when the opposing torque exceeds the first regulated torque.

2. The anchor system of claim 1, wherein the motor is configured to impose the first regulated torque when the drum shaft spins in a first direction and to impose the second regulated torque different from the first regulated torque when the drum shaft spins in a second direction different from the first direction.

3. The anchor system of claim 1, wherein the motor comprises a hydraulic motor, the anchor system further comprising a hydraulic system comprising the hydraulic motor and a hydraulic pump in fluid communication with the hydraulic motor, the hydraulic system operatively connected to the drum shaft via the motor.

4. The anchor system of claim 1, wherein the second regulated torque is greater than the first regulated torque.

5. The anchor system of claim 4, wherein the hydraulic system further comprises a pressure relief valve having: (1) an inlet in fluid communication with an inlet of the hydraulic motor and an outlet of the hydraulic pump; and (2) an outlet in fluid communication with an outlet of the hydraulic motor, wherein the pressure relief valve is movable between a closed configuration in which the pressure relief valve prevents flow of hydraulic fluid from its inlet to its outlet and an open configuration in which the pressure relief valve enables flow of the hydraulic fluid from its inlet to its outlet, wherein the pressure relief valve is biased to the closed configuration and configured to move from the closed configuration to the open configuration responsive to a pressure of the hydraulic fluid at the inlet of the pressure relief valve reaching a pressure relief valve set point.

6. The anchor system of claim 5, wherein the hydraulic system is configured such that a pressure of hydraulic fluid between the hydraulic pump and the hydraulic motor is a first pressure when the hydraulic motor imposes the first regulated torque on the drum shaft.

7. The anchor system of claim 6, wherein the hydraulic system is configured such that the pressure of hydraulic fluid between the hydraulic pump and the hydraulic motor is a second pressure greater than the first pressure when the opposing torque exceeds the first regulated torque.

8. The anchor system of claim 7, wherein the hydraulic system further comprises an accumulator having an inlet/outlet port in fluid communication with an outlet port of the hydraulic pump.

9. The anchor system of claim 8, wherein the hydraulic system further comprises a pressure switch configured to measure a pressure of hydraulic fluid between the hydraulic pump and the hydraulic motor and: (1) electrically connect the hydraulic pump and a power source responsive the pressure of hydraulic fluid between the hydraulic pump and the hydraulic motor being below a pressure switch lower set point; and (2) electrically disconnect the hydraulic pump from the power source when the pressure of hydraulic fluid between the hydraulic pump and the hydraulic motor equals or exceeds a pressure switch upper set point that is greater than the pressure switch lower set point.

10. The anchor system of claim 3, wherein the hydraulic system further comprises:
a pressure relief valve between and in fluid communication with the hydraulic pump and the hydraulic motor; and
a tank in fluid communication with the hydraulic motor and the hydraulic pump.

11. The anchor system of claim 10, wherein the hydraulic system further comprises an accumulator between the pressure relief valve and the hydraulic motor.

12. The anchor system of claim 11, wherein the hydraulic system further comprises a pressure switch configured to measure a pressure of hydraulic fluid between the hydraulic pump and the hydraulic motor and: (1) electrically connect the hydraulic pump and a power source responsive the pressure of hydraulic fluid between the hydraulic pump and the hydraulic motor being below a pressure switch lower set point; and (2) electrically disconnect the hydraulic pump from the power source when the pressure of hydraulic fluid between the hydraulic pump and the hydraulic motor equals or exceeds a pressure switch upper set point that is greater than the pressure switch lower set point.

13. The anchor system of claim 10, wherein the hydraulic system is configured such that, when the opposing torque is less than the first regulated torque, the hydraulic pump pumps hydraulic fluid from the tank through the hydraulic motor and back into the tank to cause the hydraulic motor to impose the first regulated torque on the drum shaft.

14. The anchor system of claim 13, wherein the hydraulic system is configured such that, when the opposing torque is greater than the first regulated torque, hydraulic fluid flows in a circuit between the hydraulic motor and the pressure relief valve and the hydraulic motor imposes the second regulated torque on the drum shaft.

15. The anchor system of claim 1, further comprising a level wind system attached to the base, the level wind system comprising a level wind shaft defining a groove and a traveler slidably mounted to the level wind shaft such that a guide element of the traveler is received in the groove.

16. The anchor system of claim 15, wherein the level wind shaft is operably connected to the drum shaft such that rotation of the drum shaft causes rotation of the level wind shaft, which causes the traveler to slide relative to the level wind shaft.

17. An anchor system for retrieving an aircraft from free flight, the anchor system comprising:

a base;

a drum shaft rotatably mounted to the base;

a drum attached to the drum shaft to rotate with the drum shaft; and a motor comprising a motor shaft operatively connected to the drum shaft to impose a regulated torque on the drum shaft independent of spin direction of the motor shaft; and a level wind system attached to the base, the level wind system comprising a level wind shaft defining a groove and a traveler slidably mounted to the level wind shaft such that a guide element of the traveler is received in the groove, wherein the level wind shaft is operably connected to the drum shaft such that rotation of the drum shaft causes rotation of the level wind shaft, which causes the traveler to slide relative to the level wind shaft.

* * * * *